US005687387A

United States Patent [19]
Endejan et al.

[11] Patent Number: 5,687,387
[45] Date of Patent: Nov. 11, 1997

[54] ENHANCED ACTIVE PORT REPLICATOR HAVING EXPANSION AND UPGRADE CAPABILITIES

[75] Inventors: Edward B. Endejan, St. Joseph; Richard S. Manning, Hartford; Larry A. Sparling, Grand Haven, all of Mich.; John P. Wagner, Round Rock, Tex.

[73] Assignee: Packard Bell NEC, Sacramento, Calif.

[21] Appl. No.: 412,505

[22] Filed: Mar. 24, 1995

Related U.S. Application Data

[63] Continuation-in-part of Ser. No. 27,669, Aug. 26, 1994, Pat. No. Des. 364,853.
[51] Int. Cl.$^6$ .................................................. G06F 13/00
[52] U.S. Cl. .................. 395/822; 395/309; 395/281; 439/638
[58] Field of Search ............................ 395/821, 309, 395/822, 281, 282; 439/638, 650–654; 364/708

[56] References Cited

U.S. PATENT DOCUMENTS

| D. 359,034 | 6/1995 | Kondo | D14/107 |
|---|---|---|---|
| D. 364,151 | 11/1995 | Yamazaki . | |
| 4,799,216 | 1/1989 | Johnson et al. | 370/67 |
| 4,903,222 | 2/1990 | Carter et al. | 361/680 |
| 5,300,874 | 4/1994 | Shimamoto et al. | 320/15 |
| 5,365,230 | 11/1994 | Kikinis | 341/22 |
| 5,460,547 | 10/1995 | Belt et al. | 439/638 |
| 5,519,851 | 5/1996 | Bender et al. | 395/500 |

OTHER PUBLICATIONS

National Semiconductor Corporation, "LM2878 Dual 5 Watt Power Audio Amplifier," pp. 1–220, date missing.
Yamaha LSI spec. sheet #YAC512, "2–Channel Floating D/A Converter," Catalog No. LSI–4AC5122, pp. 1–8, 1988.
Yamaha LSI spec. sheet #YMF262, "FM Operator Type L3 (OPL3)," Catalog No. LSI–4MF2622, pp. 1–20, 1988.
National Semiconductor spec. sheet for "DP83905 AT/LANTIC™ at Local Area Network Twisted–Pair Interface Controller," pp. 1–3, missing date.
MAXIM spec. sheet for MAX705–MAX708/MAX813L, "Low–Cost µP Supervisory Circuits," pp. 5–45, missing P. date.
MAXIM spec. sheet, "6–8 Cells to 3.3V/5V at Medium Power," p. 32, P. date missing.
AT&T Microelectronics Data Sheet, "Notebook Power Products 50 Series, 50 W ac/dc Adaptor," pp. 1–4, Jul. 1993.
Pulse Engineering, Inc. spec. sheet, "10Base–T Transformers and Common Mode Chokes," 901–2, 2 pages, Jan. 1992.
Valor Electronics, mechanical and electrical drawing sheets 3 & 4 of 14, Drawing No. SF1012., P. date missing.
National Semiconductor, "DP83905 AT/LANTIC™ Hardware User's Guide," pp. 1–19 Mar. 28, 1993.

(List continued on next page.)

*Primary Examiner*—Jack B. Harvey
*Assistant Examiner*—Ario Etienne
*Attorney, Agent, or Firm*—Fitch, Even, Tabin & Flannery

[57] ABSTRACT

An active port replicator, adapted to be connected to a portable personal computer, enables the portable personal computer to be relatively quickly and easily connected to a plurality of external I/O devices, such as a printers, a full size video monitor and the like in a desktop application and readily disconnected from the external I/O devices for portable applications. The active port replicator replicates all of the ports on a typical portable personal computer and may provide additional ports, such as an additional type PS/2 port, for added convenience and flexibility. Once the desired external I/O devices are connected to the active port replicator, the active port replicator may quickly and easily docked to a portable personal computer for desktop application and disconnected for portable application. In order to provide additional capability and flexibility of the portable personal computer in a desktop application, the active port replicator is user upgradeable with a network interface and a PCMCIA interface.

18 Claims, 144 Drawing Sheets

OTHER PUBLICATIONS

National Semiconductor, "AT/LANTIC™ Evaluation Software Description—ATLES," pp. 1–6, Dec. 3, 1992.

National Semiconductor, "DP83905EB–AT–AT/LANTIC™ Evaluation Board," pp. 1–11 plus four pages of schematics, Jan. 22, 1993.

Cirrus Logic, "CL–PD6710/6720 Advance Data Book," 1 page, Jan. 1993.

MAXIM, "Triple–Output Power–Supply Controlled for Notebook Computers," MAX783, pp. 4–241, Aug. 1993.

John R. Quain, "Moving Up to Multimedia," *PC Magazine*, pp. 112–116, 120, 121, 124–128, 135, 136, 138, 142, 143, 146, 151, 152, 154 and 157, Oct. 25, 1994.

Quality Semiconductor Inc. spec. sheet QS3L384 and QS3L2384, "High Speed, Lower Power CM0S10–bit Bus Switches," pp. 7–61 (MDSL–0036–00), P. date missing.

Power IC's Databook, 1993 Edition, National Semiconductor, "LP2950/LP2950AC/LP2950C 5V and LP2951/LP2951AC/–LP2951C Adjustable Micropower Voltage Regulators," pp. i & II and 2–95 thru 2–107, P. date missing.

Crystal Semiconductor Corp., CS4231, "Parallel Interface, Multimedia Audio Codec," pp. 4–165, Nov. 1993.

MOZART Preliminary Specification, pp. 1–3, Dec. 1993.

Russ Uithoven, "Software Specification for the Ninja Charging Cradle (MOACC)," pp. 1–5, Version 1.1, Mar. 9, 1994.

IBM ThinkPad, "Dock 1 User's Guide," pp. iii–xii, 1–1 thru 6–18, A–1 thru D–5 and 14 unnumbered pages, P. date missing.

IBM ThinkPad 750 brochure, P. date missing.

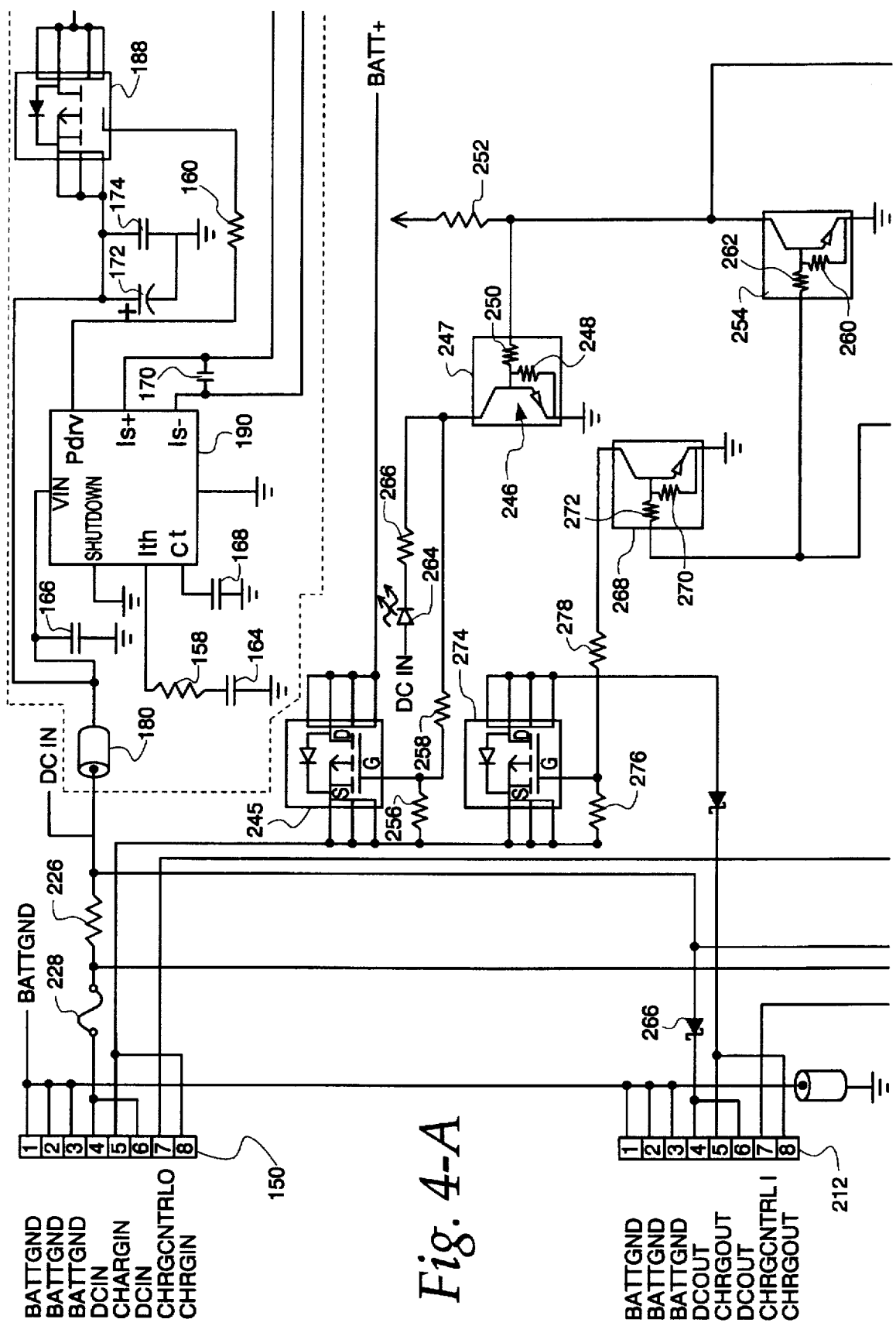
Fig. 4-A

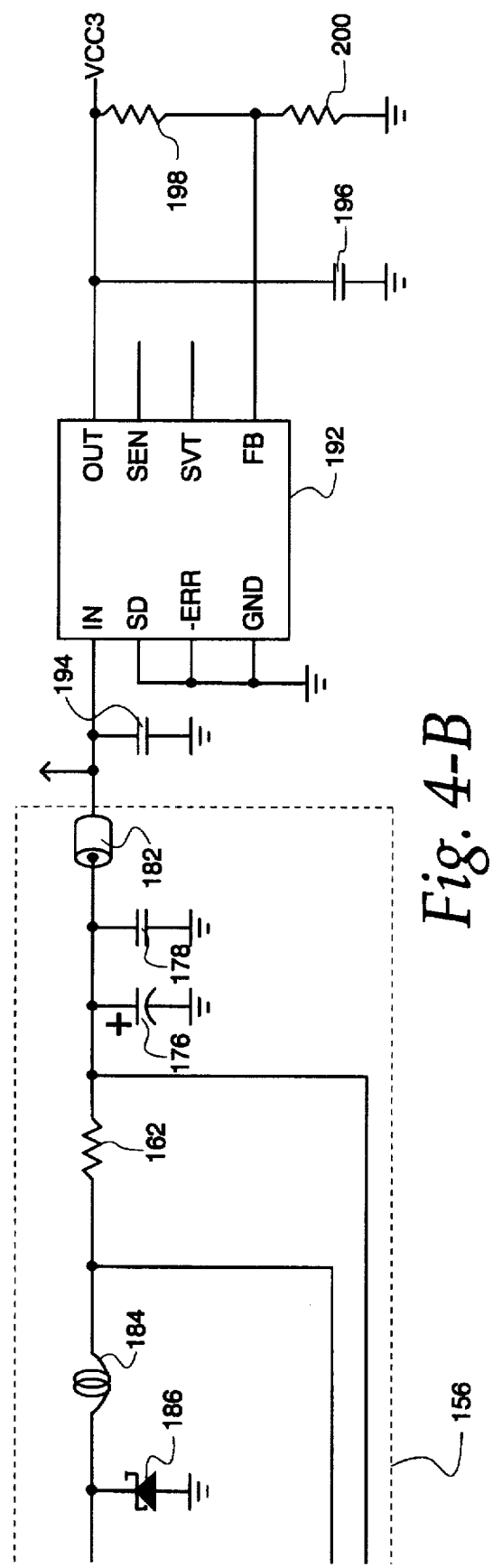
Fig. 4-B
| Fig. 4-A | Fig. 4-B |
|---|---|
| Fig. 4-C | Fig. 4-D |
Fig. 4-E

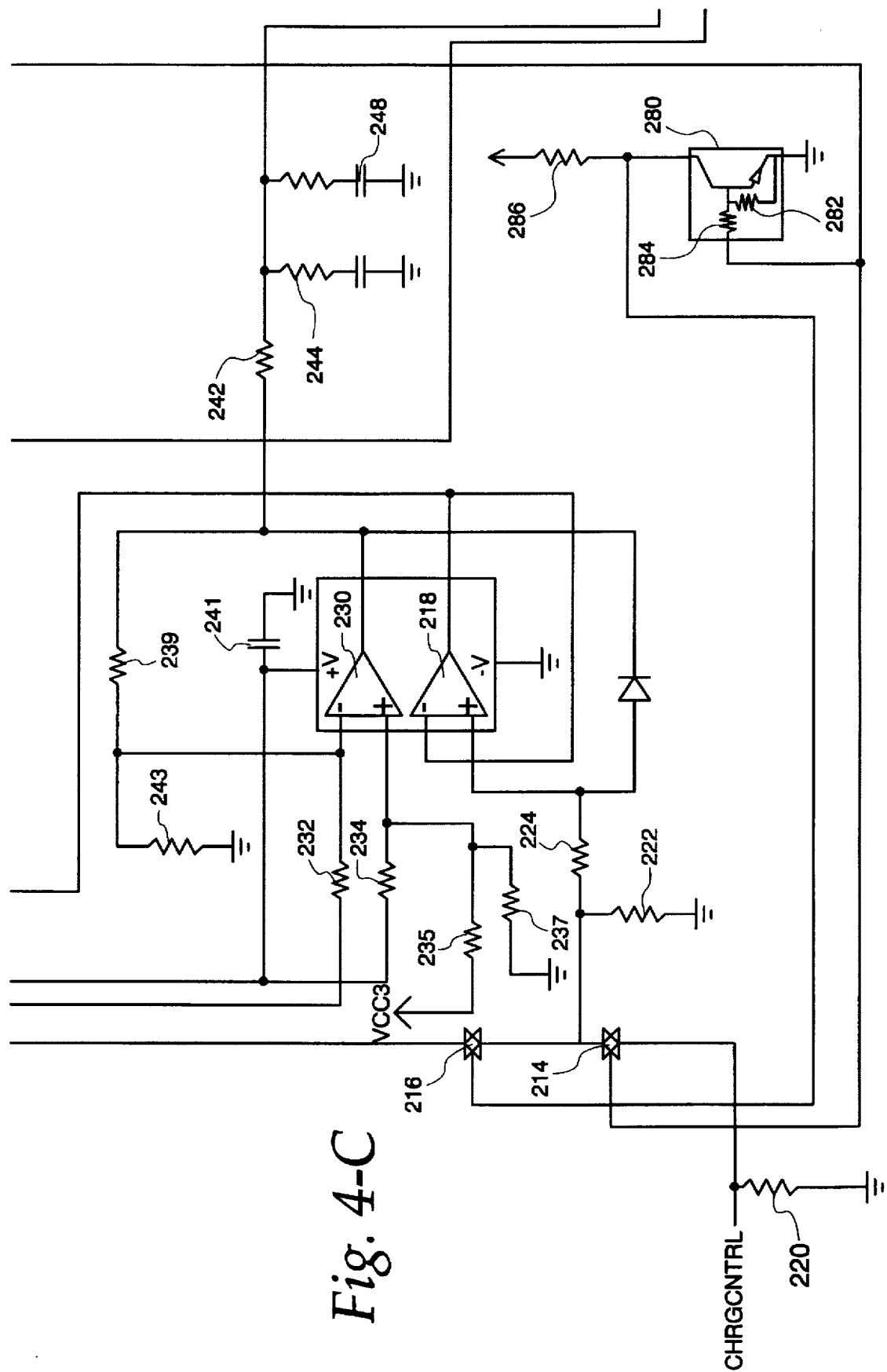
Fig. 4-C

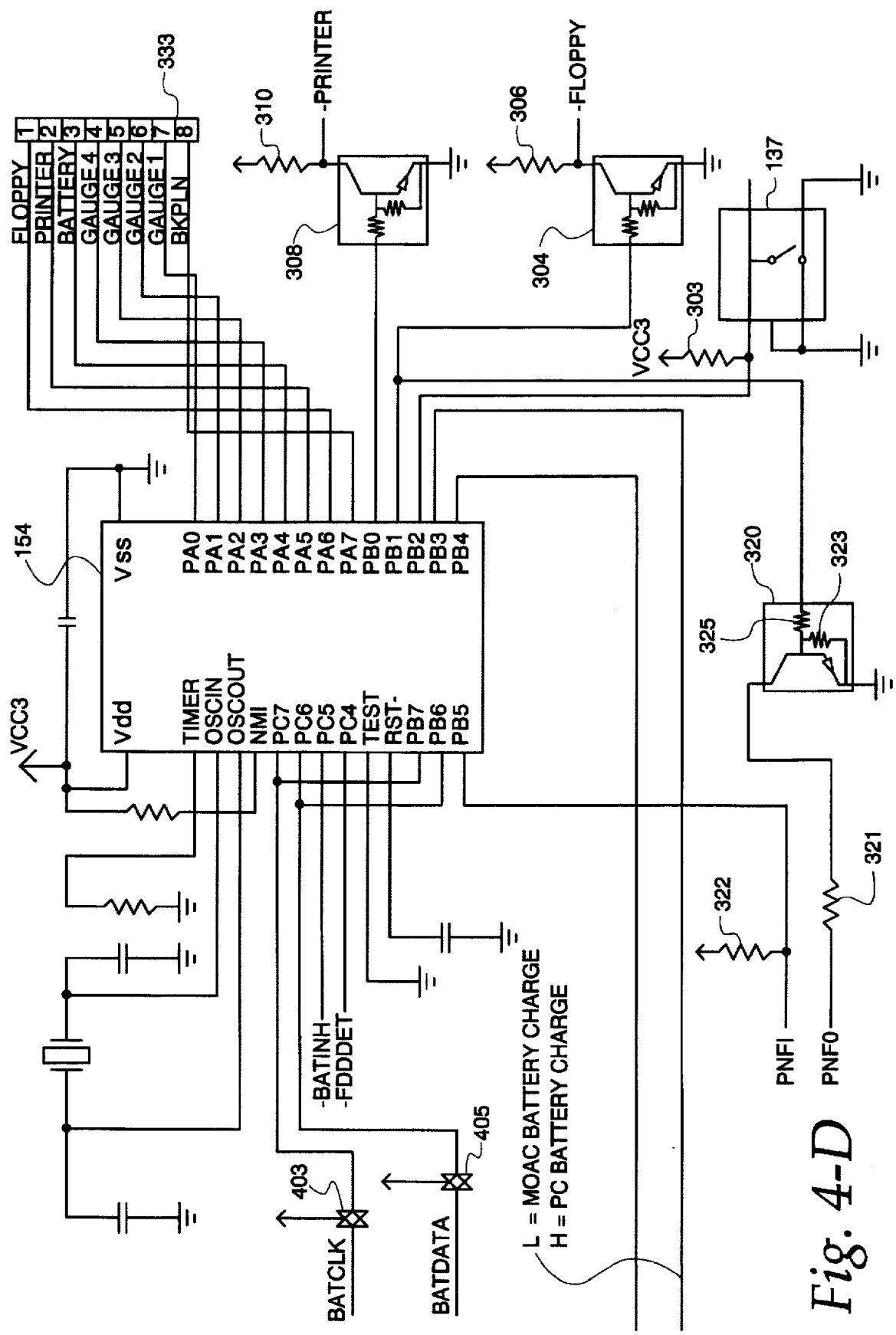
Fig. 4-D

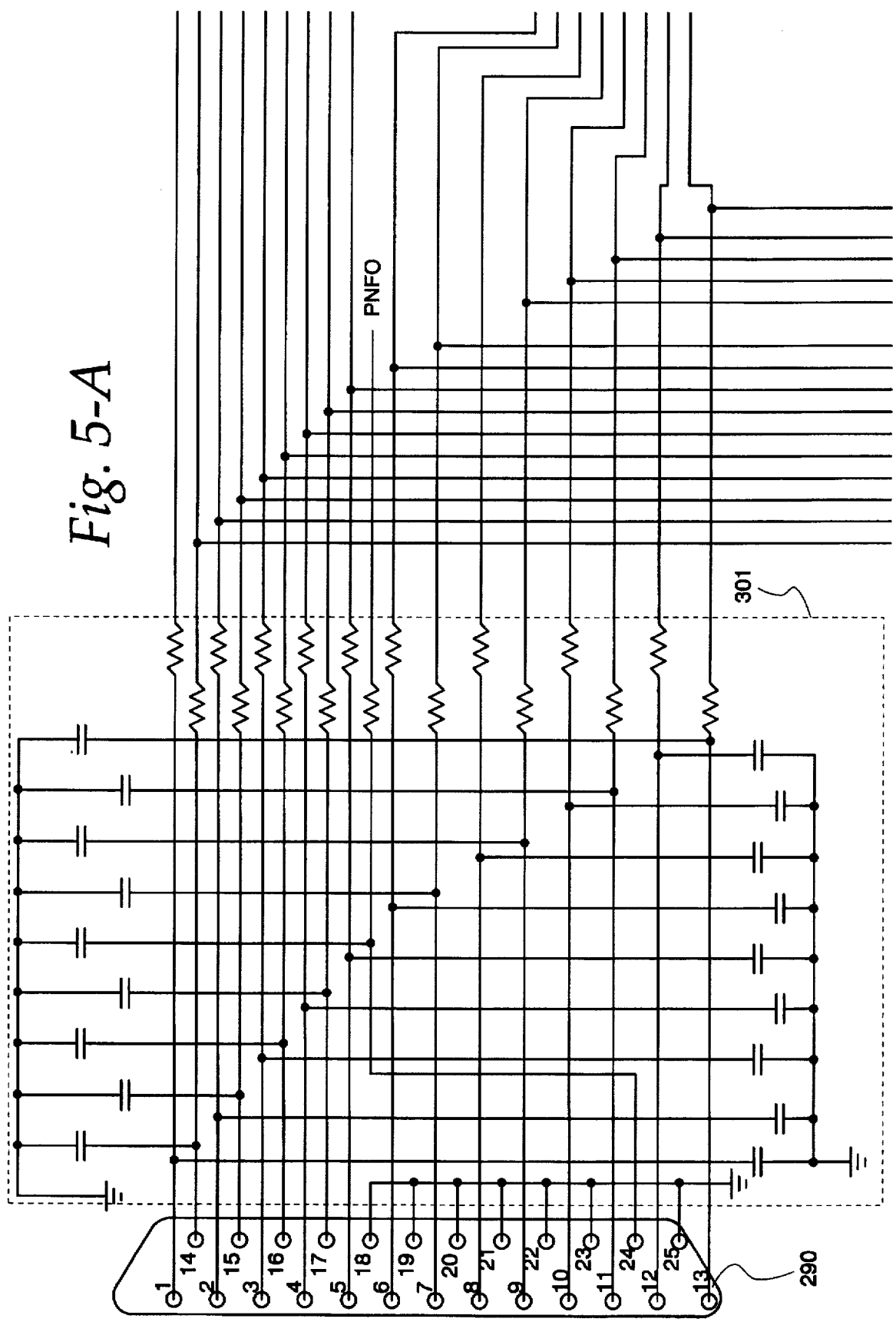
Fig. 5-A

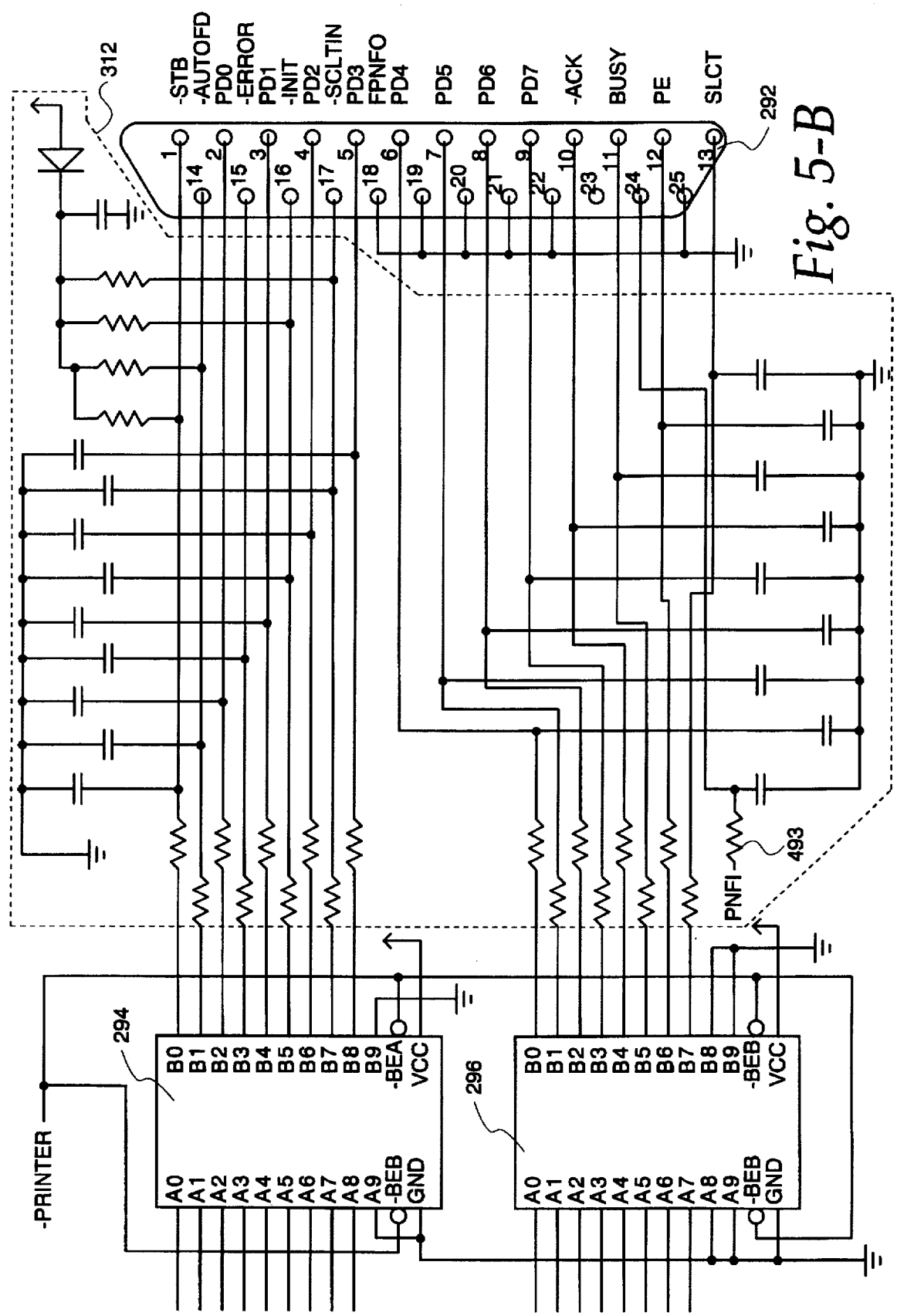
Fig. 5-B

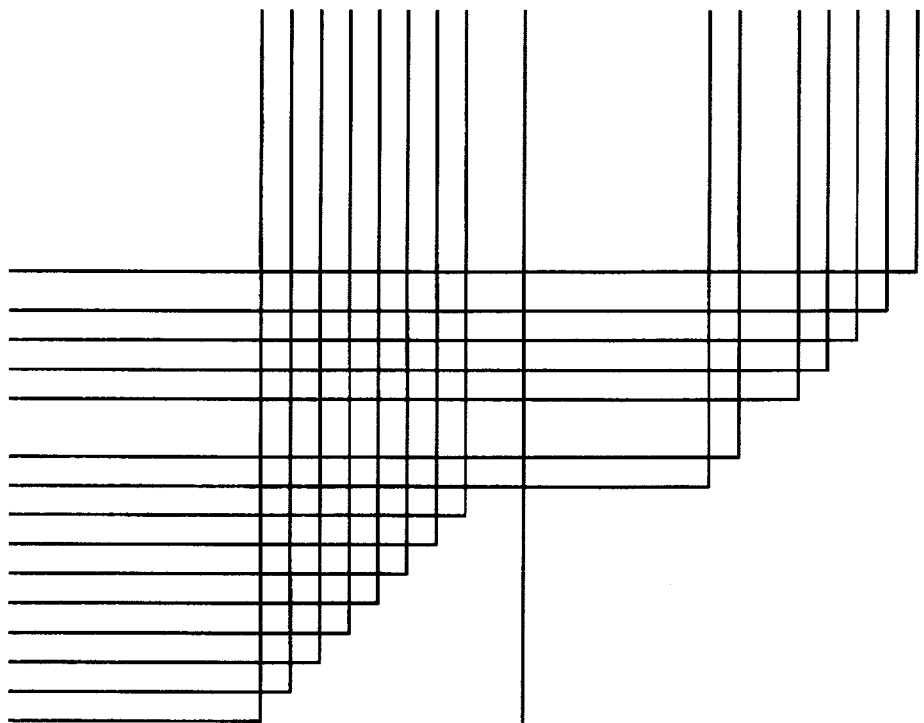
-FLOPPY
Fig. 5-C
| Fig. 5-A | Fig. 5-B |
| Fig. 5-C | Fig. 5-D |
Fig. 5-E

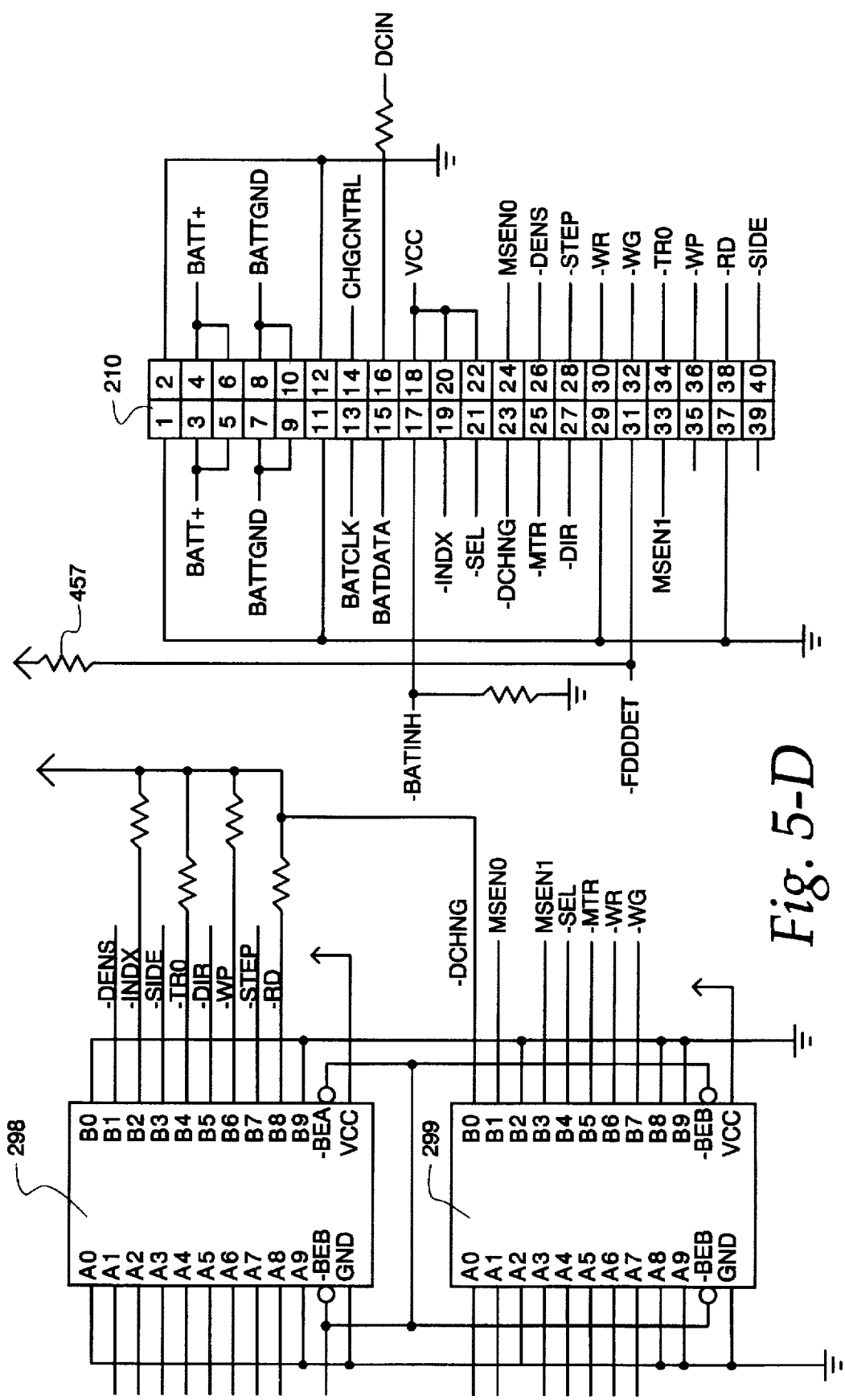
Fig. 5-D

Fig. 19
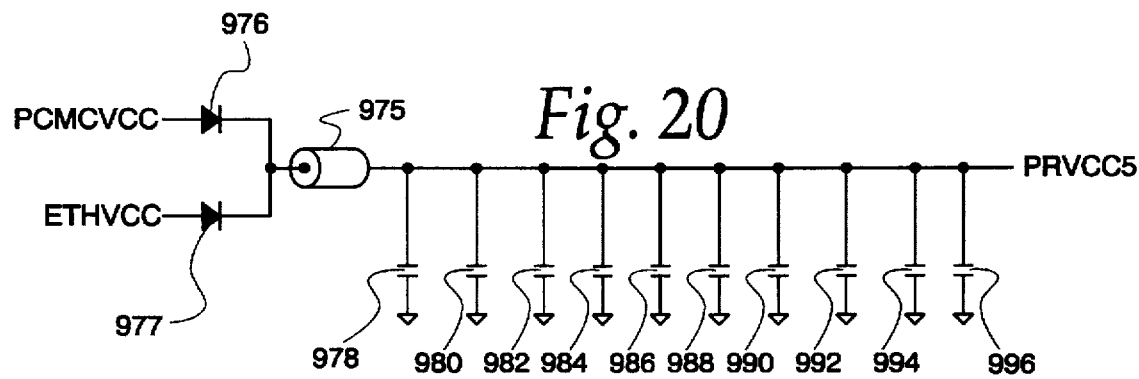
Fig. 20
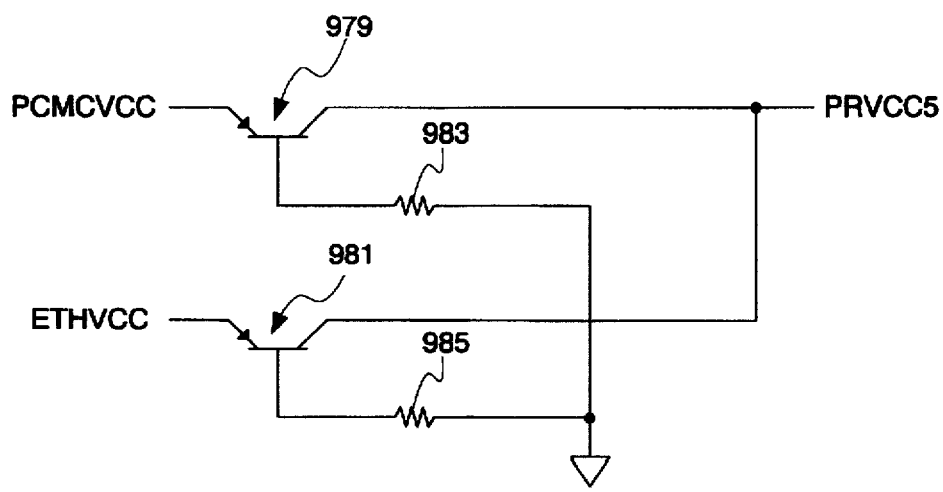

| Left | Pin | Pin | Right |
|---|---|---|---|
| QSD 15 | 1 | 2 | QSD 13 |
| QSD 11 | 3 | 4 | QSD 9 |
| QSD 8 | 5 | 6 | -QMEMR |
| QSA 18 | 7 | 8 | QSA 19 |
| -QRDPCRI | 9 | 10 | QSA 22 |
| QIRQ 11 | 11 | 12 | QIRQ 12 |
| PCMCVCC | 13 | 14 | -QSBHE |
| QSA0 | 15 | 16 | QSA 2 |
| QBALE | 17 | 18 | QSA 4 |
| PRPWRON | 19 | 20 | QIRQ 3 |
| QSA7 | 21 | 22 | QIRQ 5 |
| QSA9 | 23 | 24 | QSA 11 |
| QSA12 | 25 | 26 | QSA 14 |
| QSA15 | 27 | 28 | -QIOW |
| QAEN | 29 | 30 | QSD 1 |
| -QZEROWS | 31 | 32 | QSD 4 |
|  | 33 | 34 | QSD 6 |
| DC IN | 35 | 36 | DC_IN |
| DC IN | 37 | 38 | DC_IN |
|  | 39 | 40 |  |
| DC_GND | 41 | 42 | DC_GND |
| DC_GND | 43 | 44 | DC_GND |
| DC_GND | 45 | 46 |  |
| PCMCVCC | 47 | 48 |  |
|  | 49 | 50 |  |
| QSD14 | 51 | 52 | QSD 12 |
| QSD10 | 53 | 54 |  |
| -QMEMW | 55 | 56 | QSD 17 |
| QIRQ14 | 57 | 58 |  |
| QSA20 | 59 | 60 | QSA 21 |
| QIRQ 10 | 61 | 62 | QSA 23 |
| -QIOCS16 | 63 | 64 | -QMMCS16 |
| QSA 1 | 65 | 66 | QSA 3 |
| QIRQ 15 | 67 | 68 | QSA 5 |
| QSA 6 | 69 | 70 | QIRQ 4 |
| QSA 8 | 71 | 72 | QSA 10 |
| QIRQ 7 | 73 | 74 | -QRFSH |
| QSA 13 | 75 | 76 | QSA 16 |
| -QIOR | 77 | 78 | QIOCHRDY |
| QSD 0 | 79 | 80 | QSD 2 |
| QSD 3 | 81 | 82 | QSD 5 |
| QIRQ 9 | 83 | 84 | QSD 7 |
| DC_IN | 85 | 86 | -QSMI |
| DC_IN | 87 | 88 | QRDPCSPK |

*Fig. 21A*

PRVCC5

| Resistor | Signal |
|---|---|
| 1004 | -QIOR |
| 1006 | -QIOW |
| 1008 | -QMEMR |
| 1010 | -QMEMW |
| 1012 | QAEN |
| 1014 | QBALE |
| 1016 | QSA 0 |
| 1018 | QSA 1 |
| 1020 | QSA 2 |
| 1022 | QSA 3 |
| 1024 | QSA 4 |
| 1026 | QSA 5 |
| 1028 | QSA 6 |
| 1030 | QSA 7 |
| 1032 | QSA 8 |
| 1034 | QSA 9 |
| 1036 | QSA 10 |
| 1038 | QSA 11 |
| 1040 | QSA 12 |
| 1042 | QSA 13 |
| 1044 | QSA 14 |
| 1046 | QSA 15 |
| 1048 | QSA 16 |
| 1050 | QSA 17 |
| 1052 | QSA 18 |
| 1054 | QSA 19 |
| 1056 | QSA 20 |
| 1058 | QSA 21 |
| 1060 | QSA 22 |
| 1062 | QSA 23 |

*Fig. 26*

PRVCC5

| Resistor | Signal |
|---|---|
| 1064 | -QSTDRV |
| 1066 | -QSBHE |
| 1068 | -QRFSH |
| 1070 | QATCLK |
| 1072 | QSD 0 |
| 1074 | QSD 1 |
| 1076 | QSD 2 |
| 1078 | QSD 3 |
| 1080 | QSD 4 |
| 1082 | QSD 5 |
| 1084 | QSD 6 |
| 1086 | QSD 7 |
| 1088 | QSD 8 |
| 1090 | QSD 9 |
| 1092 | QSD 10 |
| 1094 | QSD 11 |
| 1096 | QSD 12 |
| 1098 | QSD 13 |
| 1100 | QSD 14 |
| 1102 | QSD 15 |

*Fig. 27*

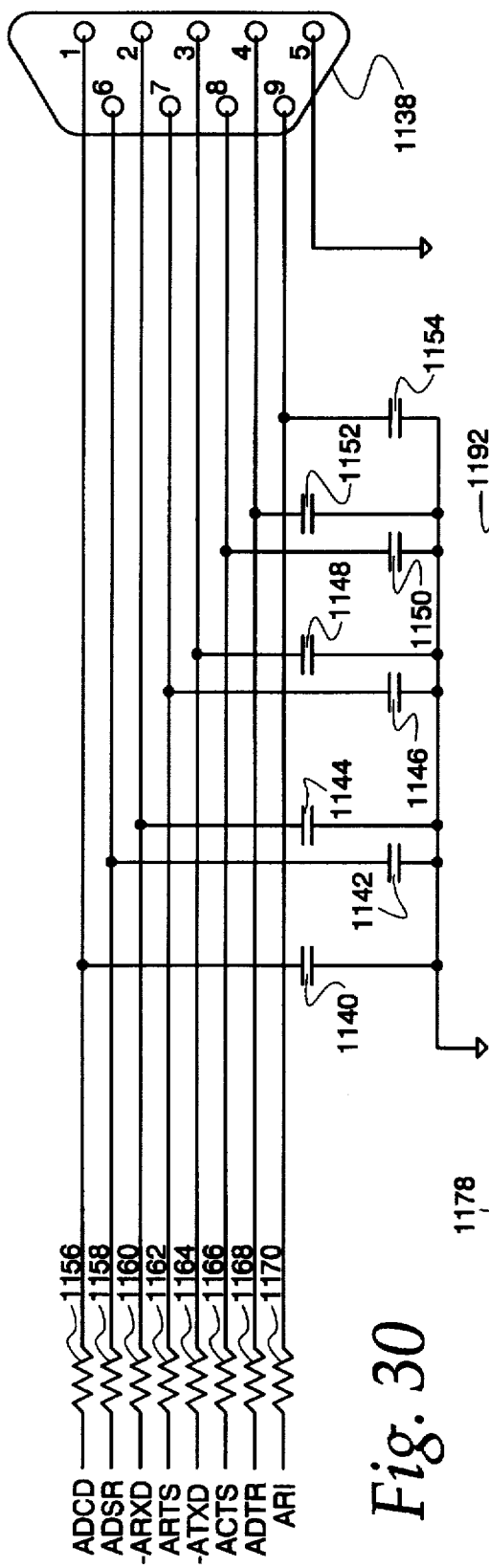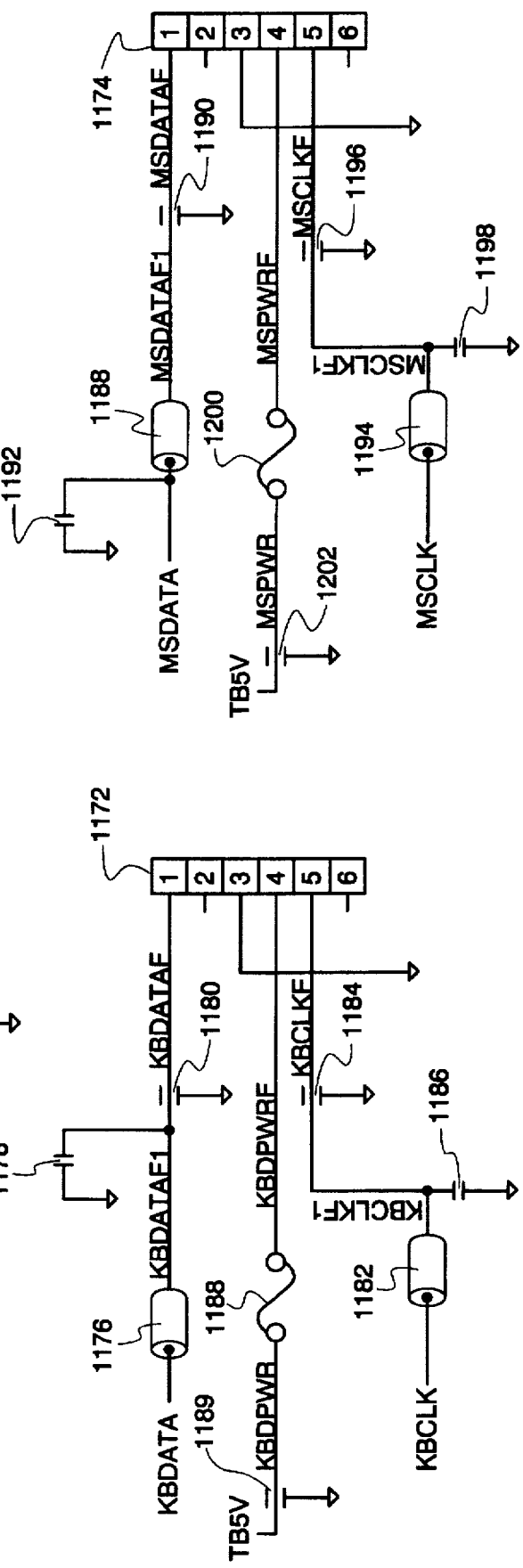

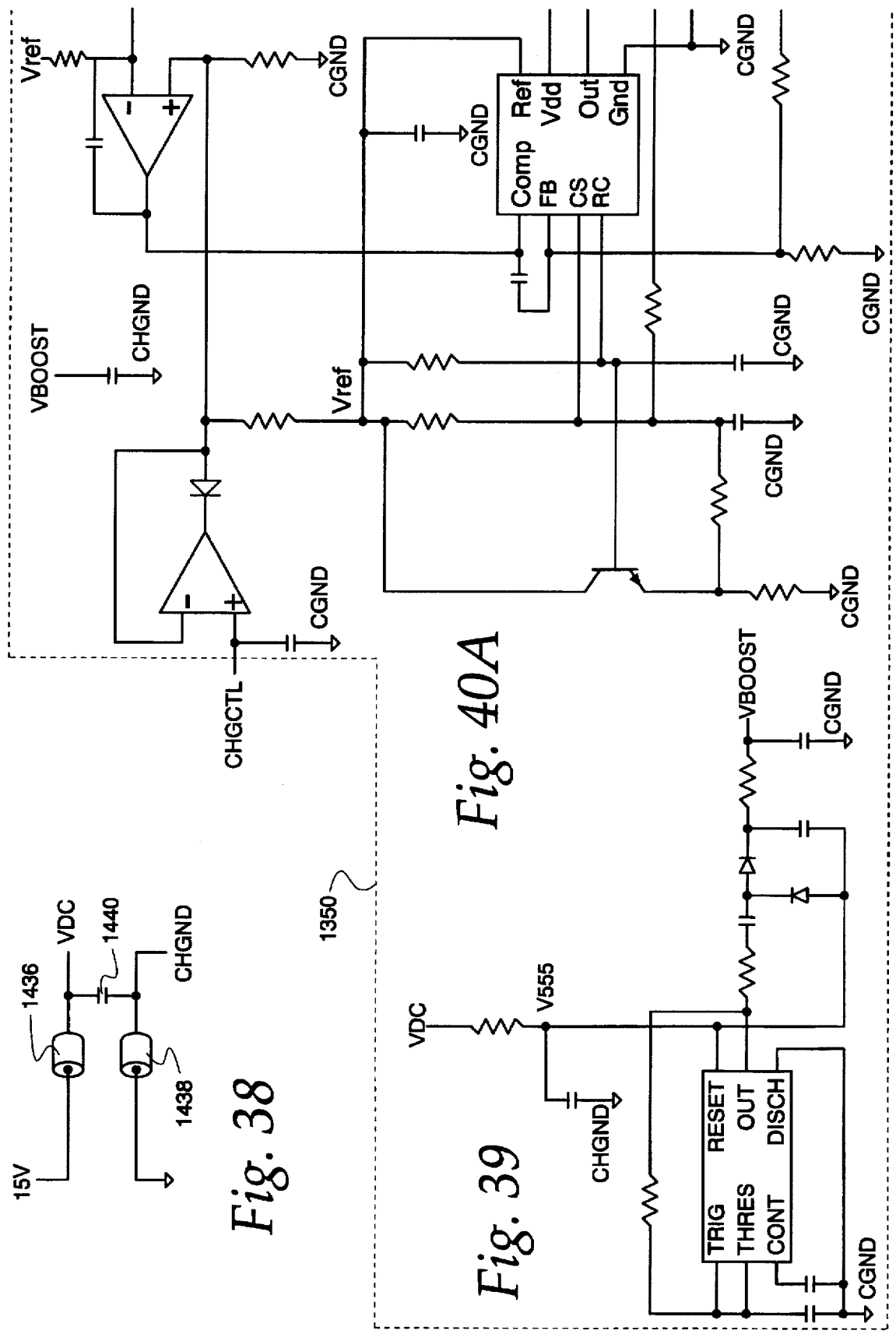

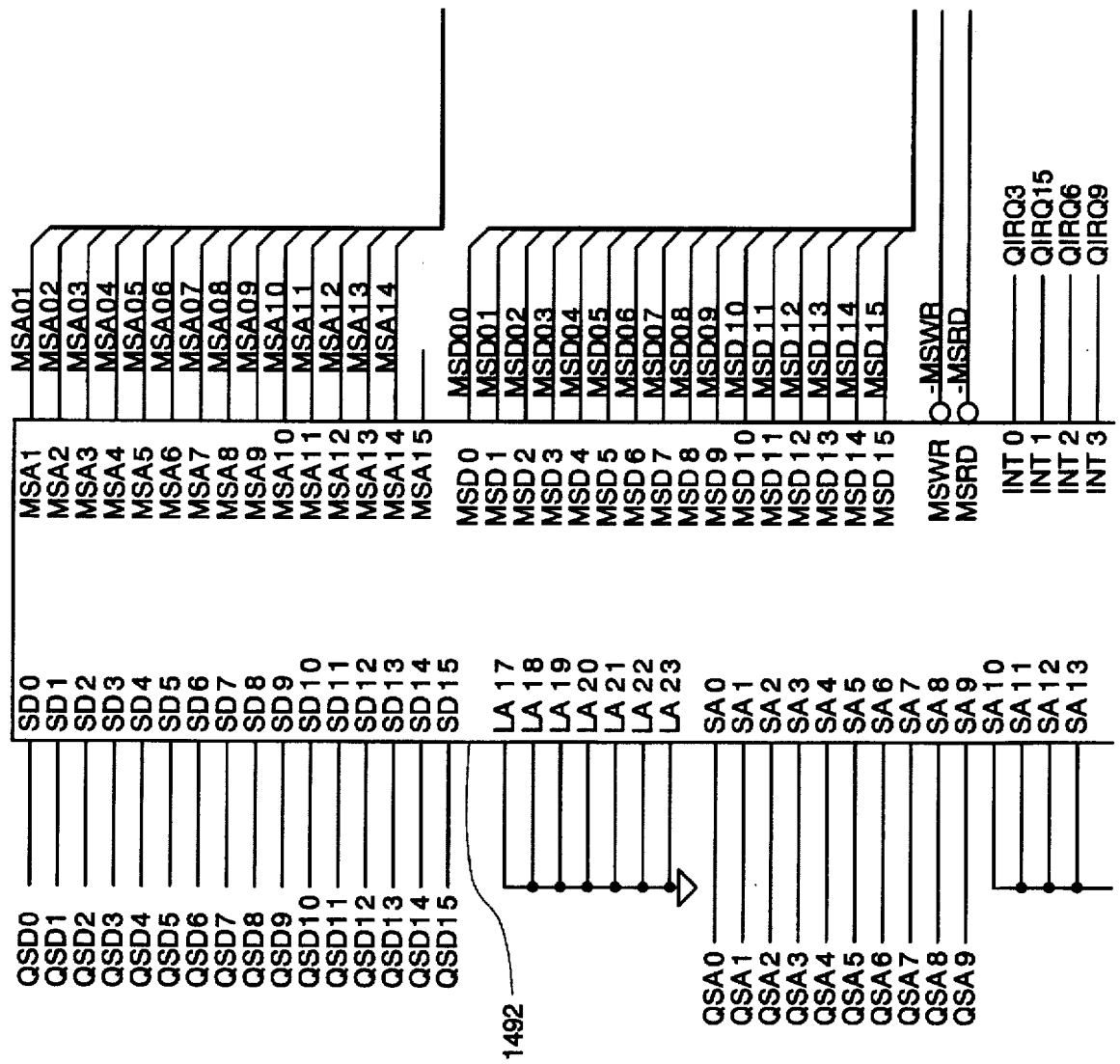
Fig. 41-A

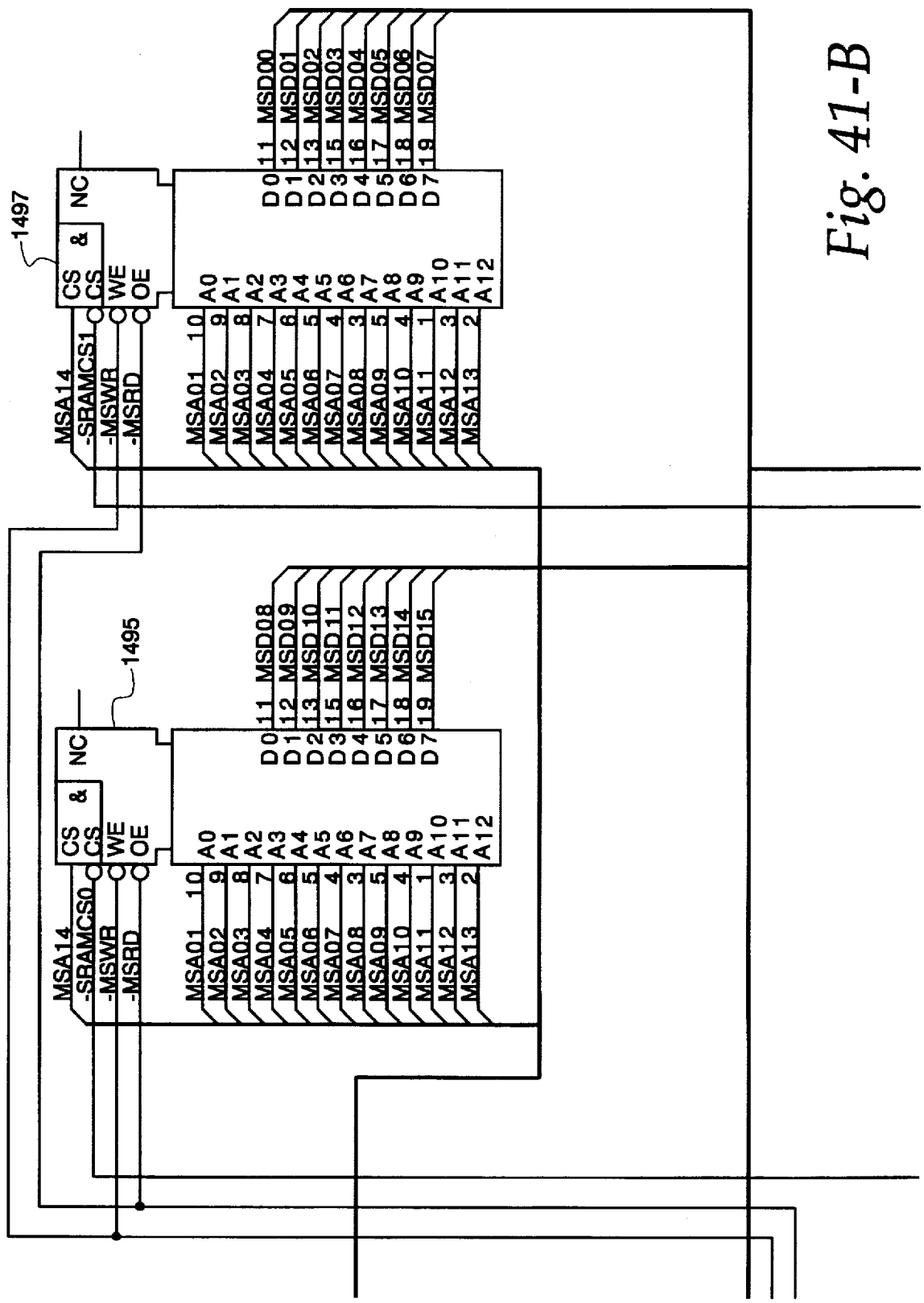
Fig. 41-B

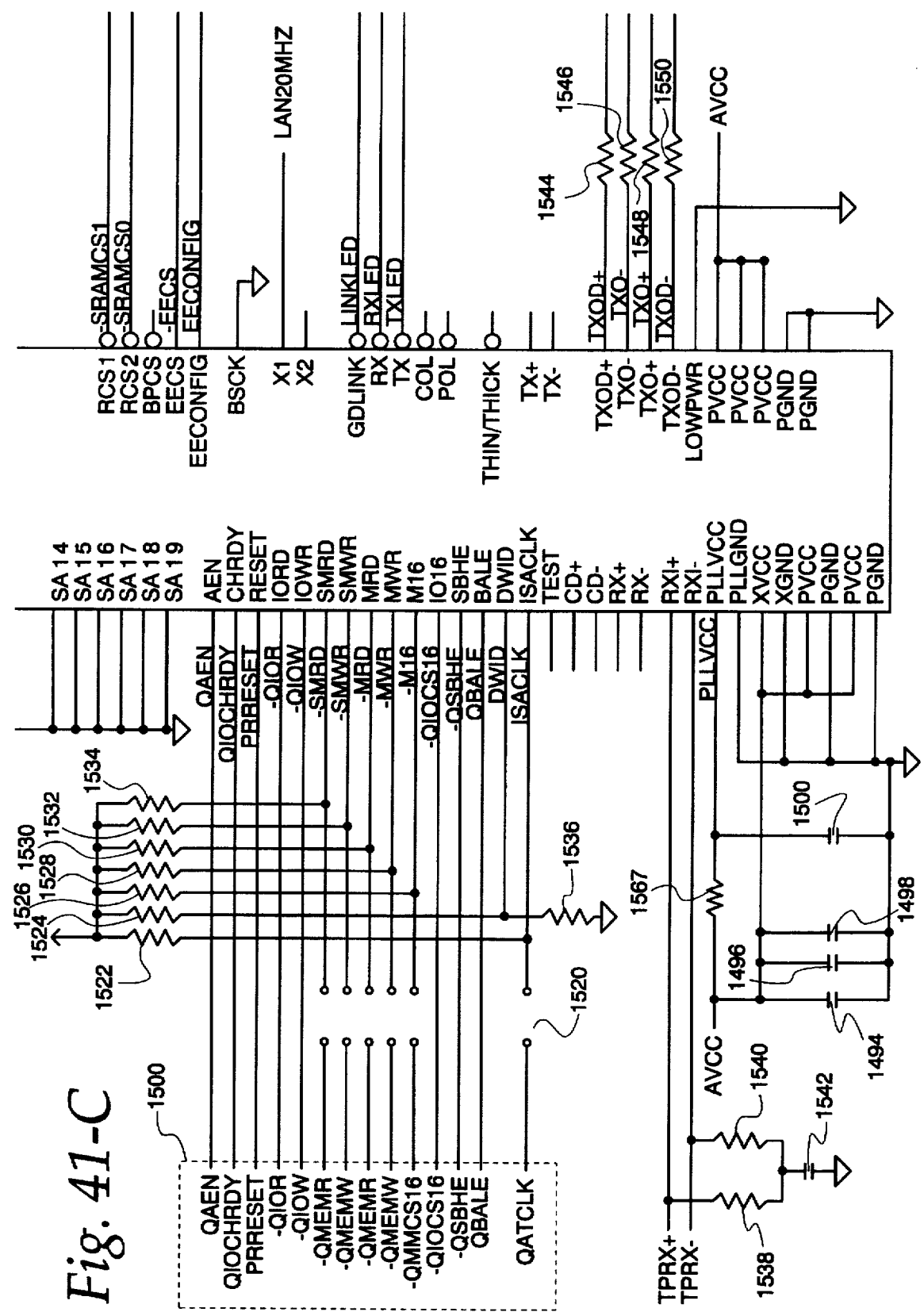
Fig. 41-C

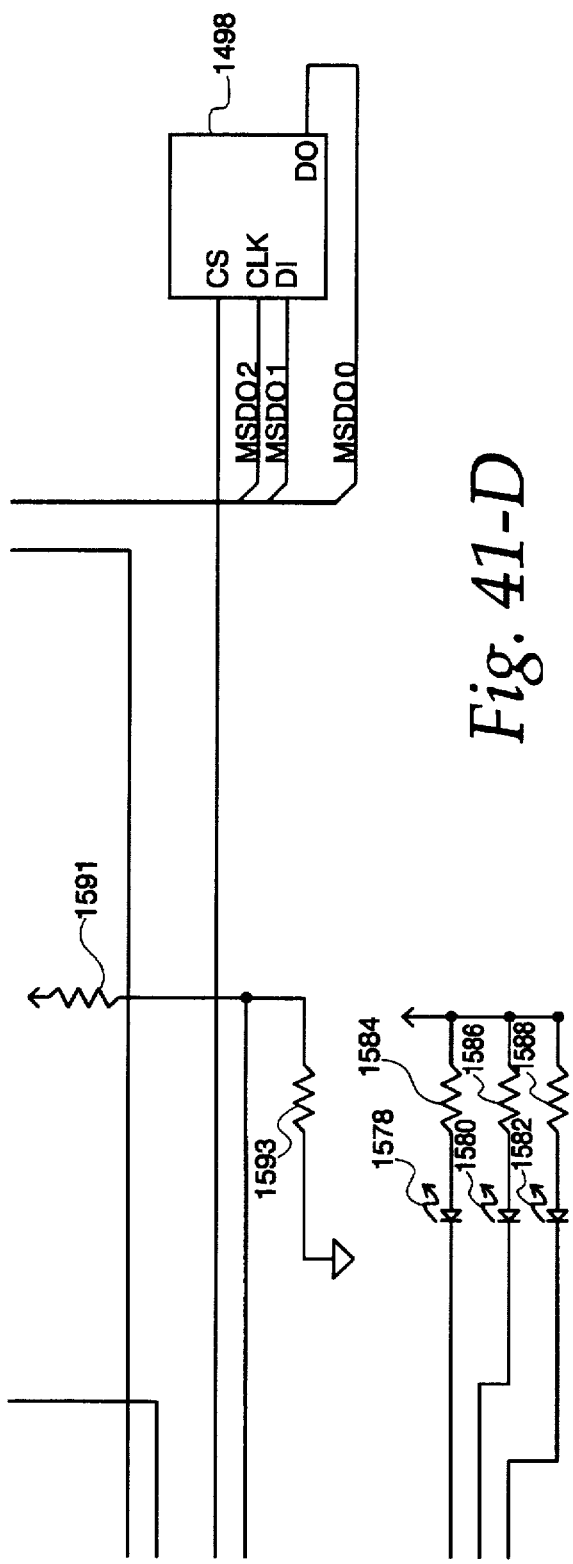
Fig. 41-D
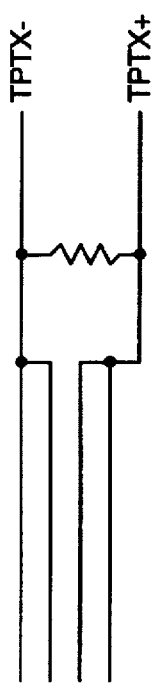
Fig. 41-E

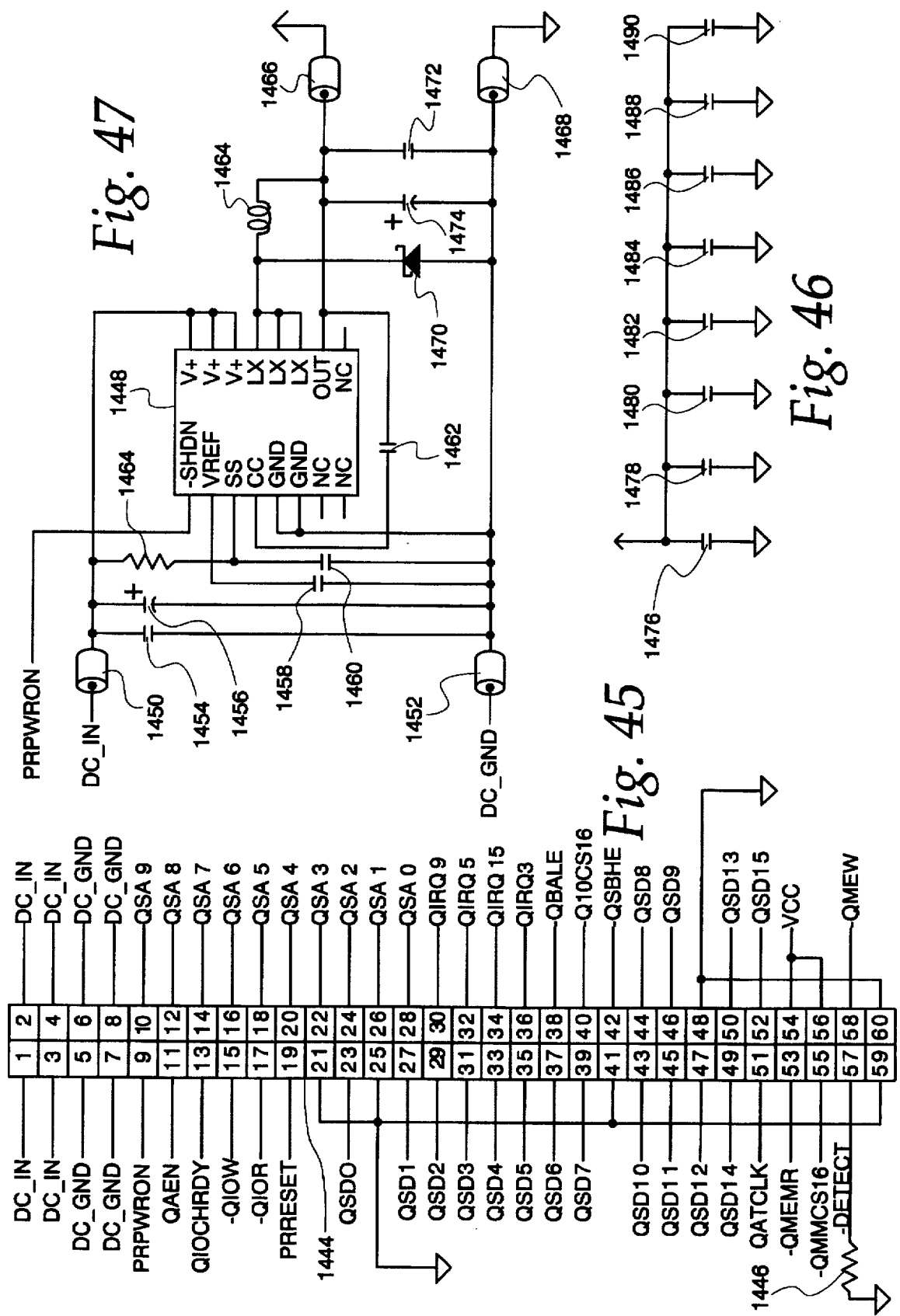

| | | |
|---|---|---|
| QSD 15C | 1 \| 2 | QSD 13C |
| QSD 11C | 3 \| 4 | QSD 9C |
| QSD 8C | 5 \| 6 | -QMEMR |
| QSA 18 | 7 \| 8 | QSA 19 |
| -QRDPCRI | 9 \| 10 | QSA 22 |
| QIRQ 11 | 11 \| 12 | QIRQ 12 |
| PCVCC5 | 13 \| 14 | -QSBHE |
| QSA0 | 15 \| 16 | QSA 2 |
| QBALE | 17 \| 18 | QSA 4 |
| PRPWRON | 19 \| 20 | QIRQ 3 |
| QSA7 | 21 \| 22 | QIRQ 5 |
| QSA9 | 23 \| 24 | QSA 11 |
| QSA12 | 25 \| 26 | QSA 14 |
| QSA15 | 27 \| 28 | -QIOW |
| QAEN | 29 \| 30 | QSD 1C |
| -QZEROWS | 31 \| 32 | QSD 4C |
|  | 33 \| 34 | QSD 6C |
| DC_IN | 35 \| 36 | DC_IN |
| DC_IN | 37 \| 38 | DC_IN |
|  | 39 \| 40 |  |
| DC_GND | 41 \| 42 | DC_GND |
| DC_GND | 43 \| 44 | DC_GND |
| DC_GND | 45 \| 46 |  |
| PCVCC5 | 47 \| 48 |  |
|  | 49 \| 50 |  |
| QSD14C | 51 \| 52 | QSD 12C |
| QSD10C | 53 \| 54 |  |
| -QMEMW | 55 \| 56 | QSA 17 |
| QIRQ14 | 57 \| 58 |  |
| QSA20 | 59 \| 60 | QSA 21 |
| QIRQ 10 | 61 \| 62 | QSA 23 |
| -QIOCS16 | 63 \| 64 | -QMMCS16 |
| QSA 1 | 65 \| 66 | QSA 3 |
| QIRQ 15 | 67 \| 68 | QSA 5 |
| QSA 6 | 69 \| 70 | QIRQ 4 |
| QSA 8 | 71 \| 72 | QSA 10 |
| QIRQ 7 | 73 \| 74 | -QRFRSH |
| QSA 13 | 75 \| 76 | QSA 16 |
| -QIOR | 77 \| 78 | QIOCHRDY |
| QSD 0C | 79 \| 80 | QSD 2C |
| QSD 3C | 81 \| 82 | QSD 5C |
| QIRQ 9 | 83 \| 84 | QSD 7C |
| DC_IN | 85 \| 86 | -QSMI |
| DC_IN | 87 \| 88 | QRDPCSPK |

*Fig. 54A*

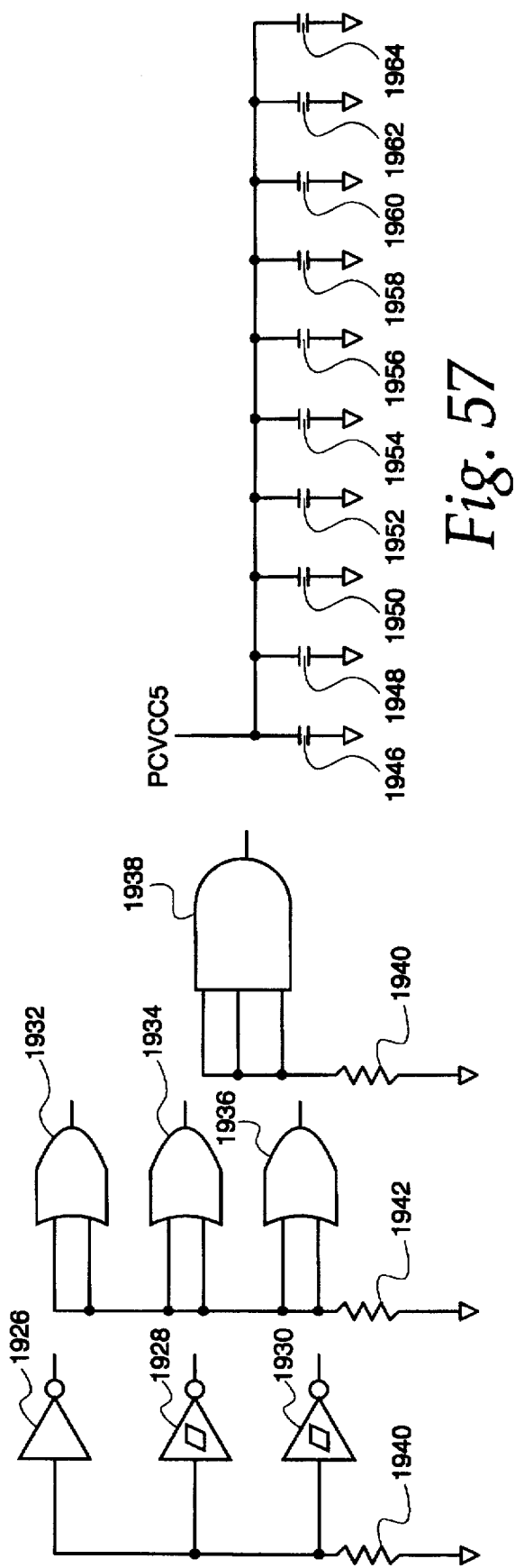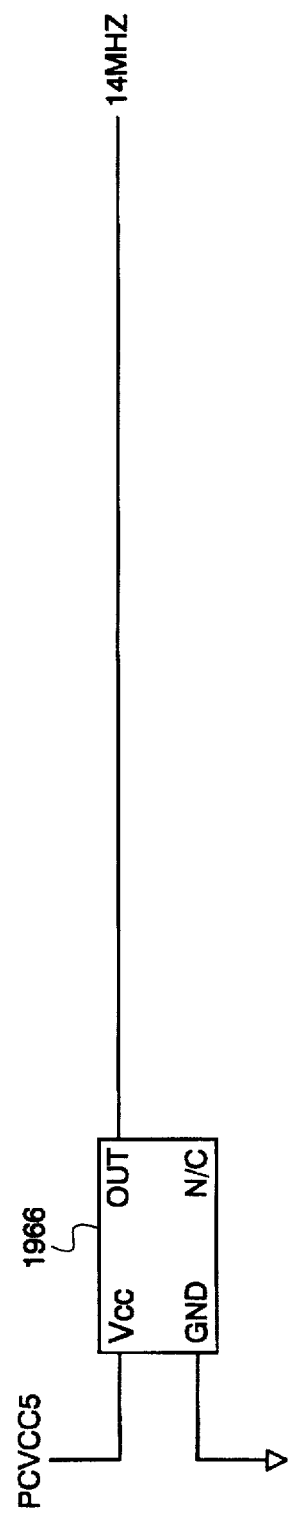

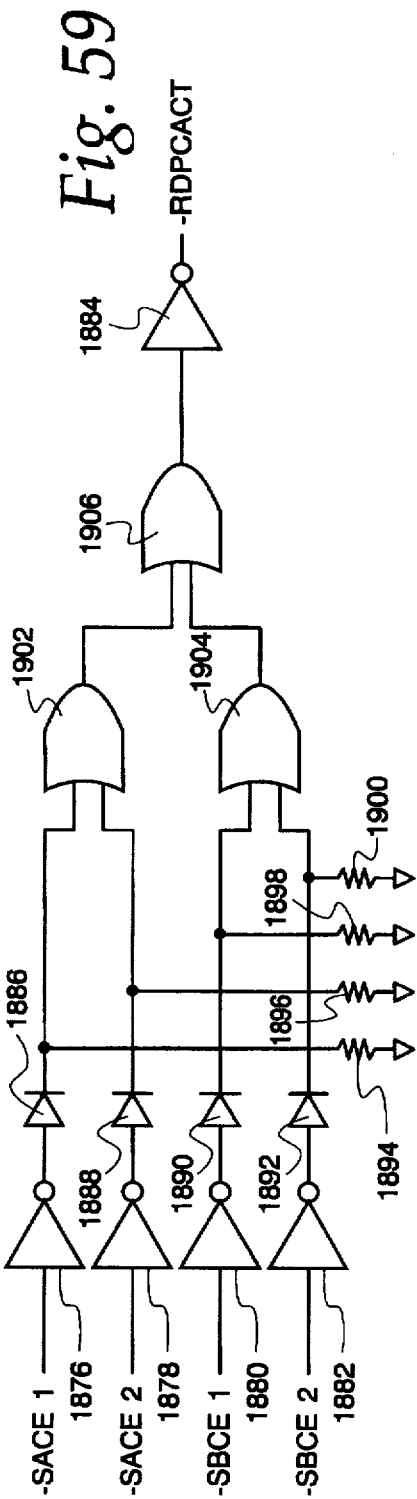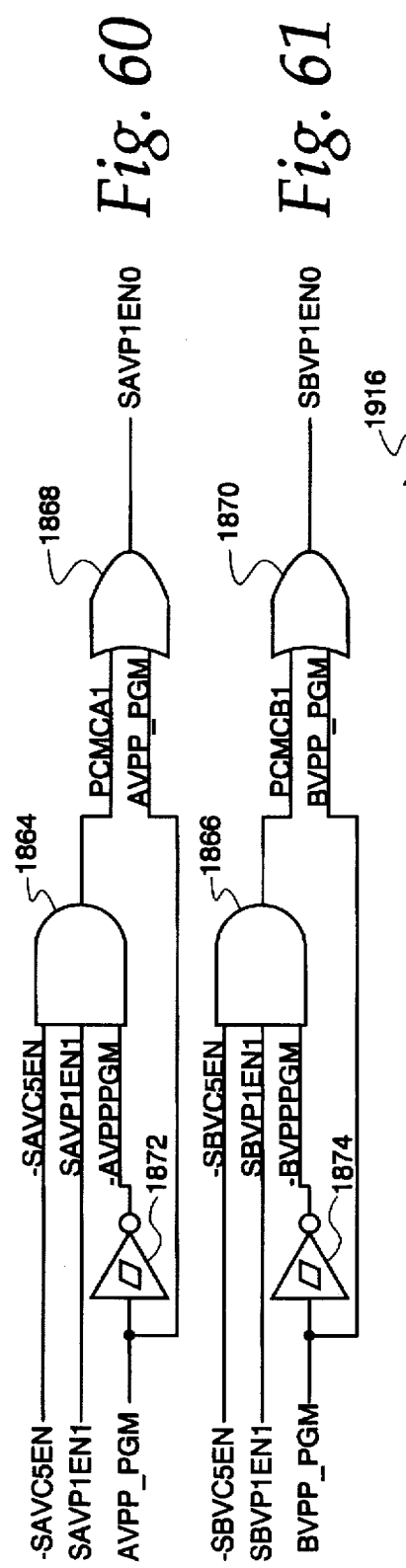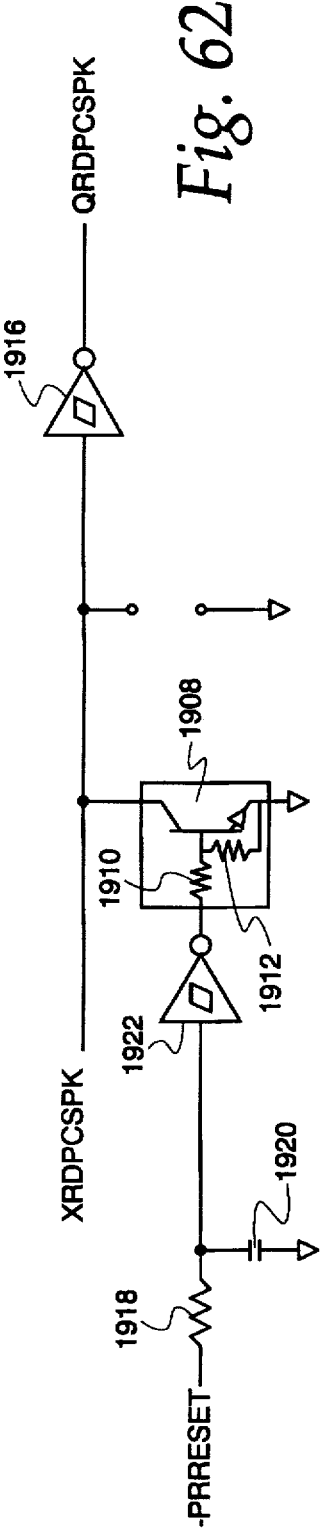

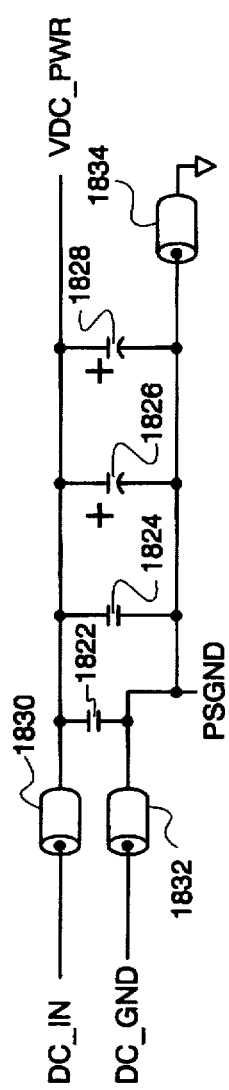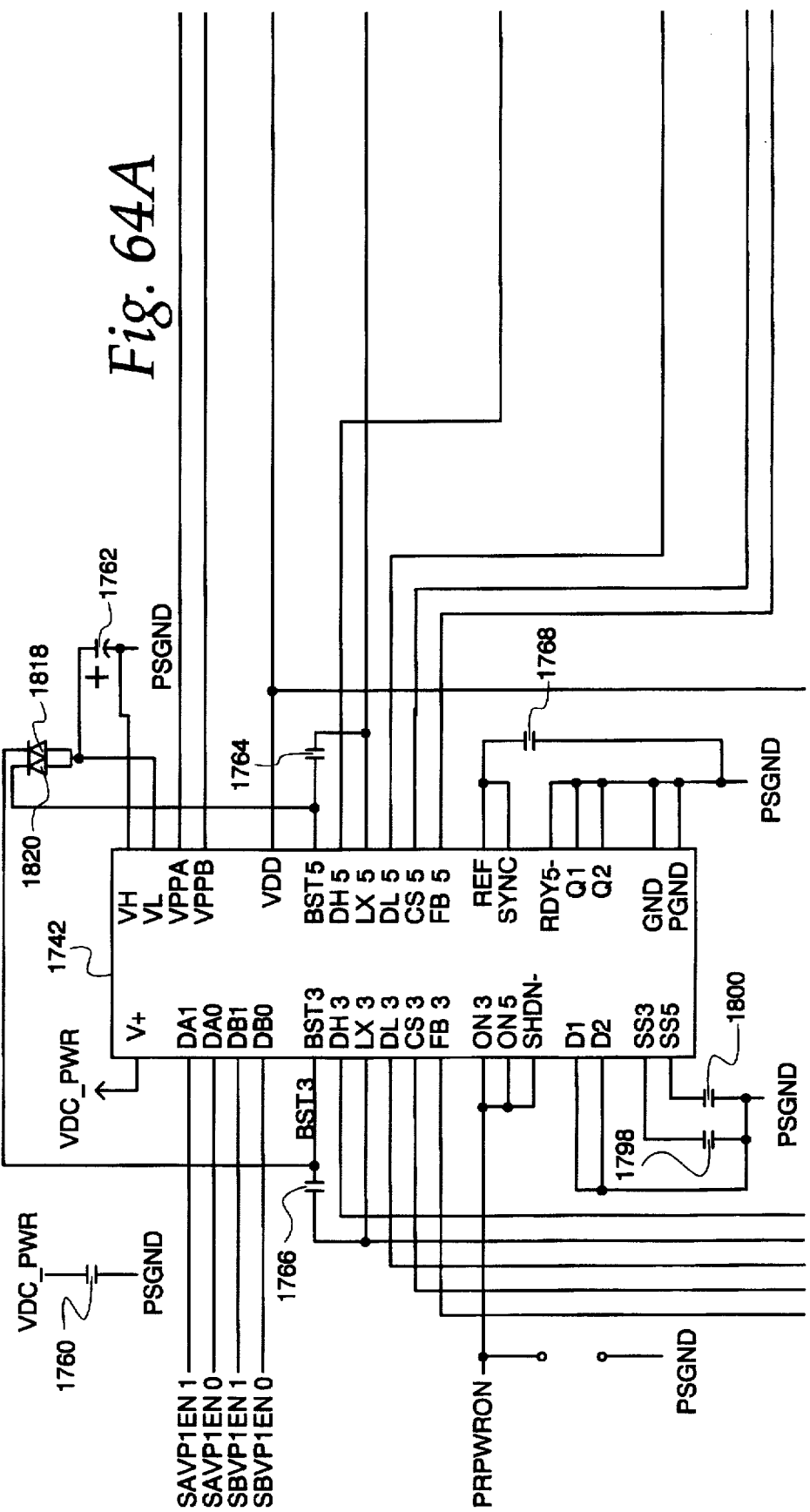

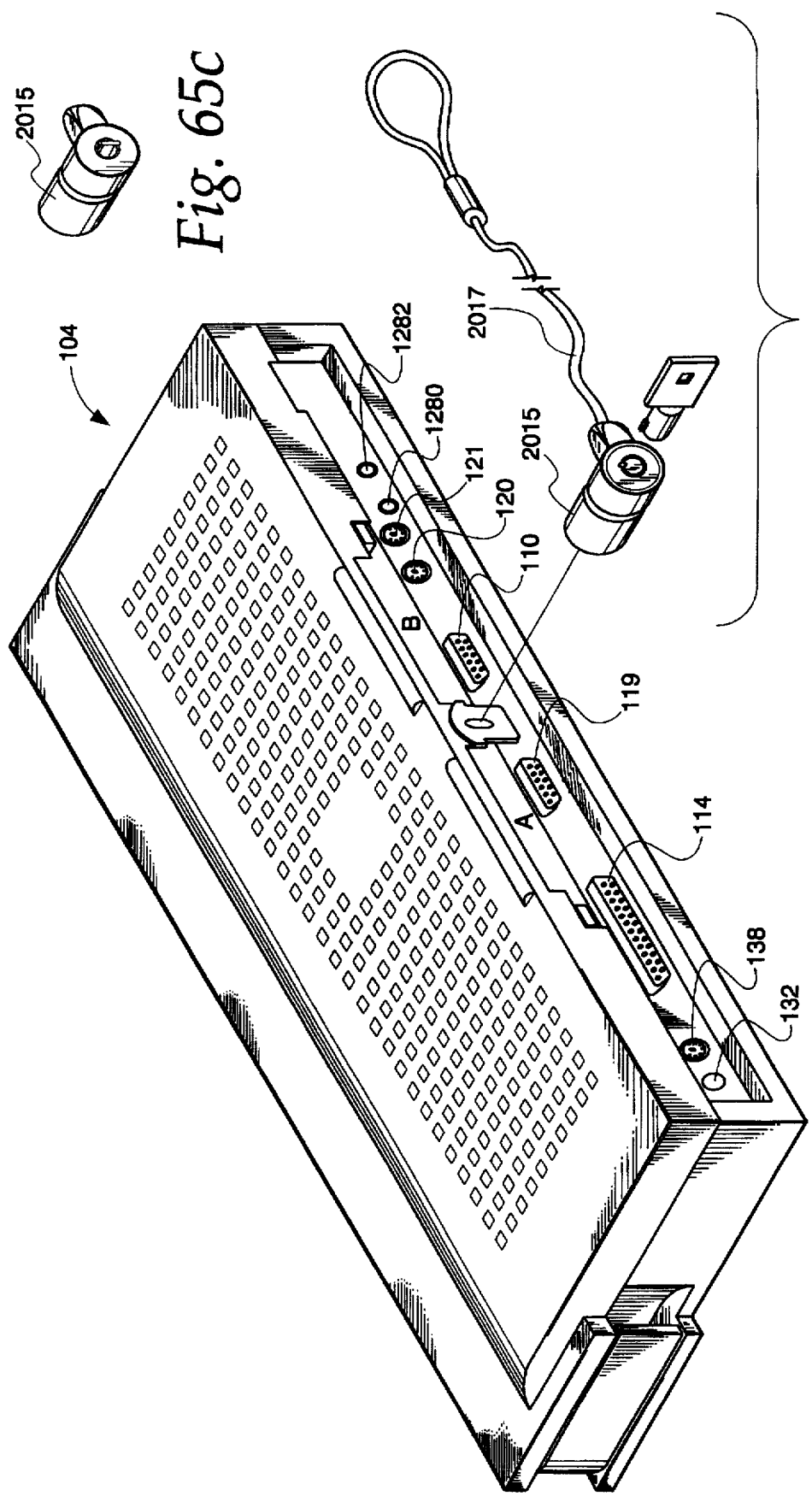

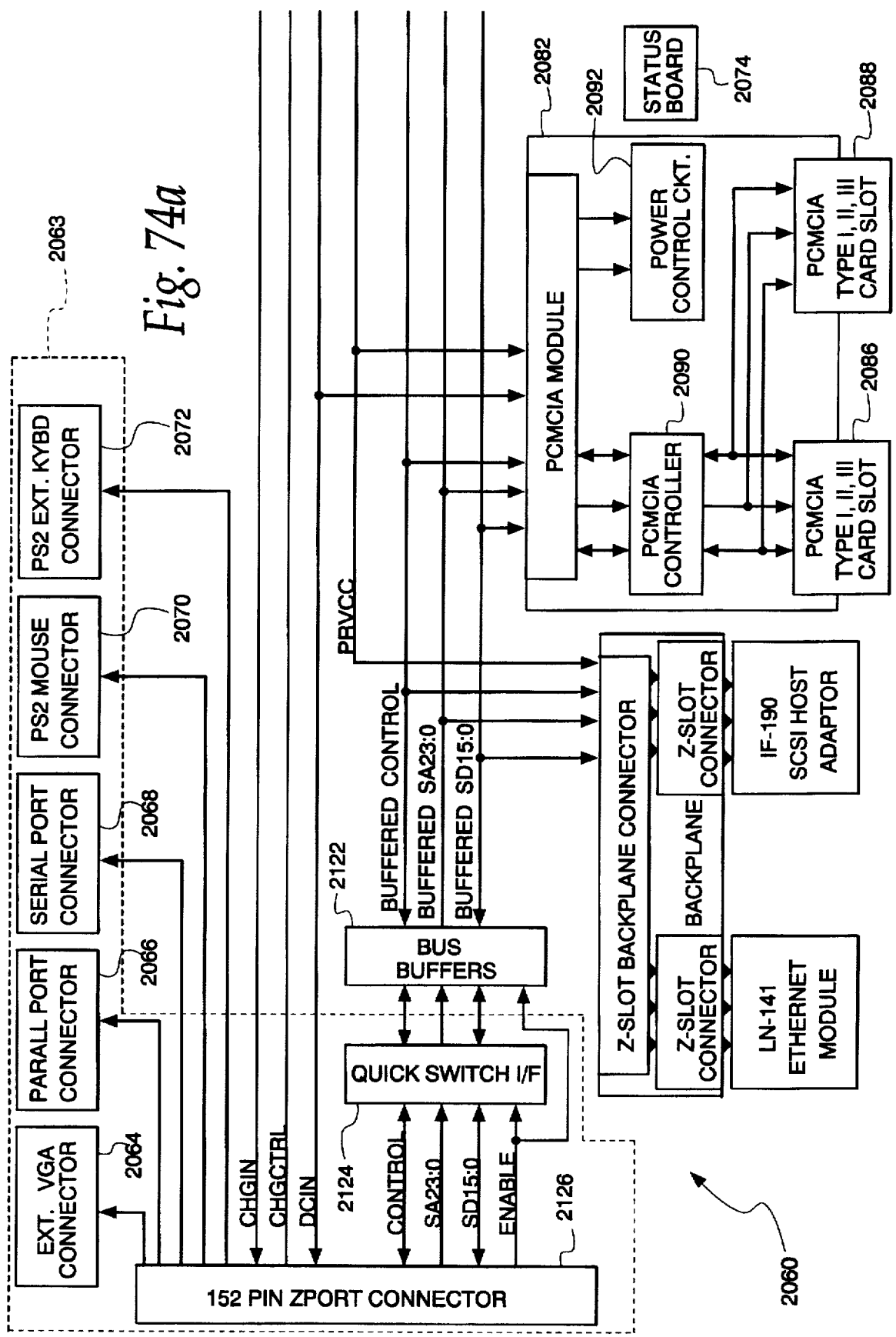

| | | | |
|---|---|---|---|
| SA3 | 40 | 116 | SA8 |
| SA2 | 41 | 117 | SA9 |
| -ZEROWS | 42 | 118 | -IOCS16 |
| AEN | 43 | 119 | TC |
| -RSTDRV | 44 | 120 | -SBHE |
| BALE | 45 | 121 | -MEMCS16 |
| -MEMR | 46 | 122 | IOCHRDY |
| -IOR | 47 | 123 | -MEMW |
| SA1 | 48 | 124 | -IOW |
| SD0 | 49 | 125 | SA0 |
| SD2 | 50 | 126 | SD1 |
| SD4 | 51 | 127 | SD3 |
| SD6 | 52 | 128 | SD5 |
| SD8 | 53 | 129 | SD7 |
| SD10 | 54 | 130 | SD9 |
| SD12 | 55 | 131 | SD11 |
| SD14 | 56 | 132 | SD13 |
| IRQ 5 | 57 | 133 | SD15 |
| IRQ11 | 58 | 134 | IRQ 9 |
| IRQ10 | 59 | 135 | -DACK 1 |
| IRQ15 | 60 | 136 | DRQ 1 |
| IRQ 3 | 61 | 137 | IRQ 4 |
| IRQ 7 | 62 | 138 | |
| IRQ14 | 63 | 139 | -OPTISM1 |
| -RDPCACT | 64 | 140 | -RDPCR1 |
| MSDATA | 65 | 141 | MSCLK |
| | 66 | 142 | KBCLK |
| | 67 | 143 | KBDATA |
| VIDRES1 | 68 | 144 | VIDRES0 |
| DACGND | 69 | 145 | RED |
| GREEN | 70 | 146 | DACGND |
| CRTHSYNC | 71 | 147 | DACGND |
| CRTVSYNC | 72 | 148 | BLUE |
| VIDRES3 | 73 | 149 | VIDRES2 |
| GND | 74 | 150 | GND |
| GND | 75 | 151 | GND |
| GND | 76 | 152 | GND |

*Fig. 75b*

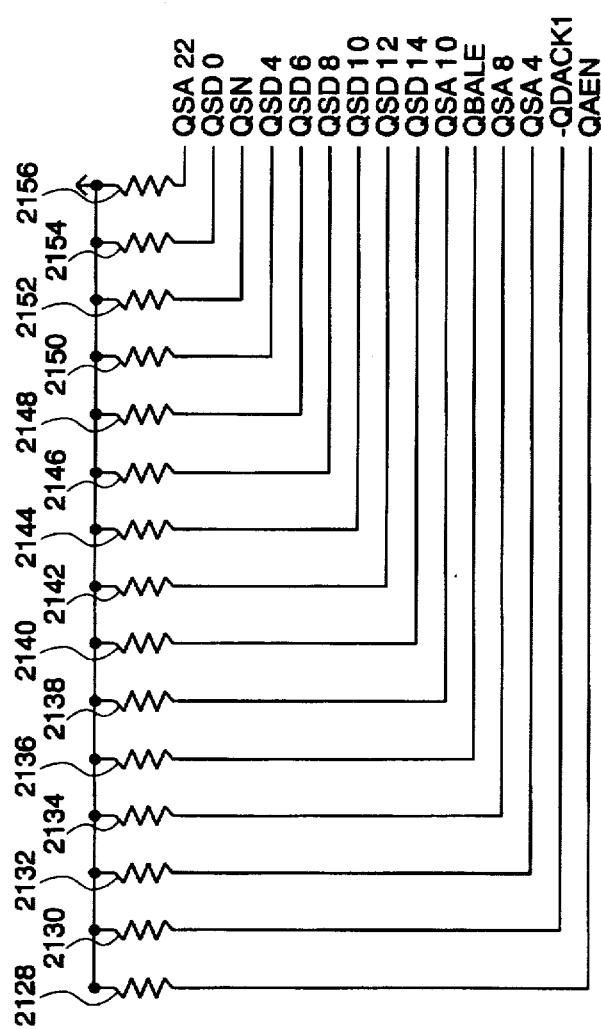
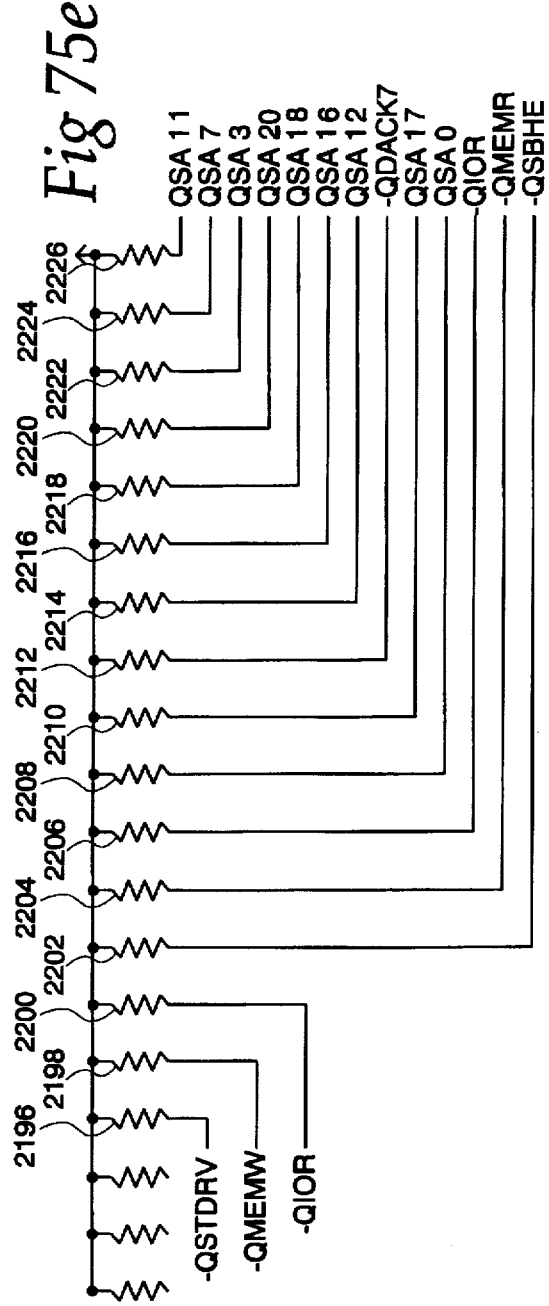

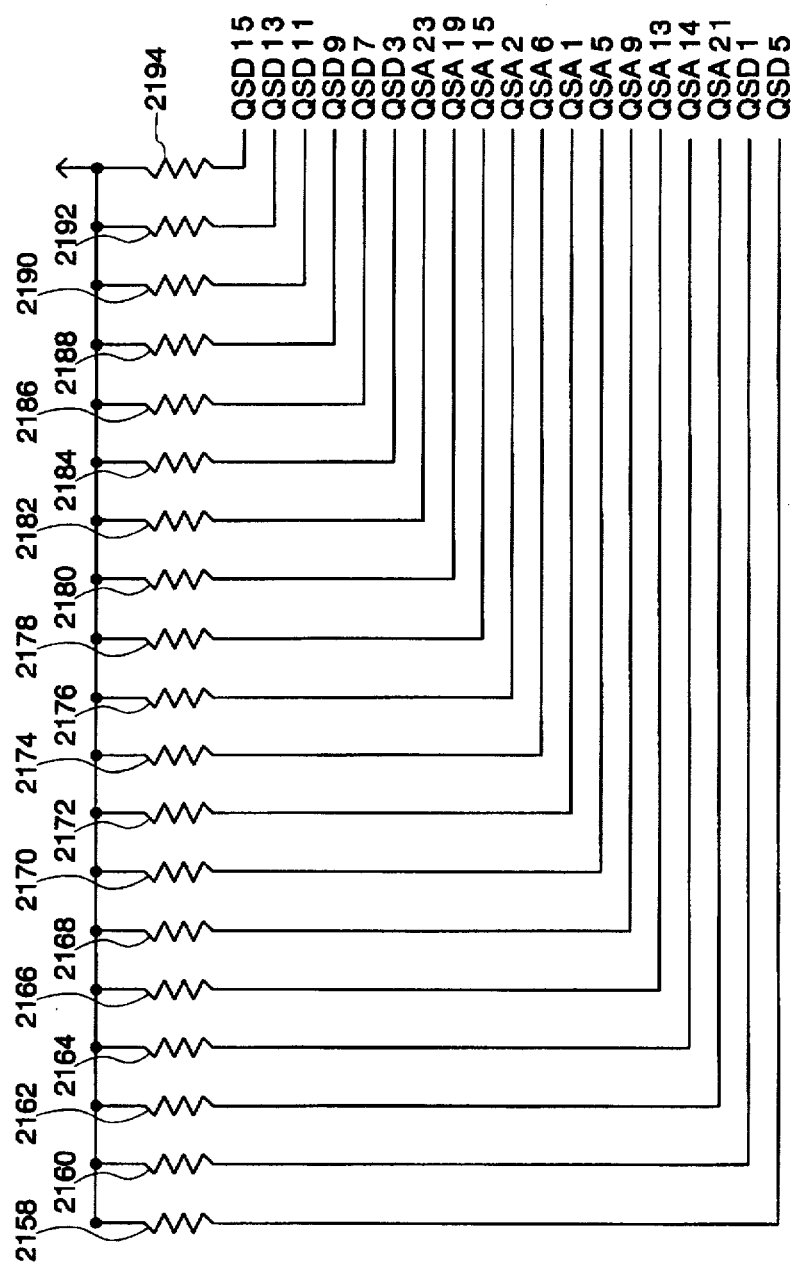

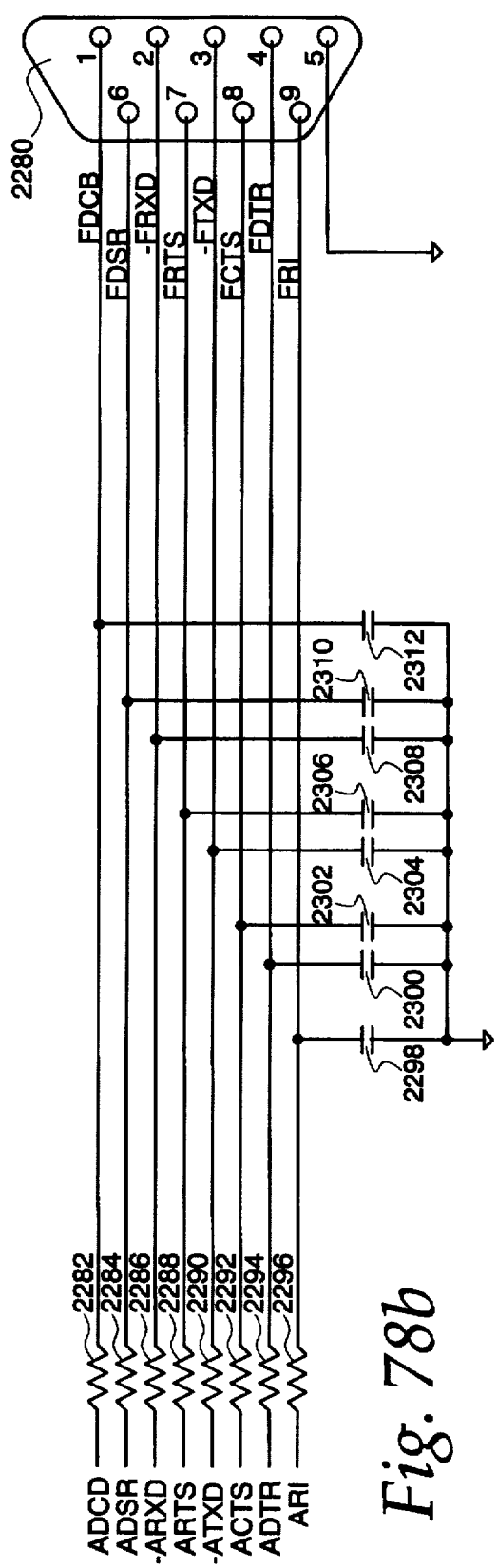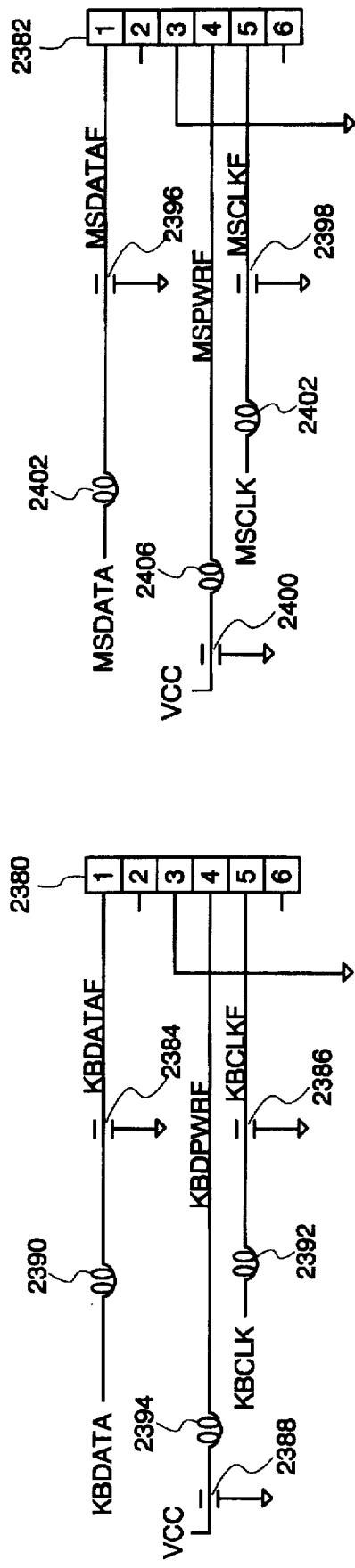
Fig. 78b
Fig. 78c
Fig. 78d

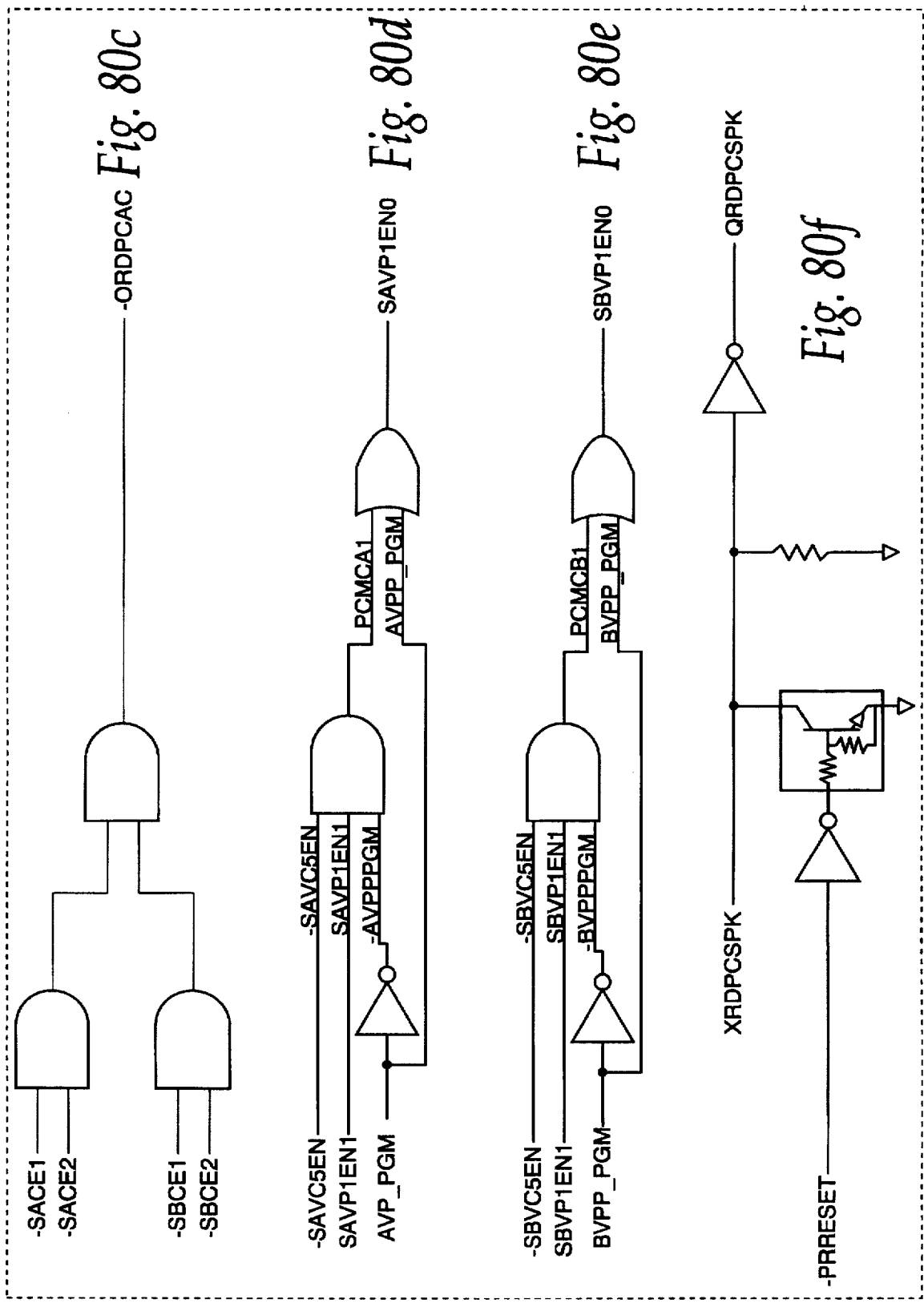

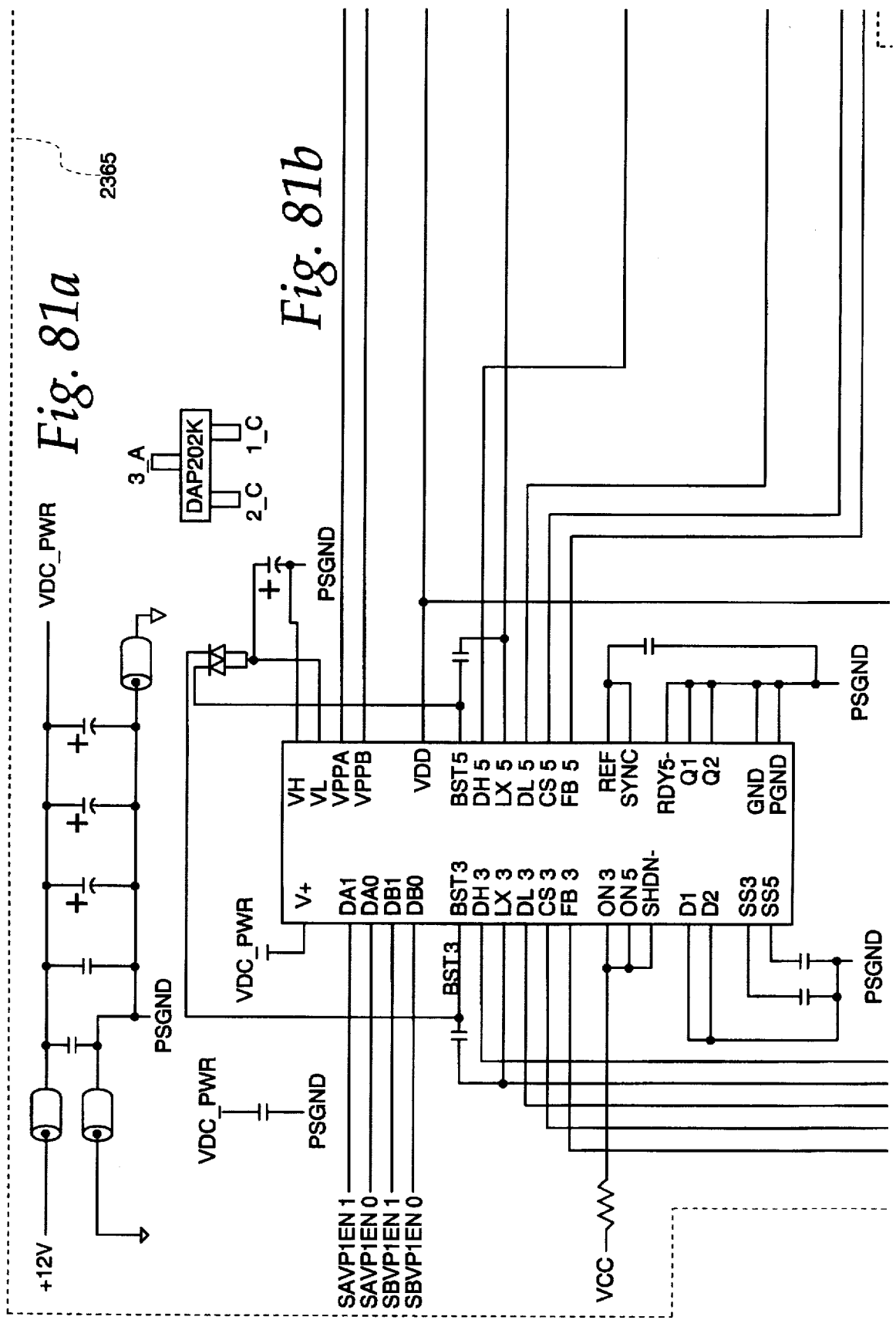

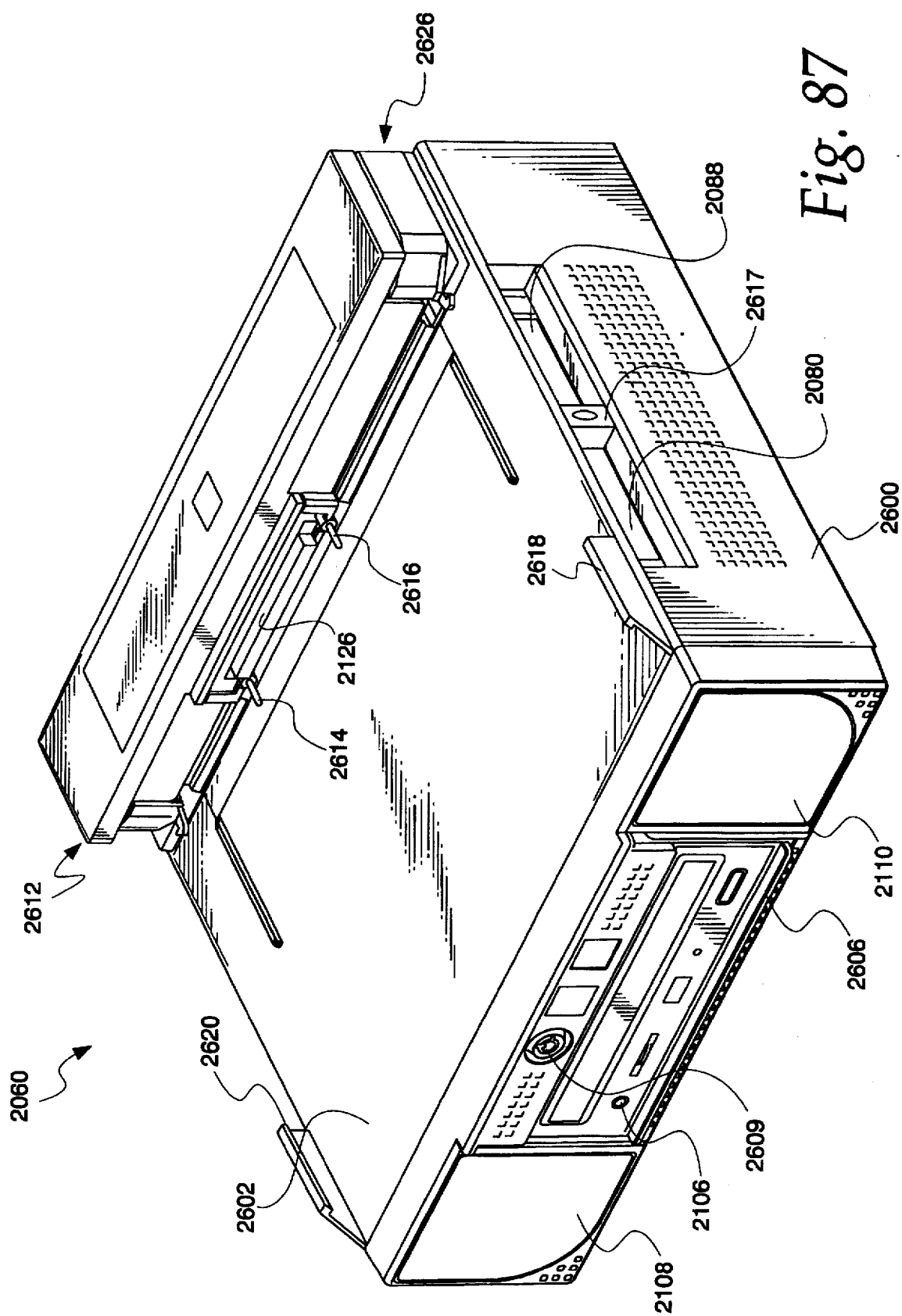

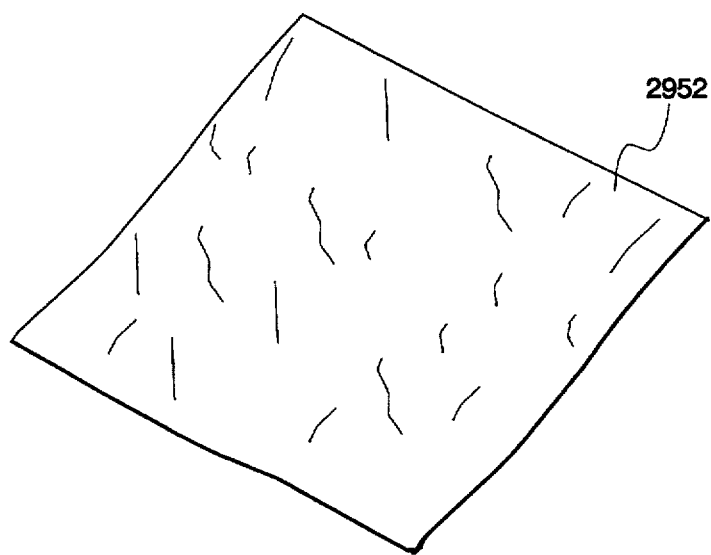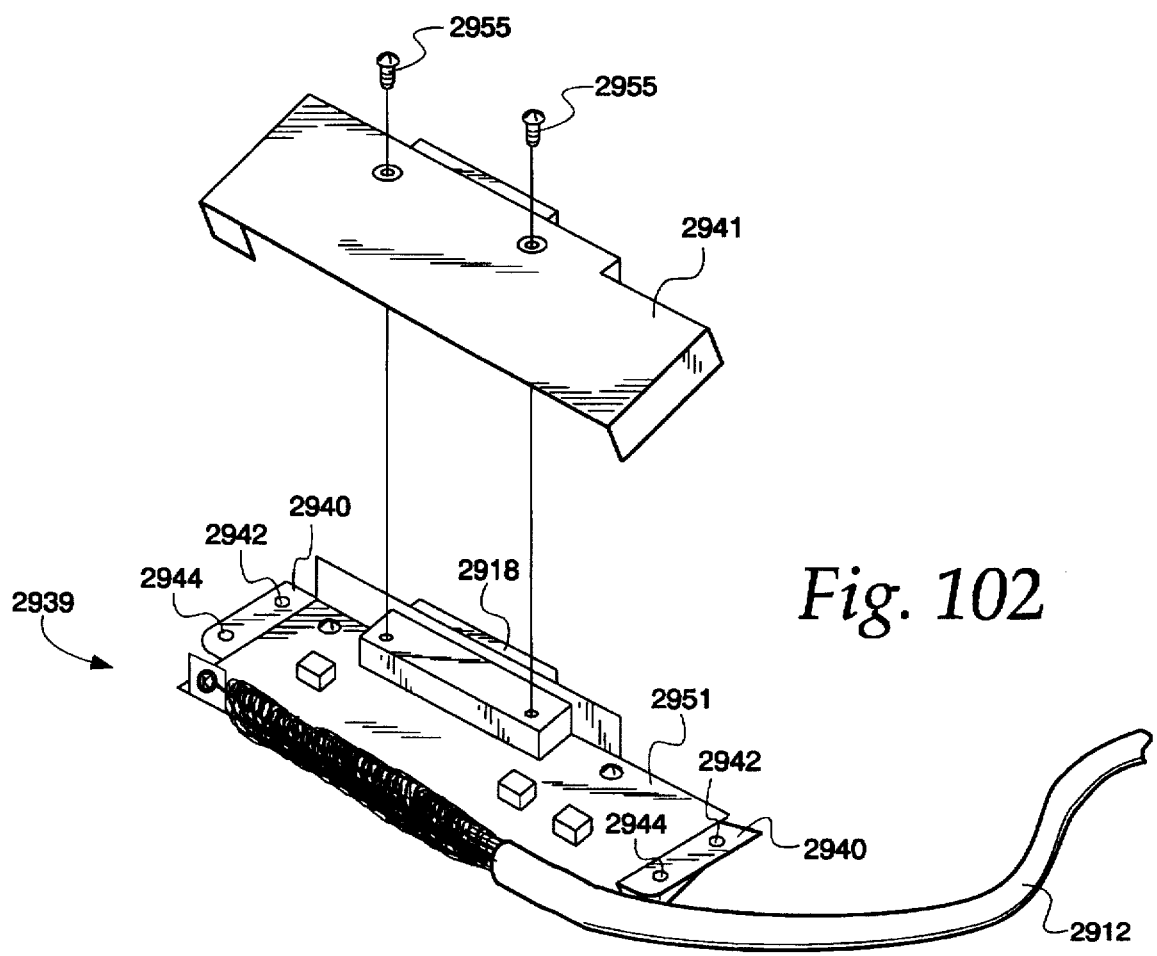
Fig. 102

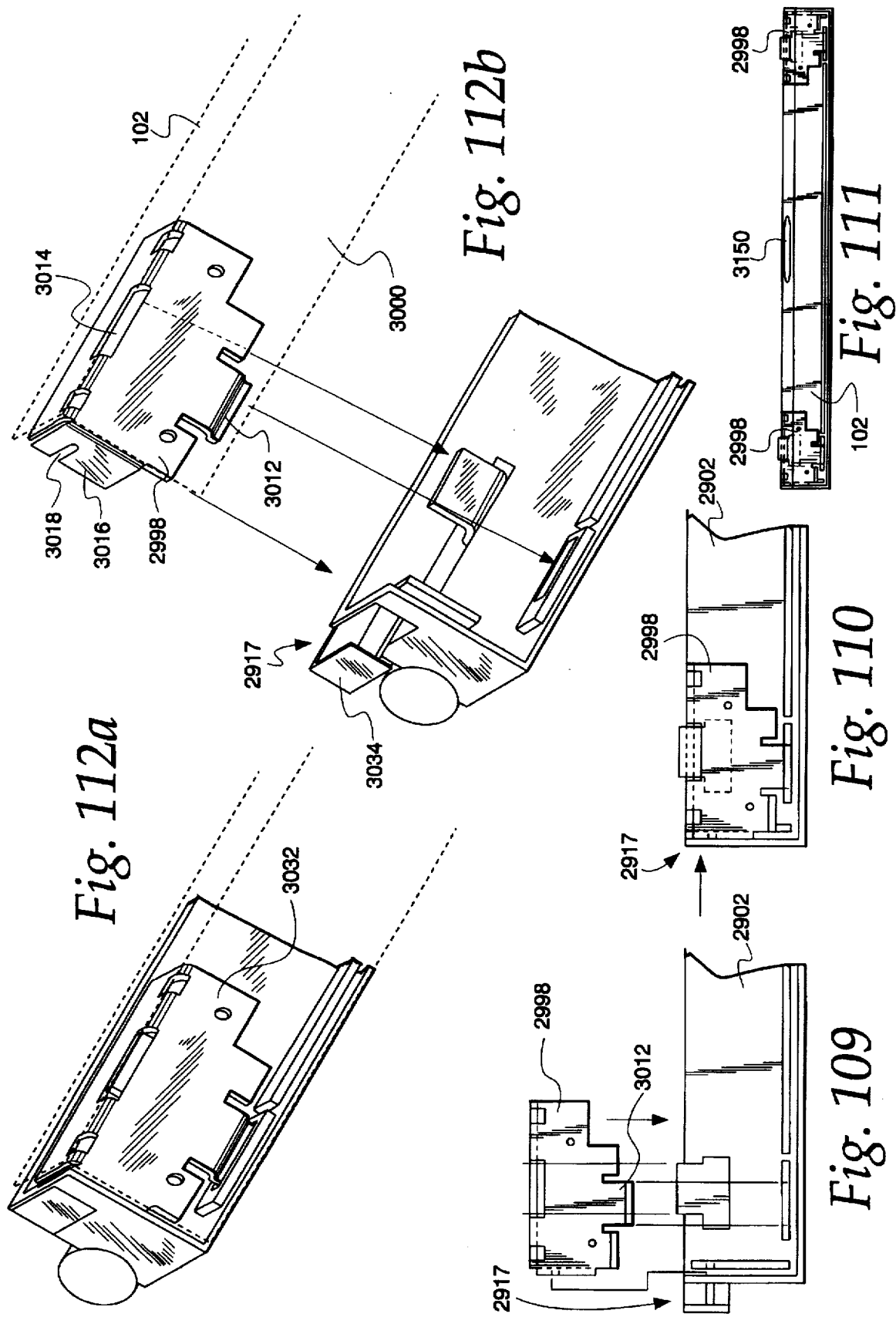

ENHANCED ACTIVE PORT REPLICATOR HAVING EXPANSION AND UPGRADE CAPABILITIES

CROSS-REFERENCE TO RELATED APPLICATIONS

This application is a continuation-in-part of U.S. patent application Ser. No. 29/027,669, filed on Aug. 26, 1994, now U.S. Pat. No. D364,853, and is related to the following U.S. patent applications, all filed on even date: External Flexible Bay, Ser. No. 410,603; Flexible Multimedia System, Ser. No. 411,379; Removable LCD and Stand Assembly, Ser. No. 410,634; Modular Portable Personal Computer, Ser. No. 415,229; and Peripheral Card Locking Device, Ser. No. 410,633.

BACKGROUND OF THE INVENTION

1. Field of the Invention

The present invention relates to a port replicator and more particularly, to an active port replicator adapted to be connected to a portable personal computer to enable the portable personal computer to be connected to external I/O devices, such as a printer, full size video monitor and the like, relatively easily in a desktop application and readily disconnected for portable application, which may include one or more optional interfaces, such as a network interface for enabling the portable personal computer to be connected to a local area network (LAN) and a PCMCIA interface for enabling various options to be added, such as a fax/modem, secondary storage devices and the like.

2. Description of the Prior Art

Portable personal computers are often used in desktop applications. In such applications, it is sometimes desirable to connect the portable personal computer to external I/O devices, such as a printer, as well as a full size video monitor and a full size keyboard. For portable personal computers not equipped with an integrated trackball, it is often desired to utilize an external mouse or track ball with the portable personal computer in a desktop application.

In order to enable such portable personal computers to be used with such external I/O devices, such portable personal computers are normally provided with various ports including a parallel port, a video port, a power port and a type PS/2 port. These ports enable the portable personal computer to be connected to various external I/O devices, such as a printer, full size video monitor as well as a full size keyboard. Physically, the external I/O devices are connected to the portable personal computer with cables. When the portable personal computer is used in a desktop operation, such cables must be connected between the ports on the portable personal computer and the external I/O devices for desktop application. When the portable personal computer is used in a portable application, the cables, connected to the ports on the portable personal computer, must be disconnected and then reconnected later for desktop use, which can be cumbersome.

In co-pending patent application Ser. No. 08/104,950, filed on Aug. 10, 1993, assigned to the same assignee as the present invention, a passive port replicator is disclosed which solves such a problem. The passive port replicator is a separate unit that provides an interface between external I/O devices and a portable personal computer which facilitates use of the portable personal computer with external I/O devices as well as facilitates disconnection of such external I/O devices for portable applications. More particularly, the passive port replicator replicates external I/O ports in the portable personal computer. External I/O devices are connected to the replicated ports on the passive port replicator. The passive port replicator, in turn is connected to the external ports on the portable personal computer rather quickly and easily for desktop operation, thus obviating the need to separately connect each cable for each of the external I/O devices. For portable applications, the passive port replicator is simply disconnected from the portable personal computer rather quickly and easily, eliminating the need to disconnect each of the external I/O devices.

While the passive port replicator discussed above solves the problem associated with connecting and disconnecting external I/O devices to a portable personal computer, however, it does not provide any added functionality. In particular, in certain applications, it may be desirous to connect the portable personal computer to a local area network (LAN). Such connections are typically made by way of network interface. No such network interface is available on the passive port replicator discussed above. With an ever increasing trend of LAN's in office environments, the lack of a network interface limits the utility of a portable personal computer in a desktop application.

Additionally, newer I/O interfaces, such as a PCMCIA interface, are available which provide substantially enhanced capability for portable personal computers. Such PCMCIA interfaces also enhance the flexibility of such portable personal computers. For portable personal computers not manufactured with such a PCMCIA interface, connecting a PCMCIA interface to a portable personal computer can be difficult if not impossible, thus, undermining the flexibility of the passive port replicator.

SUMMARY OF THE INVENTION

It is an object of the present invention to solve various problems of the prior art.

It is yet another object of the present invention to facilitate connection and disconnection of external I/O devices to a portable personal computer.

It is yet another object of the present invention to provide relatively increased capability of a portable personal computer.

It is a further object of the present invention to provide relatively increased flexibility of a portable personal computer.

It is yet a further object of the present invention to provide a port replicator for replicating ports on a portable personal computer.

It is another object of the present invention to facilitate connection of a portable personal computer to a local area network.

It is yet a further object of the present invention to provide a PCMCIA interface for a portable personal computer.

Briefly, the present invention relates to an active port replicator, adapted to be connected to a portable personal computer to enable the portable personal computer to be relatively quickly and easily connected to a plurality of external I/O devices, such as a printer, a full size video monitor and the like in a desktop application and readily disconnected from the external I/O devices for portable applications. The active port replicator replicates all of the ports on a typical portable personal computer and may provide additional ports, such as an additional type PS/2 port, for added convenience and flexibility. Once the desired external I/O devices are connected to the active port replicator, the active port replicator may quickly and easily be docked to a portable personal computer for desktop application and disconnected for portable application. In order to provide additional capability and flexibility of the portable personal computer in a desktop application, the active port replicator is user upgradeable with a network interface and a PCMCIA interface.

BRIEF DESCRIPTION OF THE DRAWING

These and other objects and advantages of the present invention will become readily apparent upon consideration of the following detailed description and attached drawing, wherein:

FIGS. 4A–4D are schematic diagrams for the external flexible bay in accordance with the present invention illustrating a microcontroller and a portion of the control circuitry for the system.

FIG. 4E is a mapping diagram illustrating the positional relationship of FIGS. 4A–4D.

FIGS. 5A–5D are similar to FIGS. 4A–4D illustrating the connectors for the personal computer, printer and I/O devices installed in the external flexible bay.

FIG. 5E is a mapping diagram illustrating the positional relationship of FIGS. 5A–5D.

FIGS. 16–40 are schematic diagrams for a main circuit board for an active port replicator in accordance with the present invention.

FIGS. 41–47 are schematic diagrams for a network interface board for the active port replicator in accordance with the present invention.

FIGS. 48–64 are schematic diagrams for a PCMCIA interface board in accordance with the present invention.

FIG. 65 is a perspective view of the active port replicator in accordance with the present invention illustrating the replicated ports.

FIGS. 74A and 74B represent a block diagram of the multimedia system in accordance with the present invention.

FIG. 87 is a perspective view of the multimedia system in accordance with the present invention.

FIG. 102 is a perspective view of the connector assembly illustrated in FIG. 101.

FIG. 109 is a partial plan view of a latch assembly on the LCD display shown with the latch assembly in an unlatched position and with a mating bracket on a personal computer removed.

FIG. 110 is similar to FIG. 109 shown with the latch assembly in a latch assembly latched to a mating bracket.

FIG. 111 is an elevational view of the rear of the portable personal computer in accordance with the present invention illustrating the brackets that are adapted to engage the latch assemblies on the removable LCD display and adapter assembly.

FIGS. 112A and 112B are perspective views similar to FIGS. 110 and 109, respectively.

DETAILED DESCRIPTION OF THE PREFERRED EMBODIMENT

Figure 1:
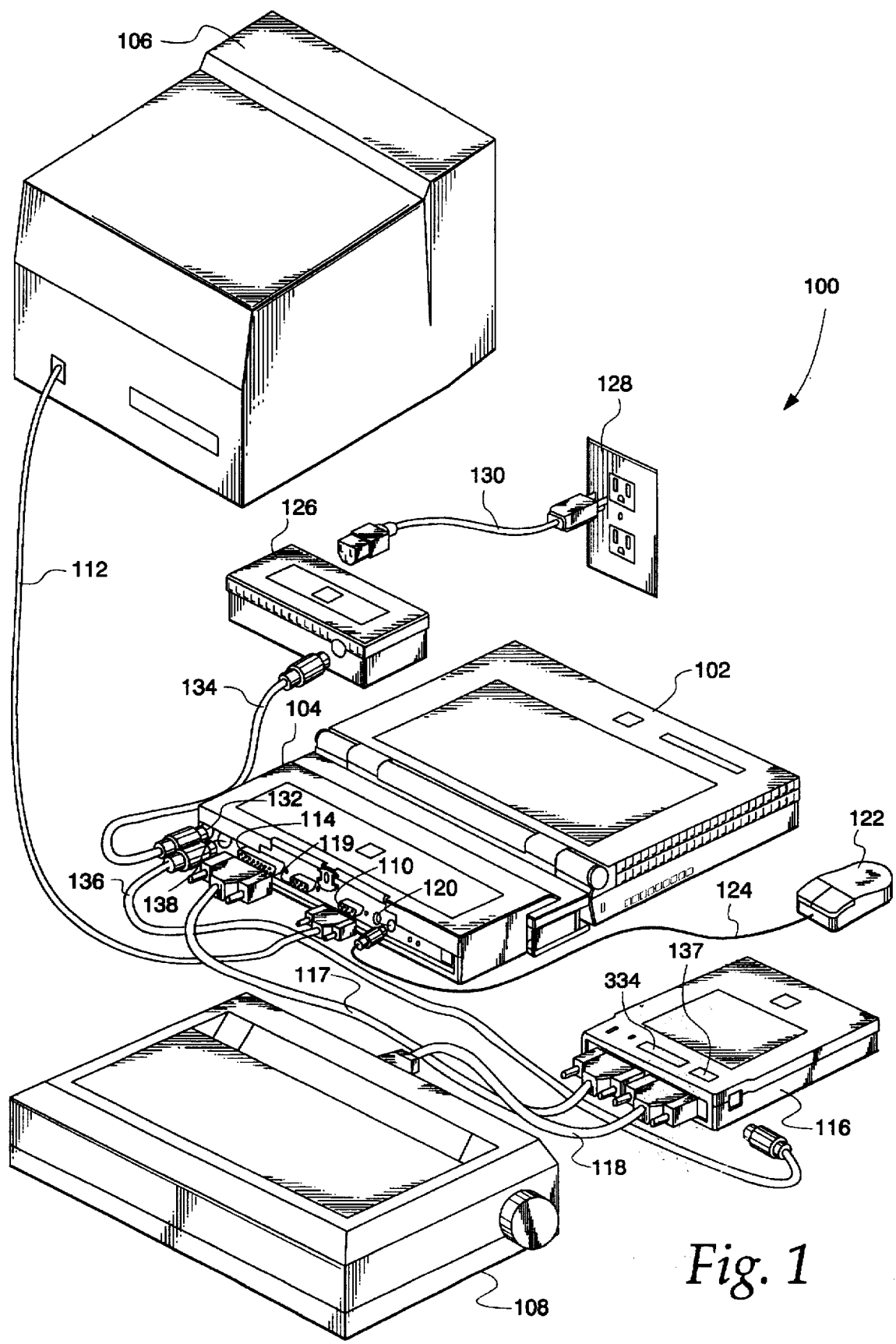
FIG. 1 is a perspective view of a flexible connectivity system in accordance with the present invention.

Referring to FIG. 1, a flexible modular connectivity system for a portable personal computer (PC) is shown, generally identified with the reference numeral 100. As shown, the flexible modular connectivity system 100 enables a notebook size PC 102, such as the Z-NOTEFLEX PC, as manufactured by Zenith Data Systems Corporation, in Buffalo Grove, Ill., to be rather easily and quickly connected to various input/output (I/O) devices for use in a desktop application. In particular, as will be discussed in more detail below, the flexible modular connectivity system 100 includes an active port replicator 104, which replicates various ports on the PC 102 including serial, parallel and mouse ports to facilitate use of external I/O devices with the PC 102 in a desktop application and the active port replicator 104 is user-upgradeable to provide additional interfaces for the PC 102 including a PCMCIA and a network interface. In a desktop application, the notebook size PC 102 is docked to the active port replicator 104, which, in turn, may be connected to various I/O devices, such as a desktop size monitor 106 and a printer 108. Such a configuration enables the notebook size PC 102 to be utilized with a full-size monitor 106 and a printer 108 in a desktop application, while eliminating the need for disconnecting such I/O devices when the notebook size PC 102 is used in a portable application and reconnecting the devices 106 and 108 for a desk-type application.

As shown, the desktop size monitor 106 is directly connected to a video port 110, available on the active port replicator 104, with a suitable cable 112. The printer 108, in turn, may either be connected to a parallel port 114 on the active port replicator 104 or may be connected by way of an external flexible bay 116. When the printer 108 is connected by way of the external flexible bay 116, a cable 117 is used to connect the parallel port 114 on the active port replicator 104 to the external flexible bay 116. The printer 108, in turn, is connected to the external flexible bay 116 by way of another cable 118. In this application, the external flexible bay 116 acts as a pass-through device for the parallel port 114 on the active port replicator 104.

In addition to the parallel port 114 and video ports 110, the port replicator 104 may also be configured with a serial port 119 and two type PS/2 ports 120 and 121. The type PS/2 ports 120 and 121 enable an external mouse 122 to be connected to the port replicator 104 by way of a suitable cable 124 and an external keyboard (not shown) for desktop application.

Figure 10:
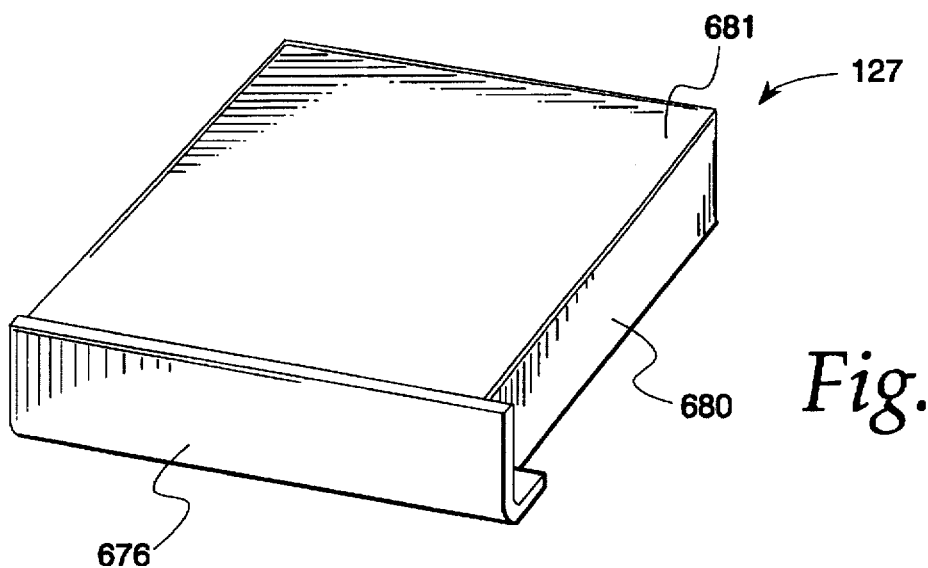
FIG. 10 is a perspective view of a modular battery pack for use with the external flexible bay and personal computer in accordance with the present invention.

As will be discussed in more detail below, the external flexible bay 116 may be used for either a modular floppy disk drive 125 (FIG. 13) or for charging a modular battery pack 127 (FIG. 10). Moreover, in order to provide optimum flexibility of the system 100, various connection configurations are possible for battery charging. For example, as shown in FIG. 1, a suitably sized AC to DC converter 126 is connected to a source of AC electrical power 128 by way of an appropriate cable 130. In this application, the AC to DC converter 126 is connected both to the active port replicator 104 and the external flexible bay 116 in order to charge the battery pack 127 (FIG. 10), disposed within the external flexible bay 116, as well as a battery pack 127 (FIG. 2) within portable PC 102. As will be discussed in more detail below, the battery pack 127 within the external flexible bay 116 is given charging priority. In particular, the AC to DC converter 126 is connected to a power port 132 on the port replicator 104 by way of a suitable cable 134 (FIG. 1). The power from the AC to DC converter 126 is passed through to the external flexible bay 116 by connecting a suitable cable 136 to an additional power port 138 on the rear of the active port replicator 104.

In an alternate configuration (not shown), the AC to DC converter 126 is connected directly to the external flexible bay 116, which, in turn, is connected to a power port (not shown) on the rear of the PC 102. Alternately, the AC to DC converter 126 can be connected directly with the PC 102 with or without the active port replicator 104 to charge the battery pack within the PC 102. Depending on the configuration used, the capacity of the AC to DC converter 126 must be sized accordingly.

Figure 13:
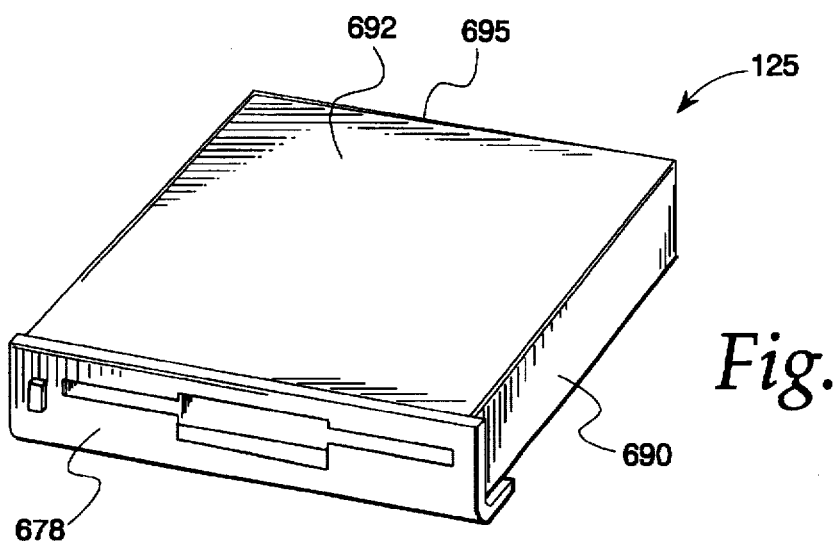
FIG. 13 is a perspective view of a modular disk drive for use with the external flexible bay and personal computer in accordance with the present invention.

The external flexible bay 116 provides for various configurations for optimum flexibility. More particularly, the external flexible bay 116 may be used as an external floppy disk drive 125 or for charging a spare battery pack 127. For example, a modular battery pack 127 (FIG. 10) may be charged by way of the external flexible bay 116. In this application the battery pack 127 is inserted within the external flexible bay 116, connected as discussed above. In an alternate configuration, the external flexible bay 116 may be used with the modular floppy disk drive 125 (FIG. 13). In this application a floppy disk drive 125, as will be discussed in more detail below, is removed from the notebook size PC 102 as shown in FIG. 2 in order to receive a spare battery pack 127 to provide additional battery capacity for the PC 102 in a portable application.

When the system 100 is configured as illustrated in FIG. 1, the external flexible bay 116 will have two modes of operation under the control of a mode select switch 137 (FIGS. 1 and 7) disposed on the external flexible bay 116. In a floppy drive mode, the external flexible bay 116 acts as an external floppy drive. In a printer mode the external flexible bay 116 merely acts as a pass-through parallel port for the printer 108. In this mode the external floppy drive 125 is disabled as will be discussed below.

Figure 2:
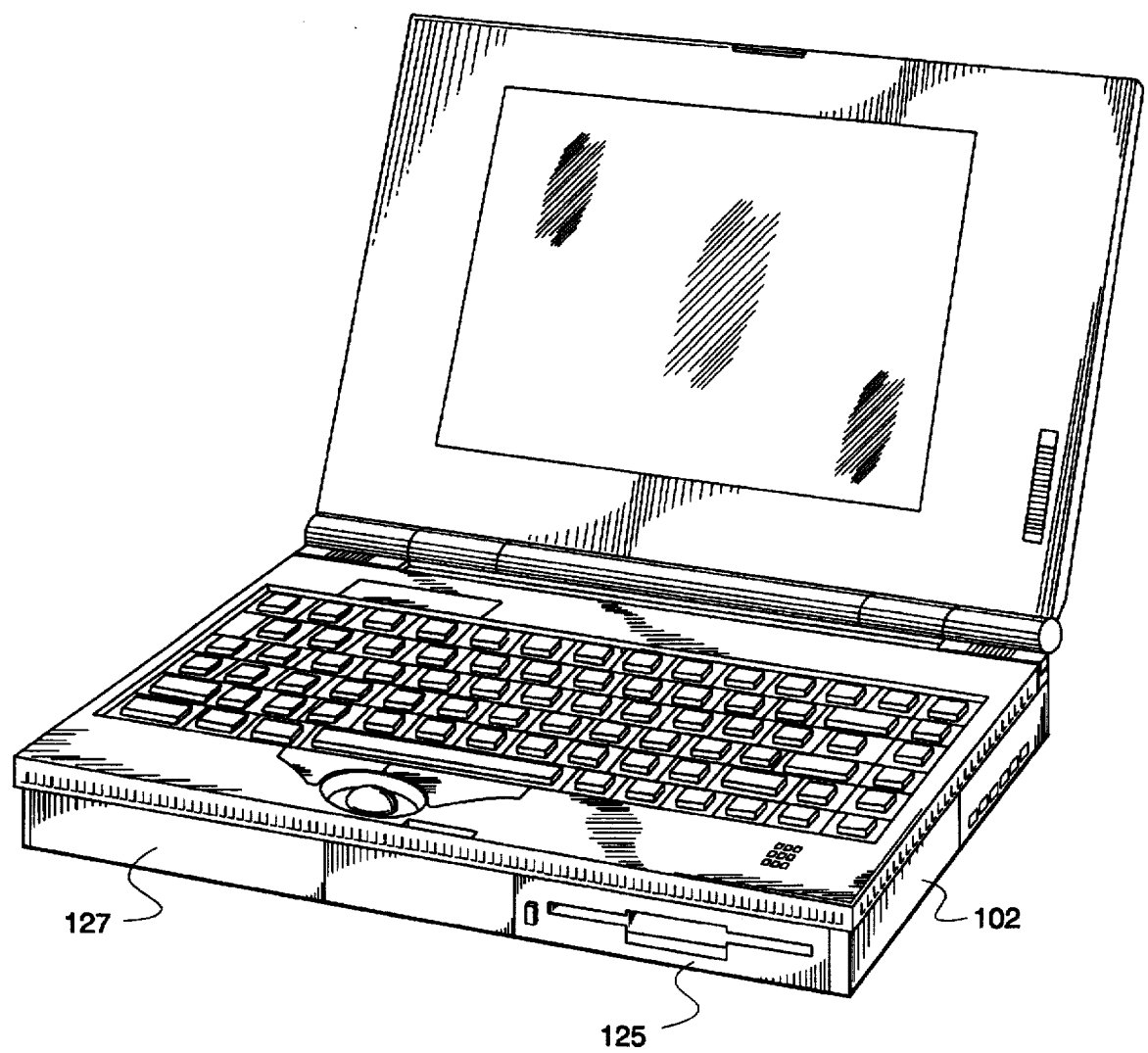
FIG. 2 is a perspective view of a portable personal computer in accordance with the present invention.
Figure 3:
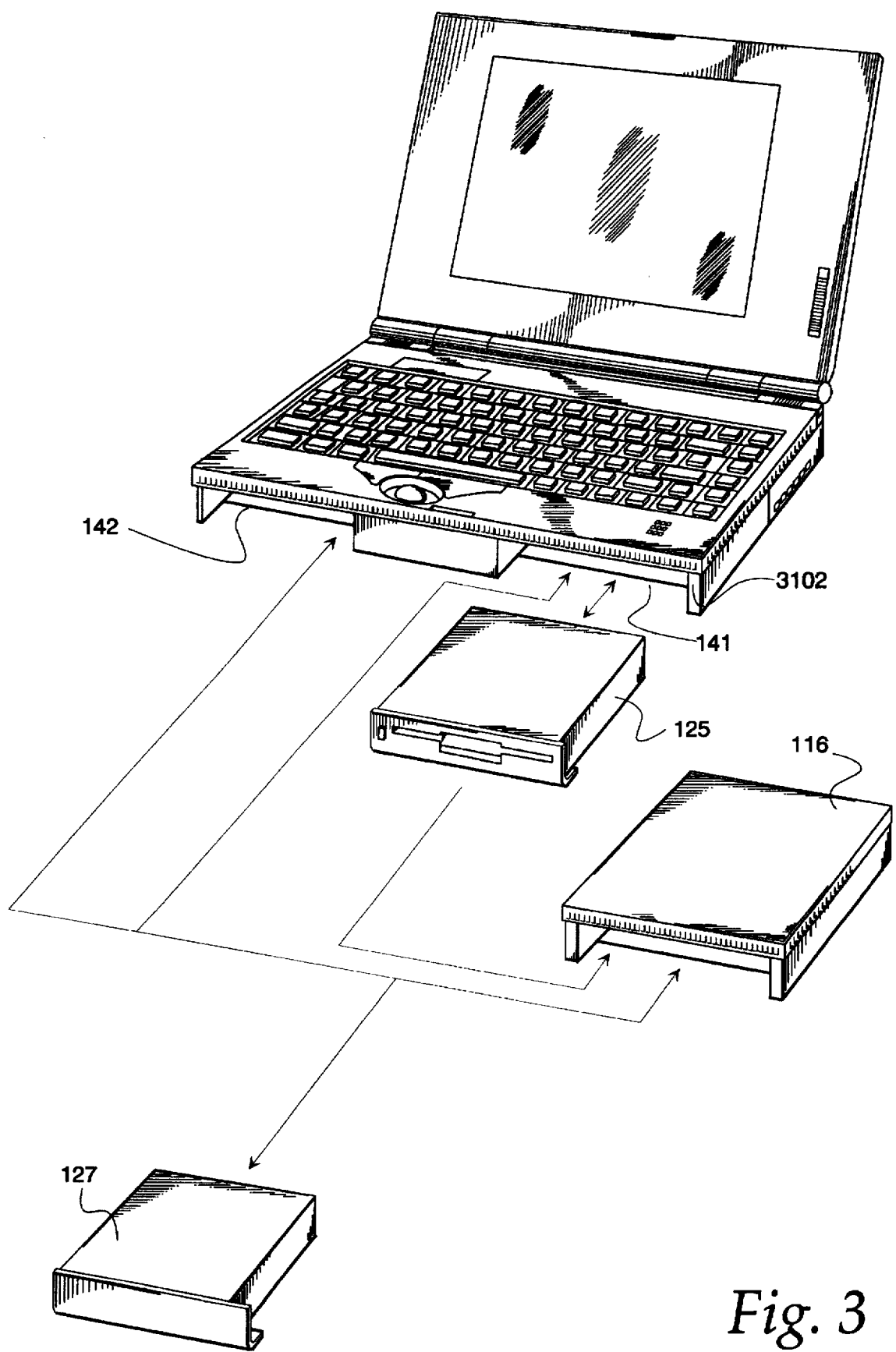
FIG. 3 is a perspective view of the portable personal computer shown in FIG. 2, illustrating an external flexible bay in accordance with the present invention.

The PC 102, adapted to be utilized with the flexible system 100, is illustrated in FIGS. 2 and 3. In particular, the notebook size PC 102 is configured with a flexible bay 141 and a battery pack bay 142. The battery pack bay 142 is configured to receive the modular battery pack 127, as shown. In order to provide additional battery capacity for the PC 100 in a portable application, the flexible bay 141 is adapted to receive either the modular battery pack 127 or the modular floppy disk drive 125. In particular, in order to provide additional battery capacity in a portable application, the modular floppy disk drive 125 may be removed from the flexible bay 141 and may be inserted into the external flexible bay 116. An additional modular battery pack 127 may then be disposed within the battery pack bay 141 to double the battery capacity of the PC 100 for a portable application. As will be discussed in more detail below, the modular floppy drive 125, as well as the modular battery pack 127, are dimensioned to be received within either the flexible bay 141 within the notebook size portable PC 102 or within the external flexible bay 116 to provide optimum flexibility.

External Flexible Bay

The schematic diagrams for the external flexible bay 116 are illustrated in FIGS. 4A–4E and 5A–5E. The software for the external flexible bay 116 is illustrated in FIGS. 6A–6L. A copy of the source code for the external flexible bay 116 is attached as Appendix A. As will be discussed in more detail below, the external flexible bay 116 is adapted to communicate with the modular battery pack 127 by way of a serial communications link. The modular battery pack 127, as well as the software control of the modular battery pack 127, is disclosed in detail below.

Since the AC to DC converter 126 provides the requisite power for the external flexible bay 116, the AC to DC converter 126 is connected to the external flexible bay 116 either directly or by way of the port replicator 104 as illustrated in FIG. 1. As discussed above, the AC to DC converter 126 may be connected to a power port 132, for example, an 8-pin connector 150 on the external flexible bay 116, or alternatively, as shown in FIG. 1 or as discussed above. When the AC to DC converter 126 is connected either directly to the external flexible bay 116 or by way of the port replicator 104 and the cable 136 (FIG. 1), the positive DC voltage from the AC to DC converter 126 is available on the DCIN and CHRGIN pins on the connector 150 (FIG. 4A). The DC voltage from the AC to DC converter 126 is used to develop a power supply VCC3, for example, 3.3 Vdc, for a microcontroller 154 (FIG. 4D). In particular, the DCIN pins on the power port connector 150 are connected to a switching power supply, indicated within the dashed box 156 (FIGS. 4A and 4B). The switching power supply 156 may include resistors 158, 160 and 162; capacitors 164, 166, 168, 170, 172, 174, 176, 178; ferrite bead inductors 180, 182; a wire-wound inductor 184; a Schottky diode 186; a field-effect transistor (FET) 188; and a switching regulator IC 190, such as a Model No. 11475, as manufactured by Linear Technology, which includes a power drive output pin Pdrv, which drives the gate of the FET 188.

The output of the switching regulator 156 is serially connected to a linear voltage regulator 192, for example, a Model No. LD2951, by Micrel, which provides a 3.3 volt output, identified as VCC3, for use as a power supply voltage for the microcontroller 154. In order to stabilize the input and output voltages, capacitors 194 and 196 are connected between the input and output pins, IN and OUT, respectively, of the linear voltage regulator 192. Two voltage divider resistors 198 and 200 are selected to provide an output voltage at the output terminal OUT to be 3.3 volts for use by the microcontroller 154.

The external flexible bay 116 is a flexible bay and, as mentioned above, is adapted to be utilized for a modular floppy drive 125 or to charge a modular battery pack 127. When the external flexible bay 116 is used to charge the modular battery pack 127, the circuitry determines the status of the modular battery pack 127 installed in the external flexible bay 116. The modular battery pack 127 when installed in the external flexible bay 116 is given priority over any modular battery pack 127 in the notebook size PC 102. As discussed in detail in U.S. Pat. No. 5,629,604, issued May 13, 1997, hereby incorporated by reference, the charging requirements of the modular battery pack 127 are provided by way of a charge control signal. In particular, the charge control signal controls the amount of charging current to be provided by the AC to DC converter 126 to the modular battery pack 127 as a function of the state of charge of the modular battery pack 127. Since the system 100 is capable of being utilized with a modular battery pack 127 installed within the external flexible bay 116, as well as a modular battery pack 127 installed within the portable PC 102, two charge control signals CHRGCNTRL and CHRGCNTRLI (FIG. 4A) are defined. The charge control signal CHRGCNTRL is used in conjunction with the modular battery pack 127 installed in the external flexible bay 116, while the charge control signal CHRGCNTRLI is used for the modular battery pack 127 installed within the portable PC 102.

The charge control signal CHRGCNTRL for the modular battery pack 127 installed in the external flexible bay 116 is available at a connector 210 (FIG. 5D), used to connect the battery pack 127 to the external flexible bay 116. The charge control signal CHRGCNTRLI is available at a connector 212 (FIG. 4A), used to connect the portable PC 102 to the system 100. A pair of multiplexers (MUXES) 214 and 216 (FIG. 4C) are used to control which of the two charge control signals CHRGCNTRL and CHRGCNTRLI are connected to the system 100. Depending on which modular battery pack 127 has priority, the charge control signals CHRGCNTRL and CHRGCNTRLI are amplified by an amplifier 218 whose output forms a charge control output signal CHRGCNTRLO to battery charger 126, available at the connector 150 (FIG. 4A). As discussed in detail in the above-mentioned U.S. Patent, the charge control output signal CHRGCNTRLO controls the amount of charging current supplied by the AC to DC converter 126 (i.e., the current supplied by the AC to DC converter 126 to the CHRGIN terminals on the connector 150 or 212).

The charge control signal amplifier 218 (FIG. 4C) may be configured as an operational amplifier with its inverting input tied to its output, which, in turn, is connected to the charge control output signal CHRGCNTRLO. The charge control signals CHRGCNTRL and CHRGCNTRLI from the modular battery packs 127 from the external flexible bay 116 or the PC 102, respectively, are applied to the noninverting input of the amplifier 218. In particular, the charge control signal CHRGCNTRL is dropped across a resistor 220 and applied to the non-inverting input of the operational amplifier 218 by way of a pair of voltage divider resistors 222 and 224 and the MUX 214. The charge control signal CHRGCNTRLI from the modular battery pack 127 within the PC 102 is applied to the noninverting input of the amplifier 218 by way of the MUX 216 and the voltage dividing resistors 222 and 224. Thus, depending on the states of the MUXES 214 and 216, either the charge control signal CHRGCNTRL or CHRGCNTRLI will be amplified by the amplifier 218 to provide the control signal CHRGCNTRLO to the battery charger 126.

The system 100 is further adapted to sense when the PC 102 is on. In particular, the DC current supplied by the AC to DC converter 126 is dropped across a sensing resistor 226 (FIG. 4A), connected to the DCIN pin on the connector 150 by way of a fuse 228. The voltage drop across the resistor 226 is amplified by an amplifier 230 (FIG. 4C). In particular, the junction between the resistor 226 and the fuse 228 is applied to an inverting input of the amplifier 230 by way of a resistor 232. The other side of the resistor 226 is applied to a noninverting input of the amplifier 230 by way of a resistor 234. The noninverting input of the amplifier 230 is referenced to a predetermined reference voltage by way of the voltage divider resistors 235 and 237 being connected to the output of the VCC3 of the linear regulator 192 (FIG. 4B). The inverting input is also connected to the output by way of a resistor 239 and connected to ground by way of a resistor 243. The resistors 232, 234, 237 and 243 determine the gain of the amplifier 230 while the resistors 235 and 243 add a DC offset.

Since the amplifiers 218 and 230 are, in essence, being used as current amplifiers, the negative power supply input −V is grounded. The positive power supply voltage +V is derived from the input voltage from the AC to DC converter 126, available at the DCIN terminal at the connector 150 by way of the resistor 226 and the fuse 228. A capacitor 241 stabilizes the voltage to the input power supply +V of the amplifiers 218 and 230.

As mentioned above, the current-sensing resistor 226 is used to determine when the PC 102 is on to ensure that the maximum composite output current (i.e. DCIN+battery charger) of the battery charger 126 is not exceeded. In particular, the DC current supplied from the AC to DC converter 126 is dropped across the resistor 226, a resistor 235 and a resistor 237 to define a voltage, proportional to the amount of DC current supplied by the AC to DC converter 126. This voltage is read by the microcontroller 154 (FIG. 4D) at port PB4 by way of a voltage divider which includes the resistors 242 and 244 (FIG. 4C). In order to ensure that the signal does not change during the A/D sample period, a low-pass filter (FIG. 4C) is connected between port PB4 and ground. The low-pass filter includes a single capacitor 248 incorporated into the voltage divider network. The microcontroller 154 may be, for example, an SGS Thompson type ST6225 microcontroller, which includes an on-board analog-to-digital converter. As such, the analog voltage signal representing the DC current being supplied by the AC to DC converter 126 may be applied directly to the microcontroller 154.

As will be discussed in more detail below, the modular battery pack 127 installed in the external flexible bay 116 is given priority over the modular battery pack 127 within the notebook size PC 102. The charge control signal CHRGCNTRL is used to read the battery charge level and set an external port PB3. Thus, when the charge level of the modular battery pack 127 within the external flexible bay 116 is low, the output signal on the external port PB3 (FIG. 4C) on the microcontroller 154 will be low, which, as will be discussed in more detail below, will connect the output power from the AC to DC converter 126 to the modular battery pack 127 installed in the external flexible bay 116. More particularly, the DC power from the AC to DC converter 126 is available at the CHARGIN pin on the input port connector 150 (FIG. 4A). This signal CHARGIN is connected to a switch 245, which may be implemented as a FET. In particular, the source terminals of the FET 245 are connected to the CHARGIN pin on the power port connector 150, while the drain terminals of the FET 245 are connected to a positive DC terminal BATT+ on the connector 210 (FIG. 5D) to connect the AC to DC converter 126 to the modular battery pack 127 within the active port replicator 104. The FET 245 is under the control of another switch 247, which may be implemented as a bipolar junction transistor (BJT). A resistor 248 is connected between the base and emitter terminals of the BJT 246 for biasing, while a resistor 250 is serially connected to the base terminal for current limiting. The base terminal of the BJT 247 is normally pulled high by way of a pull-up resistor 252.

When the output port PB3 of the microcontroller 154 is low, another switch 254, also implemented as a BJT, whose collector is connected to the base terminal of the switch 247, causes the switch 247 to close, which, in turn, provides a negative voltage at the gate terminal of the FET 245 by way of the resistors 256 and 258. A biasing resistor 260 and a current-limiting resistor 262 are connected to the BJT 254 as described above.

The switch 247 may also be used to provide a status indication of the charging status of the battery pack 127 within the external flexible bay 116. In particular, a light-emitting diode (LED) 264 may be connected to the collector terminal of the switch 247 by way of a current-limiting resistor 266. A signal DCIN from the AC to DC converter 126, which indicates that the AC to DC converter 126 is plugged in, is applied to the anode of the LED 264. Thus, as long as the switch 247 is closed, indicating that the battery pack 127 in the external flexible bay 116 is being charged, the LED 264 will be conducting, indicating the charging status.

As indicated above, the circuitry is capable of additionally charging the modular battery pack 127 within the PC 102 after the modular battery pack 127 in the external flexible bay 116 has been fully charged. In this situation, the output port PB3 from the microcontroller 154 will be high, indicating that the modular battery pack 127 within the external flexible bay 116 is fully charged. During this condition, the high on the output port PB3 on the microcontroller 154 will bias a switch 268; configured as a BJT with a biasing resistor 270 and a current-limiting resistor 272. The BJT 268 controls a switch 274, for example, a FET, which, in turn, connects the output of the AC to DC converter 126 to the modular battery pack 127 in the PC 102 by way of a power port 212. In this situation the high signal at the output port PB3 on the microcontroller 154 will cause the switch 268 to close, which, in turn, generates a negative voltage at the gate terminal of the FET 274 by way of the resistors 276 and 278.

As discussed above, when the modular battery pack 127 within the external flexible bay 116 is being charged, the CHRGCNTRL signal from the battery pack 127 in the external flexible bay 116 is connected to the current amplifier 218 by way of an analog switch 214. The analog switch 214 is under the control of the BJT 254. In particular, the control line for the analog switch 214 is coupled to the collector terminal of the BJT 254, normally pulled high by way of the pull-up resistor 252. The BJT 254 is under the control of the port PB3 of the microcontroller 154. When the modular battery pack 127 in the external flexible bay 116 is being charged, the output port PB3 will be low, which, in turn, will result in the collector terminal of the BJT 254 being high. This condition will cause the analog switch 214 to close, thus connecting the CHRGCNTRL signal from the modular battery pack 127 within the external flexible bay 116 to the system 100.

During conditions when the modular battery pack 127 within the PC 100 is being charged, the output port PB3 will be high, causing the BJT 254 to close, which grounds the collector terminal, connected to the control line of the MUX 214. Such low voltage will cause the analog switch 214 to open, thus disconnecting the CHRGCNTRL signal from the system 100. During such a condition when the battery pack 127 in the PC 100 is to be charged by the system 100, the charge control signal CHRGCNTRLI is connected to the system 100, while the signal CHRGCNTRL is disconnected from the system 100. The charge control signal CHRGCNTRLI is connected to the system by way of the analog switch 216. The analog switch 216 is under the control of a switch 280, which may be implemented as a BJT, configured with a biasing resistor 282 and a current-limiting resistor 284. The collector terminal of the BJT 280 is normally pulled high by way of pull-up resistor 286. When the switch 280 is closed, the collector terminal is pulled low, causing the analog switch 216 to open, thus disconnecting the charge control signal CHRGCNTRLI from the system 100. Since the charging of the modular battery pack 127 within the external flexible bay 116 and the battery pack 127 within the PC 102 are under the control of port PB3 of the microcontroller 154, during conditions when the modular battery pack 127 within the PC 102 is to be charged, the output of the port PB3 in the microcontroller 154 will be high. This high signal at the output port PB3 will, in turn, cause the BJT 254 to close, which, in turn, will pull the signal to the base terminal of the BJT 280 low, which, in turn, will force the input signal to the analog switch 216 to be high by way of the pull-up resistor 286, to close the analog switch 216 to connect the charge control signal CHRGCNTRLI to the system.

As mentioned above, the external flexible bay 116 is adapted to be utilized as an external floppy drive and also as a pass-through parallel port, which can be used for connection to an external printer 108. As mentioned above, the external flexible bay 116 has two modes of operation. In particular, the system 100 has a floppy drive mode and a printer mode. As will be discussed in more detail below, connections to the modular floppy drive 125 inserted within the flexible external bay 116 are disconnected anytime a printer cable is connected to the external parallel port connector 292 (FIG. 5B) on the exterior of the external flexible bay 116. In this mode, the standard floppy disk drive signals (shown at terminals 19–40 of the connector 210) are disconnected from the connector 290 (FIG. 5A) within the flexible external bay 116. When a printer cable is not connected, the standard floppy disk drive signals from the PC 102 will be fed from the parallel port connector 290 (FIG. 5A) through the internal connector 210 (FIG. 5D) to enable the floppy disk drive within the external flexible bay 116 to be under the control of the PC 102.

Referring to FIGS. 5A–5D, a parallel port connector 290 is used to connect to the PC 102. The port 290 is implemented as a 25-pin connector and is connected to a plurality of bus switches 294, 296, 298 and 299; for example, Quick Switch model 24QSOP 10-bit bus switches, by way of a plurality of RF filtering circuits, shown within the dashed box 301. As indicated above, a mode-selector switch 137, for example, a signal pole, single throw switch, is provided on the exterior of the external flexible bay 116 (FIG. 4D). In particular, the switch 137 is connected to port PB2 in the microcontroller 154 by way of a pull-up resistor 303. One side of the switch 137 is connected to the pull-up resistor 303 while the other side is connected to ground. In a first position with the switch 137 open as shown, a high input is applied to the input port PB2 on the microcontroller 154. When the switch 137 is closed, the signal to the input port PB2 is pulled low in order to indicate the position of the switch 137.

The system 100 ascertains the position of the switch 137 to determine whether the mode-selector switch 300 was placed in the floppy mode or the printer mode. In particular, as mentioned above, the position of the switch 137 is monitored by an input port PB2 on the microcontroller 154. Depending on the position of the switch 137, the output ports PB0 and PB1 are used to indicate whether a floppy mode or a printer mode was selected. In particular, the output port PB1 on the microcontroller 154 goes high anytime the floppy mode was selected to generate an active low floppy signal –FLOPPY. More particularly, the output port PB1 on the microcontroller 154 is tied to a switch 304, configured as a BJT. The collector of the BJT 304 is tied high by way of a resistor 306. The –FLOPPY signal is available at the output of the collector. Thus, whenever the floppy mode is selected, the output port PB1 will go high, which closes the switch 304, which, in turn, causes the –FLOPPY signal to go low. Similarly, when the printer mode of operation is selected, the output port PB0 will go high to generate an active low –PRINTER signal. In particular, the output port PB0 is used to control a switch 308, configured as a BJT. The collector of the BJT 308 is tied high by way of a resistor 310. The –PRINTER signal is available at the collector terminal. Thus, anytime the output port PB0 goes high, the switch 308 will close, causing the collector to be tied to ground, forcing the –PRINTER signal low.

These signals, –PRINTER and –FLOPPY, are used to control the bus switches 294, 296, 298 and 299. More particularly, as shown on FIGS. 5B and 5D, the –PRINTER signal is applied to the bus switches 294 and 296 in order to connect the parallel connector 290 to the connector 292 in order to provide standard parallel port signals to the printer 108. Similar to the input side, RF filtering within the dashed box 312 is provided between the bus switches 294 and 296 and the connector 292.

The –FLOPPY signal, in turn, is used to control the bus switches 298 and 299. When the –FLOPPY signal is low, a modular floppy disk drive, installed within the external flexible bay 116 will be connected to the connector 290 by way of the bus switches 298 and 299.

As mentioned above, the modular floppy drive 125 cannot be used when a printer is being used. Thus, a selector switch 300 is used to toggle between a printer mode and a floppy mode. In order to prevent an improper configuration of the system 100, pin 24 on the 25-pin connector 292 (FIG. 5B) is monitored. Normally, when no printer cable is connected to the 25-pin connector 292, pin 24, identified as PNFI, is grounded by way of the switch 320 (FIG. 4D), anytime the mode-selector switch 300 is placed in a floppy mode of operation. In particular, the PNFO signal, available on pin 24 of the connector 290, is connected to the collector terminal of the BJT 320, by way of a resistor 321. The BJT 320, having a biasing resistor 323 connected across its base and emitter terminals, is connected to port PB1 on the microcontroller 154 by way of a current-limiting resistor 325. When a floppy mode is selected, the output port PB1 will be high, causing the BJT 320 to conduct, which, in turn, grounds the signal PNFO through a resistor 321.

A signal PNFI, tied to pin 24 of the 25-pin connector 292, is pulled high by a pull-up resistor 322. Thus, when no printer connector cable is connected to the 25-pin connector 290, the signal PNFI will be high. This signal PNFI is tied to an input port PB5 on the microcontroller 154. As mentioned above, whenever a printer cable is connected to the 25-pin connector 290, the pin 24 on the connector 292 will be connected to ground, which, in turn, will cause the signal PNFI to go low. Thus, depending on the position of the mode selector switch 300 and whether a printer cable is connected to the system 100, as will be discussed in more detail below, the bus switches 294, 296, 298 and 299 will enable either the battery pack 127 or the modular floppy disk drive 125, installed in the external flexible bay 116 to be utilized in the system 100.

The external flexible bay 116 provides status indication of the state of charge of the modular battery pack 127 installed therewithin and whether the floppy mode or printer mode was selected by the mode selector switch 137. In particular, ports PA5 and PA6 of the microcontroller 154 (FIG. 4D) are connected to status indication segments 330 and 332, respectively, of a LCD display 334 on the external flexible bay 116 (FIG. 7) by way of a connector 333 to indicate whether a floppy mode or a printer mode was selected by way of the mode selector switch 137 (FIG. 4D). In addition, ports PA0, PA1, PA2 and PA3 may be connected to a four-segment bar graph 334 (FIG. 7) on the LCD display 334 by way of the connector 333 to indicate the status of charge of the modular battery pack 127 within the external flexible bay 116.

Smart Battery Pack

Overview

The following describes a control module to be used within ZDS battery packs. This module will allow users to determine the amount of energy left in the battery pack. In addition the module will control charging and charge termination of the battery pack.

Information regarding the present state of the battery pack can be requested by the computer system through a serial interface to the battery pack. This same serial interface will also accept data and software commands from the computer that alter the way the module functions.

Charging of the battery pack will be controlled by the module as well. A signal from the module will control the charging current supplied by the AC Charger/Adapter to charge the battery pack.

These features allow for new battery technologies or charging techniques to be incorporated into existing designs with little or no effect. This separation of function provides for systems which are adaptable between designs of different products and with changing battery technology.

Functional Specifications

Battery Charging

The module must control battery charging and charge termination. Charge decisions are to be based on information about from the System Status/VDC Line and commands received from system. In addition, the module must sense the battery pack temperature and voltage, recall previous battery capacity and the present battery capacity and determine the present computer operating mode (on, off, or rest).

Charge Control Method

The battery pack module employs an analog signal on the Charge Control line to request: no charge, fast charge or an intermediate charge level from the AC Cube.

Charge Control

The Charge Control line output must drive a 47k ohm load with a 0 to 5 V signal. When the control line is between 0 and 1 V, the charger output will be 0. For outputs greater than 4 V, the charger output is 1.2 A. For control voltages between 1 and 4 V the charger output current will vary linearly between 0 and 1.2 A. The module will monitor the battery charge level and request maintenance charge, or fast charge.

Charge Initiation

Fast charge will be initiated when the present available battery capacity, as determined by the module, is less than the charge activation level value of 95%.

Maintenance charge is normally active whenever the fast charge has been terminated.

Fast charge cycles will not begin if the cell temperature is not within the following range: 5 deg C. to 40 deg C. Maintenance charge cycle will not begin if the cell temperature is not within the following range: 5 deg C. to 45 deg C.

Maintenance Charge

The maintenance charge control method will be the analog charge signal.

Maintenance Charge Algorithm

Maintenance charging will normally be active whenever fast charging is not required.

Maintenance charging must cease if the cells have reached a min. or max. temperature extreme (5 deg or 45 deg C.), if the battery has reached a maximum voltage (# cells*1.5), or if a fast charge termination was caused by the host system being turned on and the system is now turned off such that fast charging may be initiated again. The module will periodically attempt to determine if the host system is turned on or off by monitoring the System Status/VDC line.

Maintenance charging is to resume when all of the offending conditions mentioned above are now satisfactory.

Fast Charge

The charge control mode will output an analog signal on the Charge Control line and adjust this signal until the desired fast charge current is obtained.

Fast Charge Algorithm

Fast charging will be initiated when the present available battery capacity, determined by the module, is less than 95%.

Fast charging is acceptable only if the battery pack temperature is within a limited range (5 deg C. and 40 deg C.), the maximum battery voltage value (# cells*1.5 V) is not exceeded.

Fast Charge Temperature Range

Fast charging is acceptable only if the battery pack temperature is within the fast charge minimum and maximum temperature limit values; 5 deg C. and 40 deg C.

Charge Termination

Maintenance charge termination can be caused by four factors as defined under Maintenance Charge sections. Fast charge termination can be caused by the following factors outlined below.

Negative Delta Voltage

Fast charging terminates when the battery voltage exceeds a minimum voltage value and is decreasing at a rate that exceeds a specified amount. The Negative Delta Voltage will NOT be implemented for the Ni-MH batteries.

DELTA Temperature With Time

Fast charging terminates when the battery temperature rate increase exceeds an amount specified by the battery manufacture. For the Ni-MH by Sanyo the rate is 1 deg/minute.

Cell Temperature

Fast charging must terminate when the battery temperature exceeds an amount of 45 deg C.

Time Out

Fast charging terminates after a maximum of 130 minutes for a fully zero capacity battery pack.

Maximum Voltage

Fast charging terminates if the battery voltage exceeds an amount specified as follows number of cells multiplied by the maximum cell voltage (i.e. 7 cell*1.6 V~10.5 Volts). This is a fail-safe mechanism.

Battery Capacity Gauge

Function

In addition to the battery charging function, the module must determine the present battery capacity at any given time.

Parametric Relationships

Determining present battery capacity is accomplished by periodically sensing all currents flowing in and out of the battery. The module will make allowances for the battery's self discharge loss and compensate all of these measurements for temperature variations, charge rates, and discharge rates.

Change in Capacity vs. Current Draw

Battery capacity diminishes faster than normal at high discharge rates. When the battery current drain exceeds a specified amount, the present battery capacity should be derated accordingly. These parameters are stored in the Battery Pack module.

Change in Capacity vs. Temperature

Battery capacity diminishes at lower temperatures. Compensation values for this condition are in the BP module Self Discharge Rate vs. Temperature The battery's self discharge rate increases with increasing temperature and diminishes at lower temperatures. Values for extrapolating the self discharge rate at various temperatures are stored in the BP module.

Charge Acceptance vs. Current

The charge acceptance is higher at a fast charge rate than at a maintenance charge rate. The charge acceptance values for fast and maintenance charging is stored in the BP module.

Charge Acceptance vs. Temperature

The battery is charge acceptance rate is higher at low temperatures and decreases at higher temperatures. Charge acceptance values for several temperature ranges are stored in the BP module.

Data Transmission

The "Clock" and "Data" lines are used for communication in both directions between the system and the Intelligent Battery Pack (IBP). These lines are driven by an open collector device which allows either the system or the Intelligent Battery Pack to force the line to a low level. When no communication is occurring the clock line is high and the data line is held high by the IBP.

When the system sends data to the Intelligent Battery Pack, it forces the data line to a low and allows the clock to go to a high level.

When the Intelligent Battery Pack sends data to or receives data from the system, it generates the clock signal to synchronize the data. The system can inhibit the IBP from transmitting data by forcing the clock line to a low level; the data line may be high or low during this time.

During the self-test the Intelligent Battery Pack allows clock and data to go high.

Data Format

The protocol is an 11-bit data stream that consists of 1 start bit (always logic '0'), 8 data bits (least significant bit to most significant bit, respectively), 1 odd parity bit and 1 stop bit (always logic '1'). The parity bit is either 1 or 0, and the 8 data bits, plus the parity bit, always have an odd number of 1's. See figures below for graphic representation of these signals.

Intelligent Battery Pack to System Line Protocol

1. IBP checks "clock" line, if logic '1' continue, if logic '0' internally store data bytes (inhibit).

2. IBP checks "data" line, if logic '1' continue, if logic '0' prepare to receive data from system.

3. IBP transmits data. While transmitting the IBP checks the clock line for logic level '1' at least every 100 microseconds. (see Line Contention below) Line contention—the system may interrupt Intelligent Battery Pack data transmission at any time up to the 10th clock by pulling the "clock" line to a logic level "0". After the 10th clock the system must receive the IBP data.

4. Data should be ready at least 5 usec before clock goes low.

System to Intelligent Battery Pack Line Protocol

1. System inhibits IBP by lowering "clock" line to logic '0' for a minimum of 100 microseconds.

2. System requests transmission by lowering the "data" line to logic level '0' (Request to Send, RTS) and allows the "clock" line to go high.

3. IBP monitors the "clock" line (10 milliseconds intervals) and detects the high level.

4. IBP detects "RTS" on the "data" line and clocks it in as the logic '0' start bit. Then clocks 8 data bits and parity.

5. IBP looks for a logic level '1' on the data line then forces it low and clocks one more bit, the "line control" bit. This action signals the system that the IBP has received the data. If the "data" is not at a logic level '0' following the 10th bit and IBP will continue to clock bits until the line becomes high. The IBP then pulls the "data" line low and transmits a "RESEND" command.

INTELLIGENT BATTERY PACK INPUT (11-BIT)

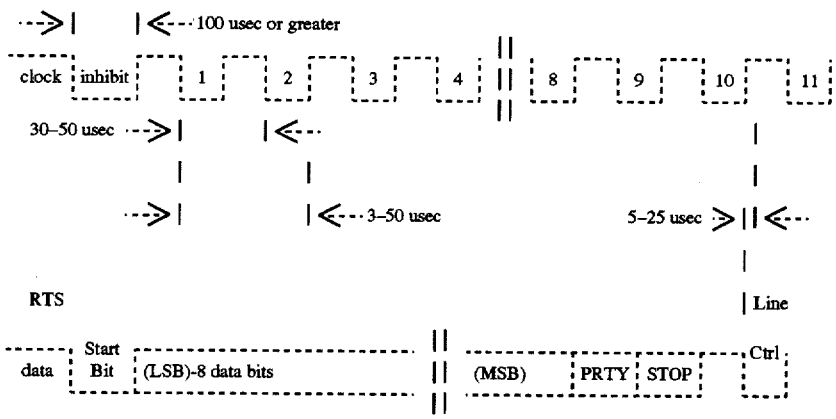

IBP reads data line when clock is high

INTELLIGENT BATTERY PACK OUTPUT (11-PUT)

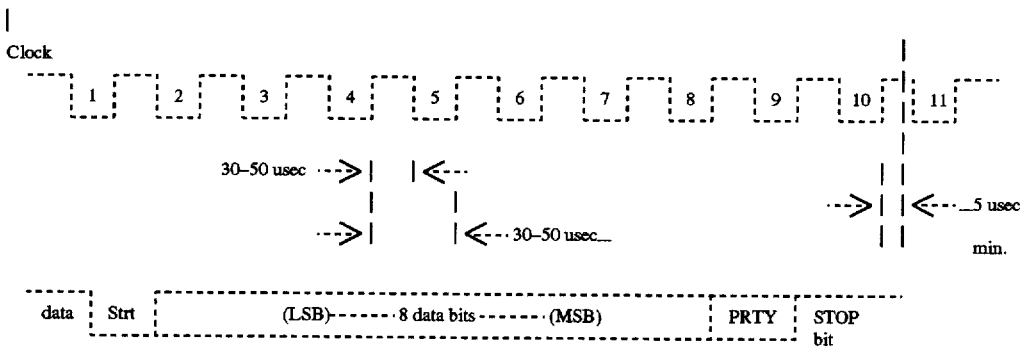

System reads data line when clock is low
Electrical Specifications
Pinout

For pin numbers and placement of connectors on the module please refer to the mechanical specifications.

Power +

This, the first of two power pins, will be used to power the computer. This pin will also be used as an input for charging the battery pack. All current entering or exiting these terminals needs to be measured and the gas gauge updated accordingly.

Power −

This, the second of two power pins, will be used to power the computer. This pin will also be used as an input for charging the battery pack. All current entering or exiting these terminals needs to be measured and the gas gauge updated accordingly.

Battery Negative

This pin will connect to the negative terminal of the series of seven to ten battery cells. A shunt resistor of not greater than 125 milliohms can be used between this terminal and power− for measuring current.

Charge Control

The charge control line will be selected as either a PWM or a three level control line through a value stored in EEPROM.

For PWM the Charge Control line output must drive a 1k ohm load with a 2.5 kHz±10%, 0 to 5 v square wave signal. The duty cycle of this signal will control the battery charge current such that a 80–100% duty cycle will produce the maximum charge current available, a 0–20% duty cycle will produce no charge current, and duty cycles of 20–80% will proportionally control intermediate levels of charge current. The module will monitor the battery charge current and adjust the duty cycle to provide the desired no charge, maintenance charge, or fast charge currents based the above defined charge algorithms.

Power Inhibit

The power inhibit signal will be pulled-low to force a system rest/suspend condition when the battery critical voltage has been detected. During normal operation the signal will be high.

| SERIAL CLOCK & SERIAL DATA | | |
|---|---|---|
| Sink Current | 20.0 mA | Maximum |
| High-level Output | 5.0 Vdc minus pull-up | Minimum |
| Low-level Output | 0.5 Vdc | Maximum |
| High-level Input | 2.0 Vdc | Minimum |
| Low level Input | 0.8 Vdc | Maximum |

Please refer to the data transmission section for timing information.

Thermistor

The thermistor input will allow for the sensing of the ambient battery cell temperature measurement. The thermistor is a Mitsubishi RH16-4A104GB with a 25° C. resistance of 100k.

Measurements

Battery Pack Voltage

Range: 6–20 Vdc

Resolution: 1 mV

Accuracy: ±30 mV

Battery Current

Range: −3.0 to +3.0 Amps

Resolution: 1 mA

Accuracy:

Temperature

Range: −xx−+xxx deg. C.

Resolution: 0.8 deg. C.

Accuracy: ±2 deg. C.

Power Consumption

In order to conserve battery power the intelligent battery pack may enter low power consumption states when feasible. These could occur when the system is powered off or in rest mode. The intelligent battery pack must be able to sense when the computer enters a fully on state, or when the battery is being charged, and at that time return to normal sampling rates for its' sensors.

Computer System Off

Before the computer system; "powers off", a software command will be sent via the serial interface. The battery pack may then enter a mode where it samples its' sensors less often in an attempt to conserve power. In addition the serial interface must be tri-stated at the gas gauge module. When the module detects a system on condition (or receives the "system on" command byte), the module will return to a full on state and restart communications with the computer system.

Computer System in Rest

Before the computer system enters rest mode a software command will be sent via the serial interface. The battery pack may then enter a mode where it samples its' sensors less often in an attempt to conserve power. In addition the serial interface must be tri-stated at the gas gauge module. When the module detects a system on condition (or receives the "system on" command byte), the module will return to a full on state and restart communications with the computer system.

Computer System Operating

When the gas gauge module detects the system on condition or if the battery is being charged, the gas gauge module should sample it's sensors at the normal rate. Before the computer enters either a rest or "power off" condition the appropriate software command will be sent via the serial interface. At this point the serial interface must be tri-stated.

Firmware Requirements

The Intelligent Battery Pack (IBP) is continuously outputting battery capacity percentage level with only one data byte internal buffer. Once one of the condition (low, critical or immediate shut-down) is reached, the IBP will output that particular data byte as defined by the time scale. The percentage capacity level should not be transmitted after reaching the low, critical or immediate shut-down condition.

Software Command Sequences

To Intelligent Battery Pack

These commands may be sent to the Intelligent Battery Pack (IBP) at any time. The IBP will respond within 20 msec., except when performing the Build In-Test (BIT).

| Command | Hex Value |
| --- | --- |
| Program EEPROM | EE (n/a) |
| Dump EEPROM | ED (n/a) |
| Resend | FE |
| ACK | FA |
| System ON | F2 |
| System OFF | F3 |
| System Rest Mode | F4 |
| Present Battery Status | F5 (n/a) |
| Rate of percentage update | F6 (n/a) |
| Built In-Test | F7 |
| Start Calibration | F8 (n/a) |
| System Standby Mode | F9 |
| Software Rest | EB |
| Revision byte information | F0 |
| Status 1 data byte | EC |

Program Electrically Erasable PROM (Not Implemented)

Resend

This command will be sent following the output of a code and before the system enables the interface allowing the next IBP output. The IBP will retransmit the previous code unless it was a "RESEND" command, in this case the keyboard will resend the last byte prior to the "RESEND" command.

Built In-Test (BIT)

The BIT should consist of the IBP's processor test, a checksum of the read only memory, the random access memory and the EEPROM. The BIT takes a minimum of 300 milliseconds and a maximum of 500 msec. During the BIT all activity on the clock and data lines will be ignored. Upon satisfactory completion of the BIT, completion code will be sent.

Rate of Continuous Update for Percentage Capacity (Not Implemented)

This byte defines the interval of the updates (0 to 255 seconds, where default is every 2.5 seconds). The IBP acknowledges receipt of this command with "ACK" and then defines the percentage capacity update rate from the IBP to system.

Acknowledge

The system sends "ACK" in response to any valid command from the IBP.

Start Calibration (Not Implemented)

This command will instruct the IBP to start the calibration cycle. Once the calibration is completed the IBP will reset the bits on the battery service data to reflect the present state of the battery pack.

System On

This command will instruct the IBP that the system is turning ON.

System Off

This command will be transmitted to the IBP just before the system is turning OFF.

System Rest Mode

This command will be transmitted to the IBP just before the system enters its REST mode.

System Standby Mode

This command will be transmitted to the IBP just before the system enters standby mode.

Revision Byte Information

Once this command byte is received by the Battery Pack it will respond with the internal firmware revision data byte.

Status 1 Data Byte

Once this command byte is received by the Battery Pack it will respond with the following bit-mapped status information:

Bit 7−1=BP inhibit pulled low/0=BP inhibit pulled high

Bit 6–1=BP voltage abnormal/0=BP voltage OK

Bit 5–1=BP ambient temperature >40 deg C.

Bit 4–1=BP ambient temperature >50 deg C.

Bit 3–1=Fast Charge Active/0=Maintenance Charge Active

Bit 2–1=BP plugged into System/0=BP outside of system (in space)

Bit 1–1=System On/0=System Off

From Intelligent Battery Pack

These command may be sent to the system any time the IBP is enabled.

| Command | Hex Value |
|---|---|
| ACK | FA |
| Low Battery Indication | FB |
| Critical Battery Indication | FC |
| Immediate Shutdown Indication | FD |
| Resend | FE |
| BIT Completion | AA |
| Battery Error Condition | E0 (N/A) |
| Battery Service Data | E1 (N/A) |

Critical Battery Indication

Once this command is received, the system will start its critical battery indication. See time scale for timing information.

Immediate Shutdown

The system will start its immediate shutdown. See time scale for timing information.

Resend

The IBP issues a "RESEND" command following receipt of an invalid input or any input with incorrect parity.

Timing Scale for Warning Indication:

The battery pack will determine the low battery, critical battery condition or immediate shutdown time using its internal algorithm. This will allow the battery pack firmware to change with the battery technology independent of the computer system's firmware.

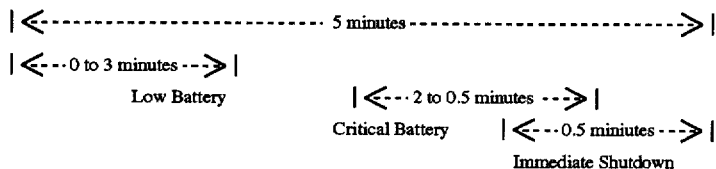

```
|<---------------------- 5 minutes ---------------------->|

|<-- 0 to 3 minutes -->|
        Low Battery              |<-- 2 to 0.5 minutes -->|
                             Critical Battery    |<-- 0.5 miniutes -->|
                                                     Immediate Shutdown
```

Acknowledge

The IBP sends "ACK" in response to any valid command from the system except "RESEND". If the IBP is interrupted while sending the "ACK", it discards "ACK" and accepts and responds to the new command.

Built In-Test Completion Code

Indicates to the system that the keyboard Built In-Test was successfully completed. Any other code indicates a failure of the IBP.

Battery Error Condition (Not Implemented)

This command instructs the system that there is a battery error condition presently. The byte following the command describes the condition as follows:

bit 7: Current overdrive
bit 6: Voltage over limit
bit 5: Voltage under limit
bit 4: Temperature over limit
bit 3: Temperature under limit
bit 2: Watchdog timer overrun
bit 1: Temperature differential over limit
bit 0: Current loop failure Battery Service Data (Not Implemented)

This command instructs the system that the battery needs service. The byte following the command describes the service condition as follows:

bit 0–4: Not used (always zero)
bit 5: Request Calibration (0=Request/1=Completed)
bit 6: Calibration (0=normal/1=in progress)
bit 7: Charge Current Request (0=Request/1=full)

Low Battery Indication

The IBP issues this command to indicate that the system should start its low battery warning indication. See time scale for timing information.

Operating Conditions

The module shall be capable of continuous operation when subjected to the specified environmental conditions without need for adjustment.

Operating Temperature

All electrical specifications apply over the temperature range of xx-xx degrees Celsius.

Operating Relative Humidity

All electrical specifications apply over the relative humidity range of 0–95% non-condensing.

Storage and Shipping Conditions

No degradation shall occur during shipping or storage of the module at the specified conditions.

Storage and Shipping Temperature

The ambient temperature during storage and shipping shall be over the temperature range of xx-xx degrees Celsius.

Storage and Shipping Relative Humidity

The relative humidity during storage and shipping shall be over the range of 0–95% non-condensing.

Software Control for External Flexible Bay

As mentioned above, the external flexible bay 116 is adapted to receive either the modular battery pack 127 or the modular floppy disk drive 125. The external flexible bay 116 is also adapted to act as a pass-through parallel port for a printer 108. However, as mentioned above, external flexible bay 116 cannot be used as a pass-through parallel port for a printer 108 when a floppy disk 125 is selected for use. Thus, the mode-selector switch 137 allows either a floppy disk drive or a printer mode to be selected when both a printer 108 and floppy disk drive 127 are connected to the system. As will be discussed in more detail below, when the mode-selector switch 137 is set to the floppy disk drive mode, the printer cable, even though its connected to the connector on the external flexible bay 116, is effectively disconnected. Similarly, when a printer mode is selected, the control signals for the modular disk drive 125 are disconnected.

Figure 7:
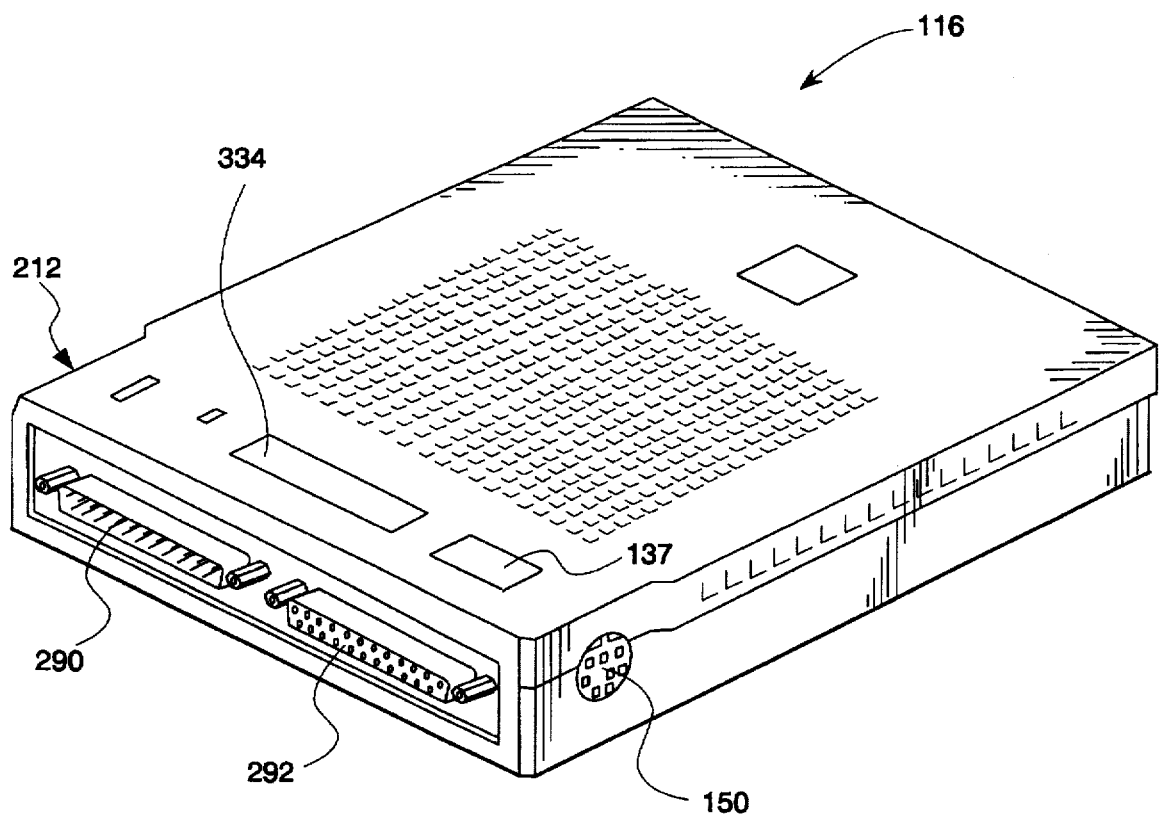
FIG. 7 is a perspective view of the external flexible bay in accordance with the present invention.

In an alternative configuration, wherein the battery pack 127 is installed in the external flexible bay 116, the system provides a bidirectional data link with the installed modular battery pack 127 to ascertain its charge status. The circuitry for the modular battery pack 127 is disclosed in detail in U.S. patent application Ser. No. 07/975,879, filed on Nov. 13, 1992, assigned to the same assignee as the present invention and hereby incorporated by reference. Once the charge status of the modular battery pack 127 is ascertained, the information is used to arbitrate charging between the modular battery pack 127 installed in the external flexible bay 116 and a modular battery pack 127 installed within the PC 102. The system 100 also has the capability of displaying the battery status of the modular battery pack 127 installed in the external flexible bay 116 on a four-segment LCD bar graph 334 (FIGS. 1 and 7).

Figure 6A:
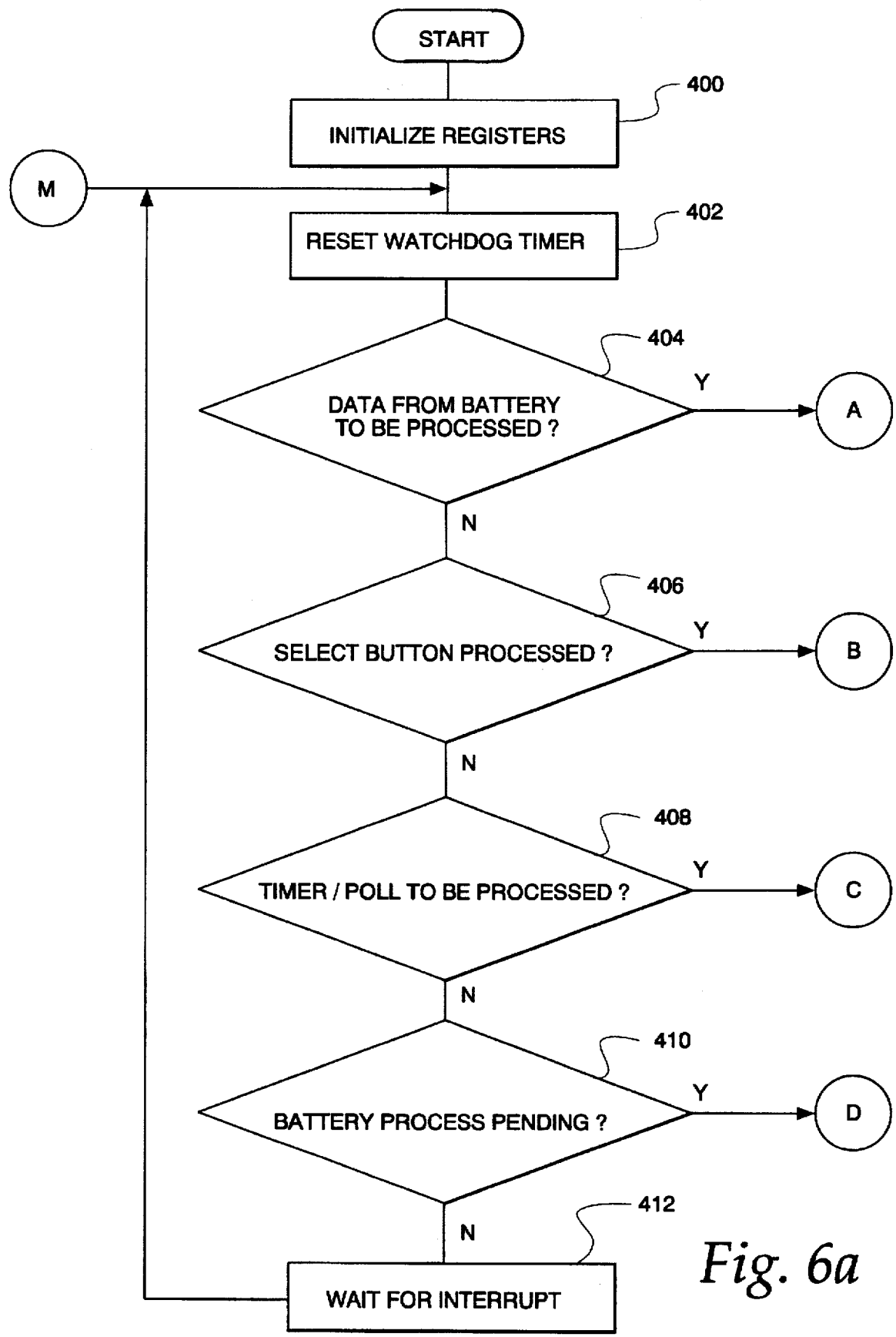
FIGS. 6A–6I represent flow charts for the microcontroller illustrated in FIG. 4D.

The main loop of the software for the microcontroller 154 is shown in FIG. 6A. Initially, on power up, all of the various registers, for example port data and direction registers, interrupt registers, A-D data and control registers and timer registers are initialized in step 400. After the registers are initialized, the microcontroller 154 watchdog timer is reset in step 402. As indicated above, the microcontroller 154 communicates with the modular battery pack 127 installed within the external flexible bay 116 by way of a bidirectional data link. More particularly, two general purpose input/output ports PC6, PB6 and PC7, PB7 on the microcontroller 154 are used. In particular, clock and data signals BATCLK and BATDATA are connected to the PC7 and PC6 ports respectively of the microcontroller 154 by way of analog switches 403 and 405 whose control inputs are tied high to enable one port to be set as an input port and the other port set as an output port, thereby providing a bidirectional data link relative to the microcontroller 154 in the external flexible bay 116. In addition, should power be lost to the microcontroller 154, the analog switches 403 and 405 will disconnect the microcontroller 154 from the modular battery pack 127 to prevent the modular battery pack 127 from backfeeding the microcontroller 154. The BATCLK and BATDATA signals are similarly connected to a pair of general purpose ports on a microcontroller (not shown) within the modular battery pack 127, discussed in detail in Appendix B.

After the watchdog timer is reset, the system checks in step 404 to determine if any data requested from the modular battery pack 127, such as level or status information, has been received. As will be discussed in more detail below, data over the serial data link is shifted one bit at a time. Thus, in step 404, the system ascertains whether the requested data, whether it be status or level information, has been received from the battery pack. If an entire byte from the modular battery pack 127 has been received, the system proceeds to FIG. 6B and processes the data in that byte as will be discussed below. If a complete byte of data from the battery pack is not available, the system proceeds to step 406 and determines whether the mode-select switch 137 has been depressed. If so, the system proceeds to FIG. 6C to configure the external flexible bay 116 according to the particular mode selected. If the mode-select push button 137 was not depressed, the system proceeds to step 408. In this step 408, the floppy disk drive and printer cable are checked, as well as the system level are polled in a periodic basis, for example two seconds. If the poll timer has timed out, the system proceeds to FIGS. 6D and 6E to process the information. If not, the system proceeds to step 410 to determine if a battery process is pending. As mentioned above, battery data between the external flexible bay 116 and the modular battery pack 127 is sent one bit at a time. Thus, if a battery process is pending, the system proceeds to FIG. 6F to process that information. If not, the microcontroller 154 goes into a sleep mode and waits for the next interrupt in step 412.

Figure 6B:
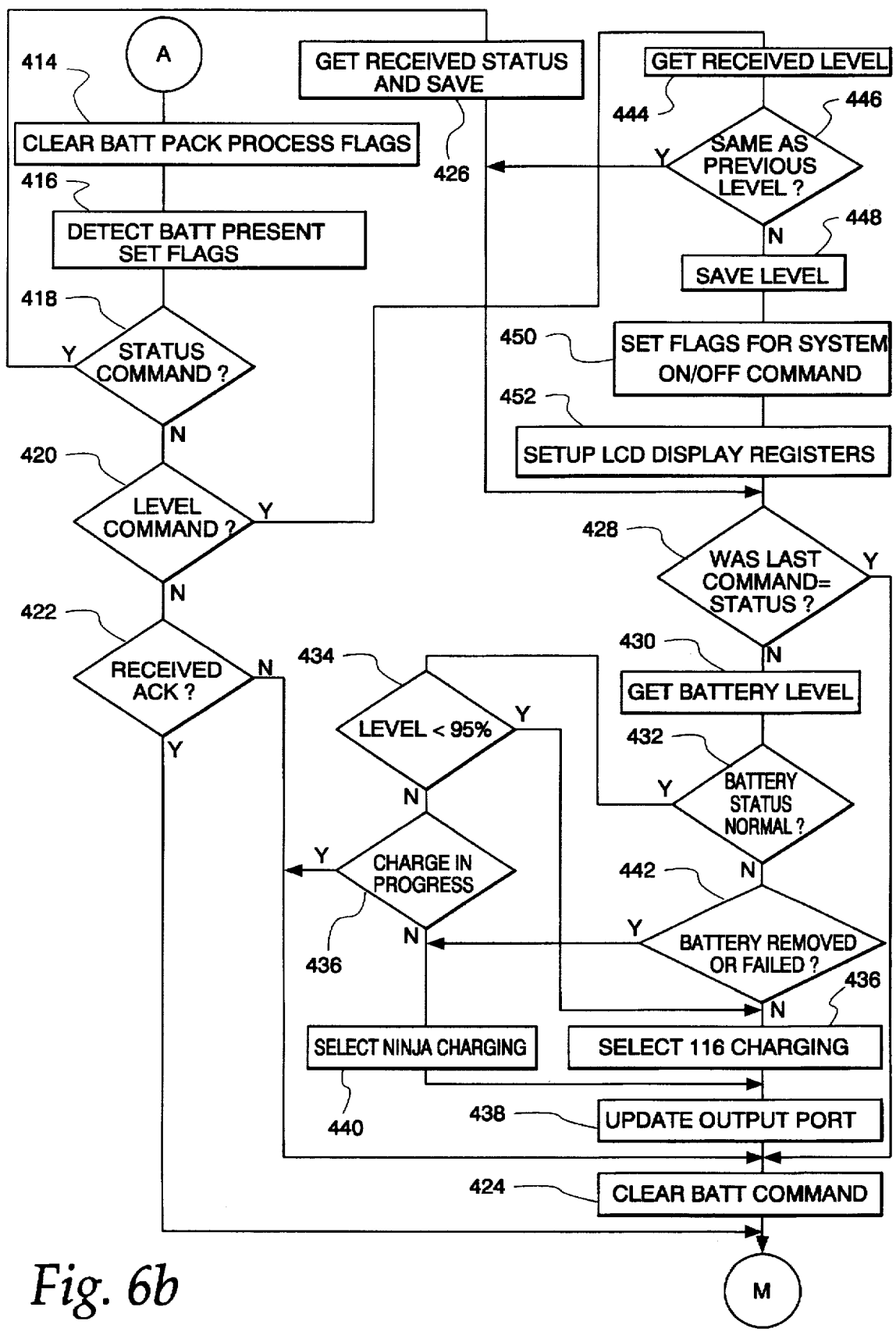
Figure 6C:
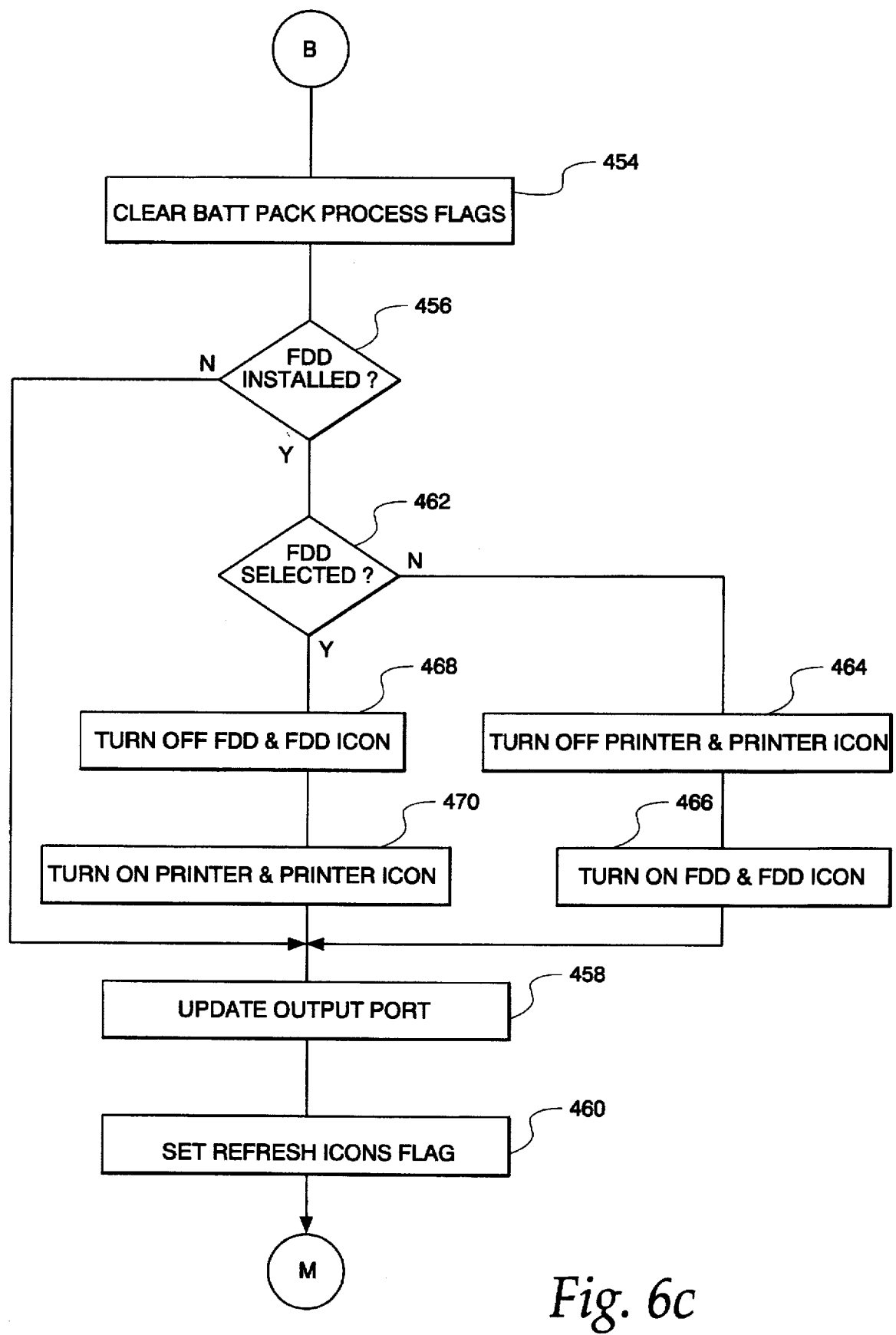
Figure 6D:
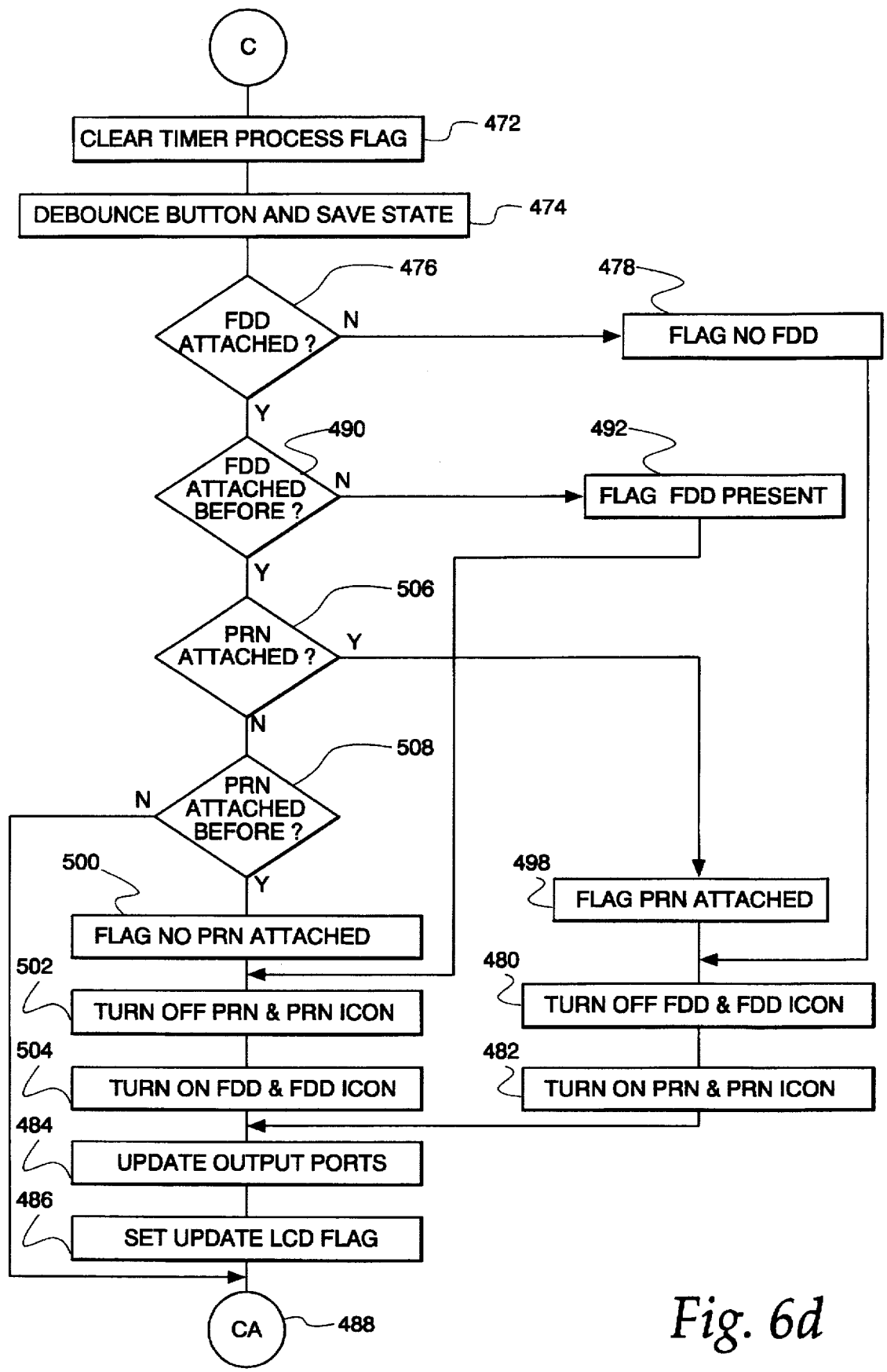
Figure 6E:
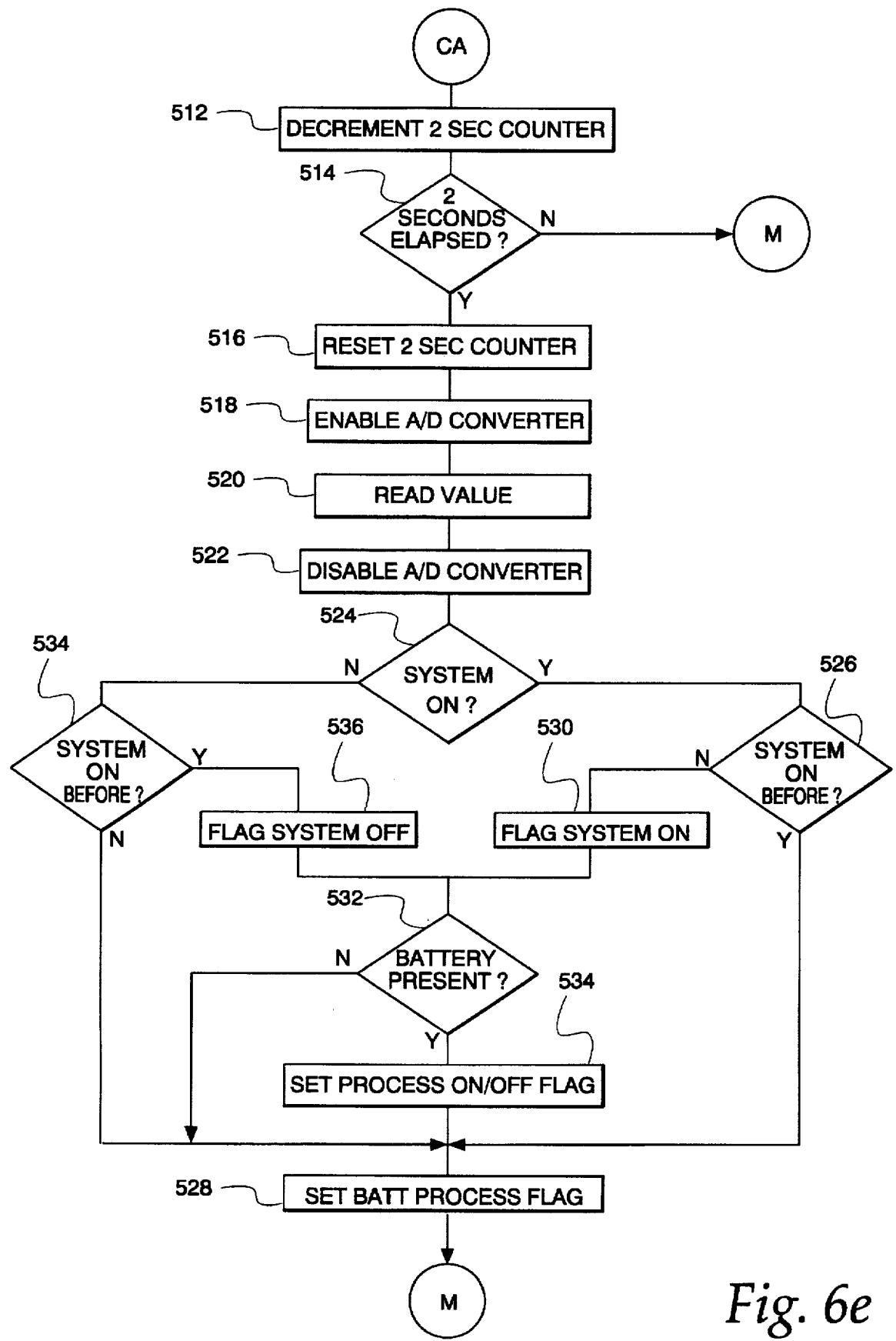
Figure 6F:
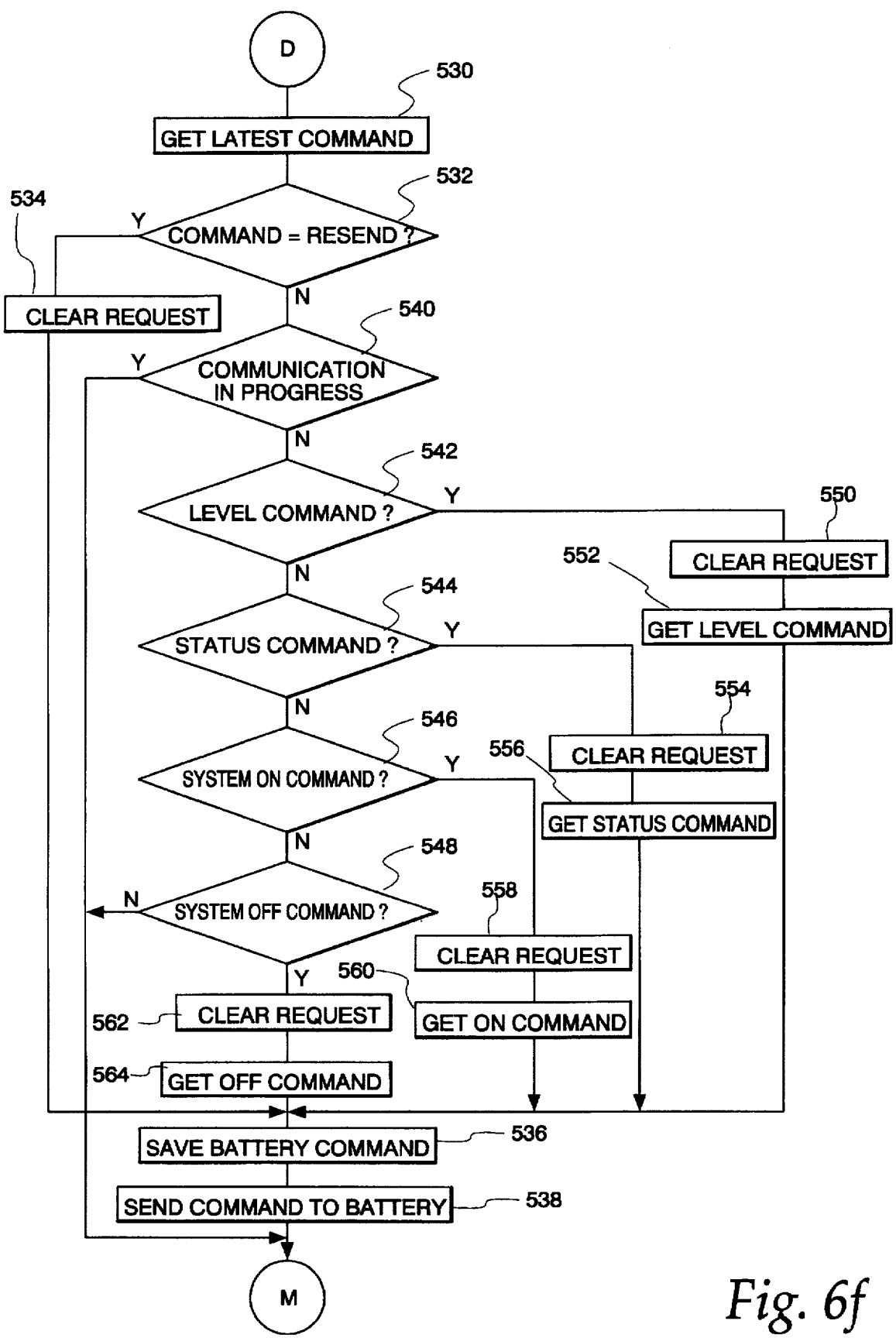

As mentioned above, if a requested data byte, whether it be status or level information, has been received, the data byte is processed by the flow chart illustrated in FIG. 6B. When data from the modular battery pack 127 is received, a communication flag is set. After the communication flag is detected, it is cleared in step 414. After the communication flag is cleared, the system detects whether the battery present flag has been set in step 416. The battery present status is detected by communication with the battery pack 127 in the external flexible bay 116 by way of a serial data link discussed in Appendix B. If a battery pack 127 is detected in the external flexible bay 116, a flag is set in step 416 to indicate the presence of a modular battery pack 127 in the external flexible bay 116.

As mentioned above, the microcontroller 154 communicates with the modular battery pack 127 installed within the external flexible bay 116 by way of a bidirectional data link. The communication protocol over the data link includes various status and level commands. In order to correctly interpret the data received from the battery pack, the various status and level commands issued by the microcontroller 154 are stored. Thus, in step 418, the system determines if the last command was a status command. As discussed in more detail in copending application Ser. No. 07/975,879, various possible battery status states are possible.

If the last command was not a status command, the system proceeds to step 420 to determine if the last command was a level command. As discussed in more detail in Appendix B, the battery level is determined and converted to a digital value by an onboard 8-bit A to D converter and will return a value between 0 and 64 H to provide a battery level between 0 and 100%. If the command was not a level command, the system proceeds to step 422 where the data byte from the modular battery pack 127 is checked to determine if it was acknowledged. In particular, in addition to battery level as mentioned above, the modular battery pack 127 can return the following six data bytes: BPD ACK-acknowledge; BPD LOW-low battery warning byte; BPD CRIT-critical battery byte; BPD SHUT-shut down byte; BPD FAIL-battery pack failure; and BPD DEAD-battery pack dead. Thus, in step 422, the system compares the received data byte with the acknowledge data byte BPD ACK. If the data byte was acknowledged by the modular battery pack 127, the system exits and returns to the main program in FIG. 6A. If not, the battery command issued by the microcontroller 154 is cleared in step 424.

If the status command is pending as indicated in step 418, the system gets the status byte from the modular battery pack 127 and stores it in step 426. After the status byte from the modular battery pack 127 is saved, the system proceeds to step 428 and again checks whether the last command was a status command. If so, the system proceeds to step 424 and clears the command. If it is determined in step 428 that the last command was not a status command, the system assumes that the last command was a battery level command and gets the battery level in step 430. After the battery level is obtained in step 430, the system analyzes the battery level in step 432 to determine if the battery status is normal. As indicated above, the modular battery pack 127 can communicate back to the microcontroller 154 with various status bytes indicating various status states. If the battery status is normal, the system proceeds to step 434 and checks whether the battery level is less than 95% of the nominal battery capacity. If the battery level is less than 95% of the nominal battery capacity, the system proceeds to step 436 and selects the modular battery pack 127 within the external flexible bay 116 for charging. Bit 3 of the B port of the microcontroller is then pulled low in step 438 in order to direct the charging current to the battery within the external flexible bay 116 and to provide the appropriate charge control signal from the battery pack 127 to the charger 126. Subsequently, the battery command is cleared in step 424, and the system returns to the main loop.

If the level of the modular battery pack 127 within the external flexible bay is greater than 95%, the system checks in step 436 to determine if the modular battery pack 127 within the external flexible bay 116 is currently being charged. If so, the system exits to the main loop. If a charge is not in progress, the system selects the modular battery pack 127 within the portable personal computer 102 for charging in step 440. Subsequently, in step 438, bit 3 of port B of the microcontroller 154 is set high in order to enable the modular battery pack 127 within the PC 102 to be charged as discussed above. After port B is set, the battery command is cleared in step 424 and the system exits to the main program.

If the battery status is found to be not normal and not failed, it is assumed that the battery pack 127 is dead and needs to be charged. Thus, in step 432, the system checks the battery flags to determine if the modular battery pack 127 within the external flexible bay 116 has either been removed or has failed in step 442. Should the modular battery pack 127 be removed or have been determined to have failed, the system proceeds to step 440 in order to charge the modular battery pack 127 within the PC 102. If it is determined in step 442 that the modular battery pack 127 has not failed, the modular battery pack 127 within the external flexible bay 116 is selected for charging in step 436 and charged as discussed above.

If, after a data byte is received in step 404, the system determines in step 420 that a level command is pending, the system then proceeds to step 444 and gets the received level. Subsequently, in step 446, the new battery level is compared with the previous level. If the level is the same, the system proceeds to step 428. If not, the new level is saved in step 448 and the flags are then set for the system on/off command to be sent to the battery pack in step 450. After the system on/off command flags are set, the LCD display registers are set up to display the battery capacity by way of the four-segment LCD display in step 452.

As mentioned above, the system is able to detect whether a modular disk drive 125 is installed and whether a printer cable has been connected to the external flexible bay 116. The system also monitors whether the mode-select switch 137 has been depressed. In particular, the mode-select push button 137 is connected to bit 2 of port B on the microcontroller 154. As discussed above, the mode-select switch 137 is normally pulled high by the pull-up resistor 303 (FIG. 4D), causing the input to bit 2 of the input/output port PB to be high. Since the switch 137 is connected to ground, anytime the mode-select switch 137 is depressed to enable either a printer or floppy disk drive to be selected, bit 2 is pulled to ground, indicating a mode selection. Thus, anytime the system determines in step 406 (FIG. 6A) that the mode-select switch 137 has been selected, the system proceeds to FIG. 6C and clears any battery pack communication flags that may be existing in step 454. Once the battery pack communication flags are cleared, the system next checks to determine whether a modular disk drive 125 has been installed in the external flexible bay 116 in step 456. In particular, pin 31 of the connector 210 (FIG. 5D) within the external flexible bay 116 is monitored. This pin 31 is normally pulled high by way of a pull-up resistor 457. Anytime a modular disk drive 125 is installed within the external flexible bay 116, pin 31 (−FDDDET) is grounded. This signal, −FDDDET, is connected to an input port bit 4 on port C of the microcontroller 154. Thus, in order to determine whether or not a modular disk drive 125 is installed in the external flexible bay 116, the microcontroller 154 merely monitors bit 4 of port C. If this bit is high, the system assumes that no modular disk drive 125 is installed. If bit 4 on port C is low, the system assumes a modular disk drive 125 is installed within the external flexible bay 116. If the system determines in step 456 that a modular disk drive 125 is not installed in the external flexible bay 116, the system proceeds to step 458 in order to update bit 1 of port B in order to cause the 10-bit bus switches to disconnect the floppy disk drive signals from the connector 210 (FIG. 5D) within the external flexible bay 116. After the output port is updated, the system proceeds to step 460 and sets a refresh icons flag. After the refresh icons flag is set in step 460, the system returns to the main program.

If the system determines in step 456 that a modular disk drive 125 is installed, the system next checks in step 462 whether the floppy mode has been selected by way of the selector switch 137. If the floppy disk drive mode has not been selected, the system proceeds to step 464 and turns off the printer icons, which may be located on the external flexible bay 116 along with floppy disk drive icons. Subsequently, in step 466, the floppy disk drive icons are turned on and the system then proceeds to step 458 where bit 1 of port B is set in order to configure the bus switches 294, 296, 298 and 299 (FIGS. 5B and 5D) for a floppy disk drive mode of operation as discussed above.

If the system determines in step 462 that the floppy disk drive mode was selected by way of the selector switch 137, the system proceeds to step 468 and turns off the floppy disk drive icons on the LCD display on the external flexible bay 116. After the floppy disk drive icons are turned off, the printer icons are turned on in step 470. After the printer icons are turned on, bit 0 of port B is pulled high in order to configure the bus switches 294, 296, 298 and 299 (FIGS. 5B and 5D) for a printer mode of operation.

As will be discussed below, the microcontroller 154 includes an onboard timer, used to poll the status of the external flexible bay 116, as well as to determine the magnitude of the current on the DCIN line to determine whether the PC 102 is on or off. This information is passed on to the battery pack via serial data link and is used by the microcontroller within the battery pack 127 as an input to the charging algorithm. The status of the above-mentioned states is polled periodically at predetermined time intervals. Every time the time interval times out, a timer process flag is set in the main loop in step 408. After the timer process flag is set, the system proceeds to FIG. 6D and clears the timer process flag in step 472. After the timer process flag is cleared, the mode selector switch 137 is debounced and its state is saved in step 474 to determine the mode of operation selected. After the state of the mode selector switch 137 is saved, the system checks in step 476 whether a modular disk drive 125 has been inserted in the external flexible bay 116 as discussed above. If not, a flag is set in step 478 indicating that a modular disk drive 125 has not been installed in the external flexible bay 116 during the current time interval. After the flag is set, the system proceeds to step 480 in order to configure the bus switch 294, 296, 298 and 299 (FIGS. 5B and 5D) to disconnect the modular disk drive 125 from the connector 210 (FIG. 5D) within the housing of the external flexible bay 116. In addition, the floppy disk drive icon on the LCD is turned off. If a modular disk drive 125 has not been installed in the external flexible bay 116, the system defaults to a printer mode of operation in step 482 and configures the bus switch 294, 296, 298 and 299 (FIGS. 5B and 5D) accordingly. In addition, in step 482, the printer icon on the LCD display available on the exterior of the external flexible bay 116 is turned on. Subsequently, in step 484, the output ports on the microcontroller 154 are updated to indicate a printer mode of operation. After the output ports on the microcontroller 154 are updated, the system proceeds to step 486 after which it services the timer in step 488.

If the system determines in the manner discussed above that a modular disk drive 125 has been installed in the external flexible bay 116, the system checks its last status in step 490 to determine if a modular disk drive 125 was installed before. If not, a no floppy disk drive flag is set in step 492 and the system checks and the system goes to step 502 as discussed below. If the modular disk drive 125 was attached before, the system proceeds to step 506 to determine if a printer 108 is attached. If a modular disk drive was previously installed as determined in step 490, the system next determines in step 506 whether a printer cable is connected. In order to determine if a printer connector is connected to the 25-pin connector 292 (FIG. 5B) on the external flexible bay 116, the system monitors pin 24 (PNF1) of that connector. Pin 24 is normally pulled high by a pull-up resistor 322 (FIG. 4D) and connected to port PB5 by way of a resistor 493 (FIG. 5B) which forms a portion of an EMI filter. Thus, normally when no printer cable is connected, bit 5 of port B is high. Once a printer cable is connected to the 25-pin connector on the external flexible bay 116, pin 24 will be pulled low, causing the input to bit 5 of port PB to be low, which indicates that a printer cable is connected. If so, a printer attached flag is set in step 498 and the system defaults to a printer mode and proceeds through steps 480–488.

If the system determines in step 506 that a printer is not connected, the system then checks in step 508 to determine whether a printer was connected during the last time interval. If not, the system proceeds to service the timer in step 488. If it is determined that a printer was previously installed, the system proceeds to step 500 and sets a flag indicating that a printer 108 is not attached to the external flexible bay 116. Subsequently, in step 502, the printer icons are turned off and the floppy disk drive icons are turned on in step 504, indicating a floppy disk drive mode of operation. Subsequently, the output ports are set in step 484 in order to configure the bus switches 294, 296 298 and 299 for a floppy disk drive mode of operation.

If the system determines in step 490 that a modular disk drive 125 was previously attached, it then proceeds to step 506 to determine if a printer cable has been connected. If not, the system proceeds to step 508 and checks whether a printer cable was connected during the last time interval. If not, the system proceeds to step 488 to service the timer. If so, the system proceeds to step 500 and updates the status flag to indicate that a printer is no longer attached to the system. As indicated above, the status of the modular disk drive 125, the printer cable and the system status are continuously polled at periodic time intervals, for example two seconds. Thus, in step 512, a two-second counter is decremented. The system next checks in step 514 whether the predetermined time interval has expired. If not, the system exits back to the main program. If the two-second time period has expired, the two-second counter is reset in step 516. After the two-second counter is reset, the system reads the status of bit 4 of port B to determine whether the PC 102 is on as discussed above. In particular, the A to D converter onboard the microcontroller 154 is enabled in step 518. After the value is read in step 520, the A to D converter is disabled in step 522. The value received from the A to D converter, which represents the current from the AC to DC converter 126, is then checked in step 524. In particular, the value from the A to D converter is compared with a predetermined value indicative of the PC 102 being ON. If the value from the onboard A to D converter is greater than the predetermined value, the system assumes that the PC 102 is ON. If the external AC to DC converter 126 is plugged into the system, the system next checks in step 526 to determine if the PC 102 was previously ON. If so, the system proceeds to step 528 and sets a battery process flag, and then exits to the main program.

If, in step 526, the PC 102 was not previously ON, a flag is set in step 530 indicating the same. After the system on flag is set, the system next checks in step 532 whether a modular battery pack 127 is present in the external flexible bay 116. If so, a process on/off flag is set in step 534. If not, the system proceeds to set the battery process flag in step 528.

If the system determines in step 524 that the system is off, the system then checks in step 534 whether the system was on before. If so, a system off flag is set in step 536 and the system then proceeds to step 532 to determine if a modular battery pack 127 is present.

Referring back to the main loop in FIG. 6A, the system determines in step 410 whether any battery processes are pending. If so, the system proceeds to FIG. 6F. In step 530 the system gets the latest command and then checks it to see if the command is a resend command, indicative of a communications problem. If so, the request is cleared in step 534. After the request is cleared, the command is saved in step 536 and sent to the modular battery pack 127 in step 538. Subsequently, the system returns to the main program. If the command is not a resend command, the system next checks in step 540 whether communication is in progress. As will be discussed in more detail below, byte commands are sent to the modular battery pack 127 one bit at a time. Battery status and level data bytes are returned in response to those commands. Anytime a command is being transmitted to the modular battery pack 127 or data is being transmitted back from the modular battery pack 127 within the external flexible bay 116, a communication in progress flag is set. Thus, in step 540, the system checks to determine if the communication in progress flag is set, indicating a communication between the battery pack and the microcontroller 154. If a communication is in progress, the system exits to the main program.

After the communication between the modular battery pack 127 within the external flexible bay 116 and the microcontroller 154 is complete, the communication in progress flag is cleared. Thus, after the communication progress flag is cleared, indicating that the communication is complete between the modular battery pack 127 installed in external flexible bay 116 and the microcontroller 154, the system next checks in step 542 whether the latest command is a level command. If not, the system proceeds to step 544 to determine if the latest command is a status command. If the latest command is neither a level command or a status command, the system next checks in step 546 whether the latest command is a system on command indicating that the PC 102 is ON in step 546. If the latest command is not a system on command, the system next checks in step 548 whether the latest command is a system off command. If the latest command is not a system off command, the system assumes that the command was not a valid battery command and exits back to the main program.

Requests for level, status, system on or system off commands are stored in a bit buffer, BPROCESS. Thus, if the system determines in step 542 that the latest command is a level command, the bit corresponding to a send level command is cleared in the bit buffer in step 550. Subsequently, the level command is stored in a temporary register in step 552 and then saved in step 536.

Similarly, if the system determines in step 544 that the latest command was a status command, the bit corresponding to a status command request is cleared in the bit buffer in step 554. Subsequently, the status command is stored in a temporary register in step 556 and then saved in step 536.

The system on and system off commands are treated in much the same manner. In particular, if the system determines in step 546 that the latest command is a system on command, the bit corresponding to a system on send is cleared in the bit buffer in step 558. Subsequently, the command is stored in a temporary register in step 560 and later saved in step 536 and sent to the battery pack within the external flexible bay 116 in step 538. Should the system determine in step 548 that the latest command is a system off command, the bit corresponding to a system off command is cleared in the bit buffer in step 562. Subsequently, the command is stored in a temporary register in step 564.

Figures 6G, 6H:
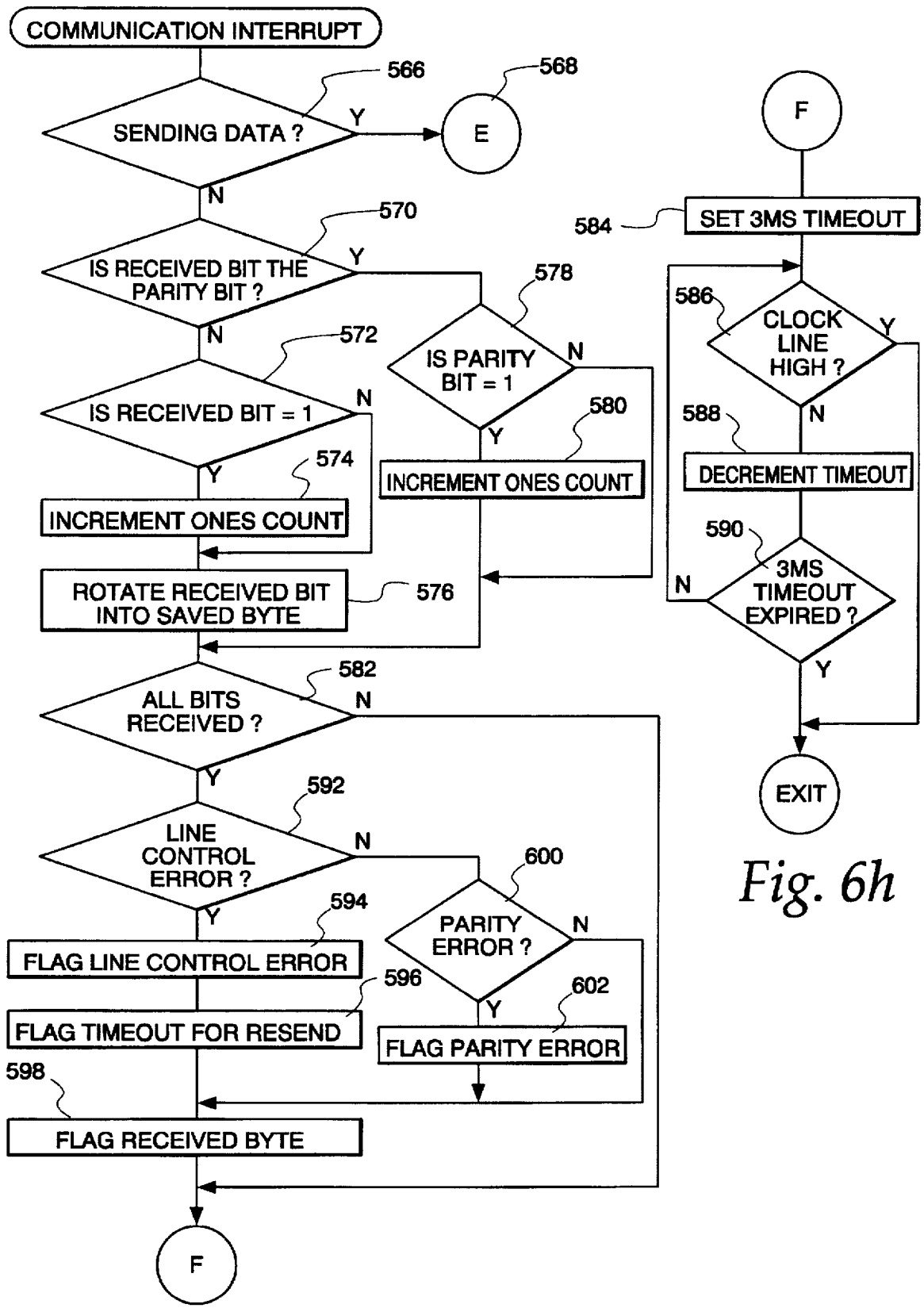
Figure 6I:
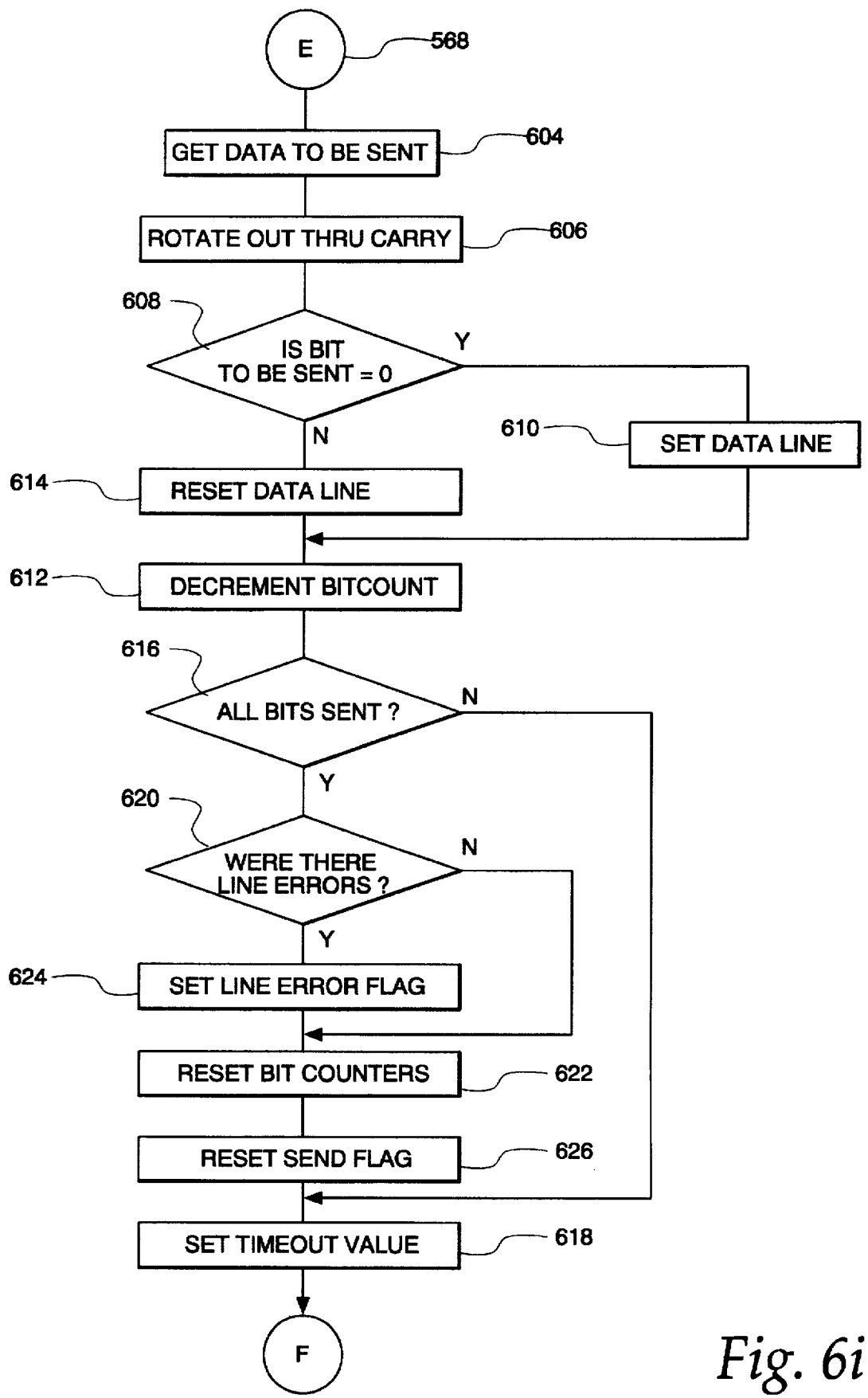

As will be discussed in FIGS. 6G, 6H and 6I, battery commands are sent between the microcontroller 154 and the modular battery pack 127 within the external flexible bay 116 or the PC 102 by way of the bidirectional data lines BATCLK and BATDATA. As mentioned above, commands such as status level, system on and system off are formulated as data bytes and sent serially by way of the bidirectional data link one bit at a time. Thus, the flow chart illustrated in FIG. 6G is entered once for each bit either sent or received by the microcontroller 154. The protocol for the data sent between the battery pack and the microcontroller 154 is comprised of eleven bits: a start bit; a stop bit; a parity bit; and 8 data bits. Data is received or transmitted by way of the BATDATA line whenever the BATCLK line is held low.

The system determines in step 566 from the battery process bit buffer whether or not command data is to be sent to the battery pack in the external flexible bay 116 or whether status or level information is to be received back from the battery pack. If command information is to be sent to the modular battery pack 127, the system proceeds to step 568. If no command data is being sent to the modular battery pack 127, the system assumes that data is to be received over the bidirectional data link from the modular battery pack 127 within the external flexible bay 116 or PC 102. After it is determined that the microcontroller 154 is to receive data from the modular battery pack 127, the system next checks to determine if the received bit is the parity bit. As mentioned above, the communications protocol consists of an 8-bit data byte, a start bit and a stop bit, as well as a parity bit. As mentioned above, the flow chart illustrated in FIG. 6G is entered once for each bit sent or received. Thus, the system keeps track of the number of bits being received to determine whether the parity bit has been received in step 570. If not, the system ascertains in step 572 whether the received bit is a "1". The "1" bits are counted for the purpose of calculating the parity, which for purposes of illustration, may be odd parity. Thus, in step 572, if the system determines that the received bit is a "1", a ones counter is then incremented in step 574. After the ones counter is incremented, the received bit is rotated into a buffer in step 576. If it's determined that the received bit is not a "1" in step 572, the system proceeds directly to step 576 and does not increment the ones counter.

If the received bit is the parity bit, the system checks in step 578 whether the parity bit is a "1", indicative of odd parity. If so, the ones counter is incremented in step 580 as discussed above to calculate the parity. If not, the system proceeds to step 582 to determine if all bits have been received. As indicated above, a protocol for communication from the modular battery pack 127 either in the external flexible bay 116 or PC 102 to the microcontroller 154 consists of an 8-bit data byte, together with a start bit, stop bit and a parity bit. If all of the bits have not been received as indicated in step 582, the system resets the communication timer. In particular, the system allows a predetermined time period, for example, for the clock line BATCLK to be asserted after the bit is read. Thus, if all bits have not been received as indicated in step 582, the system proceeds to step 584 and sets, for example, a three-millisecond timer. After the three-millisecond timer is set in step 584, the system checks to see if the clock line is high in step 586. If the clock line is already high, the system exits, if not, the three-millisecond timer is decremented in step 588. Subsequently, the system checks in step 590 to see if the three-millisecond timer has timed out. If not, the system loops back to step 586 to check if the clock line is high. If the three-millisecond timer has timed out or the clock line has gone high, the system exits.

If, in step 582, the system determines that all bits have been received, the system next checks in step 592 whether there have been any communication errors. If so, the system sets a flag in step 594 indicating a communication error. Subsequently, the system sets a flag for a time-out period for requesting resending of the data byte in step 596. Since all bits were indicated as received in step 582, a flag receive byte is set in step 598 and the system proceeds to step 584 to set the clock line timer as discussed above.

If no line control or communication errors are detected in step 592, the system next checks in step 600 whether there was a parity error. If not, the system sets the received byte flag in step 598 and proceeds to step 584 as discussed above. If a parity error is detected, the system sets a parity error flag in step 602 and then proceeds to step 598 as discussed above.

If data is to be sent to the modular battery pack 127 installed within the external flexible bay 116 or PC 102, the system gets the data and stores it in a temporary register in step 604. Subsequently, since only a single bit is sent at a time, the bit is rotated into position in step 606. Subsequently, in step 608, the system determines whether the bit to be sent is a 1 or a 0. If the bit to be sent is a zero, the battery data line BATDATA is set in step 610 and the bit counter is decremented in step 612. If a 1 is to be sent, the battery data line BATDATA is pulled low in step 614, after which the bit counter is decremented in step 612.

The system next determines in step 616 whether all bits have been sent by examining the bit counter. If less than all the bits were sent, the system proceeds to step 618 and sets the timeout value for the battery clock line BATCLK and subsequently proceeds to steps 584 through 590.

If the system determines in step 616 that all bits were sent, the system next checks in step 620 whether there were any communication errors. If not, the system resets the bit counter in step 622. If there were communication errors, a line error flag is set in step 624. Subsequently, the bit counter is reset in 622, after which a send flag is reset in step 626. After the send flag is reset, the system executes steps 618 and 584–590 to control the timer for control of the battery clock line BATCLK as discussed above.

Figure 8:
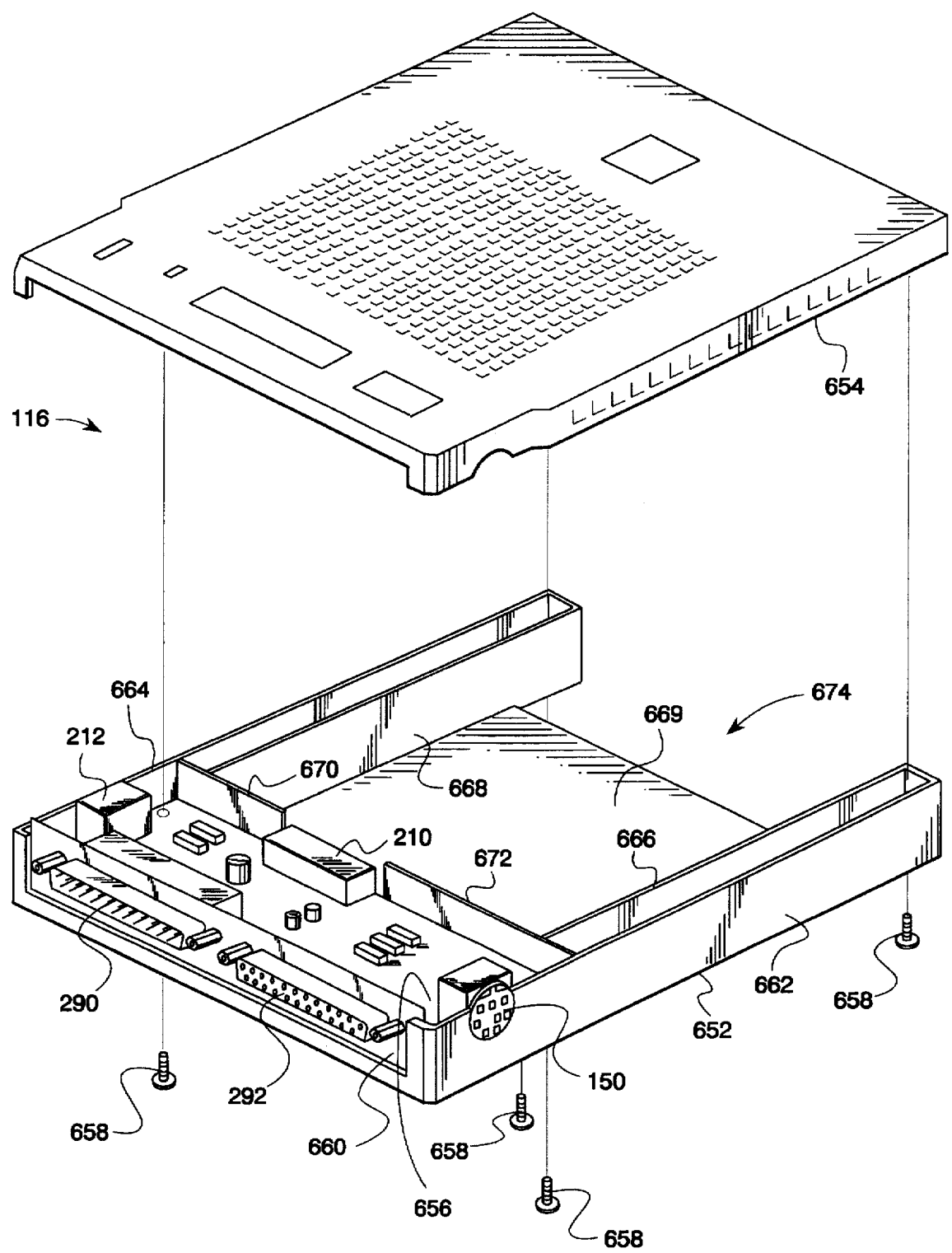
FIGS. 8 and 9 are perspective views of the external flexible bay illustrated in FIG. 7, in different states of assembly.
Figure 9:
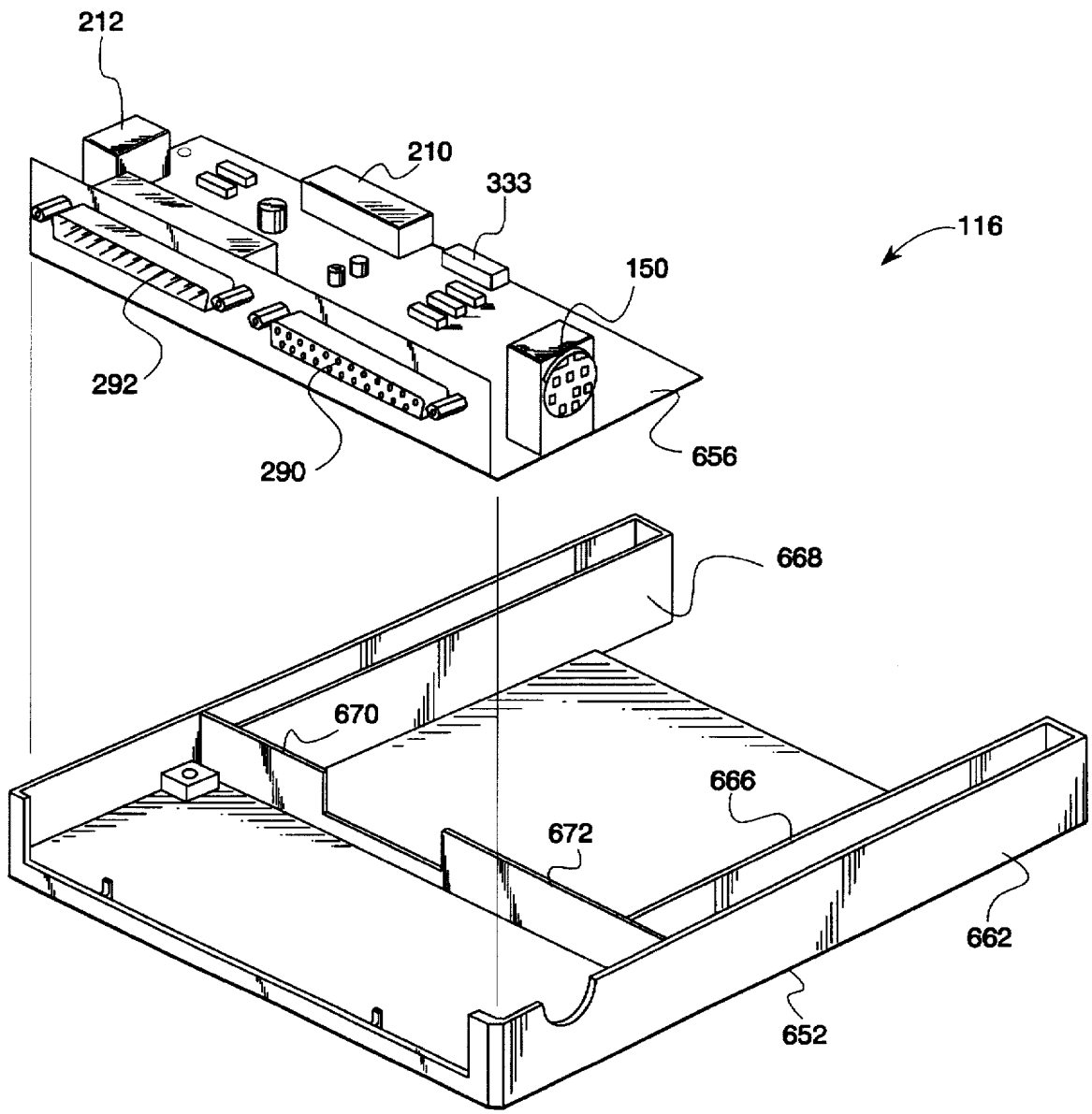
Figure 11:
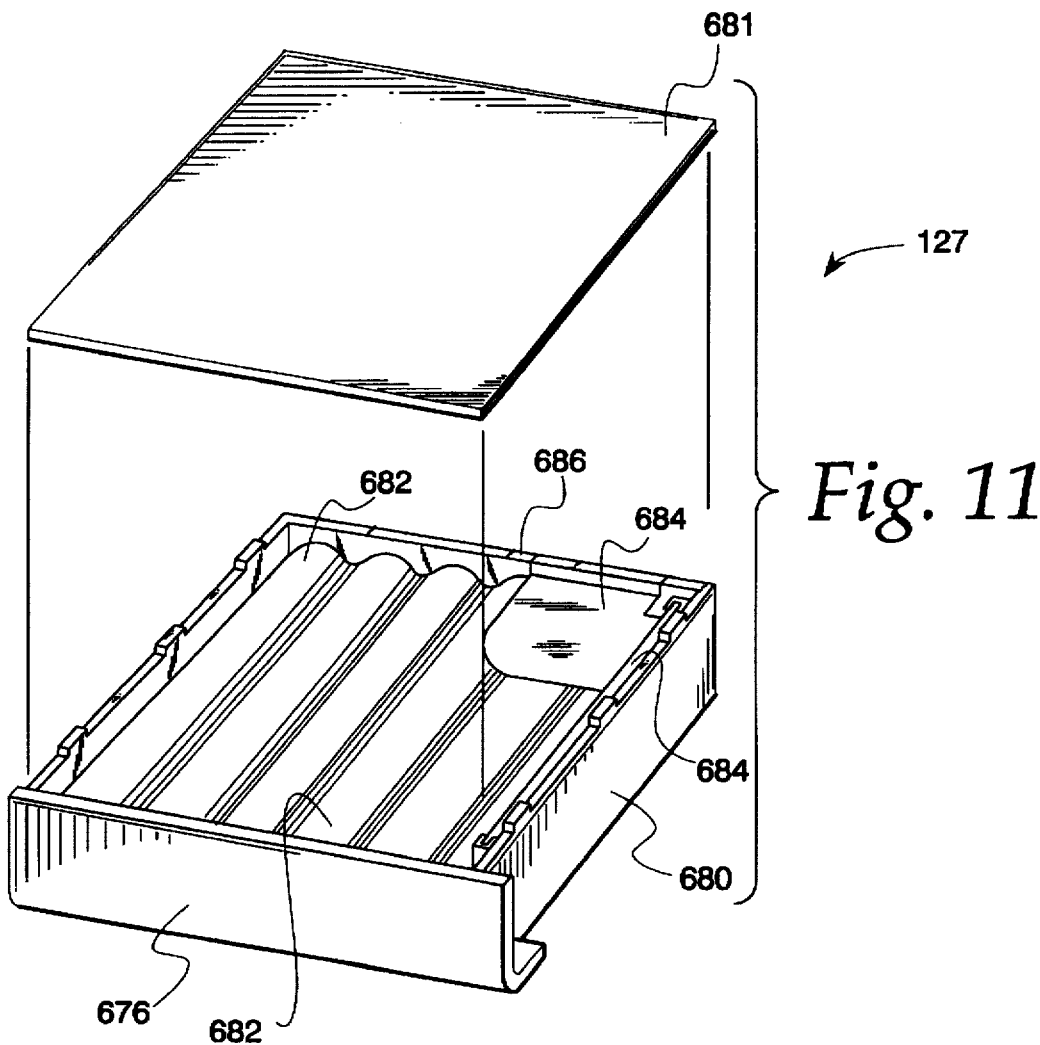
FIGS. 11 and 12 are exploded perspective views illustrating the modular battery pack shown in FIG. 10 in different states of assembly.
Figure 12:
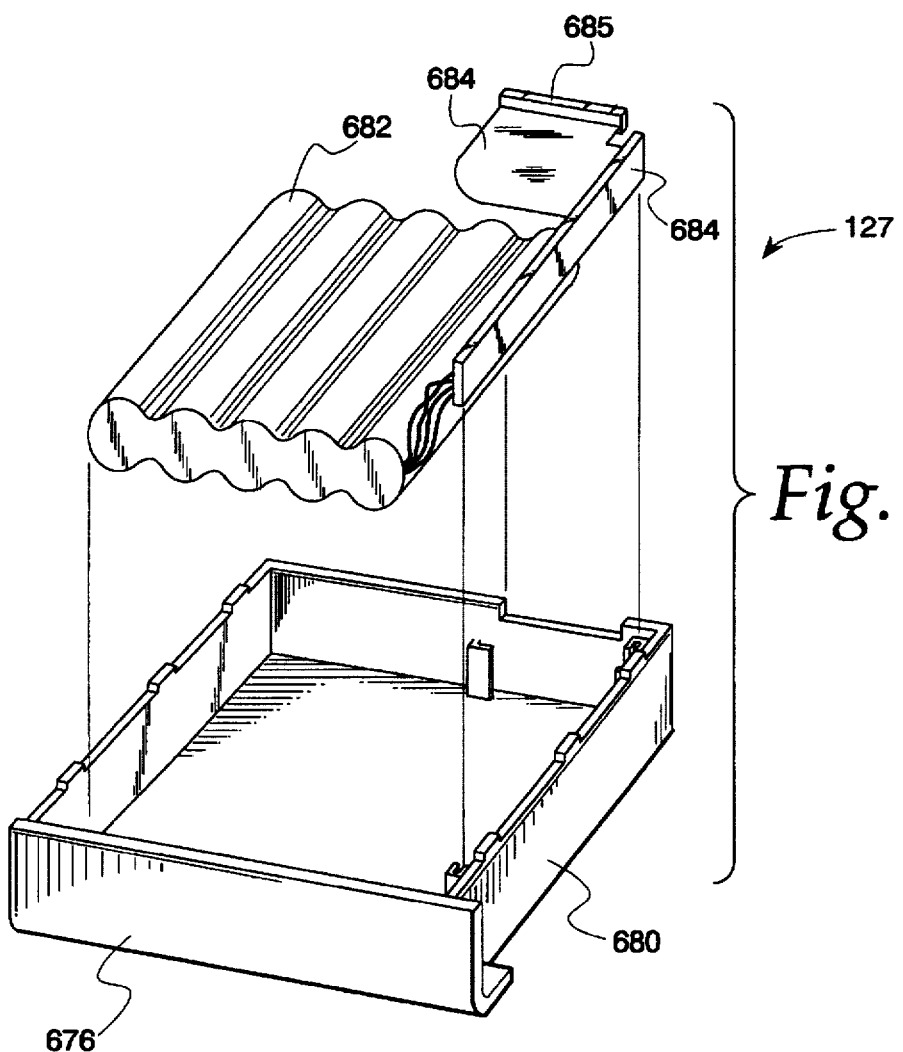
Figure 14:
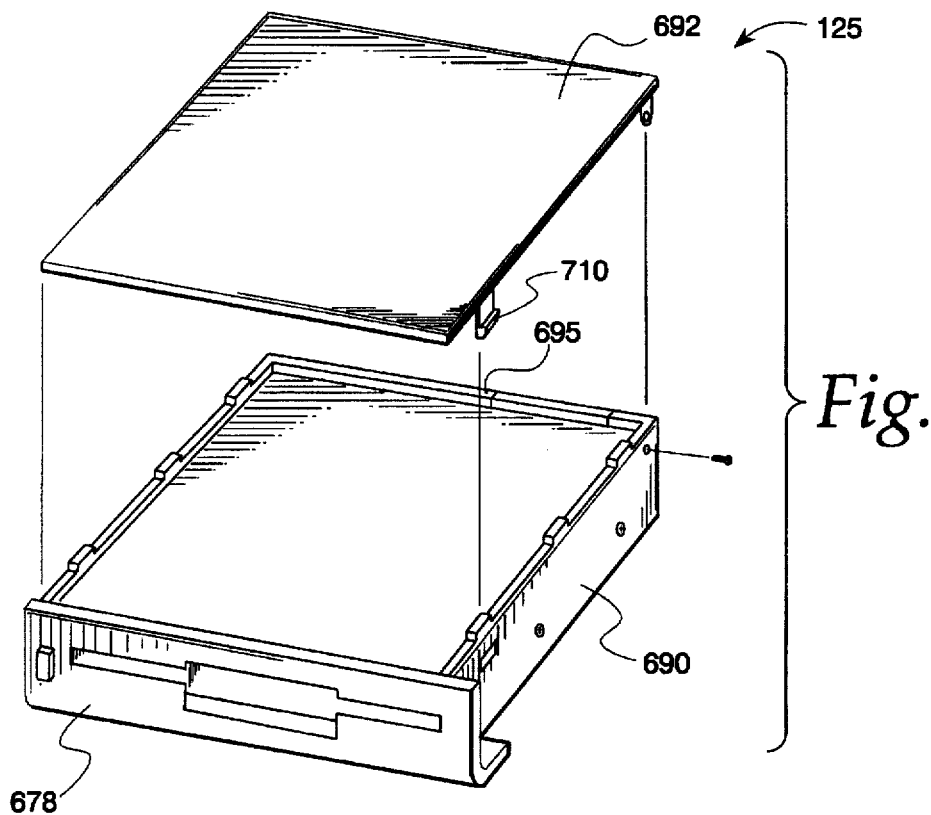
FIGS. 14 and 15 are exploded perspective views of the modular disk drive shown in FIG. 13 in different states of assembly.
Figure 15:
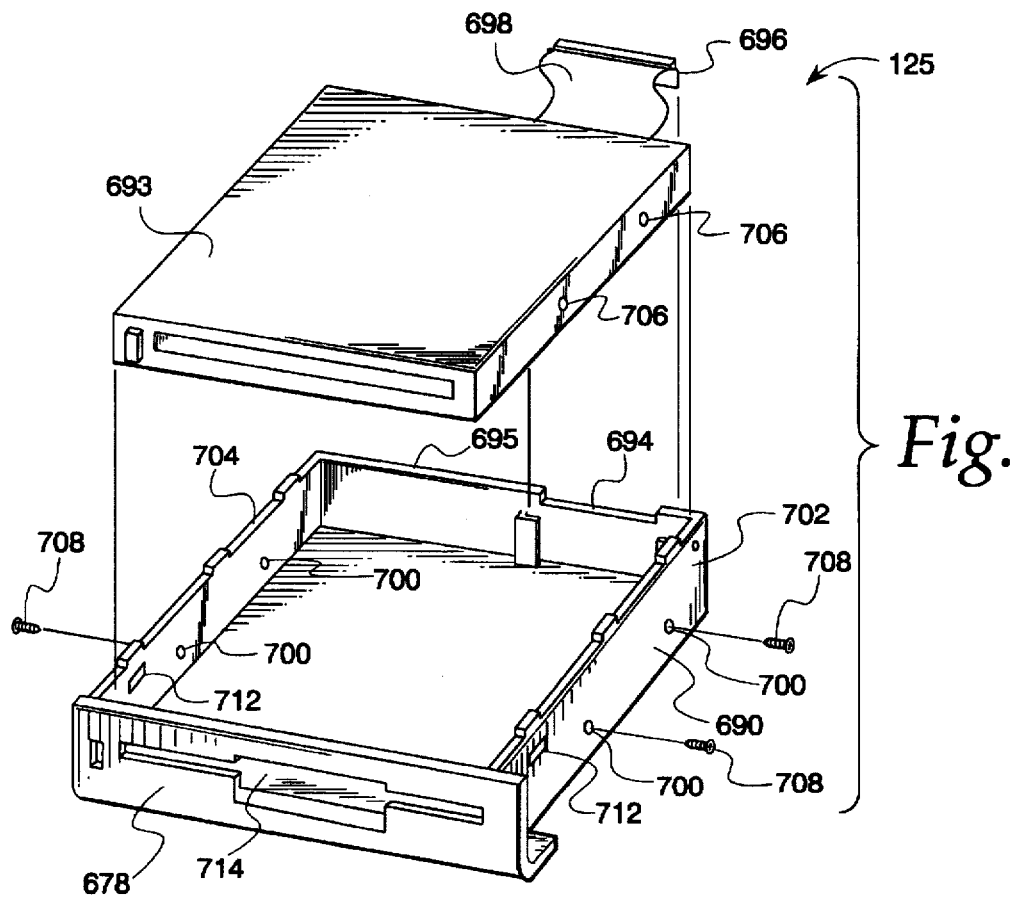

Hardware for the External Flexible Bay, Modular Battery Pack and Modular Disk Drive The hardware for the external flexible bay 116 is shown in FIGS. 7–9. The hardware for the external battery pack 127 is shown in FIGS. 10–12. The hardware for the modular disk drive 125 is shown in FIGS. 13–15.

Referring first to FIGS. 7–9, the external flexible bay 116 may be configured with a two housing defining a base portion 652 and a cover portion 654 (FIG. 8). The circuitry illustrated in FIGS. 4A–4D and 5A–5D is carried by a printed circuit board (PCB) 656 (FIG. 9) which may be secured with suitable fasteners 658. The parallel port connectors 290 and 292 (FIGS. 5A and 5B) may be carried by a rear panel portion 660, which may be removable and connected to the PCB 656 as discussed above. The connectors 150 and 212 (FIG. 4A) may be rigidly carried by side wall portions 662 and 664 of the base portion 652 and connected as discussed above. The connector 333 (FIG. 9) may be carried by the PCB 656 and connected to the various displays on the cover portion 654, discussed above.

A pair of interior side walls 666 and 668 are formed within the base portion 652 to receive either the modular disk drive 125 or the modular battery pack 127. A pair of interior backstop 670 with a centrally disposed generally rectangular notch 672 is disposed generally perpendicular to the interior side walls 666 and 668 to define a cavity 669. The connector 210 is aligned with the interior backstops 670 and disposed within the notch 672 to ensure adequate insertion of either the modular disk drive 125 or the modular battery pack 127. As will be discussed in more detail below, the base portion 652 is formed with a recessed portion 674 at an insertion end of the cavity 669 to cooperate with covers 676 and 678 (FIGS. 10 and 15) formed on the modular battery pack 127 and modular disk drive 125, respectively, which compensate for the different widths of the modular disk drive 125 and modular battery pack 127.

The modular battery pack 127 is illustrated in FIGS. 10–12. The modular battery pack 127 includes a generally box-shaped base portion 680, whose width is sized to fit between the interior side walls 666 and 668 (FIG. 8) of the external flexible bay 116 as well as within the bays 141 and 142 on the PC 102 (FIG. 3). The base portion 680 is open on top and closed by a cover 681 (FIG. 11) by suitable means, for example by sonic welding or with an adhesive. A plurality of serially connected battery cells 682 may be disposed within the base portion 680 and connected to a PCB 684 which contains the circuitry described in the above-mentioned copending patent application. The PCB 684 is connected via a flexible cable (not shown) to a connector 685 in a rear wall portion 686 of the base portion 680 for mating with connector 210 (FIGS. 5D and 9) within the external flexible bay 116.

As mentioned above, the modular battery pack 127 includes a stop 676, rigidly secured to the base portion 680. The stop 676 cooperates with the back stops 670 and 672 within the external flexible bay 116 as well as back stops (not shown) within the PC 102 (FIG. 3) to ensure proper insertion.

The modular disk drive 125 is illustrated in FIGS. 13–15. The modular disk drive 125 includes a box-like base portion 690, open on top, and closed by a cover 692. The base portion 690 including the rigidly attached stop 678 are sized to enable the modular disk drive 125 to be inserted into the external flexible bay 116 or the bay 141 on the PC 102 (FIG. 3). A suitably sized 3.5" floppy disk drive 693, for example a Model No. MD 3661 or 3771, as manufactured by Canon, is installed within the base portion 690. Rectangular cutouts 694 may be formed in the rear wall portion 695 of the base portion 690 to receive a connector 696 (FIG. 15), connected to the floppy disk drive 693 by way of a ribbon cable 698 to enable the modular disk drive 125 to be plugged into the connector 210 (FIG. 5D) within the external flexible bay 116 or a similar connector (not shown) in the bay 141 in the PC 102 (FIG. 3).

A plurality of apertures 700 may be formed in side wall portions 702 and 704 of the base portion 690. The apertures 700 are located to be aligned with apertures 706 on the floppy disk drive 693 when installed within the base portion 690 to enable the floppy disk drive 693 to be securely installed thereto by way of suitable fasteners 708.

In order to enable the floppy disk drive 693 to be removed, the cover 692 may be formed with one or more resilient tabs 710 (FIG. 14). The resilient tabs 710 are adapted to cooperate with generally rectangular apertures 712 disposed in the side wall portions 702 and 704.

As shown, the modular disk drive 125 is described and illustrated for use with the floppy disk drive 693. In such a configuration, the stop 678 is formed with an aperture 714 for receiving a 3.5" floppy disk (not shown). Alternatively, the modular disk drive 125 could be used with a hard disk drive (not shown). In that configuration, a stop similar to the stop 676 for the modular battery pack 127 would be used which may be provided with an external LED (not shown) to indicate access to the hard disk drive.

Active Port Replicator

The active port replicator 104, in accordance with the present invention, facilitates desktop and portable operation of a portable PC 102, such as a Z-NOTE-FLEX, as manufactured by Zenith Data Systems in Buffalo Grove, Ill. In particular, the active port replicator 104 is adapted to be connected to the ports on the portable PC such that external I/O devices, such as printers, monitors, keyboards and the like can be connected thereto for desktop operation. During a portable mode of operation rather than disconnecting all of the various external I/O devices, the portable PC 102 is merely disconnected from the active port replicator 104 rather quickly and easily. When it is desired to return to desktop application, the portable PC 102 is merely reconnected to the active port replicator 104.

As mentioned above, the active port replicator replicates various ports on the portable PC 102, such as a serial port, parallel port, video port, type PS/2 port, and a power input port. An additional type PS/2 port may be provided to enable an external keyboard as well as an external mouse to be connected simultaneously. In addition, as will be discussed in more detail below, the active port replicator 104 is user upgradeable to provide a local area network (LAN) interface, such as 10Base-T ethernet interface, and a PCMCIA interface. The PCMCIA interface provides additional PCMCIA slots, for example, two type III PCMCIA slots, which can be used for adding additional memory, a fax modem, or other PCMCIA options.

Figure 67:
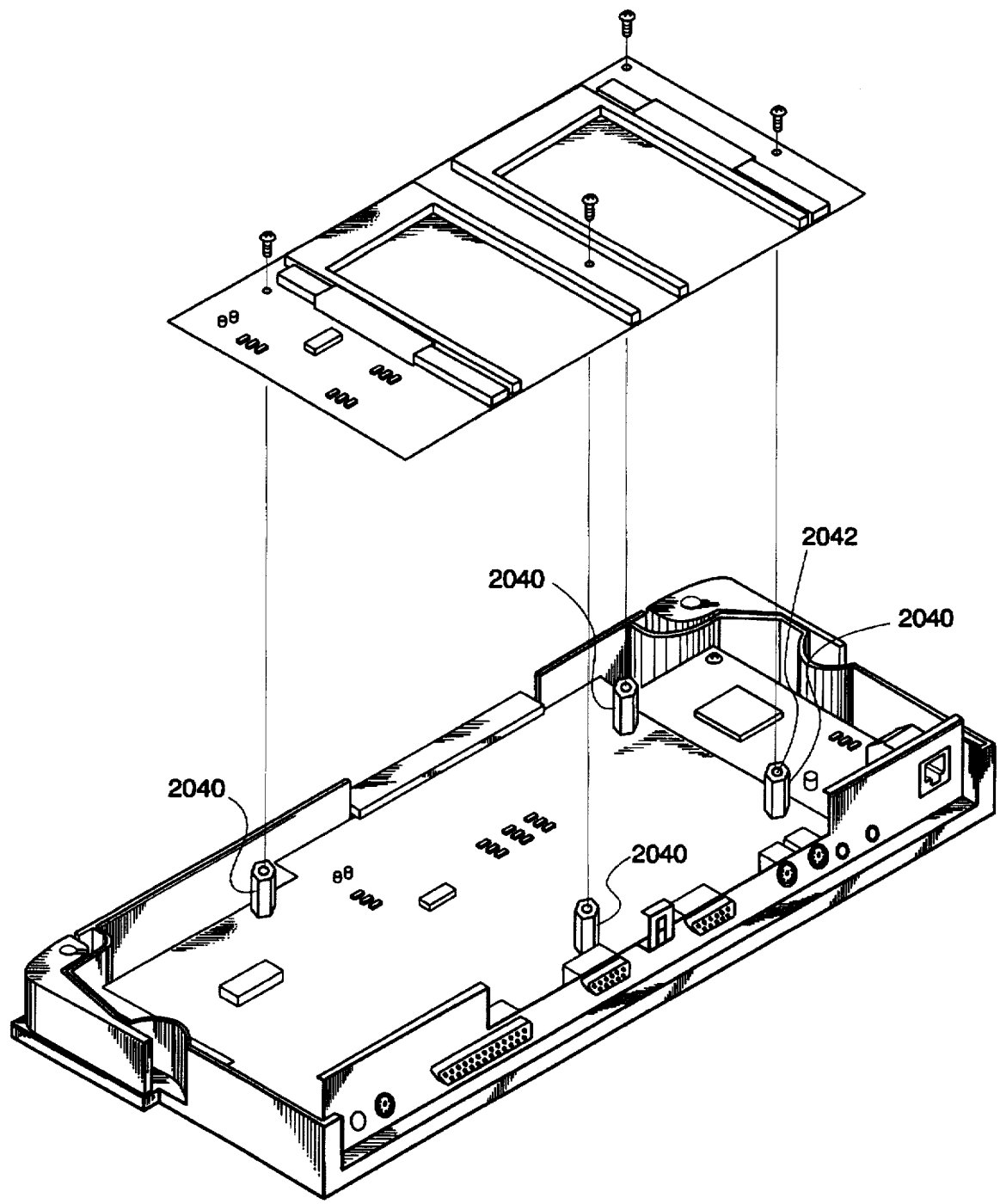

The active port replicator 104 is illustrated in FIGS. 16–73. In particular, the active port replicator 104 includes a main board 740 (FIG. 68), a LAN board 742 and a PCMCIA board 744 (FIG. 67). The circuitry on the main board 740 is illustrated in FIGS. 16–40. The main board 740 is a passive board that replicates the system ports as discussed above plus provides an additional type PS/2 port. The LAN board 742, illustrated in FIGS. 41–46, provides a 10Base-T ethernet interface. The PCMCIA board 744 may provide two additional type III PCMCIA slots. The PCMCIA board 744 is illustrated in FIGS. 48–64. Finally, the physical details of the active port replicator 104 are illustrated in FIGS. 65–73.

Figure 16A:
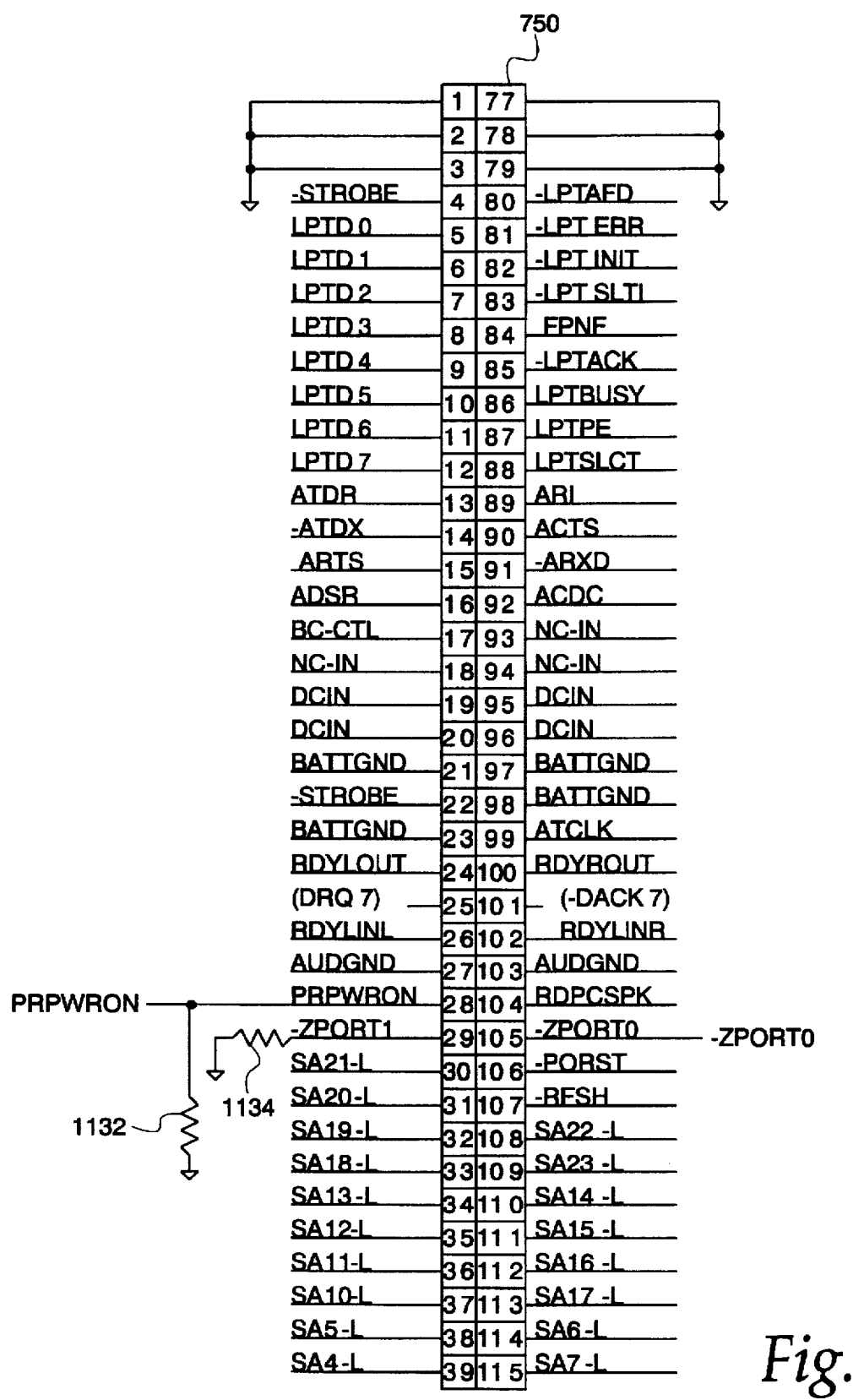

Referring first to FIGS. 16–40, the port replicator 104 interfaces to the PC 102 by way of a 152 contact pinless connector 750 (FIGS. 16A and 7). The connector 750 is adapted to mate with a corresponding connector on the PC 102 to replicate a serial port, parallel port, video port, type PS/2 port and a power input port on the PC 102. In addition, as mentioned above, the active port replicator 104 provides an additional type PS/2 port to enable a keyboard (not shown) and a mouse 122 to be connected to the port replicator 104 simultaneously. In addition to port replication, the main board 740 also provides for battery charging and logic circuitry that provides various signals to the external flexible bay 116 which determines which of the modular battery packs 127 in the PC 102 and the external flexible bay 116 are charged.

Figure 16B:
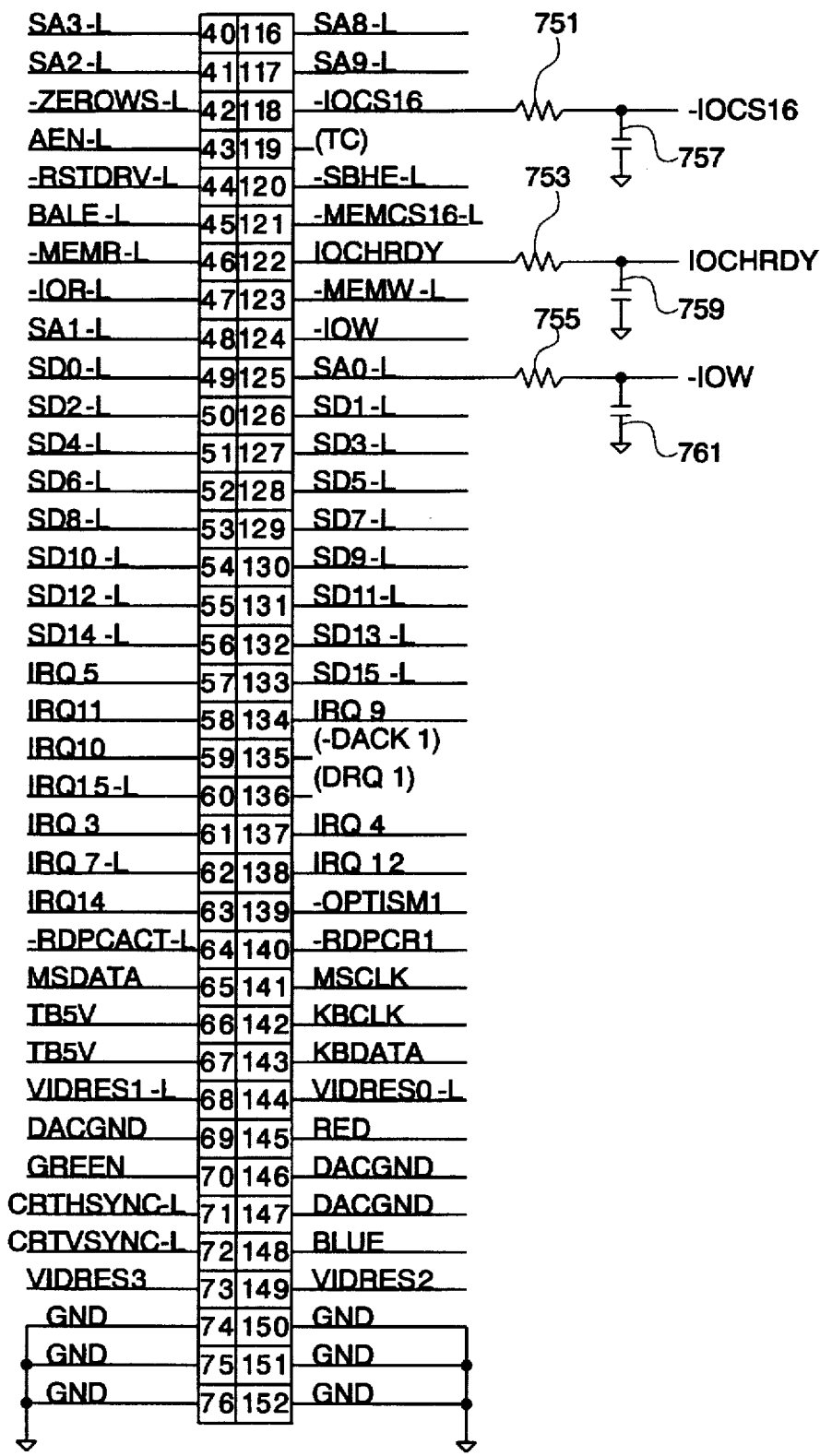
Figure 17:
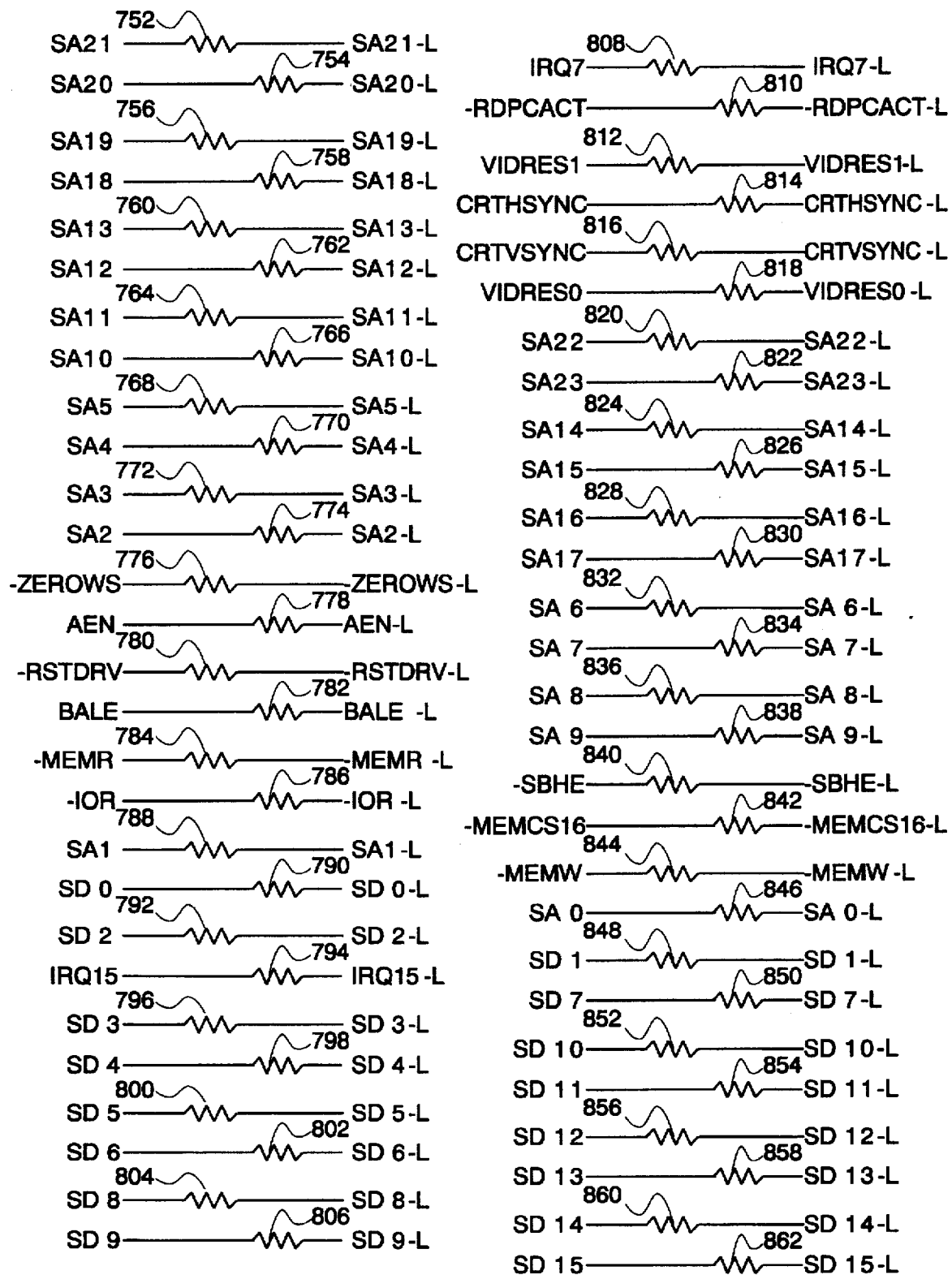
Figure 18:
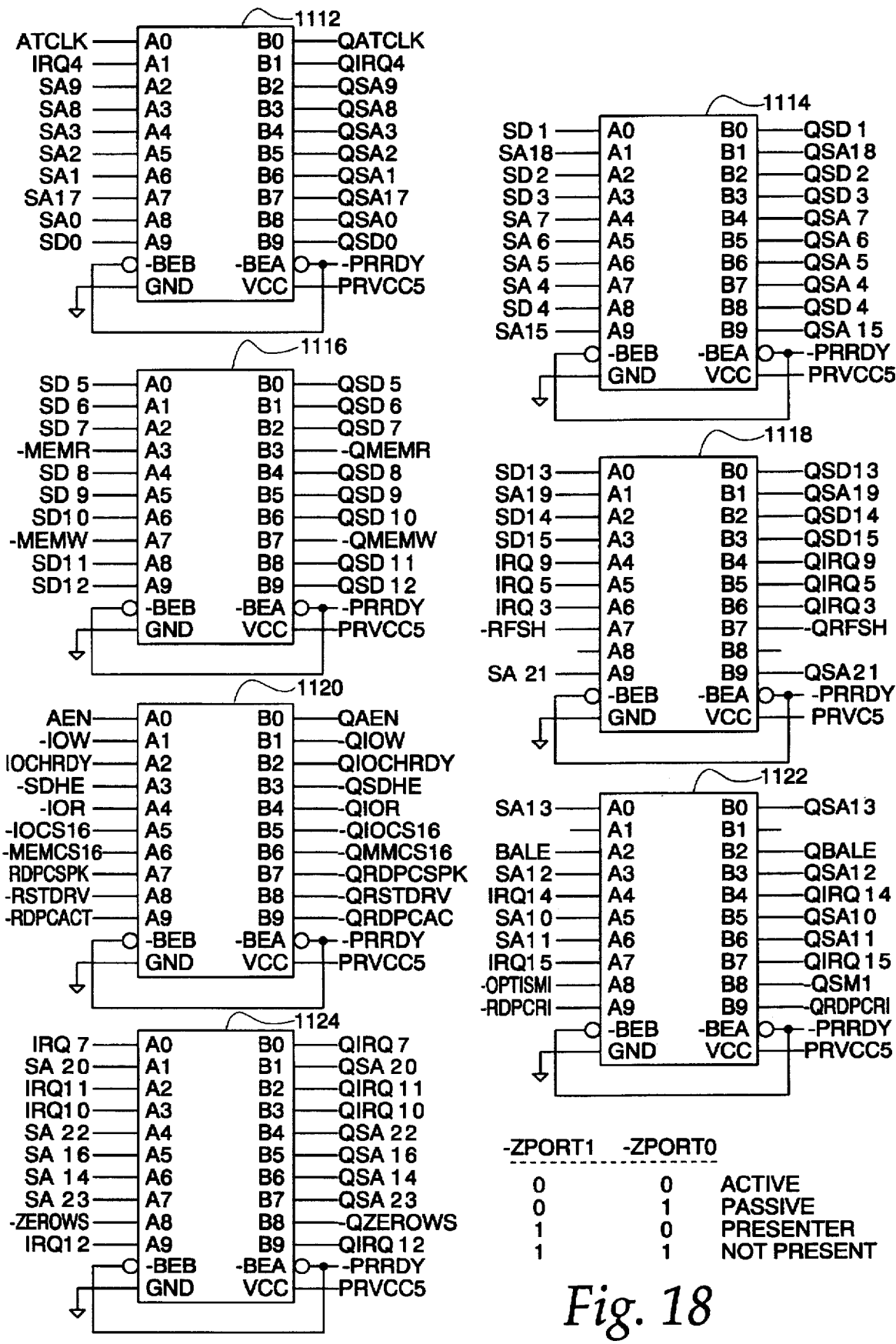
Figure 21B:
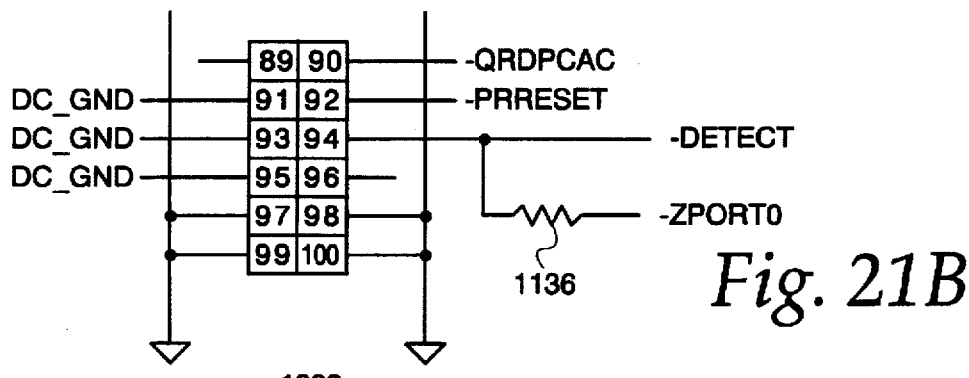

Table 1 defines the signals attached to the 152 contacts on the connector 750 while Table 2 defines I/O address and Table 3 defines interrupt assignments. Certain signals, −IOCS16, IOCHRDY and −IOW, are filtered by way of filter circuits which include the resistors 751, 753, 755 and capacitors 757, 759 and 761 (FIG. 16B).

TABLE 1

| Pin | Signal | Direction | Description |
| --- | --- | --- | --- |
| 1 | GND | — | Ground |
| 2 | GND | — | Ground |
| 3 | GND | — | Ground |
| 4 | -LPTSTRB | O | Parallel Port Data Strobe |
| 5 | LPDT0 | O | Parallel Port Data Bit 0 |
| 6 | LPDT1 | O | Parallel Port Data Bit 1 |
| 7 | LPDT2 | O | Parallel Port Data Bit 2 |
| 8 | LPDT3 | O | Parallel Port Data Bit 3 |
| 9 | LPDT4 | O | Parallel Port Data Bit 4 |
| 10 | LPDT5 | O | Parallel Port Data Bit 5 |
| 11 | LPDT6 | O | Parallel Port Data Bit 6 |
| 12 | LPDT7 | O | Parallel Port Data Bit 7 |
| 13 | DTR | O | Serial Port Data Terminal Ready |
| 14 | -TXD | O | Serial Port Transmit Data |
| 15 | RTS | O | Serial Port Request To Send |
| 16 | DSR | I | Serial Port Data Set Ready |
| 17 | BC-CTL | O | Battery Pack Charge Control |
| 18 | NC-IN | I | Ninja Battery Charge Input |
| 19 | DCIN | I | Ninja DC In Voltage (+15V) |
| 20 | DCIN | I | Ninja DC In Voltage (+15V) |
| 21 | BATTGND | — | Battery Ground |
| 22 | BATTGND | — | Battery Ground |
| 23 | BATTGND | — | Battery Ground |
| 24 | RDYLOUT | O | |
| 25 | DRQ7 | I | DMA Request line 7 |
| 26 | RDYLINL | I | |
| 27 | AUDGND | — | Audio Ground |
| 28 | PRPWRON | O | Port Replicator Power On control |
| 29 | -ZPORT1 | I | Z-Port Select line 1 |
| 30 | SA21 | O | ISA Bus Address Bit 21 |
| 31 | SA20 | O | ISA Bus Address Bit 20 |
| 32 | SA19 | O | ISA Bus Address Bit 19 |
| 33 | SA18 | O | ISA Bus Address Bit 18 |
| 34 | SA13 | O | ISA Bus Address Bit 13 |
| 35 | SA12 | O | ISA Bus Address Bit 12 |
| 36 | SA11 | O | ISA Bus Address Bit 11 |

TABLE 1-continued

| Pin | Signal | Direction | Description |
| --- | --- | --- | --- |
| 37 | SA10 | O | ISA Bus Address Bit 10 |
| 38 | SA5 | O | ISA Bus Address Bit 5 |
| 39 | SA4 | O | ISA Bus Address Bit 4 |
| 40 | SA3 | O | ISA Bus Address Bit 3 |
| 41 | SA2 | O | ISA Bus Address Bit 2 |
| 42 | -ZEROWS | I | ISA Bus Zero Wait State |
| 43 | AEN | O | ISA Bus Address Enable |
| 44 | -RSTDRV | O | Reset Drive |
| 45 | BALE | O | ISA Bus Address Latch Enable |
| 46 | -MEMR | O | ISA Bus Memory Write command |
| 47 | -IOR | O | ISA Bus I/O Read command |
| 48 | SA1 | O | ISA Bus Address Bit 1 |
| 49 | SD0 | B | ISA Bus Data Bit 0 |
| 50 | SD2 | B | ISA Bus Data Bit 2 |
| 51 | SD4 | B | ISA Bus Data Bit 4 |
| 52 | SD6 | B | ISA Bus Data Bit 6 |
| 53 | SD8 | B | ISA Bus Data Bit 8 |
| 54 | SD10 | B | ISA Bus Data Bit 10 |
| 55 | SD12 | B | ISA Bus Data Bit 12 |
| 56 | SD14 | B | ISA Bus Data Bit 14 |
| 57 | IRQ5 | I | Interrupt Request line 5 |
| 58 | IRQ11 | I | Interrupt Request line 11 |
| 59 | IRQ10 | I | Interrupt Request line 10 |
| 60 | IRQ15 | I | Interrupt Request line 15 |
| 61 | IRQ3 | I | Interrupt Request line 3 |
| 62 | IRQ7 | I | Interrupt Request line 7 |
| 63 | IRQ14 | I | Interrupt Request line 14 |
| 64 | -RDPCACT | I | PCMCIA Activity |
| 65 | MSDATA | B | Mouse Port Data line |
| 66 | TB5V | O | Track Ball 5 volts |
| 67 | TB5V | O | Track Ball 5 |
| 68 | VIDRES1 | O | Video Resolution 1 |
| 69 | DACGND | — | Video DAC ground |
| 70 | GREEN | O | CRT Green gun |
| 71 | CRTHSYNC | O | CRT Horizontal Sync |
| 72 | CRTVSYNC | O | CRT Vertical Sync |
| 73 | VIDRES3 | O | Video Resolution 3 |
| 74 | GND | — | Ground |
| 75 | GND | — | Ground |
| 76 | GND | — | Ground |
| 77 | GND | — | Ground |
| 78 | GND | — | Ground |
| 79 | GND | — | Ground |
| 80 | -LPTAFD | O | Parallel Port Auto Feed |
| 81 | -LPTERR | I | Parallel Port Error |
| 82 | -LPTINIT | O | Parallel Port Initialize |
| 83 | -LPTSLTI | O | Parallel Port Select In |
| 84 | FPNF | O | Parallel Port Not Floppy Control |
| 85 | -LPTACK | I | Parallel Port Acknowledge |
| 86 | LPTBUSY | I | Parallel Port Printer Busy |
| 87 | LPTPE | I | Parallel Port Printer Paper Empty |
| 88 | LPTSLCT | I | Parallel Port Printer Select Acknowledge |
| 89 | RI | I | Serial Port Ring Indicator |
| 90 | CTS | I | Serial Port Clear To Send |
| 91 | RXD | I | Serial Port Receive Data |
| 92 | DCD | I | Serial Port Data Carrier Detect |
| 93 | NC-IN | I | Ninja Battery Charge Input |
| 94 | NC-IN | I | Ninja Battery Charge Input |
| 95 | DCIN | I | Ninja DC In Voltage (+15V) |
| 96 | DCIN | I | Ninja DC In Voltage (+15V) |
| 97 | BATTGND | — | Battery Ground |
| 98 | BATTGND | — | Battery Ground |
| 99 | ATCLK | O | ISA Bus Clock |
| 100 | RDYOUT | O | |
| 101 | -DACK7 | O | DMA Acknowledge Line 7 |
| 102 | RDYLINR | I | |
| 103 | AUDGND | — | Audio Ground |
| 104 | RDPCSPK | I | PCMCIA PC Speaker Input |
| 105 | -ZPORT0 | I | Z-Port Select Line 0 |
| 106 | -PRRDY | I | Port Replicator Ready (Power OK) |
| 107 | -RFSH | O | ISA Bus Refresh |
| 108 | SA22 | O | ISA Bus Address Bit 22 |
| 109 | SA23 | O | ISA Bus Address Bit 23 |
| 110 | SA14 | O | ISA Bus Address Bit 14 |
| 111 | SA15 | O | ISA Bus Address Bit 15 |
| 112 | SA16 | O | ISA Bus Address Bit 16 |

TABLE 1-continued

| Pin | Signal | Direction | Description |
|---|---|---|---|
| 113 | SA17 | O | ISA Bus Address Bit 17 |
| 114 | SA6 | O | ISA Bus Address Bit 6 |
| 115 | SA7 | O | ISA Bus Address Bit 7 |
| 116 | SA8 | O | ISA Bus Address Bit 8 |
| 117 | SA9 | O | ISA Bus Address Bit 9 |
| 118 | -IOCS16 | I | ISA Bus I/O Chip Select 16 |
| 119 | TC | O | ISA Bus Terminal Count |
| 120 | -SBHE | O | ISA Bus System Byte High Enable |
| 121 | -MEMCS16 | I | ISA Bus Memory Chip Select 16 |
| 122 | IOCHRDY | I | ISA Bus I/O Channel Ready |
| 123 | -MEMW | O | ISA Bus Memory Write Command |
| 124 | -IOW | O | ISA Bus I/O Write Command |
| 125 | SA0 | O | ISA Bus Address Bit 0 |
| 126 | SD1 | B | ISA Bus Data Bit 1 |
| 127 | SD3 | B | ISA Bus Data Bit 3 |
| 128 | SD5 | B | ISA Bus Data Bit 5 |
| 129 | SD7 | B | ISA Bus Data Bit 7 |
| 130 | SD9 | B | ISA Bus Data Bit 9 |
| 131 | SD11 | B | ISA Bus Data Bit 11 |
| 132 | SD13 | B | ISA Bus Data Bit 13 |
| 133 | SD15 | B | ISA Bus Data Bit 15 |
| 134 | IRQ9 | I | Interrupt Request Line 9 |
| 135 | -DACK1 | O | DMA Acknowledge Line 1 |
| 136 | DRQ1 | I | DMA Request Line 1 |
| 137 | IRQ4 | I | Interrupt Request Line 4 |
| 138 | IRQ12 | I | Interrupt Request Line 12 |
| 139 | -OPTISMI | I | OPTI Chip System Management Interrupt |
| 140 | -RDPCRI | I | PCMCIA Ring Indicator |
| 141 | MSCLK | I | Mouse Port Clock |
| 142 | KBCLK | I | Keyboard Port Clock |
| 143 | KBDATA | B | Keyboard Port Data |
| 144 | VIDRES0 | O | Video Resolution 0 |
| 145 | RED | O | CRT Red Gun |
| 146 | DACGND | — | Video DAC ground |
| 147 | DACGND | — | Video DAC ground |
| 148 | BLUE | O | CRT Blue Gun |
| 149 | VIDRES2 | O | Video Resolution 2 |
| 150 | GND | — | Ground |
| 151 | GND | — | Ground |
| 152 | GND | — | Ground |

TABLE 2

| IO Port (hex) | Description |
|---|---|
| 300-31F | LAN Module option A (default) |
| 320-33F | LAN Module option B |
| 340-35F | LAN Module option C |
| 360-37F | LAN Module option D |
| 3E0 | PCMCIA Module controller index register |
| 3E1 | PCMCIA Module controller data register |

TABLE 3

| IRQ Line | Description |
|---|---|
| 3 | LAN Module Option 1/PCMCIA Module Controller |
| 4 | PCMCIA Module Controller |
| 5 | LAN Module Option 2/PCMCIA Module Controller |
| 7 | PCMCIA Module Controller |
| 9 | LAN Module Option 3 (default)/PCMCIA Module Controller |
| 10 | PCMCIA Module Controller |
| 11 | PCMCIA Module Controller |
| 12 | PCMCIA Module Controller |
| 14 | PCMCIA Module Controller |
| 15 | LAN Module Option 4/PCMCIA Module Controller |

Various signals from the connector 750, including the address signals SA[0:23], the data signals SD[0:15] and various control signals are provided with radio frequency interference (RFI) filters. These RFI filters include the resistors 752 to 862 (FIG. 17) and a plurality of capacitors 864–974 (FIGS. 19, 23–25).

Five (5) volt power supplies ETHVCC and PCMCVCC are generated by the network board 742 (ETHVCC) and the PCMCIA board 744 (PCMCVCC), respectively, and are ORed to the main board 740 by way of a pair of diodes 976 and 977 and coupled by way of an in-line ferrite bead inductor 975 (FIG. 20). In particular, connectors for the PCMCIA board 744 and the LAN interface card 742 are identified by the reference numerals 1000 and 1002 and illustrated in FIGS. 21 and 22, respectively. As will be noted therein, the 5 volt power supply PCMCVCC for the PCMCIA card 744 is available from terminals 13 and 47 of the connector 1000 while the 5 volt power supply for the LAN card 742 is available from terminals 54 and 56 of the connector 1002. The 5 volt power supplies PCMCVCC and ETHVCC are used to develop the five volt supply PRVCC5 for the main board. The 5 volt power supply PRVCC5 on the main board 740 is used primarily as power for the quick switches and pulling up various address, data and control lines by way of the pull-up resistors 1004–1102 as illustrated in FIGS. 26 and 27 to prevent the signals to the PCMCIA board 744 from floating. A pair of transistors 979 and 981 and biasing resistors 983 and 985 may be used as an alternative to the diodes 976 and 977 as shown in FIG. 20 to reduce spurious triggering of the supervisory IC 1104 (FIG. 28), which monitors the 5 volt supply and generates a reset to the LAN board 742 and PCMCIA board 744 at initial power up and any subsequent power failure. The power supervisory circuit is also used to disable the bus switches 1112 and 1124 when power to the PC 102 is turned off to prevent backpowering of the PC 102.

Figure 28:
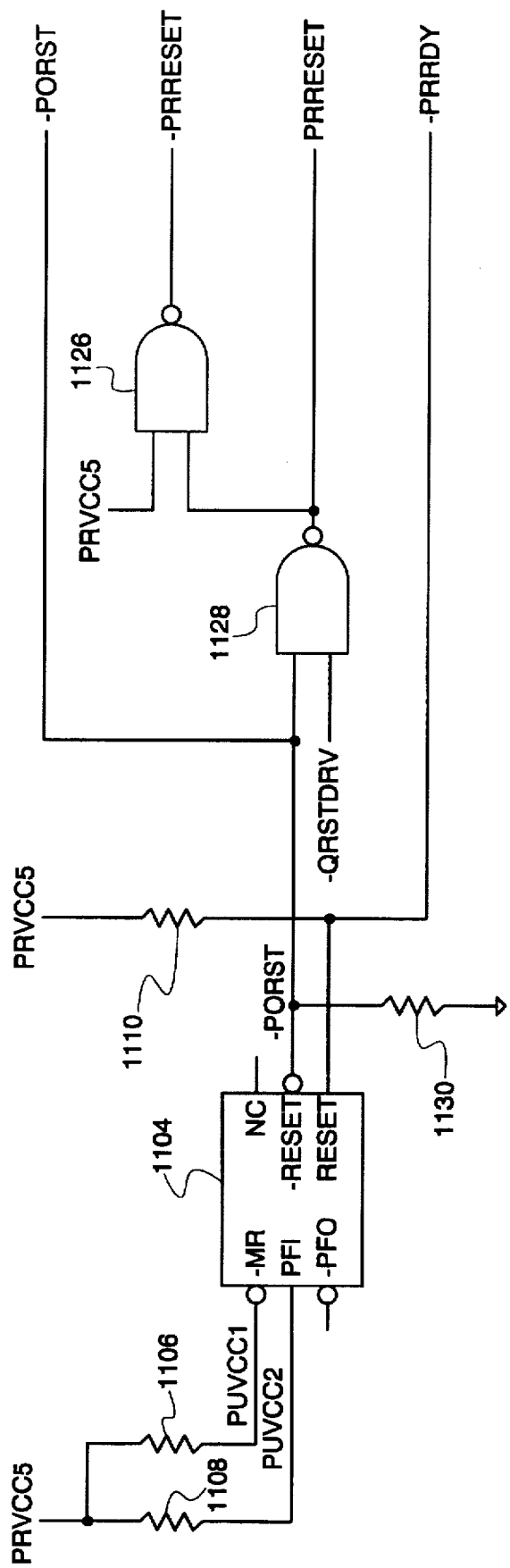

In order to prevent various external I/O devices from backpowering the main board 740, a power supervisory circuit is illustrated in FIG. 28 which monitors the 5 volt power supply PRVCC5 and, as will be discussed below, will disconnect the accessory boards 742 and 744 from the main board in the event of a loss of power in the PC 102. In particular, the 5 volt power supply voltage PRVCC5 is applied to a microprocessor supervisory IC 1104, for example, a Maxim model MAX 707, by way of input resistors 1106, 1108 and 1110 (FIG. 28). As will be discussed in more detail below, the output of the microprocessor supervisory IC 1104 includes an active high reset RESET, used as a control signal to control a plurality of bus switches 1112–1124 (FIG. 18), which, in turn, are used to disconnect the PCMCIA board 744 and LAN board 742 from the main board 740 when power to the PC 102 is unavailable. In particular, as discussed above, the 5 volt power supply voltage PRVCC5 is generated by the PCMCIA board 744 and LAN board 742. Accordingly, when the PC 102 is on, it generates a power on signal PRPWRON, which, in turn, enables the LAN card 742 and PCMCIA card 744 power supplies ETHVCC and PCMCVCC which allow the supervisory circuit to release the RESET status. When the reset signal RESET on the microprocessor supervisory IC 1104 is high, as will be discussed in more detail below, it will cause the bus switches 1112–1124 to be closed, thereby connecting the PCMCIA board 744 and the LAN board 742 to the main board 740. Conversely, should the power supply to the PC 102 be lost or unavailable, the power supply voltage PRVCC5 will be low. During such a condition, a microprocessor supervisory IC 1104 will cause the bus switches 1112–1124 (FIG. 18) to disconnect the PCMCIA board 744 and LAN board 742 from the main board 740.

The microprocessor supervisory IC 1104 (FIG. 28) is also used to develop other reset signals, such as –PORST, –PRRESET and PRRESET. In particular, the active low output signal –RESET of the microprocessor supervisory IC 1104 is applied to a NAND gate 1128 and pulled low by a pull-down resistor 1130. A power supply signal —QRSTDRV (FIG. 27) is applied to the input of the NAND gate 1128. The power supply signal —QRSTDRV will be low when the power supply voltage PRVCC5 for the main board 740 is unavailable. The output of the NAND gate 1128 generates an active high reset signal PRRESET for the network interface board 742. The active high reset signal PRRESET for the network interface board 742 is applied to pin 19 of the connector 1002.

A NAND gate 1126 is used to generate an active low system reset signal —PRRESET for the PCMCIA board 744. In particular, the active high output signal from the NAND gate 1128 is applied to an input of the NAND gate 1126. The main board power supply voltage PRVCC5 is applied to another input of the NAND gate 1126 to develop the active low reset signal —PRRESET. This reset signal —PRRESET is applied to terminal 92 of the connector 1000 (FIG. 21B) to provide a reset signal for the PCMCIA board 744.

In addition to the reset signals —PRRESET and PRRESET, a power on signal PRPWRON from the PC 102 is also used to cut off power to the LAN board 742 and the PCMCIA board 744 in the event that the power supply to the PC 102 is turned off or unavailable. In particular, referring to FIG. 16A, a power-on signal PRPWRON from the PC 102 is applied to pin 28 of the main connector 750 and is otherwise pulled low by way of a pull-down resistor 1132 (FIG. 16A). This signal PRPWRON, in turn, is applied to pin 19 of the connector 1000 for the PCMCIA board 744 and to pin 9 of the connector 1002 for the LAN board 742. The power on signal PRPWRON will be high after the power supply voltage in the PC 102 is stabilized after power up. Thus, as will be discussed in more detail below, use of the power on signal PRPWRON will prevent power from being applied to the PCMCIA board 744 and the LAN board 742 and thereby also prevents power from being supplied to the main board until the power supply voltage in the PC 102 has stabilized.

Due to the flexibility of the system 100, two pins 29 and 105 (—Zport 1 and —Zport 0) on the connector 750 (FIG. 16A) are used to identify the particular device into which the PC 102 is connected. More particularly, as will be discussed in more detail below, the connector 750 on the active port replicator 104 is adapted to be connected to a mating connector on the PC 102. These two pins, 29 and 105, enable up to four different options to be identified to the PC 102. For example, as illustrated in Table 4 below, various options are possible.

TABLE 4

| --ZPORT 1 | --ZPORT 0 | Blank |
|---|---|---|
| 0 | 0 | Active |
| 0 | 1 | Passive |
| 1 | 0 | Multimedia |
| 1 | 1 | Not Present |

When the active port replicator 104 is furnished with a LAN board 742 and/or a PCMCIA board 744 and connected to the PC 102, both pins 29 and 105 on the connector 750 are low. More particularly, pin 29 is pulled low by way of a pull-down resistor 1134 (FIG. 16A). Pin 105 is pulled low by way of a pull-down resistor 1622 (FIG. 54B) connected to pin 94 of the PCMCIA connector 1620 which mates with connector 1000 and/or the pull-down resistor 1446 (FIG. 45) connected to pin 57 of the LAN board connector 1444 which mates with connector 1002 (FIG. 22) to indicate the presence of a PCMCIA and/or a LAN upgrade. Thus, anytime the active port replicator 104 is connected to the PC 102 and a PCMCIA upgrade or LAN is installed in the port replicator 104, signals —Zport 0 and —Zport 1 will be active low to indicate to the PC 102 that the active port replicator 104 is connected to the rear of the PC 102. Alternately, when neither a PCMCIA nor a LAN upgrade is included in the active port replicator 104, —Zport 0 will be high, which will indicate to the PC 102 that a passive port replicator (i.e. port replicator without a PCMCIA or a LAN upgrade) is connected to the rear of the PC 102. Alternately, as will be discussed in more detail below, the PC 102 is adapted to be connected to a portable multimedia presentation system which provides full multimedia capabilities for the PC 102. When the PC 102 is connected to such a multimedia system, the signal —Zport 1 will be high, while the signal —Zport will be low. Lastly, when the PC 102 is not connected to anything (i.e. during portable operation), the signals —Zport 1 and —Zport 0 are pulled high.

As mentioned above, the active port replicator 104 duplicates the standard ports on the PC 102 and provides an additional type PS/2 port to enable both a keyboard (not shown) as well as a mouse 122 (FIG. 1) to be connected to the active port replicator 104 simultaneously. Referring to FIGS. 30-35, the replicated ports are shown. In particular, FIG. 30 illustrates a serial port 1138 configured as a 9-pin connector. Each of the signals for the serial port 1132 with the exception of pin 5 are filtered by way of a plurality of lowpass capacitors 1140–1154 connected to ground. Pin 5 is connected directly to ground. The serial port signals (ADCD, ADSR, —ARXD, ARTS, —ATXD, ACTS, ADTR and ARI) are connected to the 152-pin connector 750 by way of current-limiting resistors 1156–1170, which enables the port replicator 104 to act as a pass-through device to enable the serial port to be replicated at the serial port connector 1138 (FIG. 30).

Similarly, the two type PS/2 ports are illustrated in FIGS. 31 and 32. The PS/2 ports are implemented as 6-pin connectors 1172 and 1174. In particular, the connector 1172 is adapted to be utilized for an external keyboard, while the connector 1174 is adapted to be utilized for an external mouse. Referring first to the keyboard port 1172, pins 1, 4 and 5 are connected to the main connector 750 (FIGS. 16A–16B). In particular, pin 1, representative of keyboard data KBDATA, is connected to pin 143 on the main connector 750 by way of a current-limiting inductor 1176 and filtering capacitors 1178 and 1180. Pin 5, which represents the keyboard clock, KBCLK, is connected to pin 142 of the connector 750 by way of an inductor 1182 and filtering capacitors 1184 and 1186. The power for the keyboard port 1172 is developed by way of the 5 volt power supply TB5V, available at pins 66 and 67 of the main connector 750. In particular, pin 4 of the keyboard port connector 1172 is applied to the 5 volt power supply TB5V by way of a fuse 1188 and filtering capacitor 1189. Pin 3 of the keyboard port connector 1172 is grounded.

Similarly, data MSDATA from the mouse port connector 1174 is connected to pin 65 of the main connector 750 by way of a current-limiting inductor 1188 and filtering capacitors 1190 and 1192. Pin 5 of the mouse port connector 1175 is connected to pin 141 of the connector 750 for the mouse clock MSCLK by way of a current-limiting inductor 1194 and filtering capacitors 1196 and 1198. The power supply for the mouse port 1174 MSPWR is developed from the 5 volt power supply TB5V, available at pins 66 and 67 of the main connector. In particular, pin 4 of the mouse port connector 1174 is applied to the 5 volt power supply TB5V by way of a fuse 1200 and a filtering capacitor 1202.

Figure 33:
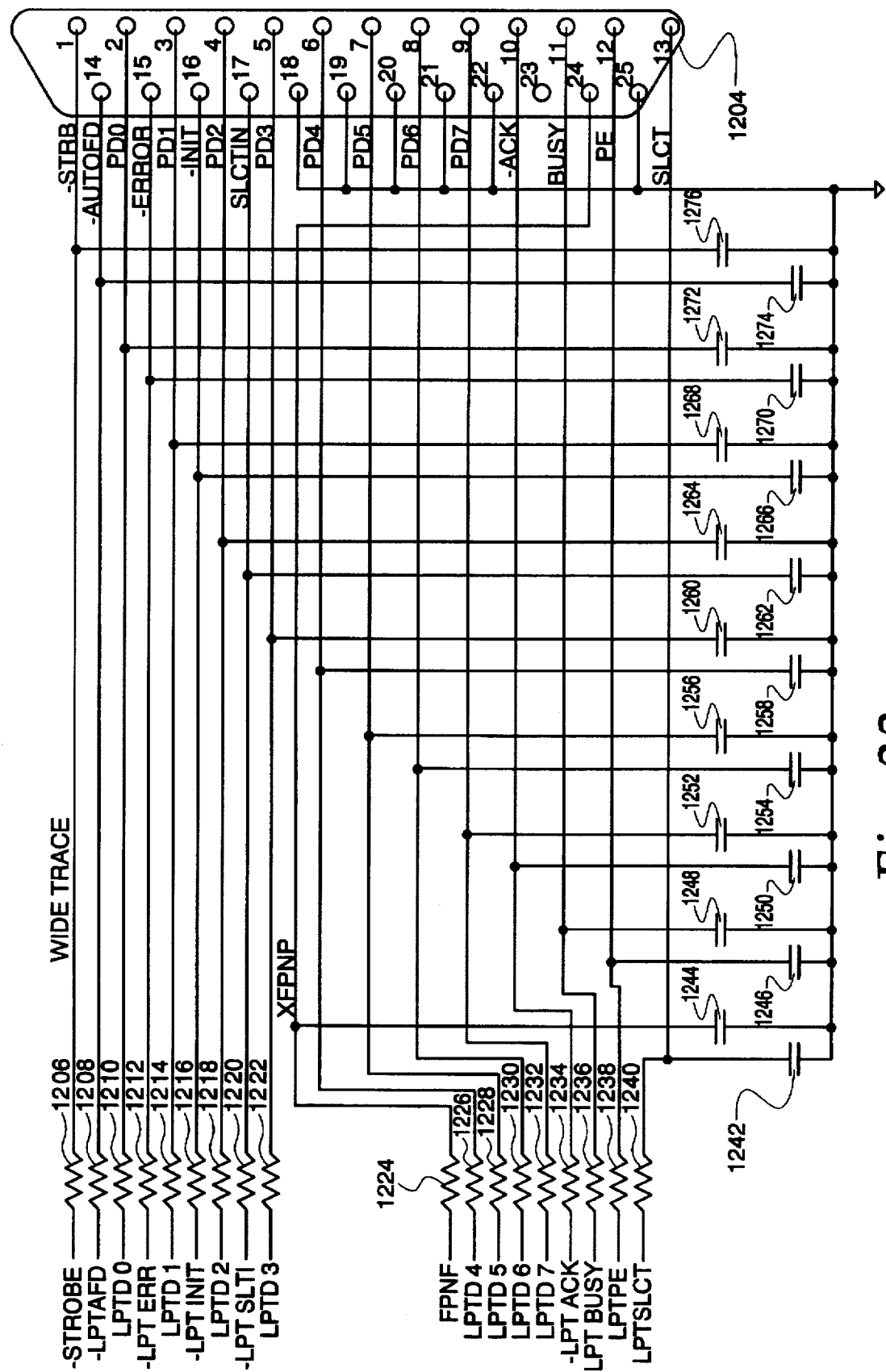

As mentioned above, the active port replicator 104 also includes a parallel port which includes a 25-pin connector 1204. Each of the standard parallel port signals identified in FIG. 33 are connected to the main connector 750 to enable the port replicator 104 to replicate a standard parallel port available at the PC 102. In particular, each of the pins 1–25 of the parallel port connector 1204 is connected to the main connector 750 by way of a serially coupled current-limiting resistor 1206–1240 and a filtering capacitor 1242–1276.

Figure 34:
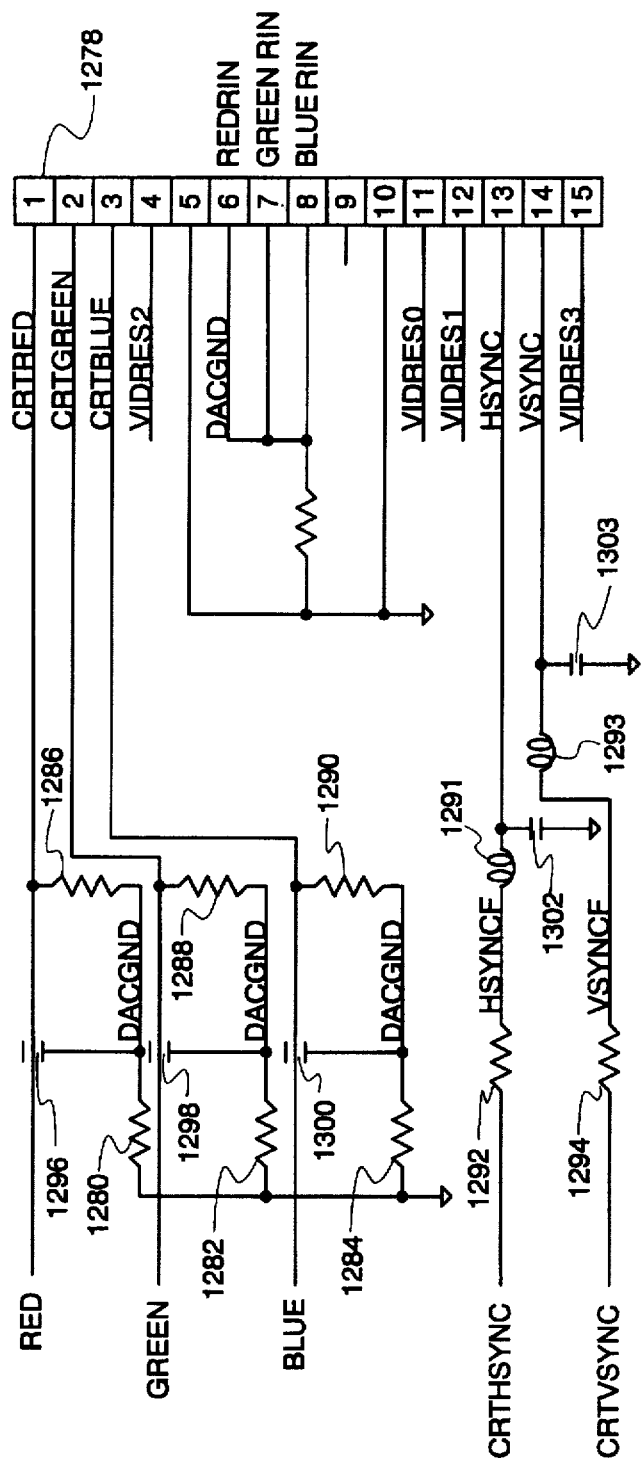
Figure 35:
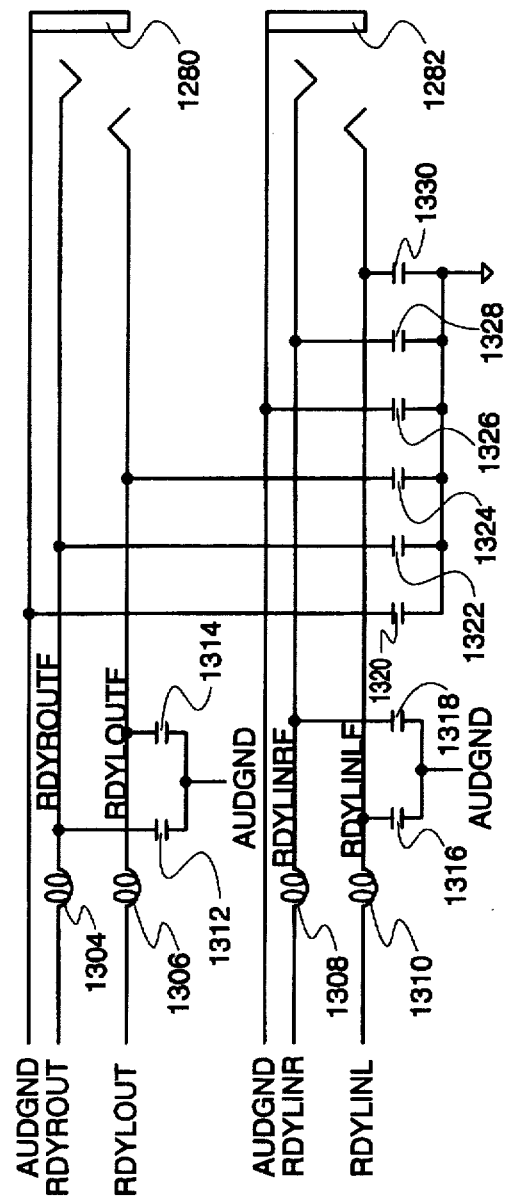

FIGS. 34 and 35 illustrate a video port which includes a 15-pin connector 1278 and two audio LINE IN and LINE OUT jacks 1280 and 1282. The standard video port signals connected to the video port connector 1278 are connected to the main connector 750 by way of a plurality of resistors 1280–1294, a plurality of inductors 1291, 1293 and a plurality of filtering capacitors 1296–1303. Similarly, the LINE IN and LINE OUT audio jacks 1280 and 1282 are connected to the main connector 750 by way of a plurality of in-line, wire-wound inductors 1304–1310, as well as a plurality of capacitors 1312–1330.

Figure 36:
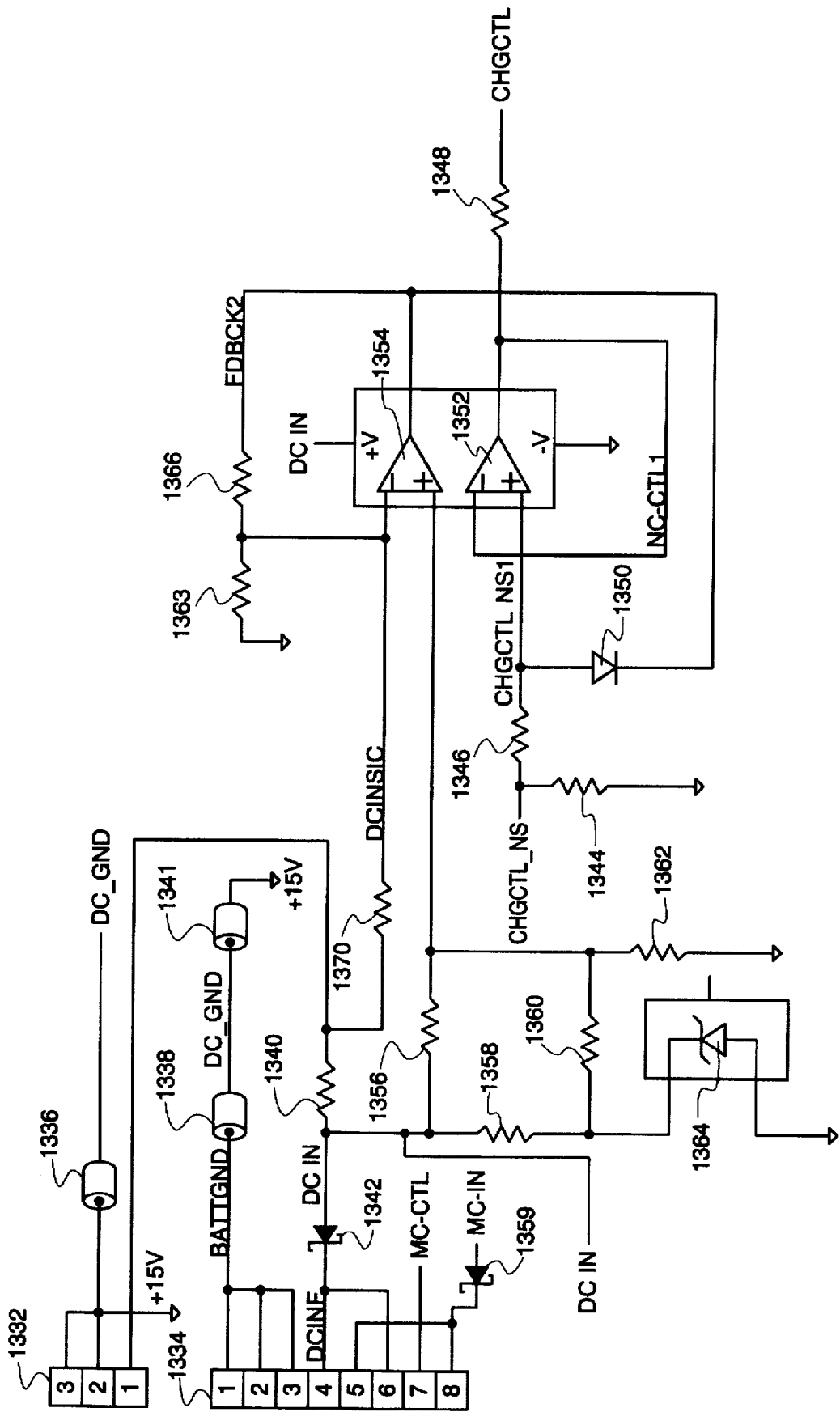

As illustrated in FIG. 1, the power from the AC to DC converter 126 is applied to a power port 132 by way of a cable 134. The cable 134 is plugged into a power port 132 and, in turn, to connector 1332 which provides a source of +15 volts DC to the port replicator 104 and to the personal computer 102. In particular, a 15 volt supply DC IN, DC__GND is used to provide a 15 volt power supply for the main board 740, as well as 15 volt power supplies for the PCMCIA board 744 and the LAN board 742, as well as act as a pass-through power supply for the external flexible bay 116, which may be connected to the power port 138 by way of a connector 1334 and connected to the external flexible bay 116 by way of a cable 136 as shown in FIG. 1. Referring to FIG. 36, the 15 volt power supply from the AC to DC converter 126 (FIG. 1) is connected to the power port connector 1332. The battery ground connection from the AC to DC converter 126 defines the DC ground signal DC__GND by way of a ferrite bead inductor 1336. Terminals 1–3 of the connector 1334 are tied to the other two ground planes by way of a pair of in-line, serially coupled ferrite bead inductors 1338 and 1340 to develop a DC ground reference, DC__GND for the external flexible bay 116. The positive 15 volt reference from the AC to DC converter 126, available at pin 1 of the connector 1332, is applied to the connector 1334 by way of a serially coupled resistor 1340 and a Schottky diode 1342. The zener diode 1364 is used to provide a voltage reference for the +15 volt DC power for the external flexible bay 116. The resistor 1340 is used as a sensing resistor to measure the current supplied from the AC to DC converter 126 to the system. The charge control signal MC-CTL is connected to terminal 7 of the connector 1334 while the charge control signal MC-IN is connected to terminal 8 of the connector 1334 by way of a Schottky diode 1359. These signals MC-IN and MC-CTL represent battery charge control signals to the external flexible bay 116.

The circuitry including resistors 1344, 1346, 1348, a diode 1350 and a buffer 1352 are used to develop a charge control signal CHGCTL for establishing which of the modular battery packs 127 in the PC 102 and the external flexible bay 116 gets charged. As discussed above, the charge control signal CHGCTL is used by the AC to DC converter 126 to provide maximum available charging for the modular battery packs 127 and both the PC 102 and the external flexible bay 116. As discussed in co-pending application Ser. No. 07/975,879, the circuitry for the AC to DC converter 126, (shown within the dashed box 1350 in FIGS. 39 and 40) provides a variable charging signal as a function of a load on the AC to DC converter 126.

As mentioned above, the resistor 1340 measures the total power being supplied by the AC to DC converter 126. The total power being supplied by the AC to DC converter 126 is compared with a reference voltage representative of the total power available by way of a differential amplifier 1354. The reference voltage is developed by way of the resistors 1356–1363 and a zener diode 1364. The differential amplifier 1354 is configured with a feedback loop which includes the feedback resistor 1366 and a voltage reference resistor 1368. The voltage across the current-sensing resistor 1340 is applied to the positive and negative inputs of the differential amplifier 1354 by way of input resistors 1370 and 1356. The resistor 1368 is to compensate for the offset voltage in the differential amplifier 1354.

In operation the current being supplied by the AC to DC converter 126 is sensed by the current-sensing resistor 1340 and applied to an inverted input of the differential amplifier 1354. As mentioned above, this voltage is compared with a reference voltage which represents the maximum allowable power output of the AC to DC converter 126. The difference between the power being supplied by the AC to DC converter 126 and the maximum available power is available at the output of the differential amplifier and is fed back to the inverting input by way of the feedback resistor 1366. During conditions when the power being supplied by the AC to DC converter 126 is less than available power supply, the difference available at the output of the differential amplifier will be a relatively large voltage, which, is used to force the Schottky diode 1342 to conduct to enable power from the AC to DC converter 126 to be supplied to the external flexible bay 116 by way of the output port connector 1334. As the voltage across the current sensing resistor 1340 rises to the level of maximum power being supplied by the AC to DC converter 126, the difference voltage at the output of the differential amplifier 1354 becomes relatively low, causing the voltage available at the anode of the Schottky diode 1342 to fall below the conduction voltage, thereby disconnecting the external flexible bay 116 from the AC to DC converter 126.

Figure 37:
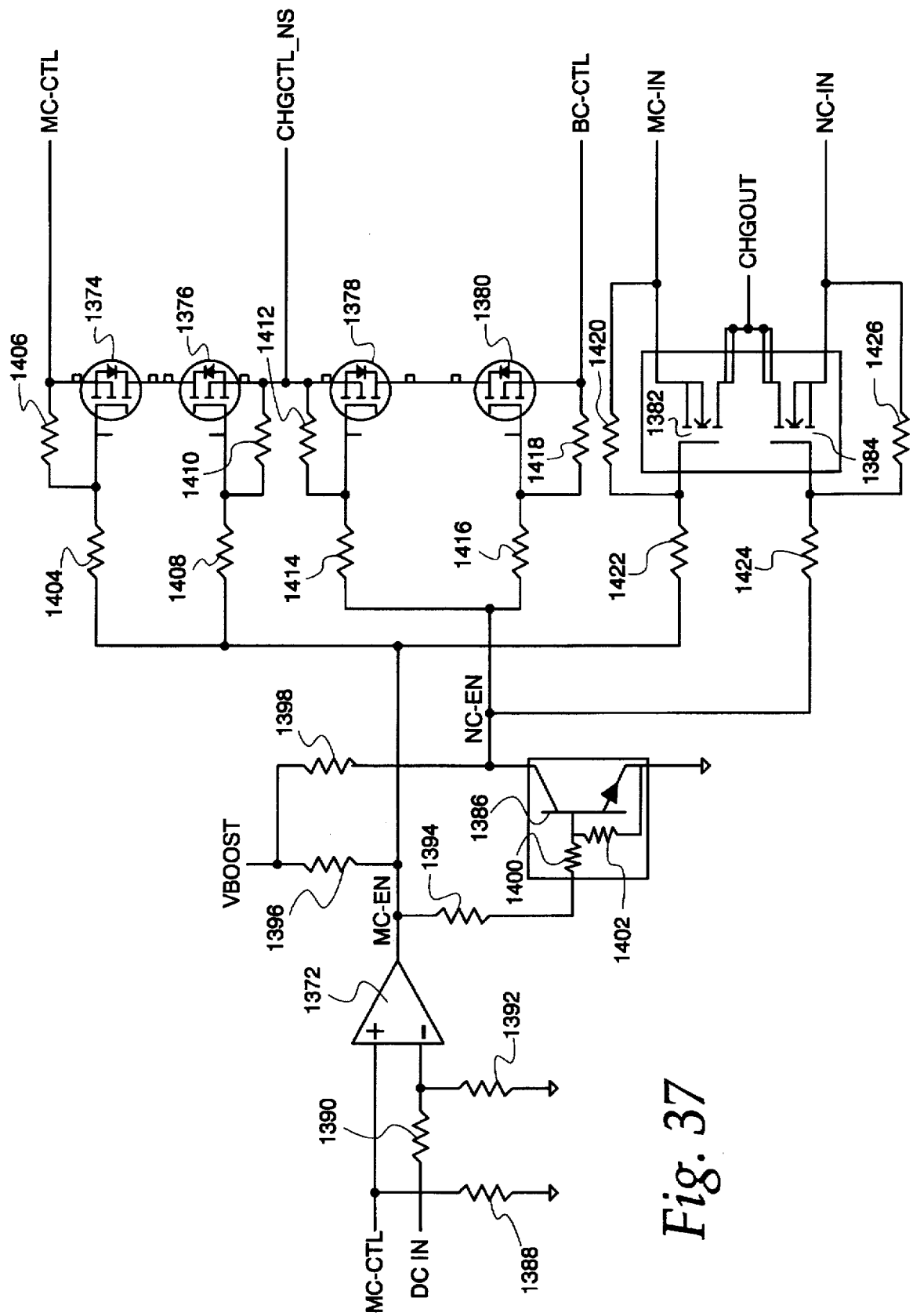
Figure 40B:
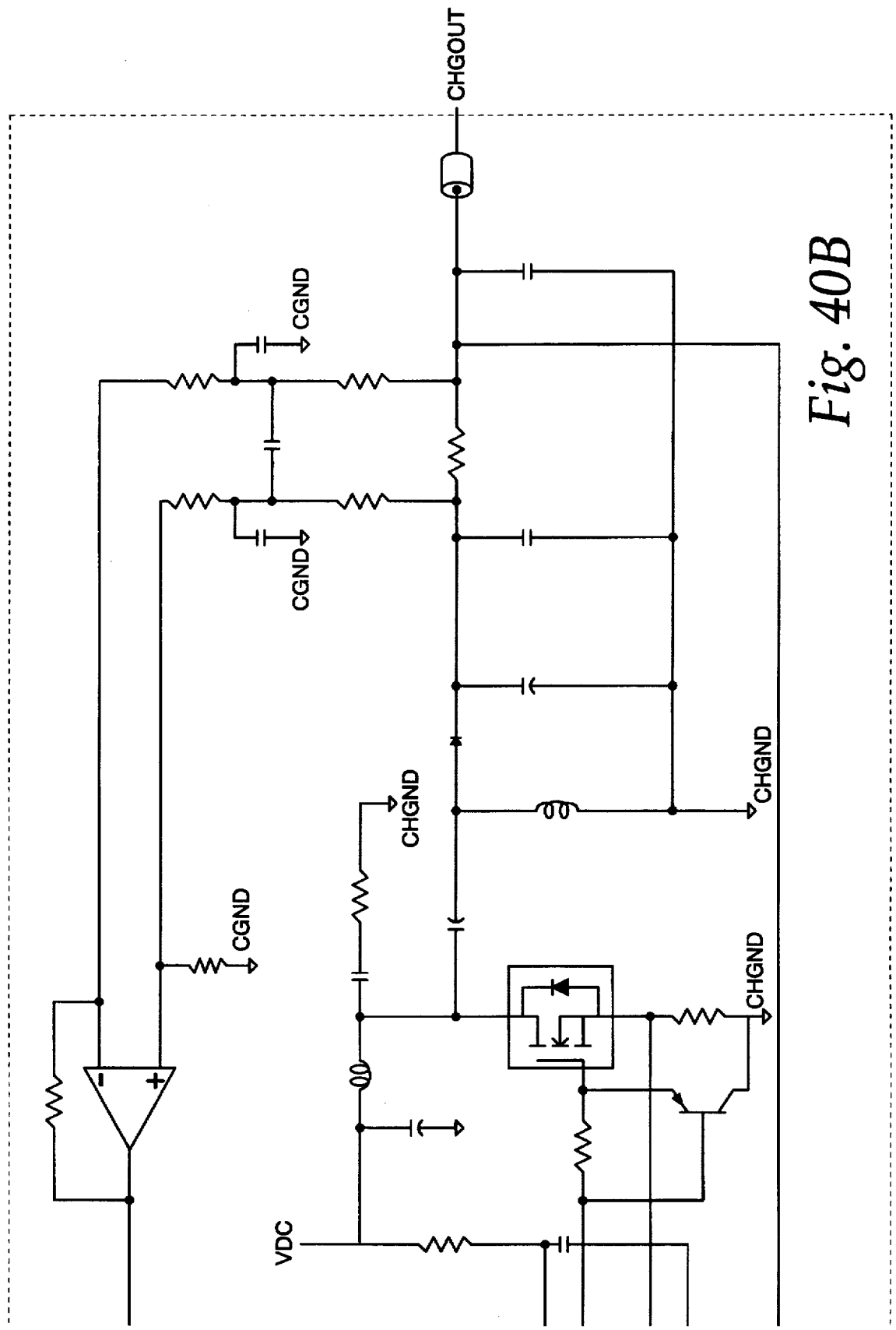

The circuitry illustrated in FIG. 37, which includes the differential amplifier 1372, field effect transistors (FETs) 1374–1384, a bipolar junction transistor (BJT) 1386 and resistors 1388–1426, is used to develop the charge control signals for the battery charger circuit 1350 illustrated in FIGS. 39 and 40. In particular, as mentioned above, each of the modular battery packs 127 includes control circuitry as described in detail in co-pending application Ser. No. 07/975,879. The charge control signal for the modular battery pack 127 (MC-CTL) for the modular battery pack 127, installed in the external flexible bay 116, is applied to an inverting input of the differential amplifier 1372 by way of a resistor 1388, while the available 15 volt supply from the AC to DC converter 126 is applied to the inverting input by way of the resistors 1390 and 1392. The charge control signal MC-CTL from the modular battery pack 127, installed within the external flexible bay 116, is additionally applied to the FET 1374 by way of the resistor 1406. Similarly, a charge control signal BC-CTL from the modular battery pack 127, installed within the PC 102, is applied to the FET 1380 by way of the resistor 1418. The charge control signals MC-CTL and BC-CTL for the modular battery packs are used to develop a battery charging signal CHGCTL_NS for the battery charger 1350 illustrated in FIGS. 39 and 40. In particular, depending on the status of charge of the particular modular battery pack 127, either within the external flexible bay 116 or the PC 102, two of the four FETs will be closed at one time to provide the charge control signal CHGCTL_NS to the battery charger 1350. In particular, as mentioned above, the modular battery pack 127 within the external flexible bay 116 is given charging priority. While this particular modular battery pack 127 is being charged, the FETs 1374 and 1376 will be closed, while the FETs 1378 and 1380 will be nonconducting. Such a configuration connects the charge control signal MC-CTL from the modular battery pack 127 within the external flexible bay 116 to the charge control signal CHGCTL_NS to provide a control signal to the battery charger 1350. When the modular battery pack within the external flexible bay 116 is charged, the FETs 1374 and 1376 will go into a nonconducting state, while the FETs 1378 and 1380 will be conducting. In particular, during conditions when the modular battery pack 127 within the external flexible bay 116 is being charged, the BJT 1376, connected to the output of the differential amplifier 1372 will force the FETs 1378 and 1380 to be nonconducting. Once the modular battery pack 127 within the external flexible bay 116 is charged, the output of the differential amplifier 1372 will cause the FETs 1374 and 1376 to go into a nonconducting state while the FETs 1378 and 1380 go into a conducting state. During such a condition, the charge control signal BC-CTL from the modular battery pack within the PC 102 will be used as the charge control signal CHGCTL_NS for the battery charger 1350. Thus, depending on which of the modular battery packs 127 is being charged, the charge control signal CHGCTL_NS to the battery charger 1350 will be connected to the modular battery pack 127 being charged.

The signal MC-IN and NC-IN are used as control signals to the particular modular battery packs 127 within the external flexible bay 116 and the PC 102. In particular, the control signal MC-IN is used to connect a charge out signal CHGOUT to the modular battery pack 127 within the external flexible bay 116 by way of the FET 1382 while the signal NC-IN is used to connect the charge out signal CHGOUT from the battery charger 1350 to the modular battery pack 127 within the PC 102. The FET 1382 is under the control of an enabling signal MC-EN, available at the output of the differential amplifier 1372. The FET 1384 is under the control of an enable signal NC-EN available at the collector of the BJT 1386. During conditions when the modular battery pack 127 within the external flexible bay 116 is being charged, the enable signal MC-EN will force the FET 1382 into a conducting state to cause the charge out control signal CHGOUT from the battery charger 1350 to be connected to the control signal MC-IN for the modular battery pack 127 within the external flexible bay 116. During conditions when the modular battery pack 127 within the PC 102 is being charged, the FET 1382 will be nonconducting, while the FET 1384 will be conducting under the control of the BJT 1386. During this condition, the charge control signal CHGOUT from the battery charger 1350 will be connected to the charge control signal NCIN to the modular battery pack 127 within the PC 102.

Figure 29:
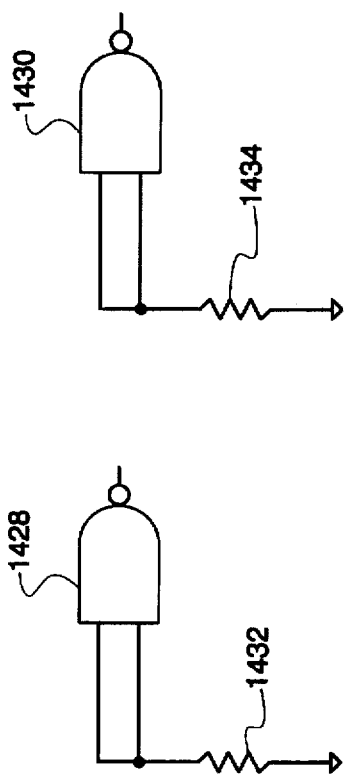

FIGS. 29 and 38 illustrate miscellaneous circuitry related to the port replicator 104. For example, FIG. 29 illustrates spare gates 1428 and 1430, whose inputs are tied together and grounded by way of grounding resistors 1432 and 1434. FIG. 38 illustrates a power supply filtering circuit for filtering the 15 volt power supply for the battery charger circuit 1350 illustrated in FIG. 40. In particular, the +15 volt DC voltage is filtered by way of a pair of in-line ferrite bead inductors 1436, 1438 and a capacitor 1440.

Figure 22:
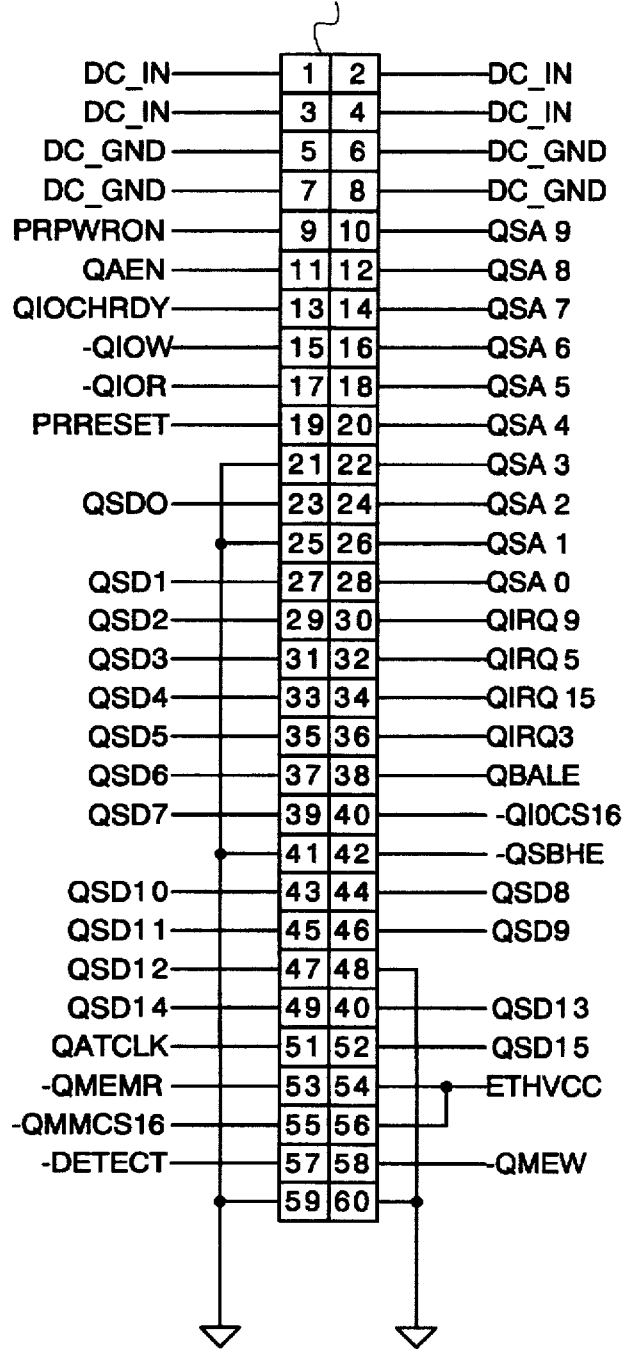
Figure 23:
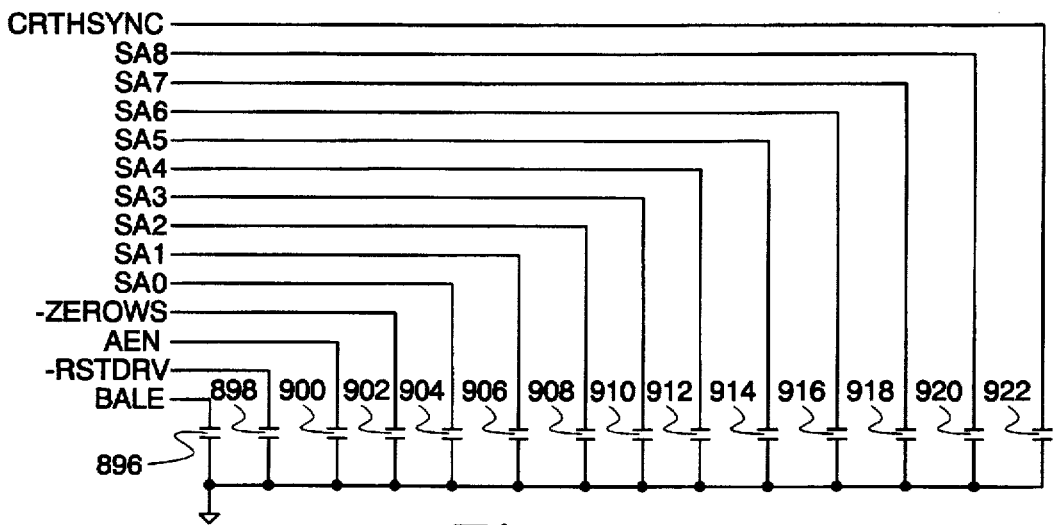
Figure 24:
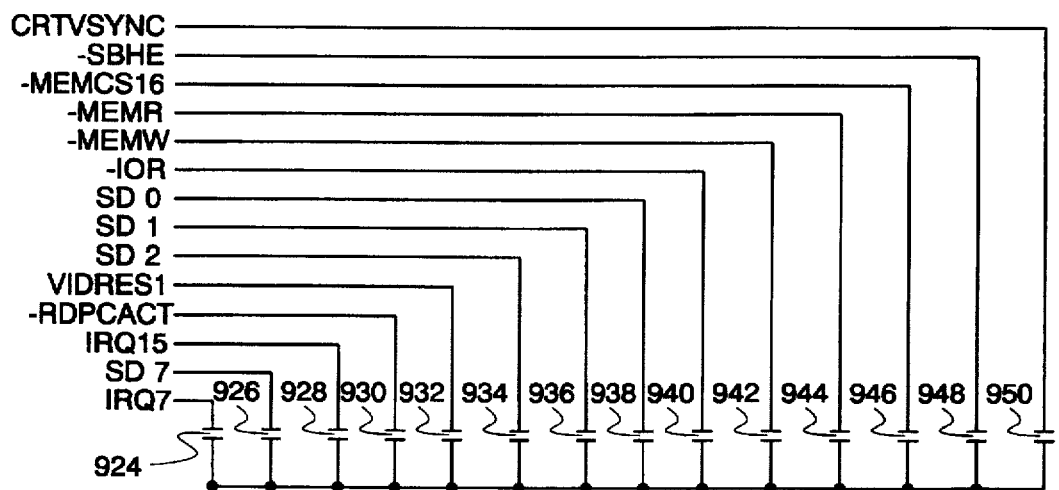
Figure 25:
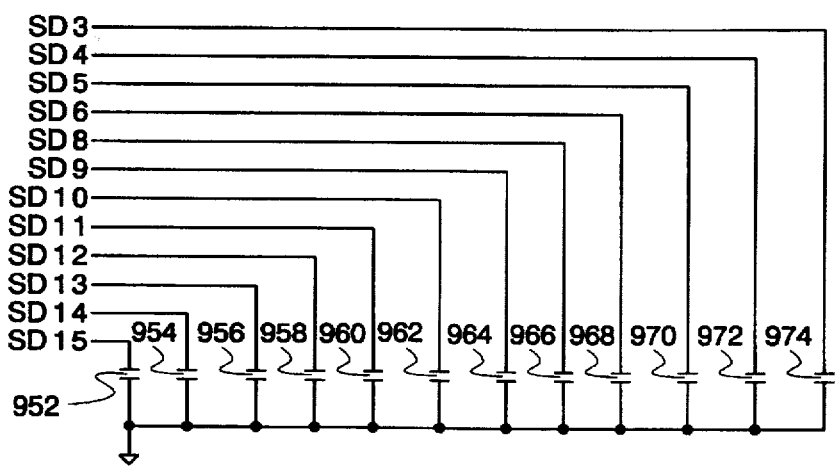

The circuitry for the LAN interface board 742 is illustrated in FIGS. 41–46. In particular, the LAN board 742 includes a 60-pin connector 1444 (FIG. 5) that is adapted to be plugged into the connector 1002 on the main board (FIG. 22). As mentioned above, the signals for the LAN connector 1444 are connected to the main board by way of the bus switches 1112–1122. Thus, as mentioned above, anytime power is unavailable in the PC 102 or the power supply to the PC 102 is turned off, the bus switches 1112–1122 will disconnect the LAN board from the system.

Figure 54B:
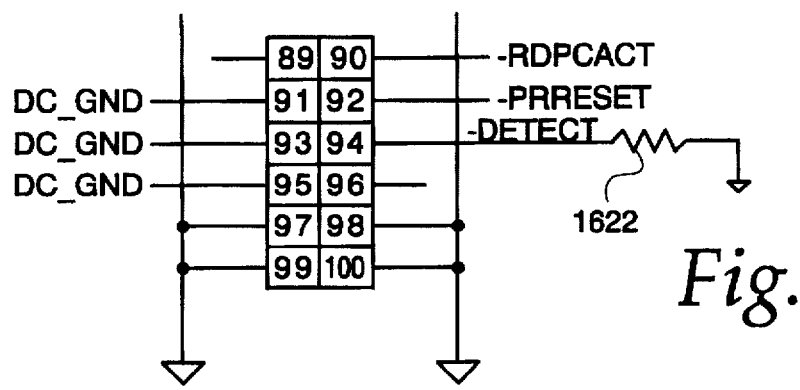

As illustrated in FIG. 45, pin 57 of the LAN connector 1444 is connected to ground by way of a grounding resistor 1446. Similarly, as illustrated in FIG. 54B, pin 94 is connected to ground by way of a grounding resistor 1622. The corresponding pin 57 of mating connector 1002 and pin 94 of connector 1000 on the main board are tied together by the –DETECT signal. This signal, which is active low, is connected to pin 105 of connector 750 through resistor 1136. This signal will normally be pulled high by a weak pullup in the PC 102, but when either one or both of the LAN board 742 or PCMCIA board 744 is installed in the system, this signal will be pulled low, indicating the presence of one or both option boards.

As mentioned above, the power supply for the LAN board is supplied by the 15 volt power supply (DC_IN, DC_GND) available on the main board. This power supply is applied to a DC-to-DC converter IC 1448 (FIG. 47), for example a Maxim model MAX738AIC, which shuts down the power supply to the LAN board 742 anytime the power supply within the PC 102 is unavailable or turned off. In particular, the 15 volt supply (DC_IN, PC_GND) is applied to the DC-to-DC converter IC 1448 by way of a filtering circuit which includes a pair of in-line ferrite bead inductors 1450 and 1452, capacitors 1454, 1456, 1458, 1460 and 1462 and an inductor 1464. A power on signal PRPWRON, as discussed above, available from the PC 102 indicates when the power supply voltage within the PC 102 has stabilized. This power on signal PRPWRON is applied to a shut-down terminal –SHDN of the DC-to-DC converter IC 1448. During normal conditions when the power supply within the PC 102 is available, a positive 5 volt supply will be available at the output terminal OUT and a DC_GND terminal. A filtering circuit, which includes a wire wound inductor 1464, ferrite bead inductors 1466 and 1468, a zener diode 1470 and a capacitor 1472 are used for stabilizing the output voltage. A capacitor 1474 is used for stabilizing. In addition, as shown in FIG. 46, a number of parallel connected capacitors 1476–1490 may be used for additional filtering.

In operation, when the power supply within the PC 102 is available, a 5 volt supply for the LAN board 742 will be available at the output terminal OUT of the DC-to-DC converter IC 1448 and DC_GND. When the power supply within the PC 102 falls below a predetermined voltage, the power on signal PRPWRON will go low, forcing the DC-to-DC converter IC 1448 to disconnect the output voltage at the output terminal OUT. Thus, anytime the power supply within the PC 102 is unavailable, no power will be supplied to the LAN card.

The heart of the LAN board 742 is a LAN controller 1492, for example a National Atlantic model No. DP83905 chip set, as illustrated in FIGS. 41A and 41C. The address bus of the LAN controller 1492 is connected to a pair of static random access memories (SRAMs) 1495 and 1497 (FIG. 41B). A read-only memory (ROM), for example, an electrically erasable programmable read-only memory (EEPROM) 1498 may be used, and programmed with a specific address for the LAN board 742 within the network (FIG. 41B). The address and data signals to the LAN controller 1492 are connected to the PC 102 by way of the bus switches 1112-1122 (FIG. 18) as discussed above. Thus, anytime power from the PC 102 is unavailable, the address and data signals to the LAN controller 1492 will be disconnected. A number of control signals from the PC 102 are applied to the LAN controller 1492. These control signals are shown within the dashed box 1500 (FIG. 41C), which may be conditional. In addition, a clock signal QATCLK can optionally be connected to the LAN controller 1492 by way of an input resistor 1520, but this resistor location is currently not populated, so the ISACLK input to the LAN controller 1492 is pulled high through resistor 1522 instead. The memory access control signals −SMRD, −SMWR, −MRD, −MWR, and −M16 are also pulled high (and thus inactive) by a plurality of pull-up resistors 1526-1534. In addition, a signal DWID is pulled low by a pull-down resistor 1536.

Data is received by the LAN controller 1492 by way of pins identified as RXI+ and RXI−. These pins RXI+ and RXI− are filtered by way of a pair of resistors 1538 and 1540 and a serially coupled capacitor 1542 and connected to input signals TPRX+ and TPRX−, which, in turn, are connected to a network server by way of a RJ-45 interface 1544 (FIG. 42).

Data is transmitted from the LAN controller 1492 by way of the pins identified as TXOD−, TXO+, TXO−, and TXPD+. These pins are coupled to the RJ-45 interface 1544 by way of input resistors 1544-1550. The transmit and receive signals from the LAN controller 1492 are applied to the RJ-45 interface 1544 by way of a 10BASE-T transformer 1552, for example a Valor model No. PE65427, and a common-mode choke 1554, for example a Pulse model No. SF1012. In addition, the input transmit and receive pins TXI− and RXI− pins are filtered by way of filtering capacitors 1556 and 1558. Likewise, the output transmit and receive pins TXO and RXO are filtered by filtering capacitors 1560 and 1562. As mentioned above, the common-mode choke 1554 is applied to a 10BASE-T transformer 1552 and ultimately to the RJ-45 interface for connection to the network server.

Figures 42, 43, 44:
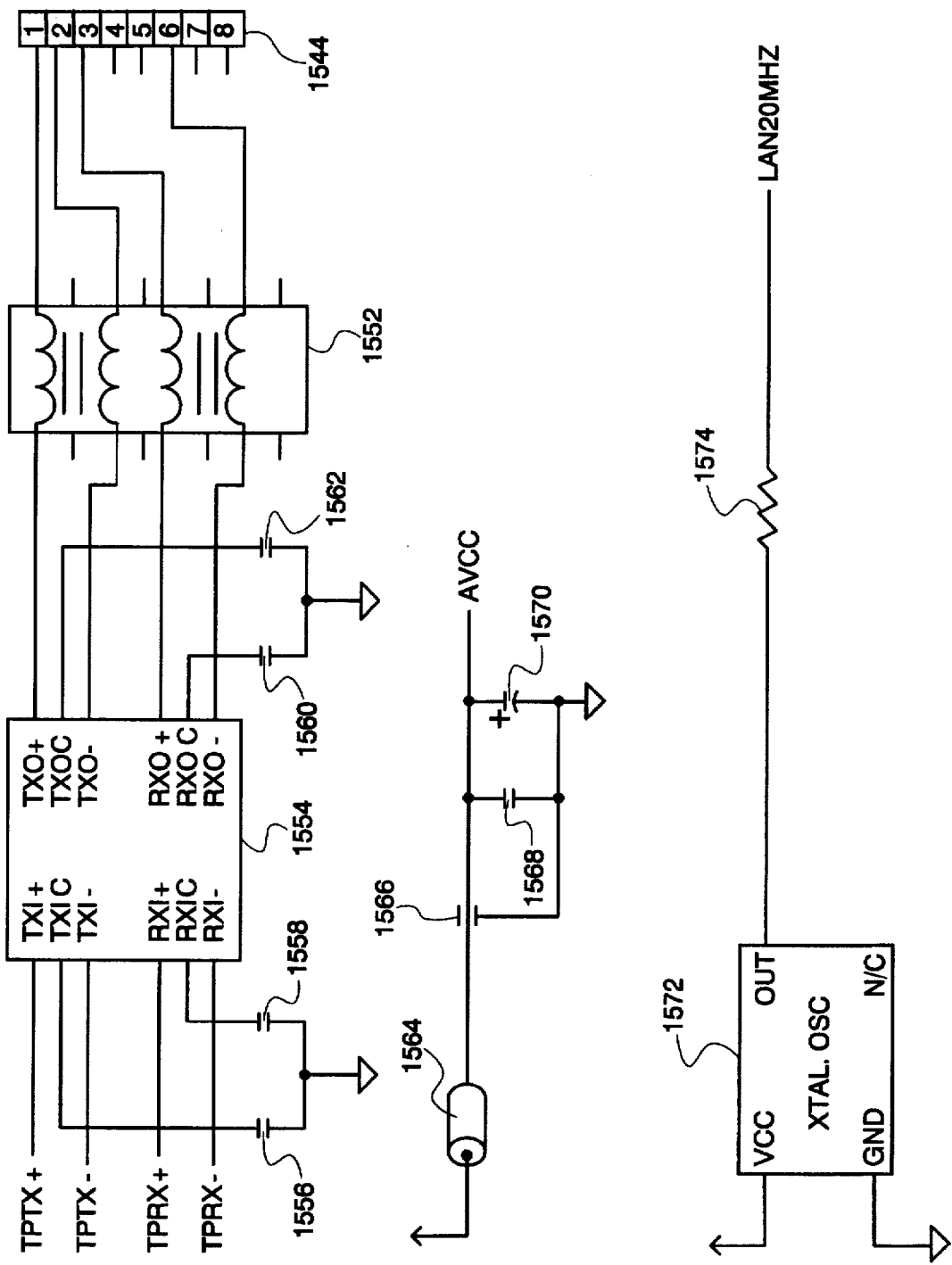

Additional filtering circuitry is shown in FIG. 43. In particular, the power supply voltage AVCC (FIG. 49A) is coupled to pin PLLVCC by way of a resistor 1567. In addition, the power supply for the LAN board 742 may be filtered by way of an in-line ferrite bead inductor 1564 and a plurality of capacitors 1566, 1568 and 1570 to develop a power supply voltage AVCC for the LAN controller 1492. As shown in FIG. 41C, additional capacitors 1494-1500 are connected to the power supply terminals PLLVCC, XVCC and ground on the LAN controller 1492.

The LAN controller 1492 requires a 20 megahertz clock signal. This 20 MHZ clock signal may be provided by a clock circuit 1572, for example, a model No. SG615P, as manufactured by Epson. The clock signal LAN 20 MHZ is available at the output terminal OUT of the clock circuit 1572 by way of an output resistor 1574.

In order to provide an indication of the status of the LAN controller 1492, a plurality of LEDs, 1578-1582, may be supplied to indicate the status of any serial communications by the LAN controller 1492. In particular, the LED 1578 is used to represent a situation when the LAN card, and in particular, the LAN controller 1492 is linked to a network server by way of the RJ-45 interface 1544 (FIG. 42). The LEDs 1580 and 1582 indicate when data has been either received from or is being transmitted to the network.

The LEDs 1578-1582 are all connected to the LAN controller 1492 by way of serially coupled resistors 1584, 1586 and 1588. The LAN controller 1492 also includes a configuration pin EECONFIG for configuring the LAN controller 1492. The configuration pin EECONFIG is tied to a reference voltage by the voltage divider resistors 1591 and 1593 (FIG. 41D).

As mentioned above, the active port replicator 104 includes a PCMCIA (personal computer memory card international association) interface. The PCMCIA interface is an industrial standard interface for an external bus for portable and small computers and accepts standard option cards to enable additional memory, fax modems or network cards to be quickly and easily installed in the system.

The PCMCIA interface is centered around a PCMCIA controller 1590 (FIGS. 48A-48D), for example a Cirrus Logic model No. CL-PD6720, two-socket PCMCIA host adapter chip, which provides the interface and logic between the system and two PCMCIA cards. The PCMCIA controller chip 1595 is capable of operating and supporting cards at both 3.3 volts and 5 volts. The PCMCIA controller chip 1595 is described in detail in "PCMCIA Host Adapters CL-PD6710/6720 Advanced Data Book" by Cirrus Logic, January 1993, herein incorporated by reference.

Figure 48A:
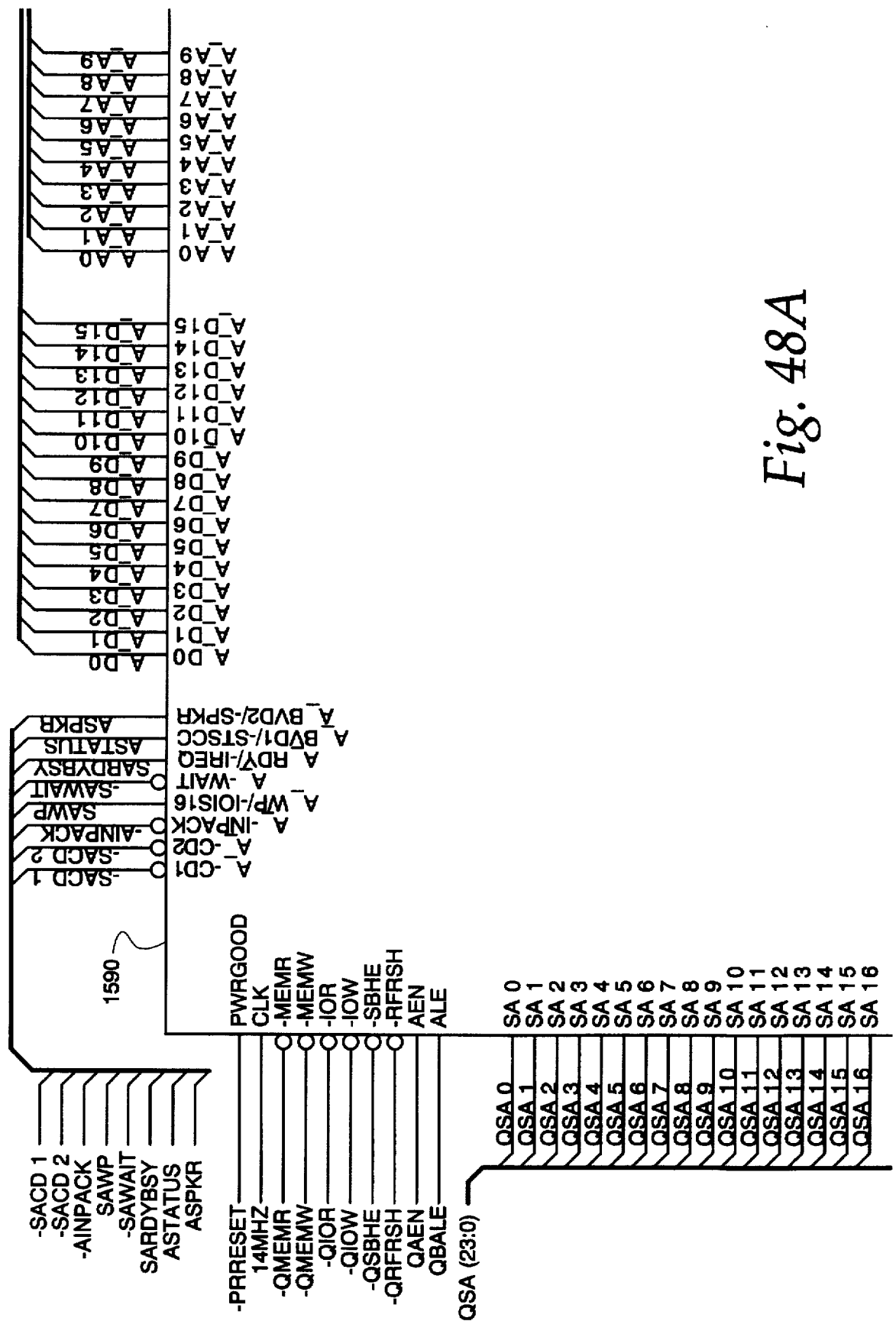
Figure 48B:
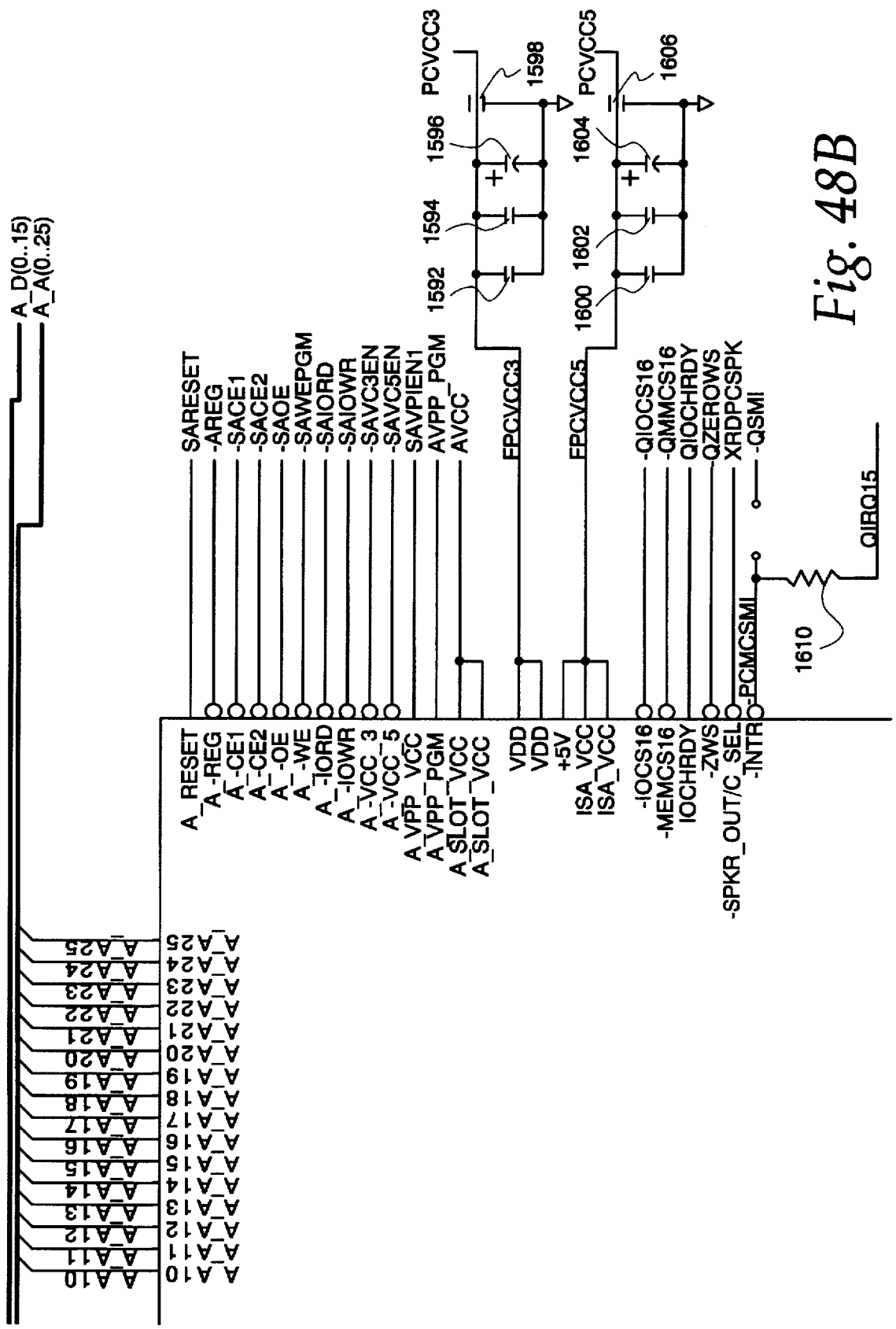
Figure 48C:
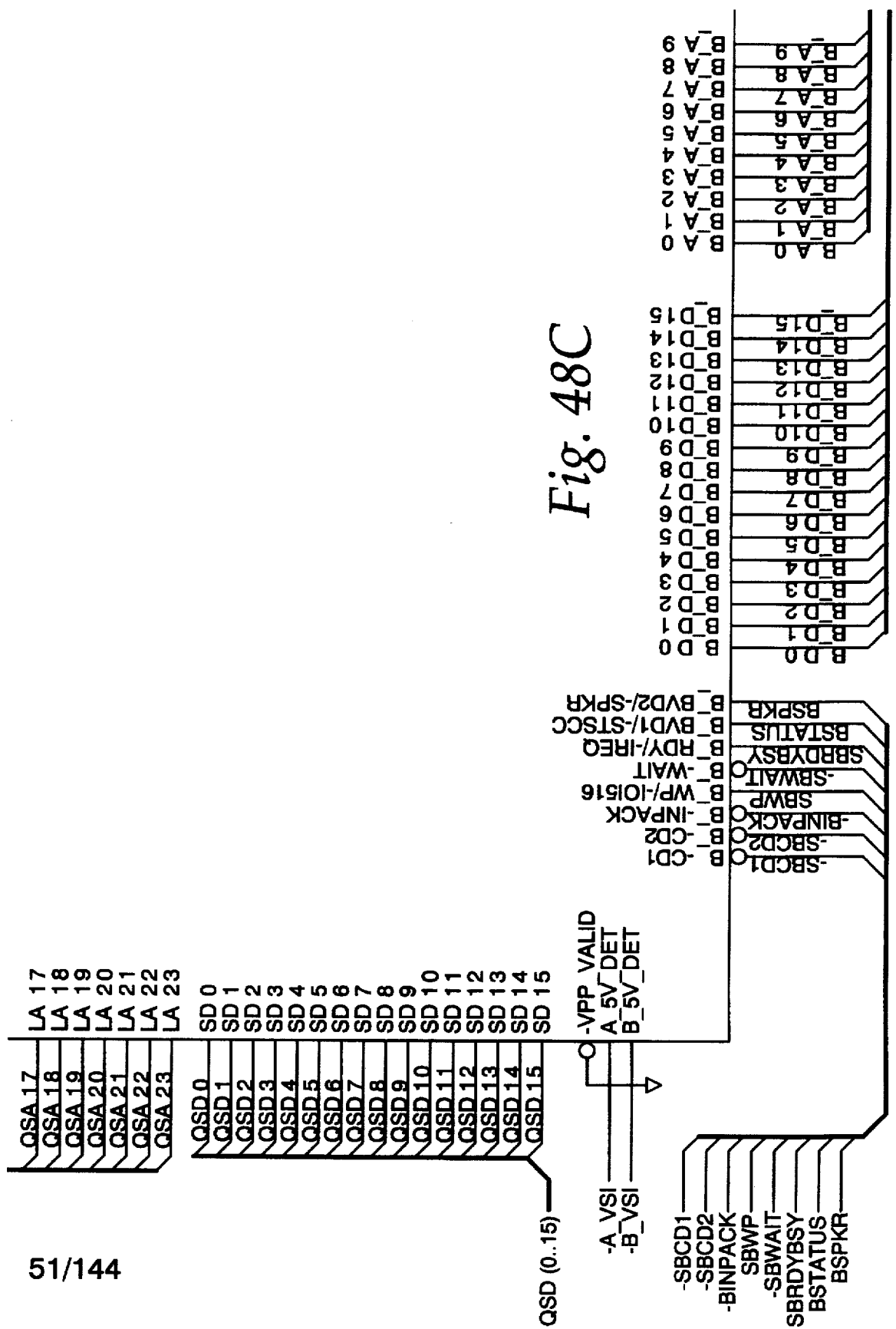
Figure 48D:
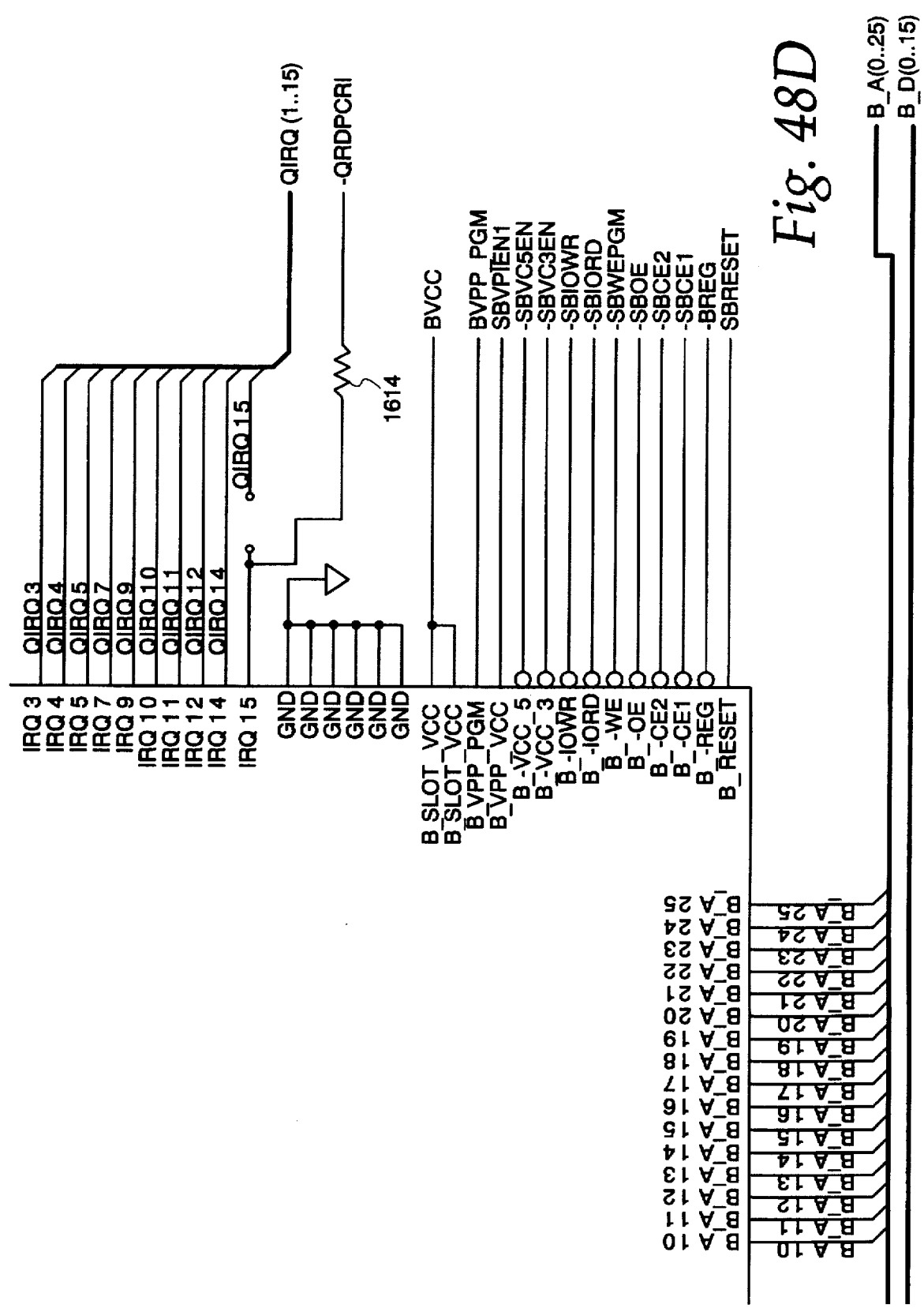

As shown in FIGS. 48B and 48D, additional circuitry is required for proper operation of the PCMCIA controller 1595. In particular, both 3 volt and 5 volt power supplies, PCVCC3 and PCVCC5, respectively, are applied to the controller 1595 by way of filtering capacitors 1596-1606 (FIG. 48B). In addition, resistors 1610-1614 are used at system build time to select the preferred signal routing to the interrupt signals IRQ 15, −RDPCRI, −SMI, and −INTR.

Figure 50:
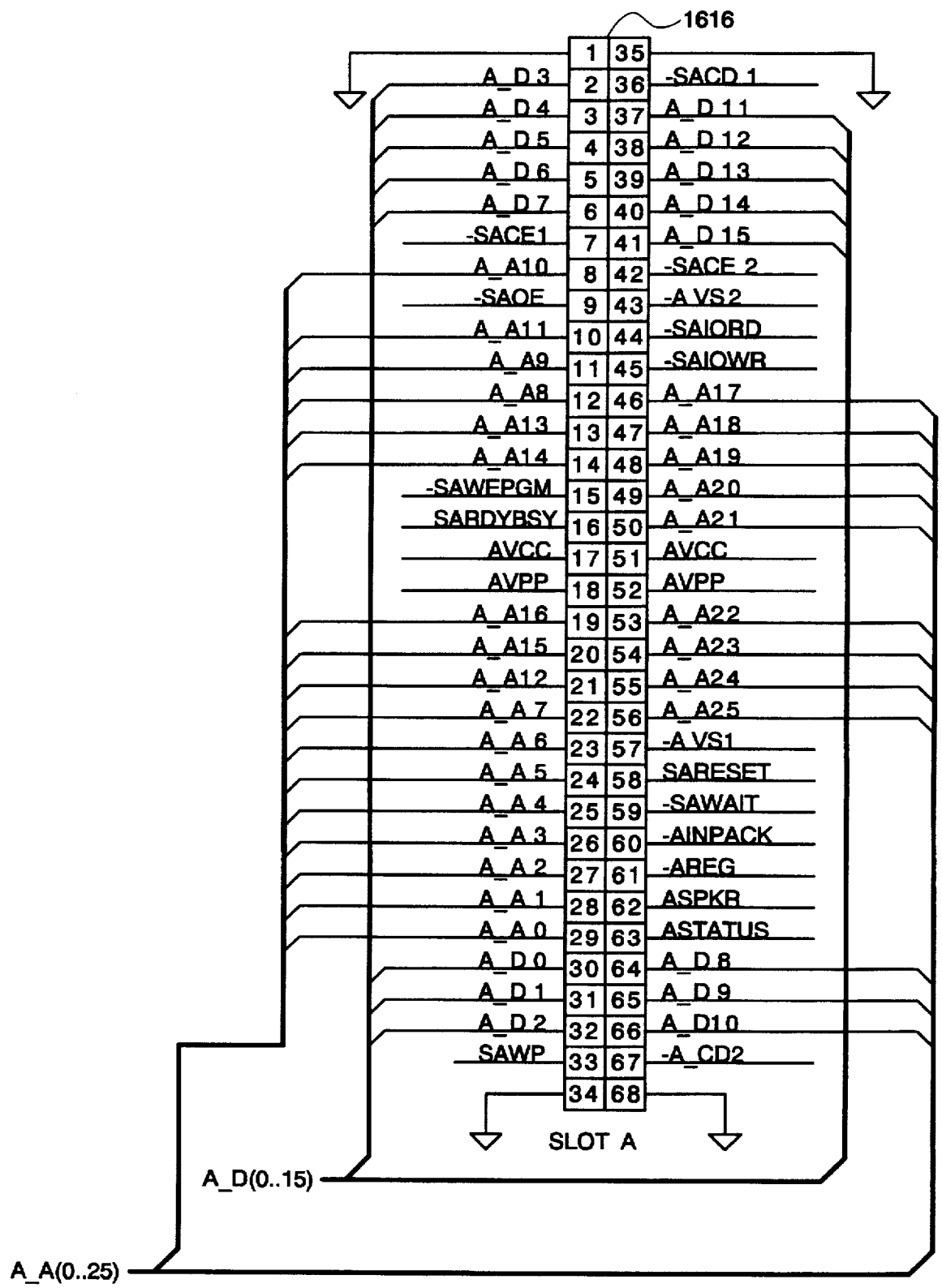
Figure 51:
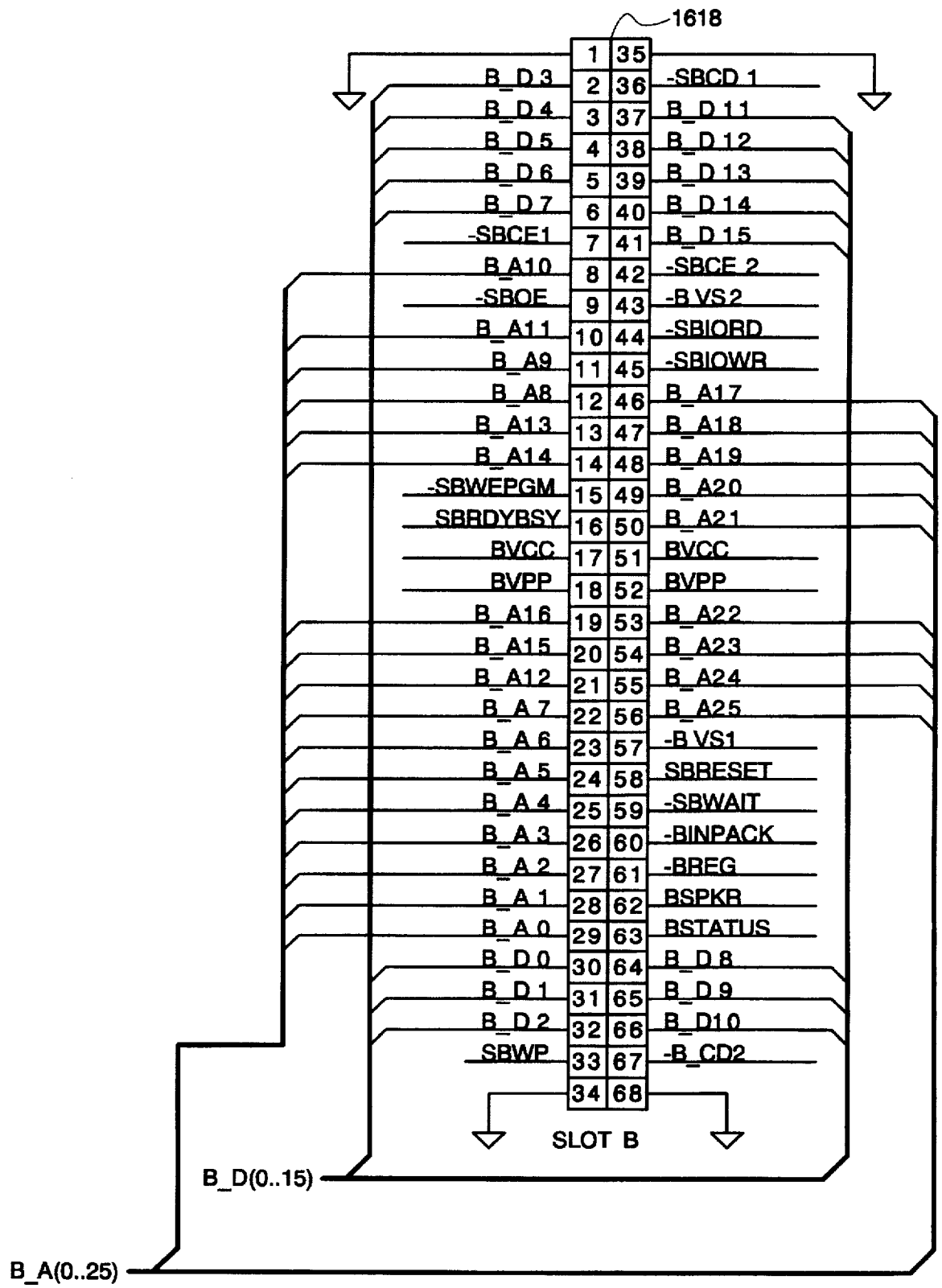

Referring to FIGS. 50 and 51, connectors 1616 and 1618 are for providing a connection between the PCMCIA controller 1595 and any PCMCIA option cards installed in either of the slots. Both of the connectors 1616 and 1618 are identical and represent a standard industrial interface between a PCMCIA option card, such as additional memory, fax modem, etc. and the PCMCIA controller 1590.

A 100-pin connector 1620 is used to connect the PCMCIA controller 1595 and associated circuitry (FIGS. 54A-54B) to the connector 1000 (FIG. 21A) on the main board 740 of the active port replicator 104. In order for the system 100 to detect whether a PCMCIA board 744 has been installed within the active port replicator 104, pin 94 of the connector 1620 is pulled low by way of a pull-down resistor 1622. Thus, when the connector 1620 on the PCMCIA board 744 is plugged into the mating connector 1000 (FIG. 21A) on the main board 740, that terminal is pulled low to represent that the PCMCIA board 744 is plugged into the main board 740.

Figure 55:
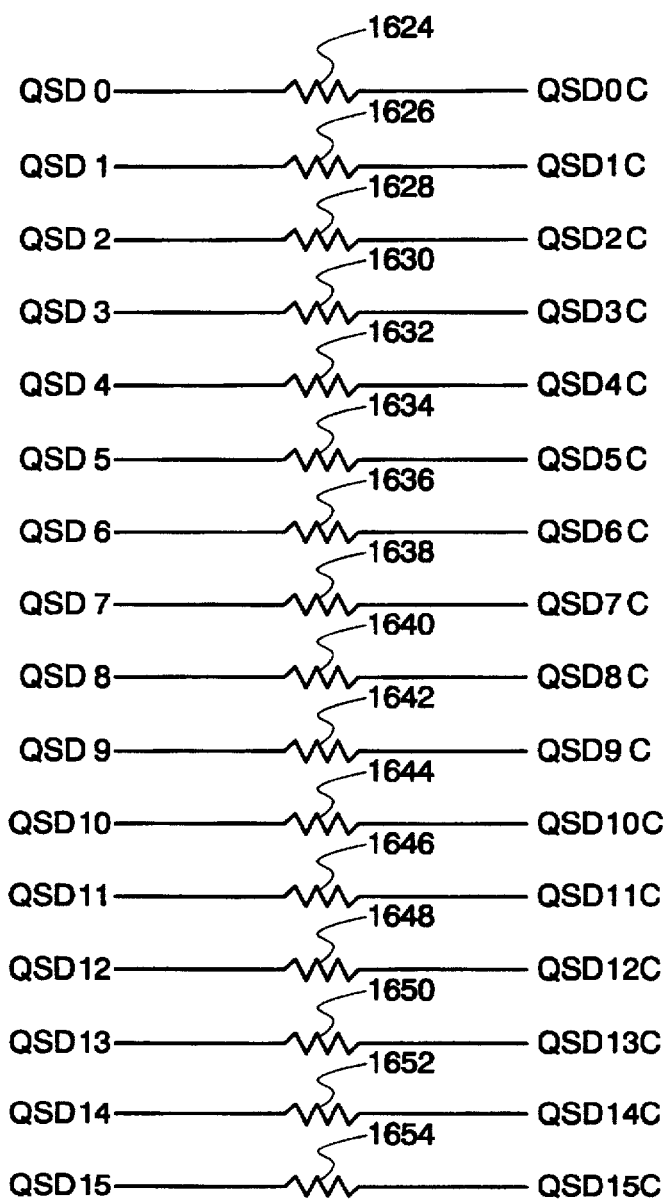

As mentioned above, the PCMCIA board 744 is automatically disconnected from the main board 740 when the power supply within the PC 102 is off or unavailable. In particular, various signals available at the PCMCIA connector 1620 are connected to the bus switches 1112-1122 (FIG. 18) by way of a plurality of input resistors 1624-1654 (FIG. 55).

Figure 49A:
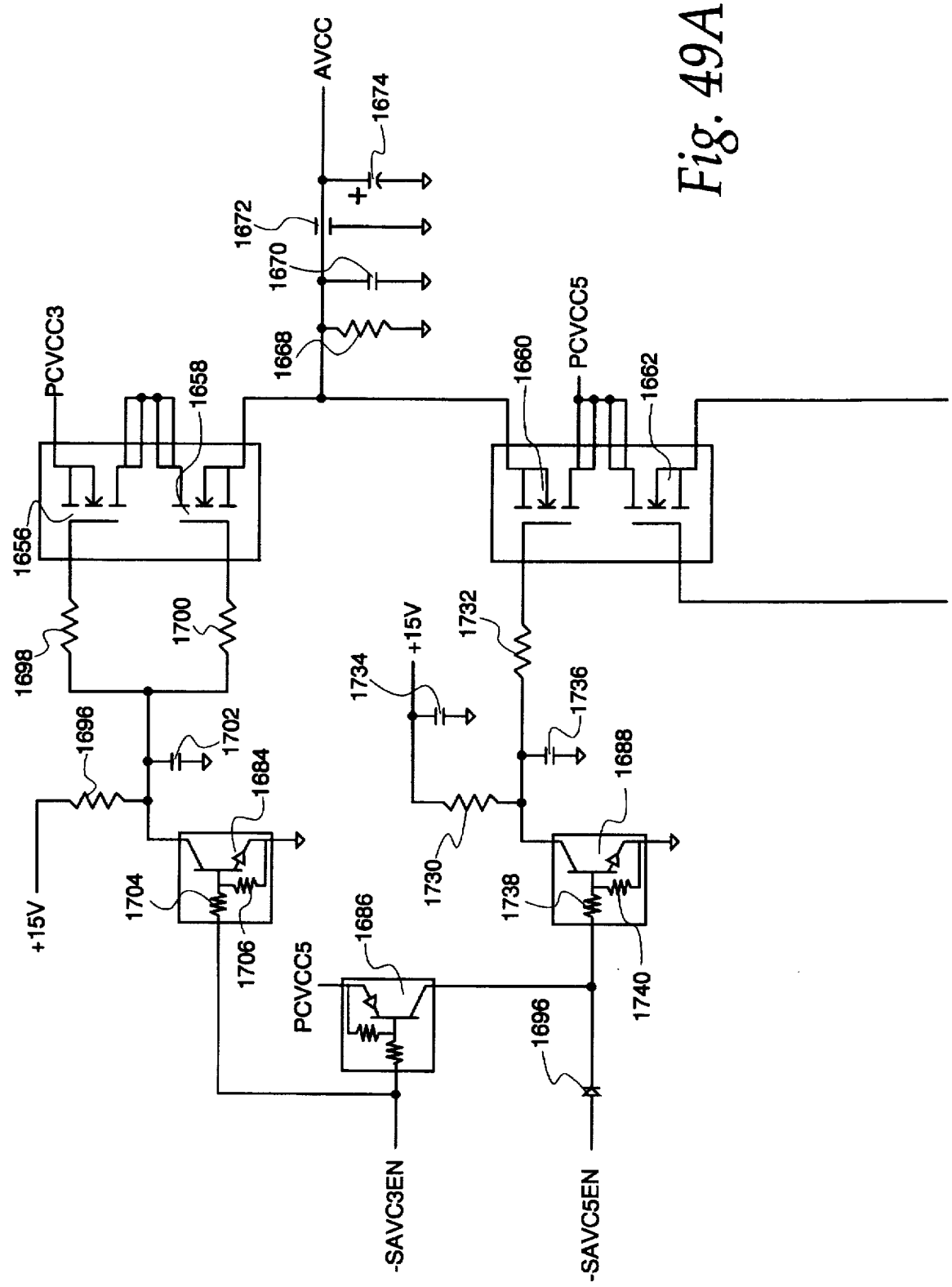
Figure 49B:
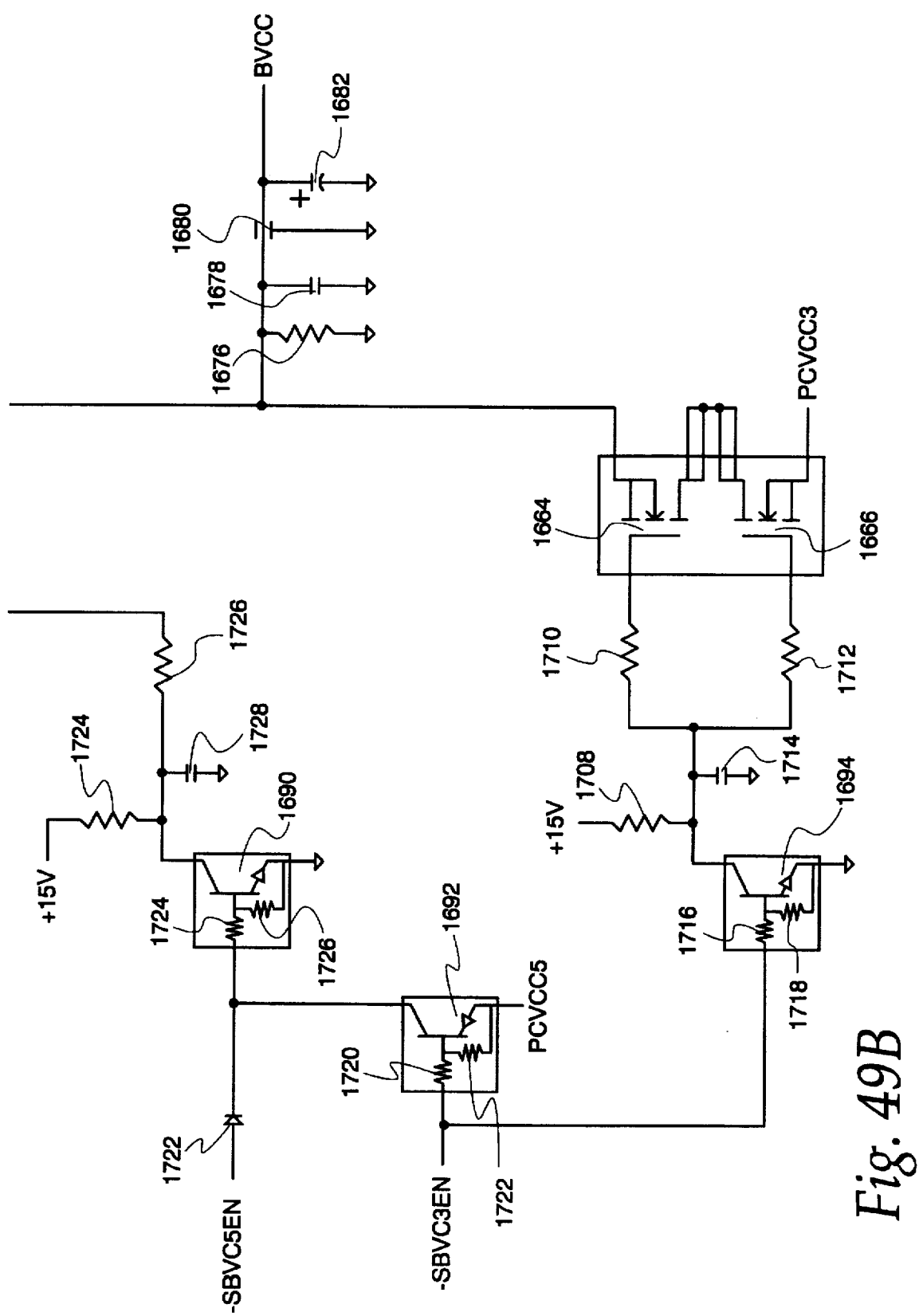

As mentioned above, the PCMCIA controller 1595 supports the 3.3 volt and 5 volt PCMCIA interface cards. The 3.3 and 5.5 volt power supply voltages are generated by the circuitry illustrated in FIGS. 63 and 64. The control of the particular power supply voltage applied to the PCMCIA card installed in the interface is controlled by the circuitry illustrated in FIGS. 49A and 49B. Since the PCMCIA interface supports two slots, two supply voltages AVCC and BVCC are developed. The supply voltage AVCC is utilized for a PCMCIA card installed in slot A while the supply voltage BVCC is used for the PCMCIA card installed in slot B of the PCMCIA interface. The particular voltage generated as the supply voltage for AVCC and BVCC is under the control of a plurality of field effect transistors (FETs) 1656–1666 (FIGS. 49A and 49B). The FETs 1656 and 1658 are cascaded together to enable a 3.3 volt power supply to be connected to a PCMCIA card installed in slot A. Similarly, the FETs 1660 and 1662 are connected to a 5 volt power supply PCVCC5 to enable a 5 volt power supply to be connected to the PCMCIA card in either slot A or slot B. The FET 1664 and 1666 are cascaded together to enable a 3.3 volt power supply PCVCC3 to be connected to the PCMCIA card in slot B.

As shown, the power supply AVCC for the power supply to the PCMCIA card for slot A is connected between the FETs 1656 and 1658 and 1660 to enable either a 3.3 or 5 volt power supply voltage to be connected to slot A. The 3.3 or 5 volt power supply connected to slot A is filtered by way of a resistor 1668 and a plurality of capacitors 1670, 1672 and 1674.

Similarly, the power supply voltage BVCC for the PCMCIA card installed in slot B is connected between the FETs 1662, 1664 and 1666 to enable either a 3.3 or 5 volt power supply to be connected to slot B. The 3.3 or 5 volt power supply connected to slot B is filtered by way of a resistor 1676 and a plurality of capacitors 1678, 1680 and 1682.

The FETs 1656 and 1658 are under the control of a pair of bipolar junction transistors (BJT) 1684 and 1686. The FETs 1660 and 1662 are under the control of a pair of BJTs 1688 and 1690, while the FETs 1664 and 1666 are under the control of a pair of BJTs 1692 and 1694. The BJTs 1684–1694, in turn, are under the control of 3 volt and 5 volt chip enable signals –SAVC3EN and –SAVC5EN, available from the PCMCIA controller 1595. In particular, a 15 volt power supply +15 volts is connected to the gates of the FETs 1656 and 1658 by way of a plurality of voltage dividing resistors 1696, 1698 and 1700. A capacitor 702 is connected between the gate and ground to stabilize the voltage connected to the gates of the FETs 1656 and 1658. When the BJT 1684, which includes biasing resistors 1704 and 1706 is off, a +15 volt power supply will be connected to the gates of the FETs 1656 and 1658 to connect the power supply voltage PCVCC3 to the supply voltage AVCC in slot A. Conversely, when the BJT 1684 is turned on, the +15 volt power supply is grounded to disable the FETs 1656 and 1658.

The enable signal from the PCMCIA controller 1595 –SAVC3EN is active low. In order to prevent the 5 volt power supply PCVCC5 from being connected to the slot A power supply AVCC at the same time as the 3 volt power supply, enable signal –SAVC3EN is applied to a BJT 1686. The BJT 1686 is a PNP-type transistor, that is turned on when the 3 volt power supply signal –SAVC3EN is active low. The 5 volt power supply PCVCC5 is connected to the emitter of the BJT 1686 while the collector is connected to a cathode side of a diode 1696. The anode side of the diode 1696 is connected to the 5 volt power supply signal –SAVC5EN. During conditions when the 3 volt power supply PCVCC3 is connected as the power supply in slot A, the 5 volt power supply PCVCC5 connected to the emitter of the BJT 1686 prevents the 5 volt power supply PCVCC5 from being connected to slot A by turning on the BJT 1688, which, in turn, disables the FETs 1660 and 1662. Similarly, the 3 volt power supply for slot B is under the control of the FET 1664 and 1666. The FETs 1664 and 1666 are under the control of the BJTs 1692 and 1694. In particular, a +15 volts is applied to the FETs 1664 and 1666 by way of a plurality of voltage dividing resistors 1708–1712. A capacitor 1714 is connected between the gates of the FETs 1664 and 1666 to stabilize the gate voltage.

As mentioned above, the +15 volt power supply is connected to the collector of the BJT 1694. During conditions when the BJT 1694 is nonconducting, the +15 volt supply will be connected to the gates of the FETs 1664 and 1666 to connect the 3 volt power supply voltage PCVCC3 to slot B. When the FET 1694, which includes biasing resistors 1716 and 1718, is conducting, the +15 volt supply will be connected to ground, thus disabling the FETs 1664 and 1666. The BJT 1694 is under the control of the 3 volt enable signal –SBVC3EN. The BJT 1692, which includes the biasing resistor 1720 and 1722, is a PNP-type transistor. Thus, when the 3 volt enable signal –SBVC3EN is active low, the BJT 1692 will be conducting; however, the BJT 1694 will be nonconducting, which, in turn, causes the FETs 1664 and 1666 to conduct and connect the 3 volt power supply voltage PCVCC3 to slot B. During such a condition, as mentioned above, when the BJT 1692 is conducting, the 5 volt power supply PCVCC5 will be disabled from being connected to slot B by way of the FETs 1660 and 1662. In particular, the collector of the BJT 1692 is connected to a cathode of a diode 1722. The collector of the BJT 1692 is also connected to the BJT 1690, which includes biasing resistors 1724 and 1726. The emitter of the BJT 1692 is connected to a 5 volt power supply voltage PCVCC5. Thus, when the 3 volt power supply enable signal –SBVC3EN is active low, the BJT 1692 will be conducting, which turns on the BJT 1690. During a condition when the BJT 1690 is conducting, a 15 volt power supply, normally connected to the gates of the FET 1660 and 1662 by way of a pair of voltage dividing resistors 1724 and 1726 and a capacitor 1728 will be connected to ground by way of the BJT 1690, thus disabling the FET 1662. Similarly, when the 3 volt power supply voltage PCVCC3 is connected to slot A, the BJT 1688 disables the FET 1660 to prevent connection of the 5 volt power supply voltage PCVCC5 to slot A. In particular, a 15 volt supply is connected to the gate of the FET 1660 by way of a pair of voltage dividing resistors 1730, 1732 and a pair of capacitors 1734, 1736. During conditions when the 3 volt power supply is selected, the BJT 1688, which includes the biasing resistor 1738 and 1740 will be forced into a conduction state by way of the BJT 1686. When the BJT 1688 is conducting, the 15 volt power supply +15 v will be connected to ground, thus disabling the FET 1660.

As mentioned above, the PCMCIA option cards in slots A and B of the PCMCIA interface may be operated at either 3.3 volts or 5 volts. When the PCMCIA option card in slot A is operated at 5 volts DC, the 5 volt enable signal –SAVCSEN will be active low, while the 3.3 volt enable signal –SAVC3EN will be high, and thus disabled. During conditions when the 5 volt power supply enable signal –SAVC5EN is active low, the BJT 1688 will be in a nonconducting state, thus connecting the 15 volt supply +15 v to the gate of the FET 1660, which, in turn, connects the 5 volt power supply PCVCC5 to slot A. During such a condition, as mentioned above, the 3 volt power supply enable signal –SAVC3EN will be high, which causes the BJT 1684 to conduct. Since the collector terminal of the BJT 1684 is connected to a +15 volt supply while the emitter is grounded, the gates of the FETs 1656 and 1658 will be effectively grounded, thus preventing the connection of the 3 volt power supply PCVCC3 to the slot A. This applies in an identical fashion to the circuitry for slot B.

Figure 64B:
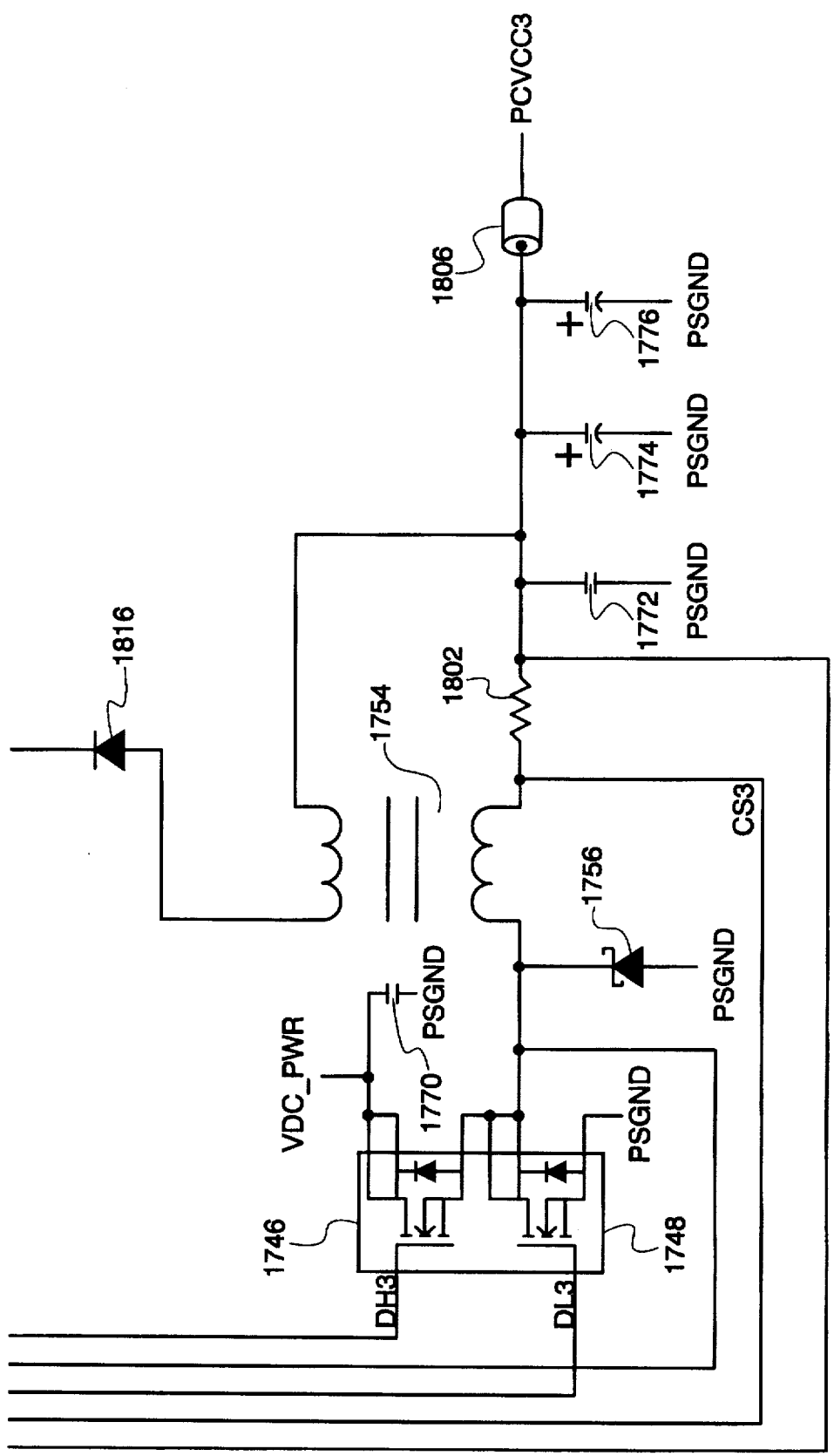
Figure 64C:
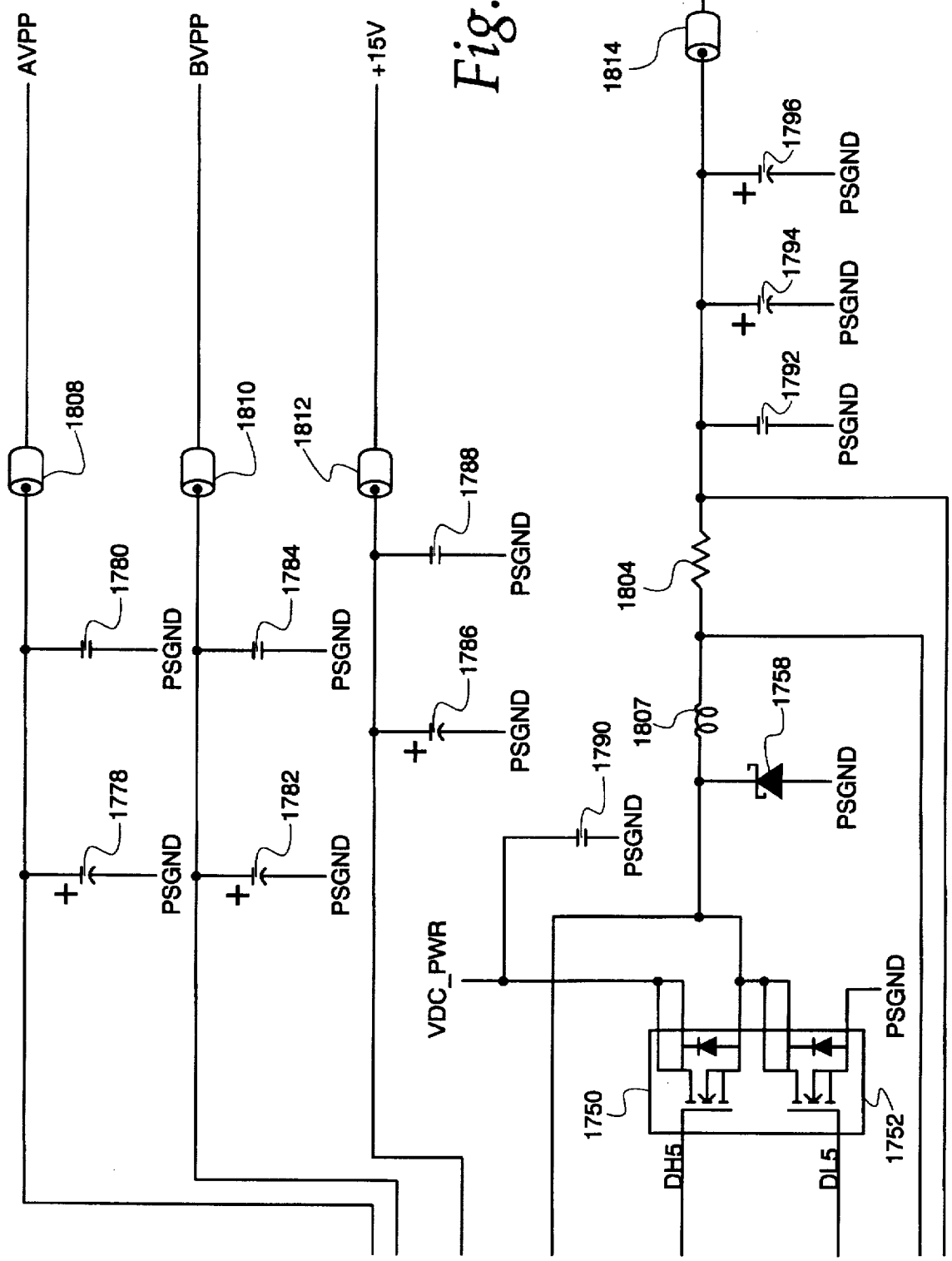
Figure 66:
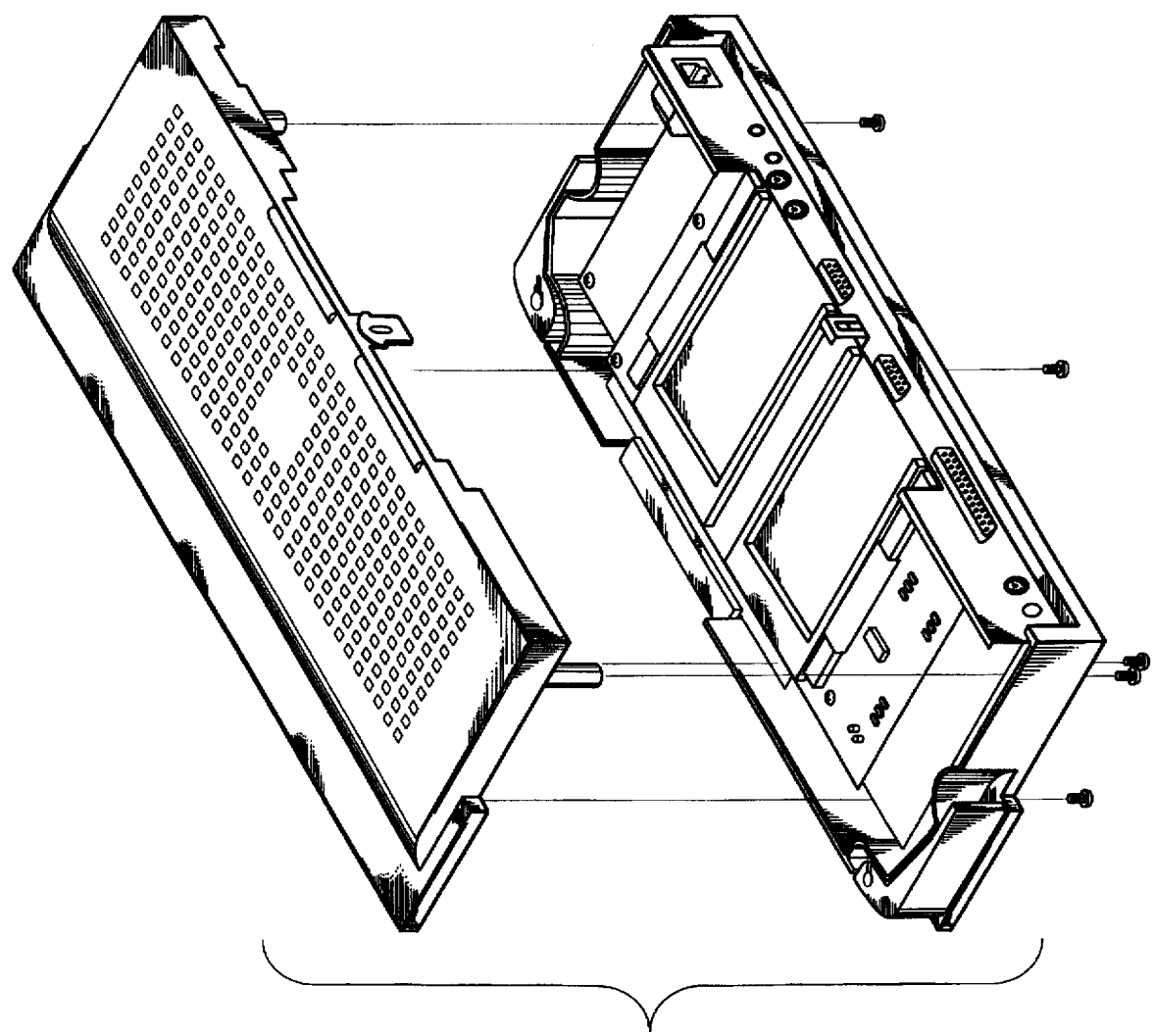
FIGS. 66–71 are perspective views of the active port replicator in accordance with the present invention in various stages of assembly.

The power supply for the active port replicator 104 is illustrated in FIGS. 63 and 64. In particular, the power supply provides the +15 v power supply described above, as well as the 5 volt power supply PCVCC5 and 3.3 volt power supply PCVCC3, as well as the programming voltage power supplies AVPP and BVPP which can be 0 volts, 5 volts, or 12 volts for the controller 1590. Referring to FIG. 64A, the heart of the power supply for the PCMCIA sub board of the active port replicator 104 is a power supply controller 1742, for example a Maxim model No. MAX782, which provides multiple outputs for use with the PCMCIA controller 1590. As described in detail in Maxim, "A Triple-Output Power Supply Controller For Notebook Computers", herein incorporated by reference, includes dual 3.3 and 5 volt outputs, dual programming voltage outputs, as well as a +15 volt output. The DC outputs are shown in FIGS. 63 and 64.

Referring to FIG. 64A, a power on signal PRPWRON as discussed above is connected to the shut-down terminal SHDN− of the power supply controller 1742. As mentioned above, the power on signal PRPWRON is used to shut down the power supply to the PCMCIA controller board 744 whenever the power supply for the PC 102 is below a predetermined value or is shut down.

The power supply circuitry for producing the various output DC voltages includes four FETS 1746–1752, a transformer 1754, a pair of Schottky diodes 1756 and 1758, a plurality of capacitors 1760–1800, a pair of resistors 1802 and 1804, an inductor 1807, a plurality of ferrite bead inductors 1806–1814, a plurality of diodes 1816–1820.

The input power supply to the power supply controller 1742 is from the 15 volt power supply DC_IN, referenced to DC_GND, available from the main connector 1620 (FIG. 54A), which, in turn, is supplied by the power supply on the main board 740. The 15 volt power supply, available from the connector 1620, is filtered by a filtering circuit which includes the capacitors 1822–1828 and the ferrite bead inductors 1830–1834.

Figure 52:
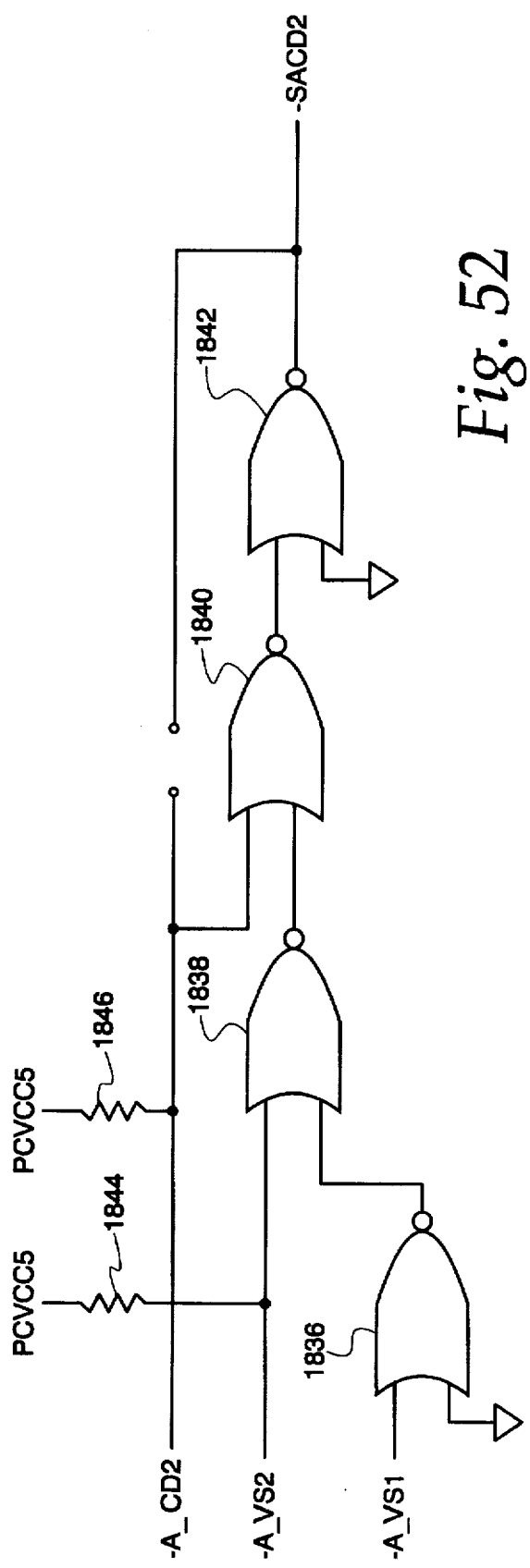
Figure 53:
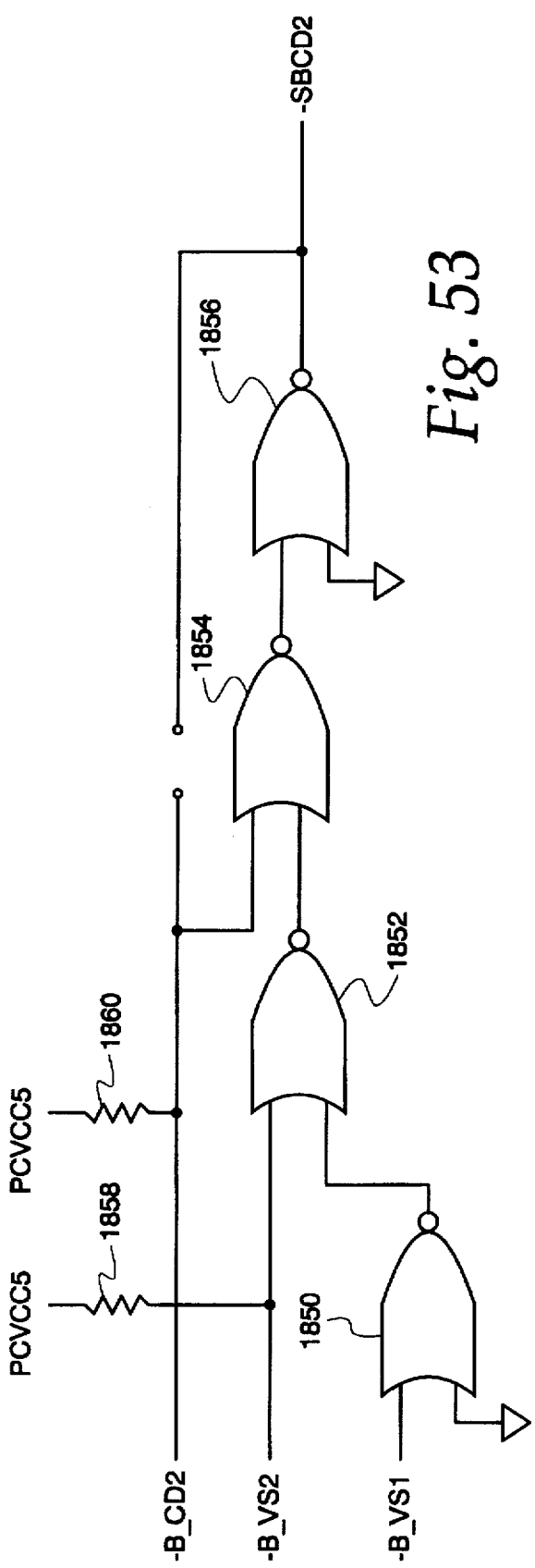

In order to conserve battery power, the circuitry illustrated in FIGS. 52 and 53 monitors the PCMCIA slots A and B and determines which slot has a PCMCIA option card plugged in, which, in turn, is fed back to the PCMCIA controller 1595 to switch on a power supply to that slot which has a PCMCIA card plugged into it. In particular, referring to FIGS. 52 and 53, FIG. 52 refers to the circuitry for detecting whether a PCMCIA option card is plugged into slot while FIG. 53 illustrates the circuitry for determining whether a PCMCIA option card is plugged into slot B. Referring first to FIG. 52, the circuitry monitors three pins, −A_CD2, —A_VS2 and −A_VS1, on the 68-pin connector 616 (FIG. 50) for slot A. The logic states for these three pins of the connector varies as a function of whether a PCMCIA option card is plugged into slot A. The circuitry includes four NOR gates 1836, 1838, 1840 and 1842. In addition, the inputs of two of the gates 1838 and 1840 are provided with a 5 volt (logical 1) input by way of the 5 volt power supply PCVCC5 and input resistors 1844 and 1846. If a PCMCIA card is plugged into slot A, the output signal of the NOR gate 1842 −SACD2 will be active low. If a PCMCIA option card is not plugged into slot A, the output signal −SACD2 will be high.

The circuitry for monitoring whether a PCMCIA option card is plugged into slot B includes four NOR gates 1850, 1852, 1854 and 1856. Signals from the 5 volt power supply PCVVCC5 representing a logical 1 are applied to the circuit by way of input resistors 1858 and 1860. In the event that a PCMCIA option card is plugged into slot B, the output signal −SBCD2 will be active low. When slot B is open, the output signal −SBCD2 will be high.

The signals −SADC2 and −SBCD2 are applied to the PCMCIA controller 1590 (FIG. 48) to indicate whether PCMCIA option cards are plugged into slots A and B. These signals −SACD2 and −SBCD2 are applied to the PCMCIA controller 1590, which, in turn, generates enable signals SAVP1EN1 and SBVP1EN1, which, in turn, are used with the logic circuitry illustrated in FIGS. 60 and 61 to generate the power control signals SAVP1EN0 and SBVP1EN0. As illustrated in FIG. 64A, the power supply control signals SAVP1EN1, SAVP1EN0, SBVP1EN1 and SBVP1EN0 are used to control the power supply controller 1742 (FIG. 64A) to provide either a 3 volt power supply voltage PCVCC3 or 5 volt power supply voltage PCVCC5 to slot A or B as discussed in connection with FIG. 49 for the A and B slots of the PCMCIA interface when PCMCIA option cards are plugged into these slots A and B. Referring back to FIGS. 60 and 61, the logic circuitry for generating the enable signals SAVP1EN0 and SBVP1EN0 includes the AND gates 1864 and 1866, OR gates 1868 and 1870 and NOT gates 1872 and 1874. The enable control signals −SAVC5EN, SAVP1EN1, −SBVC5EN and SBVP1EN1 are applied to the inputs of the AND gates 1864 and 1866. The 5 volt supply voltage for the slots A and B enable control signal −SAVC5EN and −SBVC5EN is programmable and available at various pins on the PCMCIA controller 1595. Signals A_VPP_PGM and B_VPP_PGM are applied to the AND gates 1864 and 1866 by way of the NOT gates 1872 and 1874, as well as to the OR gates 1868 and 1870. These signals A_VPP_PGM and B_VPP_PGM represent programming voltage enable signals for slots A and B.

The circuitry in FIG. 59, which includes a plurality of NOT gates 1876–1884, a plurality of diodes 1886–1892, a plurality of pull-down resistors 1894–1900 and a plurality of OR gates 1902–1906, provides a signal −RDPCACT which indicates that the PCMCIA controller 1595 is active. This signal −RDPCACT is applied to the connector 620 (FIG. 54) and routed back to the main board 740 to indicate to the main board 740 when the PCMCIA controller 1595 is active. In particular, various chip enable signals −SACE 1, −SACE 2, −SBCE 1, and −SBCE 2, available as output pins on the PCMCIA controller 1595, are used to enable PCMCIA option cards plugged into slots A and B. In particular, the chip enable signals −SACE 1 and −SACE 2 are applied to the PCMCIA connector 1660 for slot A, while the chip enable signals −SBCE 1 and −SBCE 2 are applied to the PCMCIA connector 1618 for slot B. Thus, anytime the PCMCIA controller 1590 selects one of the PCMCIA option cards in slots A or B, one or more of the PCMCIA chip enable signals −SACE 1, −SACE 2, −SBCE 1 and −SBCE 2 will be active low. These signals, −SACE 1, −SACE 2, −SBCE 1 and −SBCE 2 are applied to the NOT gates 1876 to 1888 to reverse their polarity. The outputs of the NOT gates are applied to the diodes 1886 and 1892. The diodes 1886–1892 are used to prevent backpowering of the system. The cathode sides of the diodes 1886–1892 are pulled low by way of the pull-down resistors 1894–1900 to enable the diodes 1886–1892 to conduct when any of the chip enable signals −SACE 1, −SACE 2, −SBCE 1 or −SBCE 2 are active low. The diodes 1886–1892 are, in turn, connected to the OR gates 1902 and 1904. In particular, the chip enable signals −SACE 1 and −SACE 2 are applied to the OR gate 1902 by way of the NOT gates 1876, 1878 and diodes 1886, 1888. With such a configuration, the output of the OR gate 1902 will be high whenever one or both of the chip enable signals −SACE 1 or −SACE 2 are active low, indicating activity of the PCMCIA option card within slot A. Similarly, the chip enable signals for slot B, −SBCE 1 and −SBCE 2 are applied to the OR gate 1904 by way of the NOT gates 1880, 1882 and the diodes 1990 and 1992. The output of the OR gate 1904 will be active high whenever one or both of the chip enable signals for slot B, −SBCE 1 or −SBCE 2, is active low, indicating activity for the PCMCIA option card in slot B. The output of the OR gates 1902 and 1904 are applied to the OR gate 1906. The output of the OR gate 1906 will thus be active high anytime any one of the chip enable signals for slot A, −SACE 1, −SACE 2, or slot B, −SBCE 1, −SBCE 2, are enabled. The output of the OR gate 1906 is applied to the NOT gate 1884 to provide an active low PCMCIA activity signal −RDPCACT. This PCMCIA activity signal −RDPCACT will be active low anytime any one or more of the chip enable signals −SACE 1, −SACE 2, −SBCE 1 or −SBCE 2 is active low. The PCMCIA activity signal −RDPCACT is connected back to the main board by way of the main PCMCIA connector 1620 (FIG. 54).

Since the PCMCIA controller 1595 supports audio speaker outputs, a circuit is provided in FIG. 62 to provide an active high speaker mute signal QRDPCSPK during a system reset. In particular, an active high speaker output signal, −XRDPCSPK, available at pin 202 of the PCMCIA controller 1595 is tied to ground by way of a BJT 1908, which includes biasing resistors 1910 and 1912. The speaker output signal XRDPCSPK is applied to a NOT gate 1916 to generate an active high mute signal QRDPCSPK that is routed back to the main board by way of the main PCMCIA connector 1620 (FIG. 54). The BJT 1908 is under the control of the system reset signal −PRRESET, available at the main PCMCIA connector 1620 (FIG. 54) from the main board. The main system reset signal −PRRESET is filtered by a filtering circuit which includes a resistor 1918 and a capacitor 920 and applied to a NOT gate 1922. The output of the NOT gate is applied to the biasing resistor 1910 for the BJT 1908. During system reset, the system reset signal −PRRESET, which is active low, will cause the BJT 1908 to conduct, thus tying the speaker mute signal XRDPCSPK to ground, thus forcing the signal low. The low speaker mute signal XRDPCSPK will then be applied to the NOT gate 1916, whose output QRDSPSK will be high during system reset.

FIGS. 56–58 show various miscellaneous circuits for the PCMCIA controller 1590. Referring first to FIG. 56, a plurality of spare gates 1926–1938 are illustrated, which are pulled low by pull-down resistors 1940–1944. FIG. 57 is a filtering circuit for filtering the 5 volt power supply voltage PCVCC5. In particular, the 5 volt power supply voltage PCVCC5 is tied low by a plurality of capacitors 1946–1964. Lastly, FIG. 58 illustrates a 14.318 MHZ clock circuit for the PCMCIA controller 1595. The clock circuit is centered around a clock generator 1966, for example a model No. 14.3181M, by Epson. A power supply for the clock generator 1966 is connected to the 5 volt supply voltage PCVCC5 while the ground connection GND is connected to system ground. The output enable OE for the clock generator 1966 is enabled by the 5 volt power supply voltage PCVCC5 which is connected to the operate enable terminal OE of the clock generator 1966 by way of a current-limiting resistor 1968. The output of the clock generator 1966, available at the OUT terminal, is a 14 Mhz signal for use by the PCMCIA controller 1590.

Figure 70:
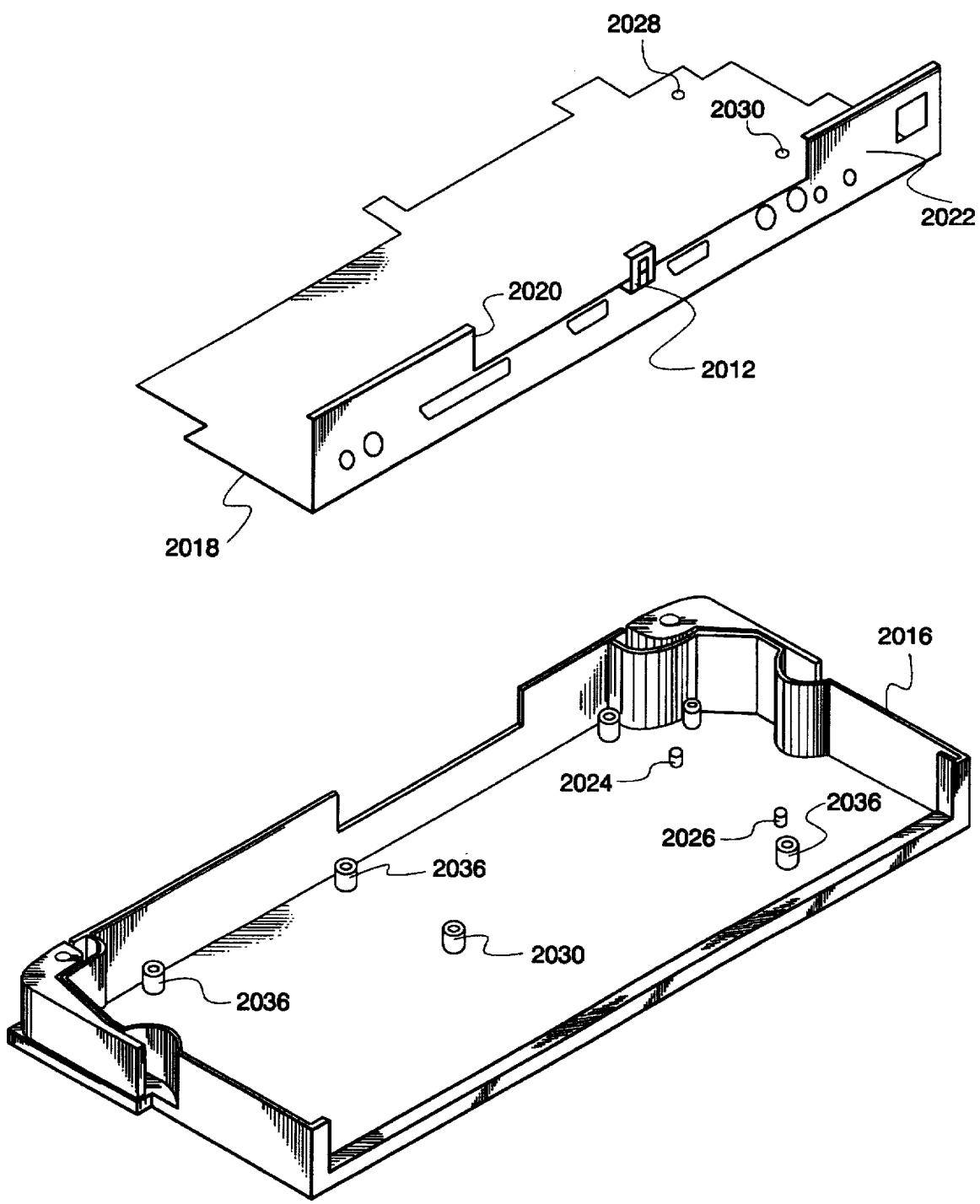
Figure 71:
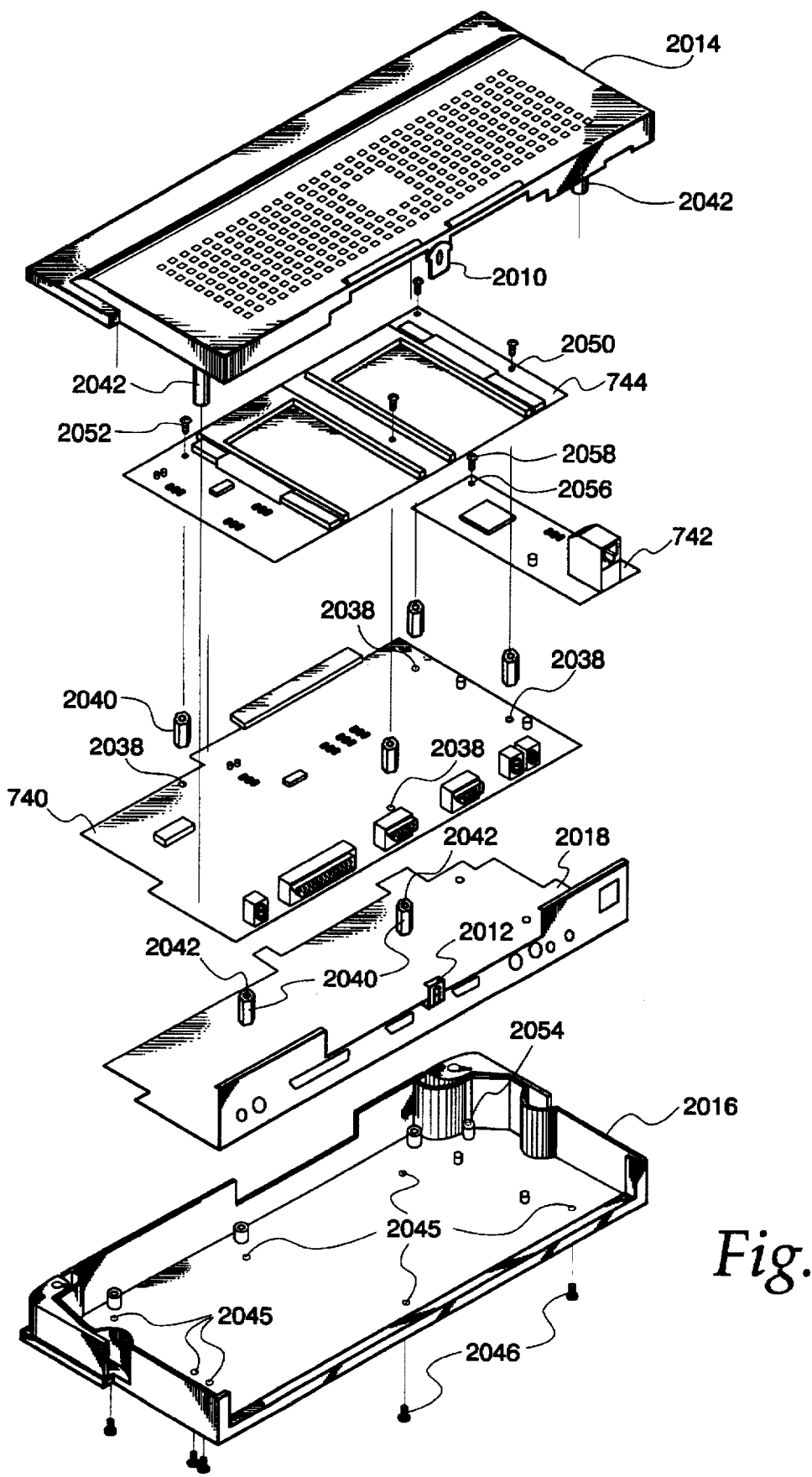
Figure 72:
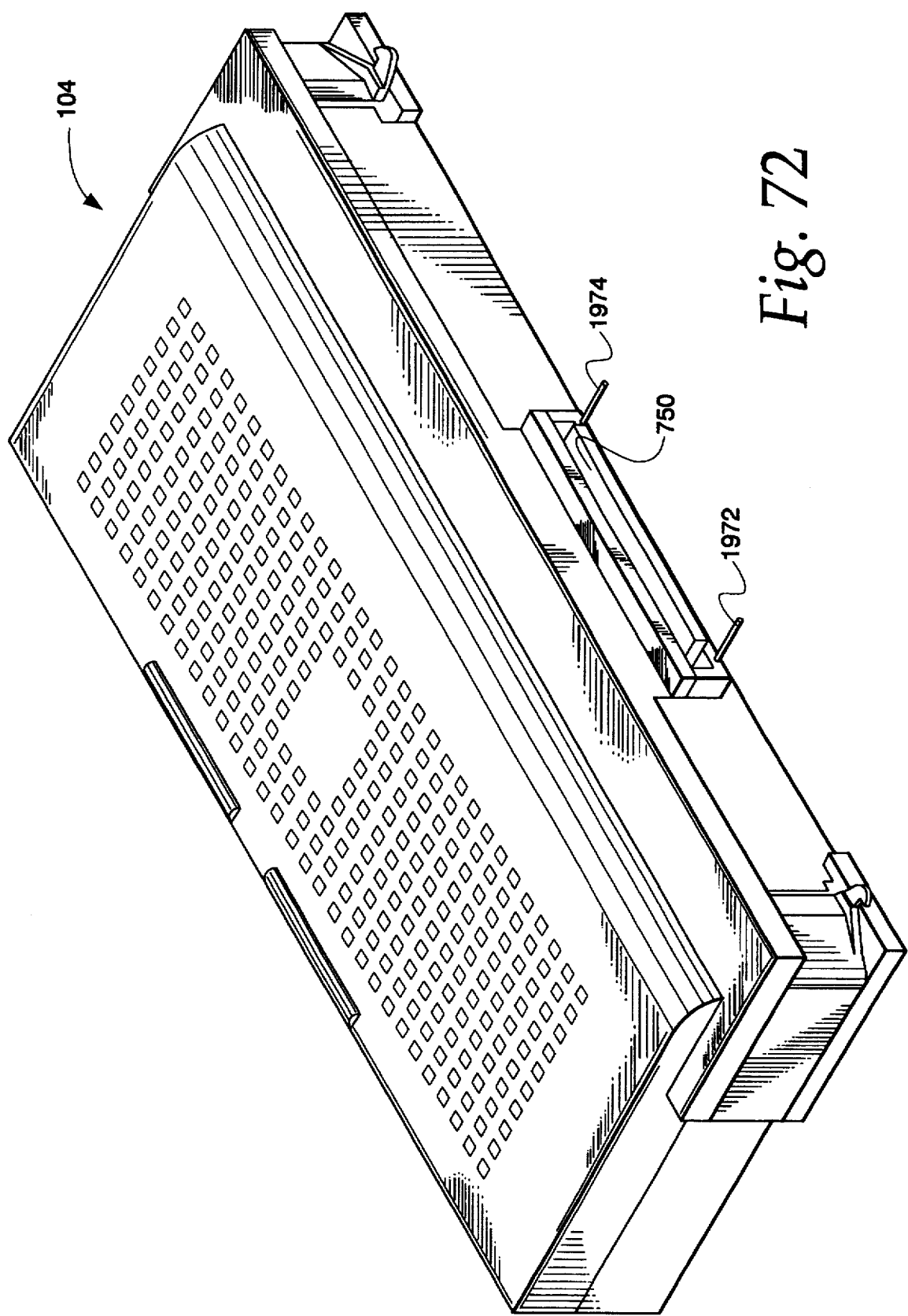
FIG. 72 is a perspective view of the active port replicator in accordance with the present invention illustrating the docking system for docking the active port replicator to a personal computer.
Figure 73A:
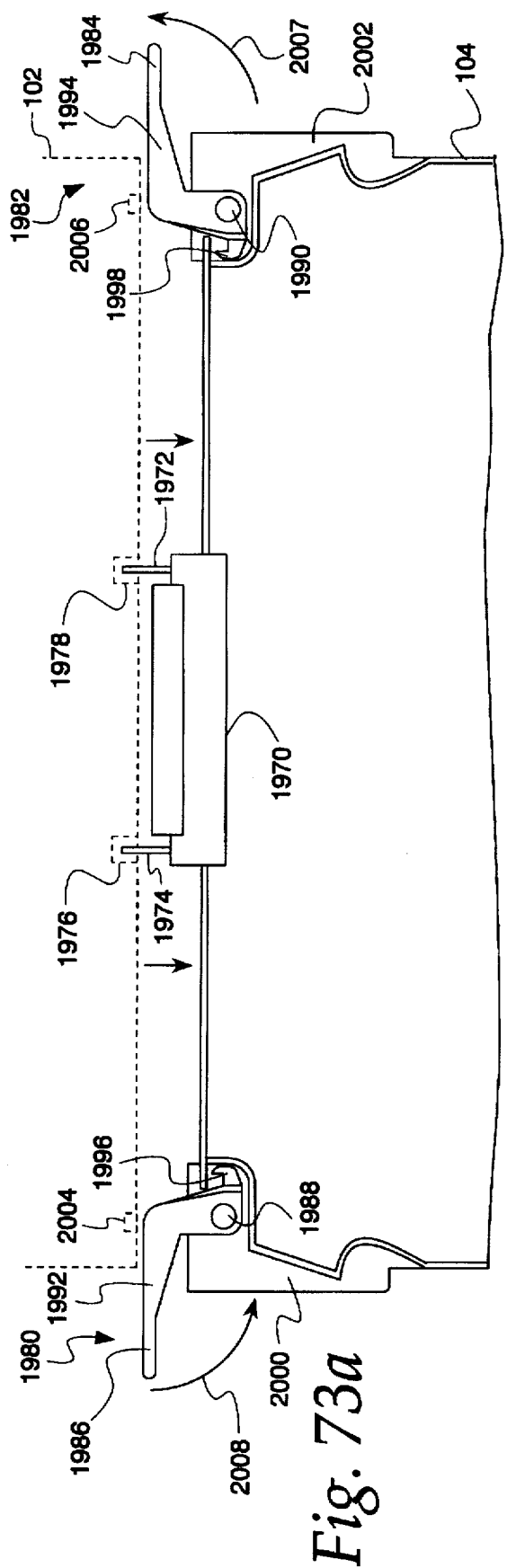
FIG. 73A is a partial plan view of a latch assembly for the active port replicator in accordance with the present invention shown with a personal computer shown in phantom just prior to being docked to the active port replicator and with the latch assembly in an unlatched position.

The physical drawings for the active port replicator 104 are illustrated in FIGS. 65–73. Referring to FIG. 65, as mentioned above, the active port replicator 104 includes a power port 132 for connection to an AC to DC converter, such as the AC to DC converter 126 (FIG. 1) and a power port 138 for providing DC power to the external flexible bay 116 as discussed above. In addition, the active port replicator 104 includes a parallel port 114, a serial port 119 and video port 110. The video port 119 enables the PC 102 to be connected to an external monitor 106 by way of the active port replicator 104. As mentioned above, the active port replicator 104 is provided with two type PS/2 ports 120 and 121. These type PS/2 ports 120 and 121 enable the PC 102 to be connected up to an external mouse 122 (FIG. 1) as well as an external keyboard (not shown) at the same time. The active port replicator 104 further includes an audio line in plug 1280 and an audio line out plug 1282 to enable the active port replicator 104 to be connected to an external microphone (not shown) and an external speaker (not shown). The docking side of the active port replicator is illustrated in FIGS. 72 and 73. The active port replicator 104 includes a 152 pin pinless connector 750 (FIG. 72) that is adapted to mate with the 152 pin pinless connector disposed on the rear of the PC 102. An important aspect of the invention is a pair of guide pins 1972 and 1974, disposed on opposing sides of the pinless connector 750 for guiding the insertion of the connector 1970 on the rear of the active port replicator 104 relative to the corresponding connector on the rear of the PC 102. As shown best in FIG. 73A, the guide pins 1972 and 1974 are adapted to be received in aligned apertures 1976 and 1978 on the rear of the PC 102. The orientation of the guide pins 1972 and 1974 relative to the apertures 1976 and 1978 provides for proper alignment of the connector 1970 on the rear of the active port replicator relative to the main connector 750 on the rear of the PC 102.

Figure 73B:
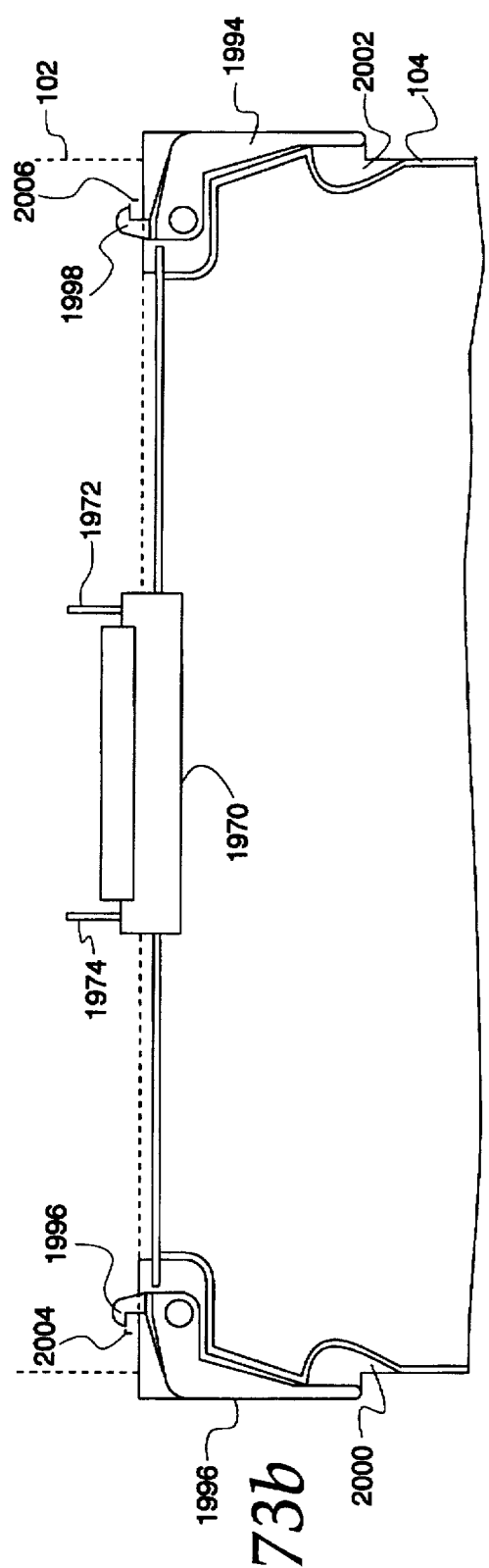
FIG. 73B is similar to FIG. 73A but with the personal computer docked to the active port replicator and with the latch assembly shown in a latched position.

In order to assure proper axial insertion of the guide pins 1972 and 1974 relative to the apertures 1976 and 1978 in order to insure proper electrical connection between the connector 750 on the rear of the active port replicator 104 and the connector on the rear of the PC 102, a pair of latch assemblies 1980 and 1982 are provided. Each latch assembly 1980 and 1982 includes an irregularly shaped lever 1984, 1986, pivotally connected to the rear of the active port replicator 104 by way of pivot pins 1988 and 1990, respectively, to enable irregularly shaped levers 1984 and 1986 to operate between a latched position as shown in FIG. 73B and an unlatched position as shown in FIG. 73A. The irregularly shaped levers 1984, 1986 include a handle portion 1992, 1994 and a latch portion 1996 and 1998. The handle portions 1992 and 1994 are adapted to be received in recessed portions 2000 and 2002 on the rear of the active port replicator 104 such that the handle portions 1992, 1994 are flush with the housing in a latch position as shown in FIG. 73B. The latch portions 1996 and 1998 are formed as generally L-shaped members and are adapted to cooperate with cooperating tabs 2004 and 2006 formed in the rear portion of the PC 102 and configured to be aligned with the latch portions 1996 and 1998 when the guide pins 1972 and 1974 on the docking side of the active port replicator are aligned with the receiving apertures 1976 and 1978 in the rear of the PC 102.

In operation, the active port replicator 104 is positioned such that the guide pins 1972 and 1974 are received within the receiving apertures 1976 and 1978 on the rear of the PC 102. As the PC 102 and active port replicator 104 are pushed together, the main connector 750 on the rear of the active port replicator 104 begins to mate with the corresponding main connector on the rear of the PC 102. Once the connector 750 on the rear of the active port replicator 104 is inserted as far as possible into the connector 750 on the rear of the PC 702, the irregularly shaped levers 1984, 1986 may be rotated in a direction indicated by the arrow 2007 for unlatching. Subsequently, the irregularly shaped levers 1984, 1986, are rotated towards a latch position as indicated by the arrow 2008. While the irregularly shaped levers 1984 and 1986 are being rotated towards a latch position, the latch portions 1996 and 1998 capture a pair of cooperating tabs 2004 and 2006 on the rear of the PC 102. As the irregularly shaped levers 1984, 1986 are rotated towards the fully latched position, as shown in FIG. 73B, the connector on the rear of the PC 102 is drawn toward the connector 1970 on the rear of the active port replicator 104 to force the two connectors 750 and 1970 into a full insertion position, thereby facilitating insertion of the two 152 pin connectors.

Another important aspect of the invention relates to the facility of not only securing the active port replicator 104 to, for example a desk or other fairly permanent fixture, but also is able to secure any PCMCIA option cards disposed within slots A and B (FIG. 65) in the active port replicator to prevent the PCMCIA option cards from being removed as well. In particular, as best shown in FIGS. 65 and 71, the active port replicator includes a pair of keyhole slots 2010 and 2012, formed in a cover 2014 and an interior metal chassis 2018, respectively, for receiving a cylindrical lock 2015 (FIG. 65C), which may include a cable 2017 (FIG. 65B), for example a Model No. ASX-3 Kensington Microsaver Lock and Cable Kit as illustrated in FIG. 65B. The keyhole slots 2010 and 2012 not only enable the active port replicator 104 to be secured to an immovable object, but also prevent any PCMCIA option cards disposed within slots A or B of the active port replicator from being removed during a locked condition. In particular, the PCMCIA slots A and B are configured in a side-by-side relationship. The keyhole slots 2010 and 2012 are positioned between the two PCMCIA slots A and B. The spacing between the side-by-side PCMCIA slots is selected such that when the cylindrical lock assembly 2015 is secured to the keyholes 2010 and 2012, the lock assembly 2015 partially overlaps both the PCMCIA slot openings and thus prevents removal of any PCMCIA cards in the slots.

As will be discussed in more detail below, the keyhole slot 2012 integrally formed with the interior metal chassis 2018 prevents removal of any PCMCIA option cards, even if a cover 2014, which forms a part of the housing for the active port replicator, is removed.

Figure 68:
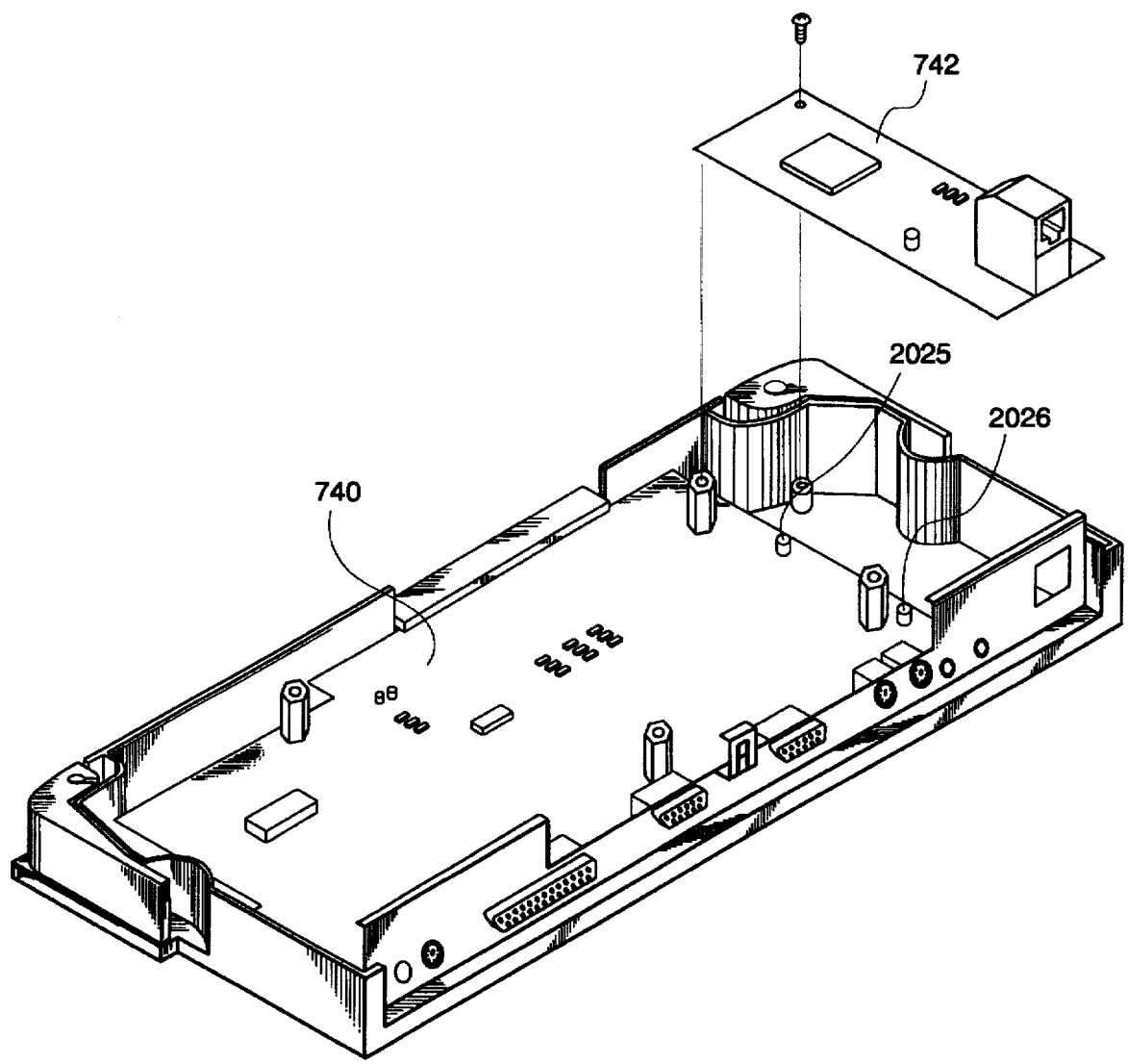
Figure 69:
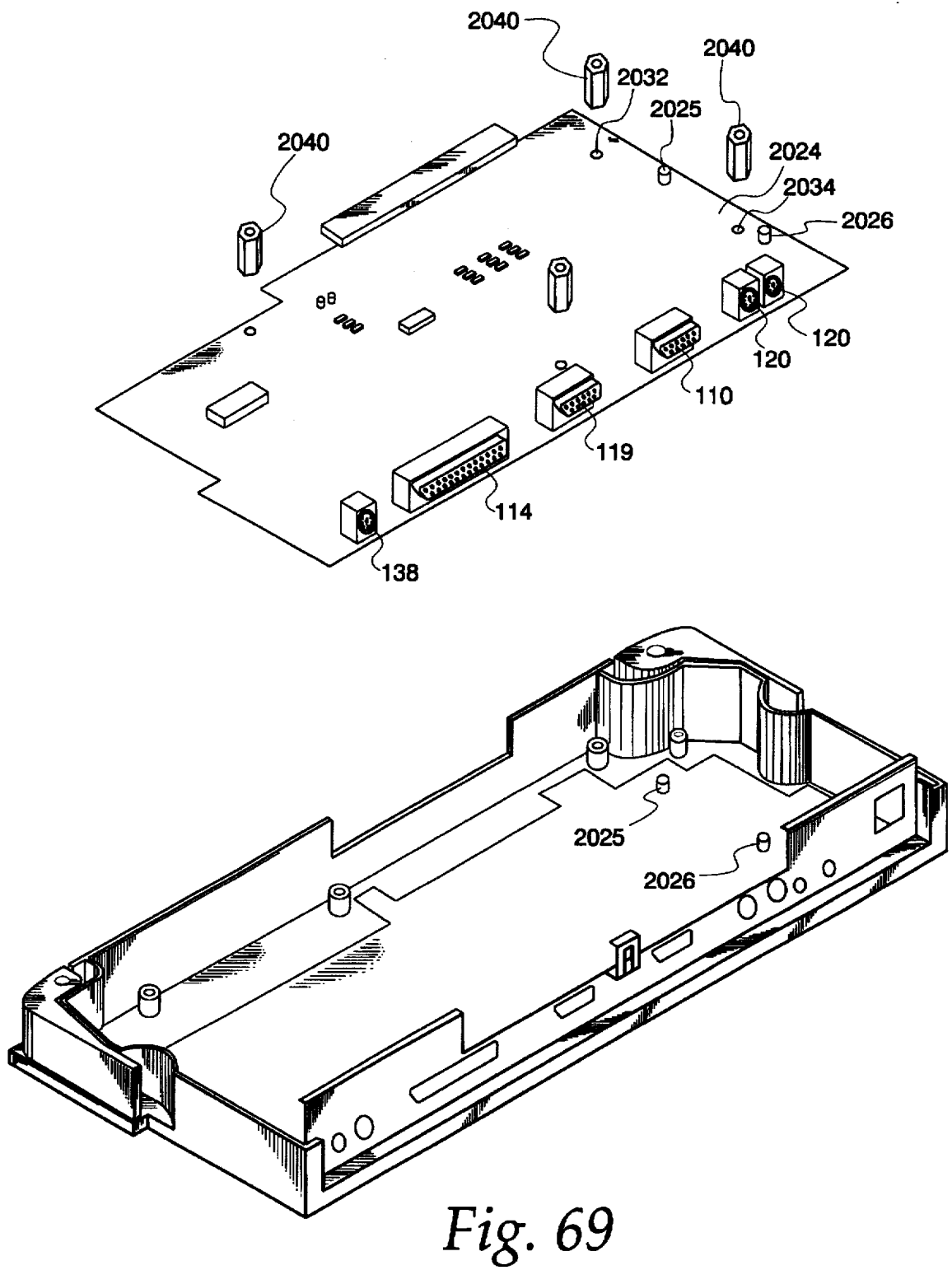

Another important aspect of the invention is the modularity of the active port replicator and the ease in which options such as a PCMCIA interface and the LAN controller can be added to the system, for example after shipment to the customer. Referring first to FIGS. 70 and 71, the housing for the active port replicator 104 includes a base portion, for example, a molded base 2016 and a metal chassis 2018. The lock slot 2012 is formed on the metal chassis 2018. As shown in FIG. 70, the lock slot 2012 is positioned intermediate a slot 2020 formed along a sidewall 2022 of the chassis 2018. By positioning the lock slot 2012, intermediate the slot 2020, any PCMCIA option cards installed in either slots A or B will be blocked from being removed when a lock, such as a Kensington lock, is secured to the lock slot 2012. In order to prevent the PCMCIA cards from being removed when the cover 2014 is removed, the main printed circuit board 2024 (FIG. 69) is rigidly secured to the chassis 2018 as well as the base 2016. More particularly, the base portion 2016 may be formed with one or more protuberances 2024 and 2026. These protuberances 2024 and 2026 are formed to be aligned with apertures 2028 and 2030 in the chassis 2018 as well as corresponding apertures 2032 and 2034 in the main printed circuit board 2024. The protuberances 2024 and 2026 may be first aligned with the apertures in the chassis 2028 and 2030 as shown in FIG. 69. Subsequently, the main printed circuit board 740 is positioned such that the apertures 2032 and 2034 receive the protuberances 2024 and 2026 once the main printed circuit board 740 is positioned within the base 2016 as shown in FIG. 68. The protuberances 2024 and 2026 are used primarily for positioning of the main printed circuit board 740 with respect to the chassis 2018 and the base portion 2016. A plurality of threaded standoffs 2036 may be integrally formed in the base portion 2016. These standoffs 2036 are used to seat the main printed circuit board 740 relative to the base portion 2016. The standoffs 2036 are also adapted to be aligned with apertures 2038 formed in the main printed circuit board 740 to enable the main printed circuit board 740 to be secured to the chassis 2018 and the base portion 2016. The apertures 2038 in the main printed circuit board 740 adapted to be aligned with corresponding apertures 2040 on the chassis 2018. The apertures 2040 may be formed in generally L-shaped finger portions 2042 of the chassis 2018 to provide a good ground connection to the chassis 2018. Once the main printed circuit board 740 is properly installed within the base portion 2016, conductive metal standoff 2040 are used to secure the main printed circuit board 740 to the chassis 2018 and, in turn, to the base portion 2016. The standoffs 2040 each include a threaded portion 2042, which, as will be discussed in more detail below, enable a PCMCIA option card 744 to be rigidly secured thereto.

An important aspect of the invention is that the configuration of the active port replicator 104 is the flexibility of the system. More particularly, the active port replicator 104 can be shipped as a complete unit with the main printed circuit board 740 assembled to the chassis 2018 and base portion 2016 as discussed above. The cover 2014 is formed with a plurality of threaded standoffs 2042. These standoffs 2042 in conjunction with apertures 2044 formed in the base portion 2016, enable the cover 2014 to be secured to the base portion 2016 with suitable fasteners 2046. In this way, the active port replicator 104 can be shipped with the main board 740 and options such as a PCMCIA interface board 744 in a network interface board 2048 installed at a later date.

The PCMCIA interface board 744 is provided with a plurality of apertures 2050, adapted to be aligned with the threaded standoffs 2040 and secured thereto by way of suitable fasteners 2052. The network interface board 742 may also be secured to the system either initially or later by the customer. The network interface board 742 is adapted to sit on one or more threaded standoffs 2054 formed in the base portion 2016. The network interface board 742 may be provided with one or more apertures 2056 which enable the network interface board 2048 to be secured to the threaded standoffs 2054 in the base 2016 with one or more suitable fasteners 2058.

Once the main board 740, PCMCIA interface board 744 and network interface board 742 are secured to the base 2016 as discussed above, the cover 2014 is secured to the base portion 2016 by way of the threaded fasteners 2046. As mentioned above, the cover 2014 includes a lock slot 2010 that is adapted to be aligned with the lock slot 2012 formed in the chassis 2018. Thus, when the cover 2014 is in proper position, a key lock such as a Kensington key lock, may be inserted through the lock slots 2010 and 2012. As mentioned above, such Kensington locks normally rigidly secured to a cable to enable the lock device to be secured to an immovable object. By providing lock slots 2010 and 2012 on the cover 2014 and chassis 2018, respectively, any PCMCIA option cards installed within slots A or B will be secured and cannot be removed even though the fasteners 2046 securing the cover 2014 to the base 2016 are removed.

Flexible Multimedia Unit

An important aspect of the invention relates to a portable multimedia system, generally identified with the reference numeral 2060. The portable multimedia system 2060, as will be discussed in more detail below, is adapted to be secured to the PC 102 and includes a retractable carrying handle to facilitate portable transportation. The portable multimedia presentation unit 2060 may be provided with various options, such as a double speed 5.25" CD-ROM drive, amplified stereo speakers and advanced sound capabilities that enables sound, music, lyrics and graphics and video to be relatively easily combined to enhance presentations.

Figure 74B:
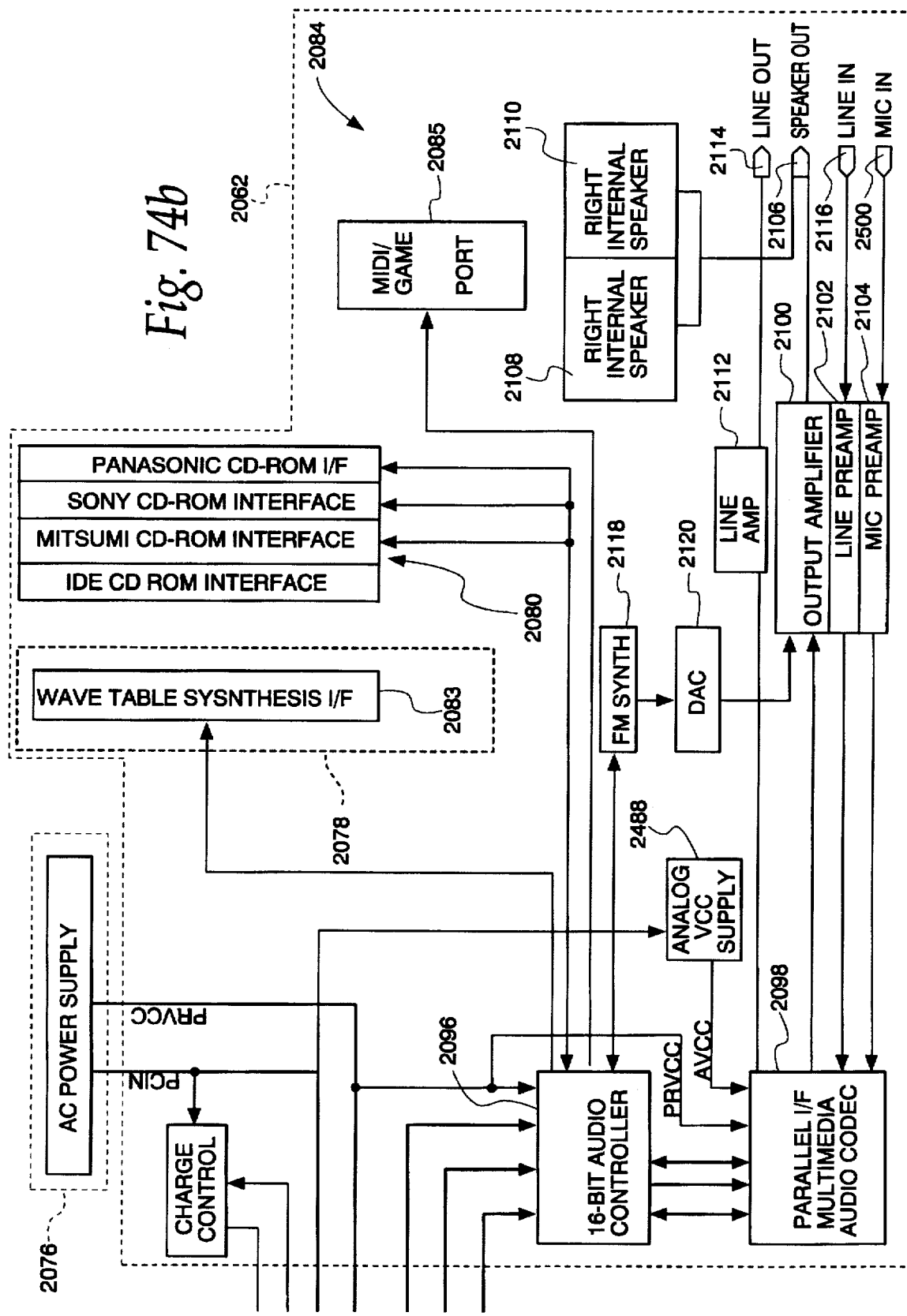

The portable multimedia system 2060 is illustrated in FIGS. 74–96. Referring to FIG. 74, a block diagram for the portable multimedia system 2060 is illustrated. As shown in FIG. 74, the portable multimedia system 2060 includes a main board 2062, a passive board 2063, a status board 2074, a power supply 2076 and an option board 2078. The passive board 2063 primarily acts as a port replicator and includes an external video connector 2064, for example a VGA connector, a parallel port 2066, a serial port 2068 and pair of type PS/2 ports 2070 and 2072 to enable both an external mouse (not shown) and an external keyboard (not shown) to be connected to the portable multimedia presentation unit 2060 at the same time. The status board 2074, which, as will be discussed in more detail below, includes a number of LEDs which provide the status of the portable multimedia system 2060. The main board 2062 provides an interface 2080 for a CD-ROM, as well as PCMCIA interface 2082 and an enhanced audio interface generally identified with the reference numeral 2084. The PCMCIA interface 2082 is adapted to support two type I, II, III PCMCIA card slots 2086 and 2088. The PCMCIA card slots 2086 and 2088 are supported by a PCMCIA controller 2090 and a power control circuit 2092 for controlling the power supply connected to the PCMCIA slots 2086 and 2088. The PCMCIA controller 2092 is part of the main board 2062 by way of a connector 2094.

Figure 74C:
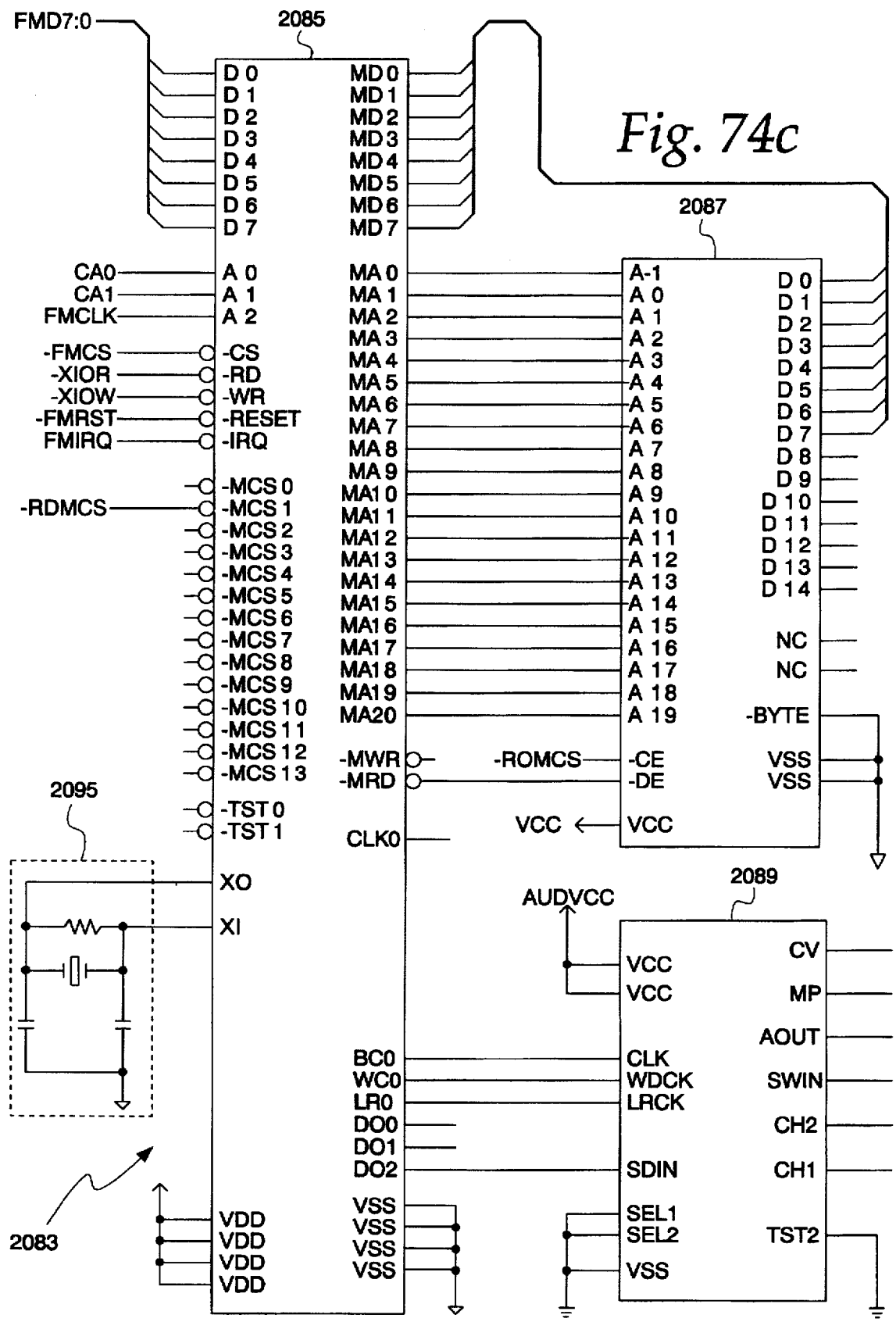
FIG. 74C is a schematic diagram of a WAV option card for the multimedia system in accordance with the present invention.
Figure 74D:
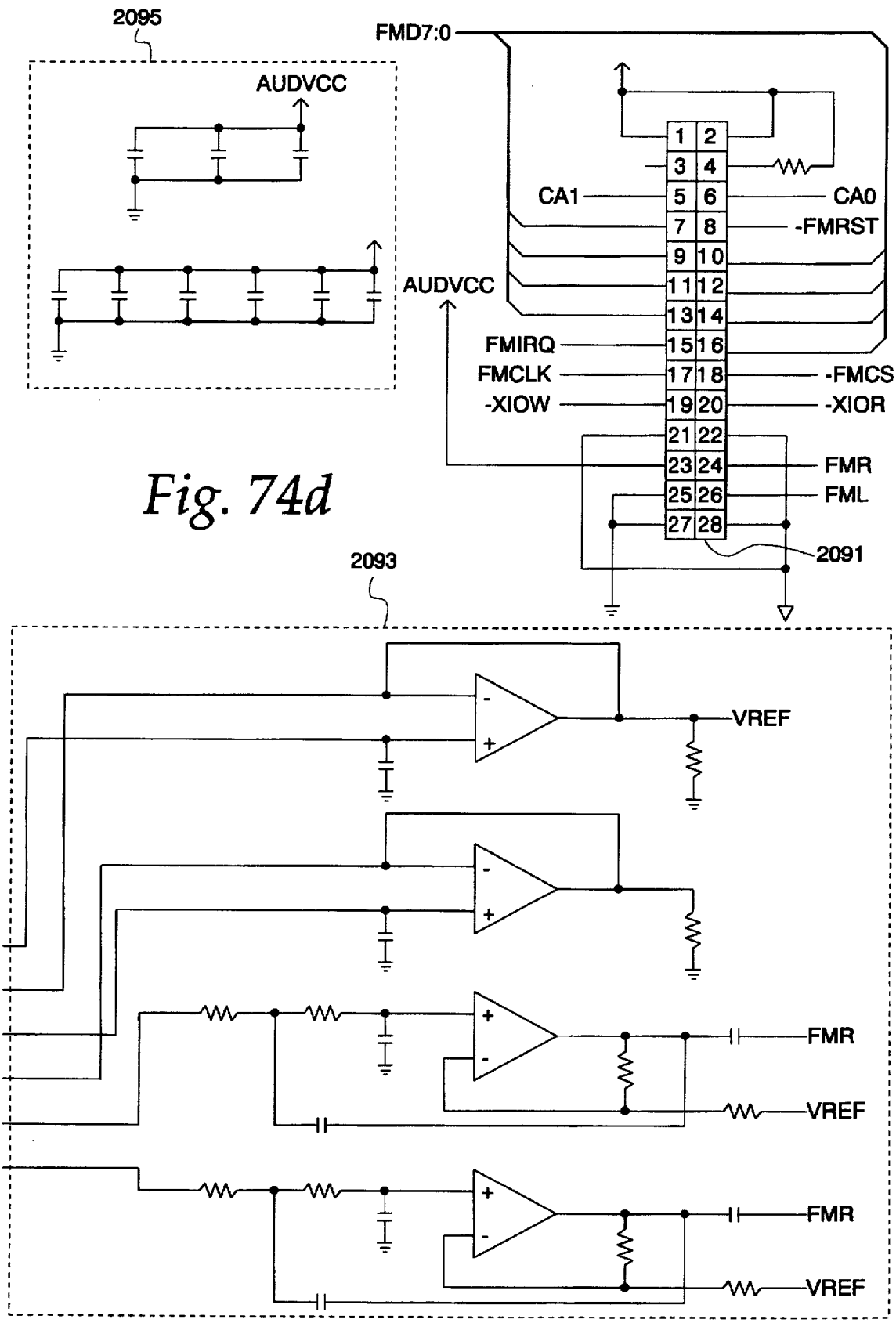
FIG. 74D is a schematic diagram of an amplifier circuit which forms part of the audio subsystem for the multimedia system in accordance with the present invention.

The option board 2078 illustrated in FIG. 74C provides upgrades.

The audio subsystem 2084 includes a 16-bit audio controller 2096 which drives the CD-ROM interface 2080 and may be used to support software generated audio signals, such as digitized WAV (windows audio visual) signals or software generated audio signals 2083 by way of a MIDI driver 2085.

The audio subsystem 2084 also includes a parallel audio CODEC (compress/decompress controller) 2098. The audio CODEC 2098 may be a Crystal Semiconductor Corporation Model CS4231, described in detail in *Crystal Semiconductor Audio Data Book*, January 1994, herein incorporated by reference, which includes stereo audio converters and on-chip filtering for recording the playback of 16-bit audio data, as well as analog mixing and programmable gain and attenuation functions. The audio CODEC 2098 communicates with the PC 102 and includes four I/O registers, an index register, a data register, a status register and a PIO data register. The audio CODEC 2098 is programmed by way of the index and data registers. Thirty-two registers are accessed through the index system to set gain and attenuation levels of the various audio inputs and control of transfers from the audio controller 2096. Interrupts are used to communicate to the system that a new burst of data needs to be set up or that a current burst of data is complete.

The audio CODEC 2098 supports various audio amplifiers 2100, 2102 and 2104 to support an external headphone or speaker 2106 as well as internal speakers 2108 and 2110. Additionally, the audio CODEC 2098 is used to drive a line amplifier 2112 to provide a standard line-out jack 2114, as well as support a line-in jack 2116 by way of the line preamp 2102 to enable the portable multimedia presentation system 2060 to receive and play audio signals.

The audio subsystem 2084 is also adapted to play synthesized FM audio signals by way of the 16-bit audio controller 2096. In particular, the audio controller 2096, as will be discussed in more detail below, is adapted to support an FM synthesizer 2118 which, by way of a digital-to-analog converter (DAC) 2120 is able to play synthesized FM music by way of the audio amp 2100 to either the internal speakers 2108, 2110 or to external headphones or speakers 2106.

An important aspect of the invention is the ability of the system to disconnect the PCMCIA interface 2082 and the audio subsystem 2084 when the PC 102 is either turned off or not docked to the system 2060. In particular, control and address signals from the PC 102 are buffered by way of a bus buffer 2122 and connected to a plurality of disconnect switches 2124. Additionally, the data bus is connected to the disconnect switches 2124. The disconnect switches 2124 disconnect the address SA23:0, data SD15:0 and control signals from the PC 102, available at a 152-pin connector 2126. This connector 2126 is adapted to mate with the connector 750 on the rear of the PC 102. Whenever the power supply to the PC 102 is turned off, or the PC 102 is not docked to the system 2060, or the power supply 2076 within the system 2060 is off, the disconnect switches 2124 disconnect the address, data and control signals to the PCMCIA interface 2082 as well as the audio subsystem 2084.

Figure 75A:
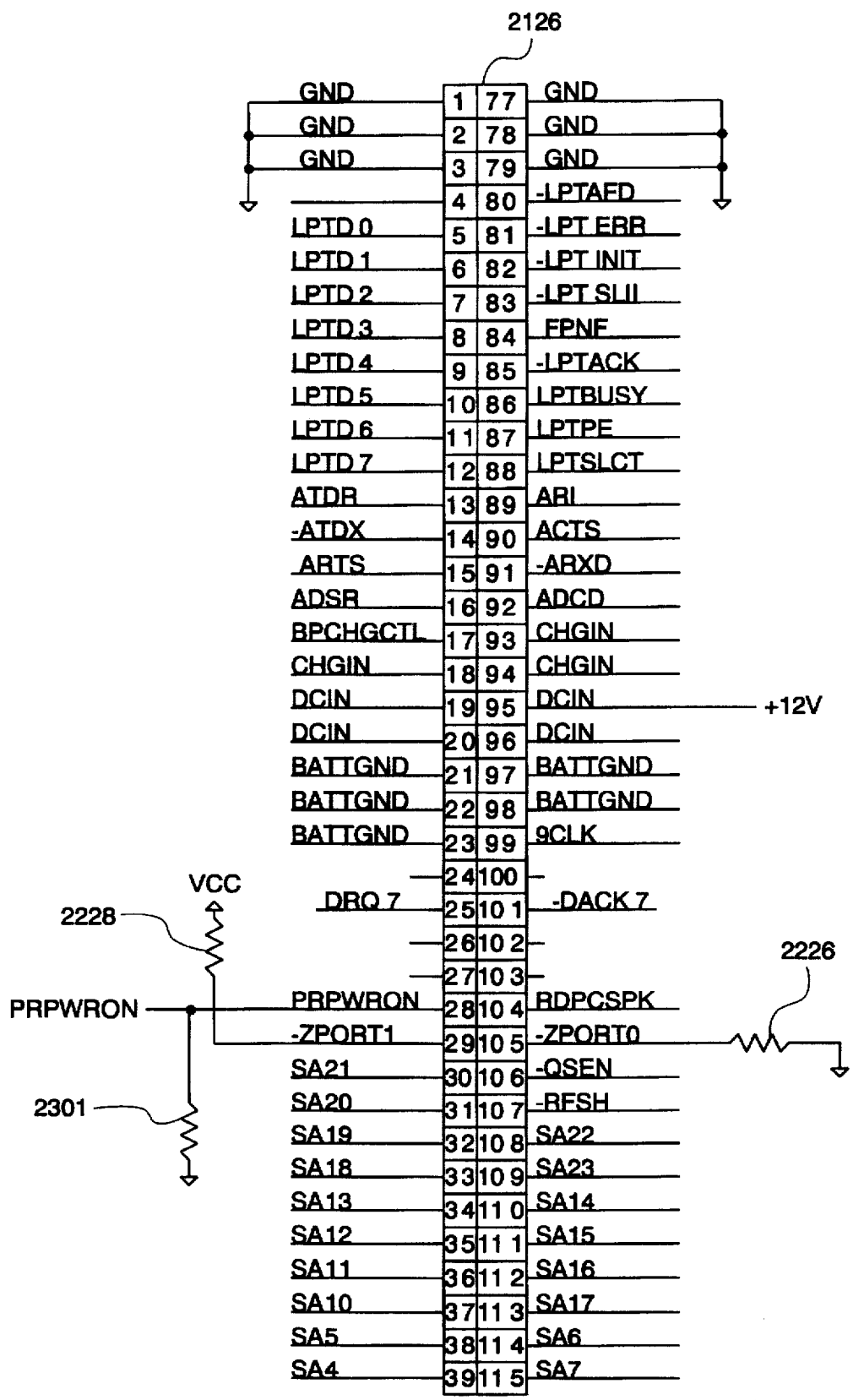
FIGS. 75–86 are electrical schematic diagrams of the multimedia system in accordance with the present invention.
Figure 75C:
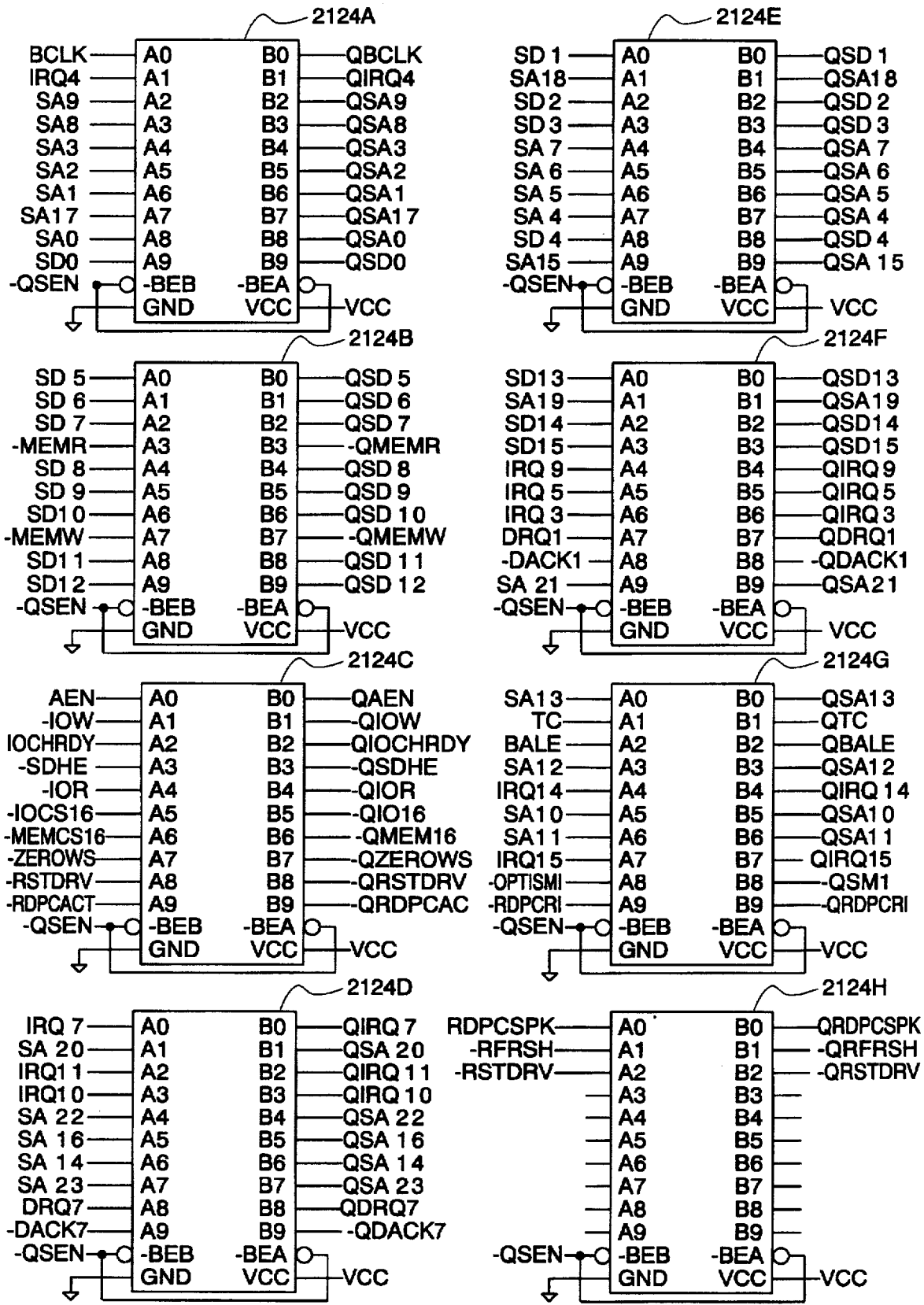

Referring to FIG. 75, the portable multimedia presentation unit includes a 152-pin connector 2126 for connecting the portable multimedia presentation unit 2060 to the corresponding 152-pin connector 750 (FIG. 16) on the PC 102. As mentioned above, various address, data and control signals are connected to bus switches 2124A–2124H (FIG. 75C) to enable such data, address and control signals to be disconnected in the event that the PC 102 is turned off, not docked to the system, or the power supply 2076 within the system 2060 is unavailable. In addition, various address, data and control signals from the PC 102 are pulled up by pull-up resistors 2128–2226.

As discussed above, the PC 102 can identify the particular device plugged into its 152-pin connector 750 by sensing pins 29 and 105 of the connector 750 (FIG. 75A), identified as −Zport 0 and −Zport 1. When the portable multimedia presentation unit 2060 is plugged into the PC 102, pin 105 is pulled low by a pull-down resistor 2226 while pin 29 (−Zport 1) is pulled high by a pull-up resistor 2228.

Figure 76:
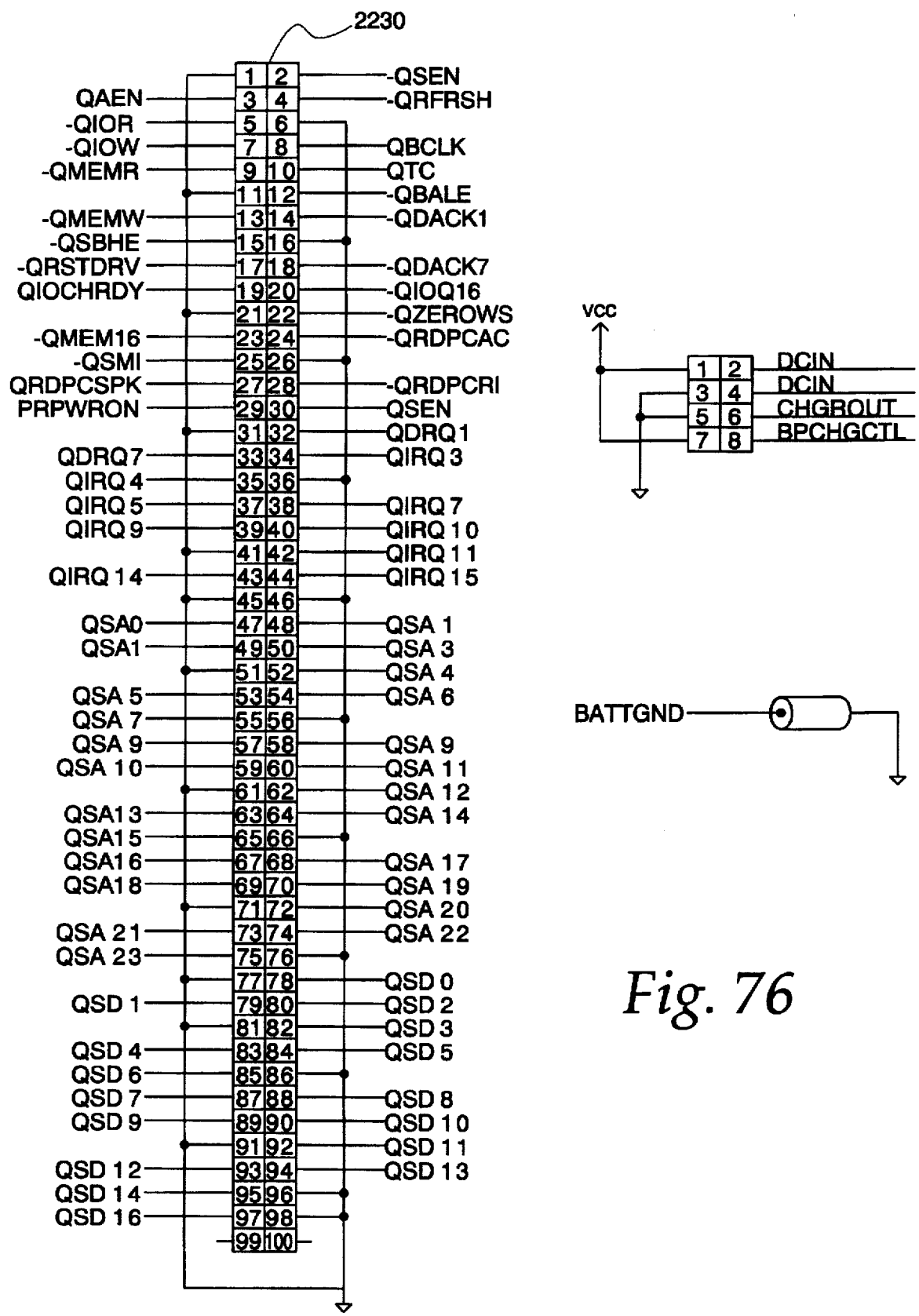

As mentioned above, various data, address and control signals are connected to the quick switches 2124A–2124H. These quick switches 2124A–2124H are located on the passive board 2063 and are routed to the main board 2062 by way of a connector 2230 (FIG. 76). The connector 2230 on the passive board 2063 is, in turn, connected to a corresponding connector 2232 (FIG. 77) on the main board 2062. The main board 2062 also includes a plurality of buffers 2234–2244 for buffering various data and address signals. In addition, various data signals available at the connector 2232 are pulled up by pull-up resistors 2246-2274. The buffers 2234, 2238, 2240, 2242 and 2244 are enabled by tying their enable inputs ENA, ENB low by way of pull-down resistors 2276 and 2278.

The buffer 2236 is utilized for buffering data to the CD-ROM interface 2080. Since the CD-ROM interface 2080 is under the control of the audio controller 2096, command –CMD and read signals –XIOR signals are used to enable the CD-ROM buffer 2236.

As mentioned above, the portable multimedia system 2060 replicates various standard ports on the PC 102. For example, referring to FIG. 78B, a serial port 2068 is connected to a standard 9-pin connector 2280 and connected to the main connector 2126 (FIG. 75A) on the main board 2062 by way of a plurality of resistors 2282-2296 and capacitors 2298-2312 which form lowpass filters. A parallel port 2068 is connected to a standard 25-pin connector 2314 (FIG. 78A) and to the main connector 2126 (FIG. 75A) on the main board 2062 by way of a plurality of resistors 2316-2314 and a plurality of capacitors 2344-2378 forming lowpass filters.

Two type PS/2 ports 2070 and 2072 (FIGS. 78C and 78D) are provided to enable an external keyboard and an external mouse to be connected to the portable multimedia system 2060 simultaneously. The mouse port is connected to a standard 6-pin connector 2380 while the keyboard port is connected to a 6-pin connector 2382. A plurality of capacitors 2384-2388, as well as a plurality of inductors 2390-2394 are connected to the keyboard port connector 2380 for filtering. In addition, pins 1 and 5 of the connector 2380 which represent keyboard data KBDATA and keyboard clock KBCLK are connected to the main connector 2126 (FIG. 75A). Similarly, the mouse port connector 2382 is connected to a plurality of capacitors 2396-2400, as well as a plurality of inductors 2402 to 2406. Pins 1 and 5 of the mouse port connector 2382 which represents mouse data and the mouse clock MSDATA and MSCLK are connected to the main connector 2126 (FIG. 75A) on the main board 2062.

Figure 78A:
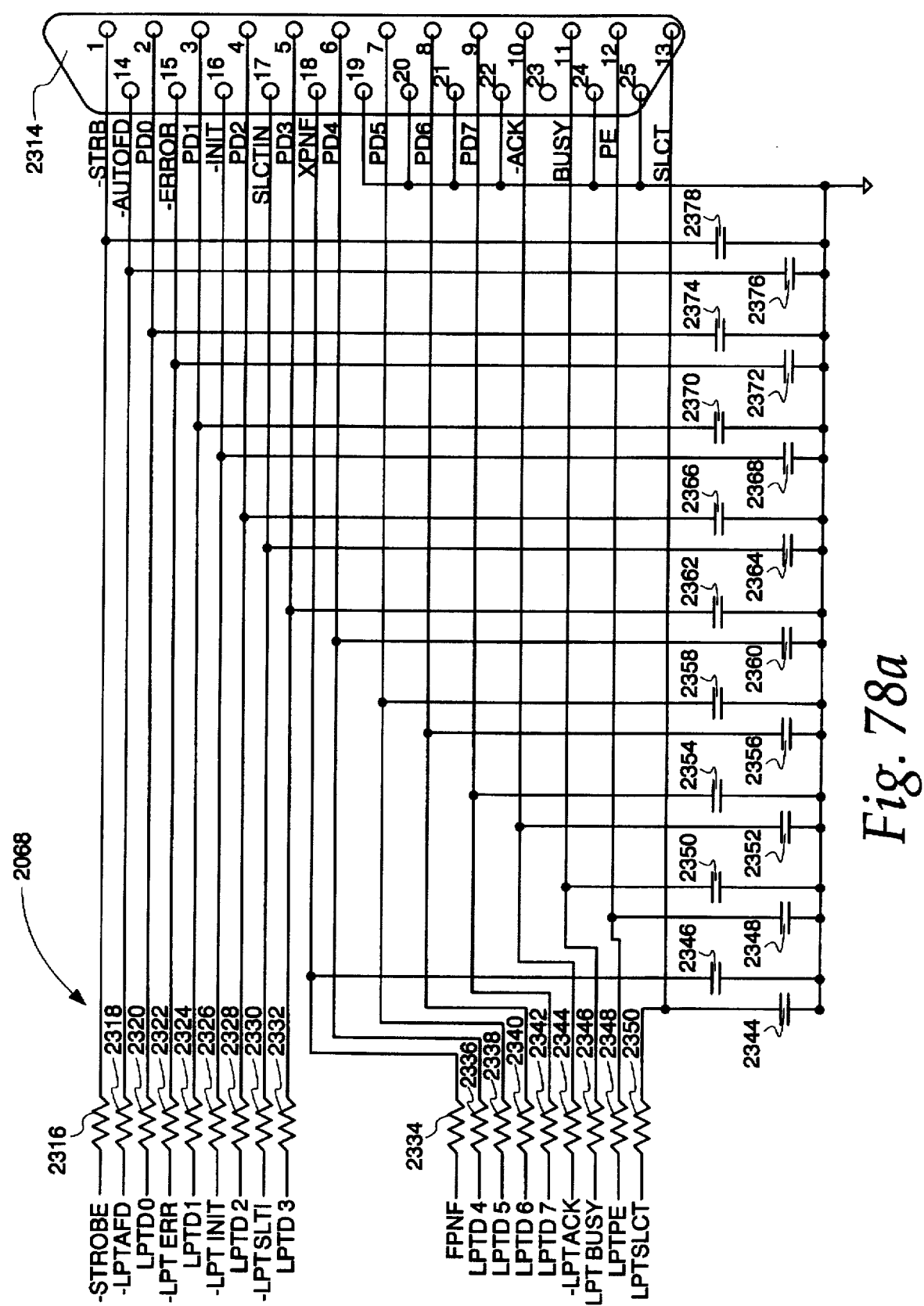
Figure 78E:
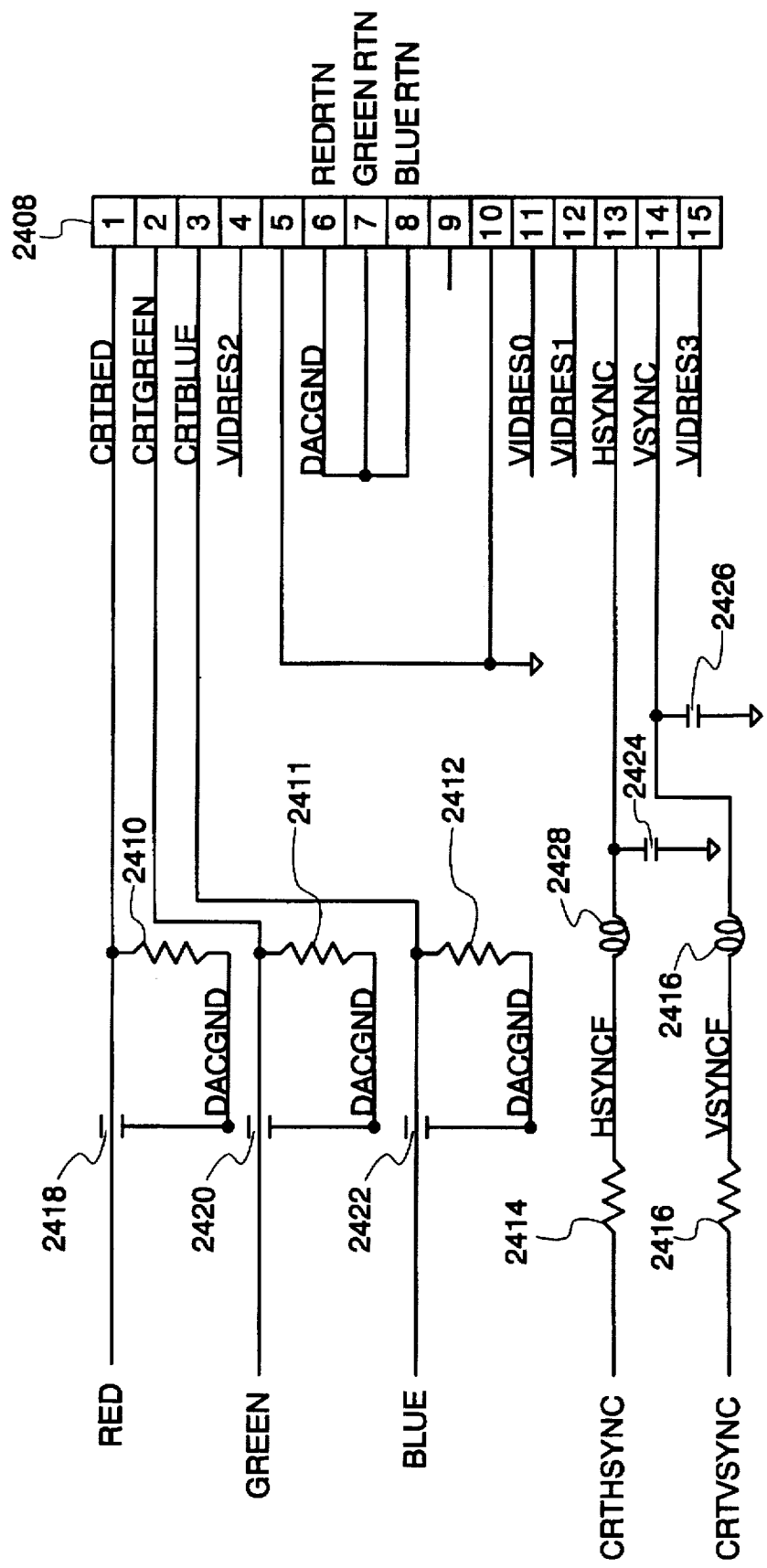
Figure 79A:
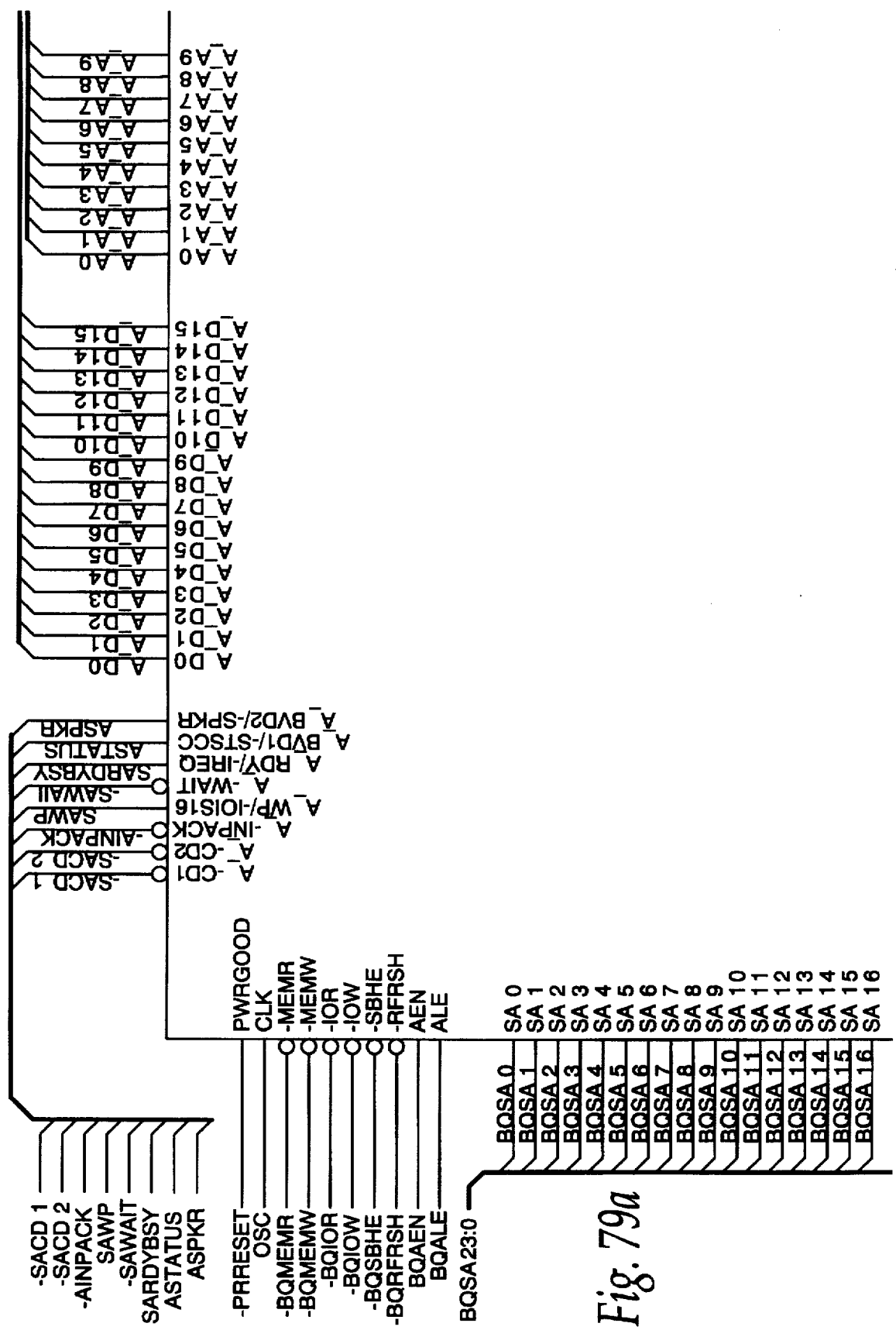
Figure 79B:
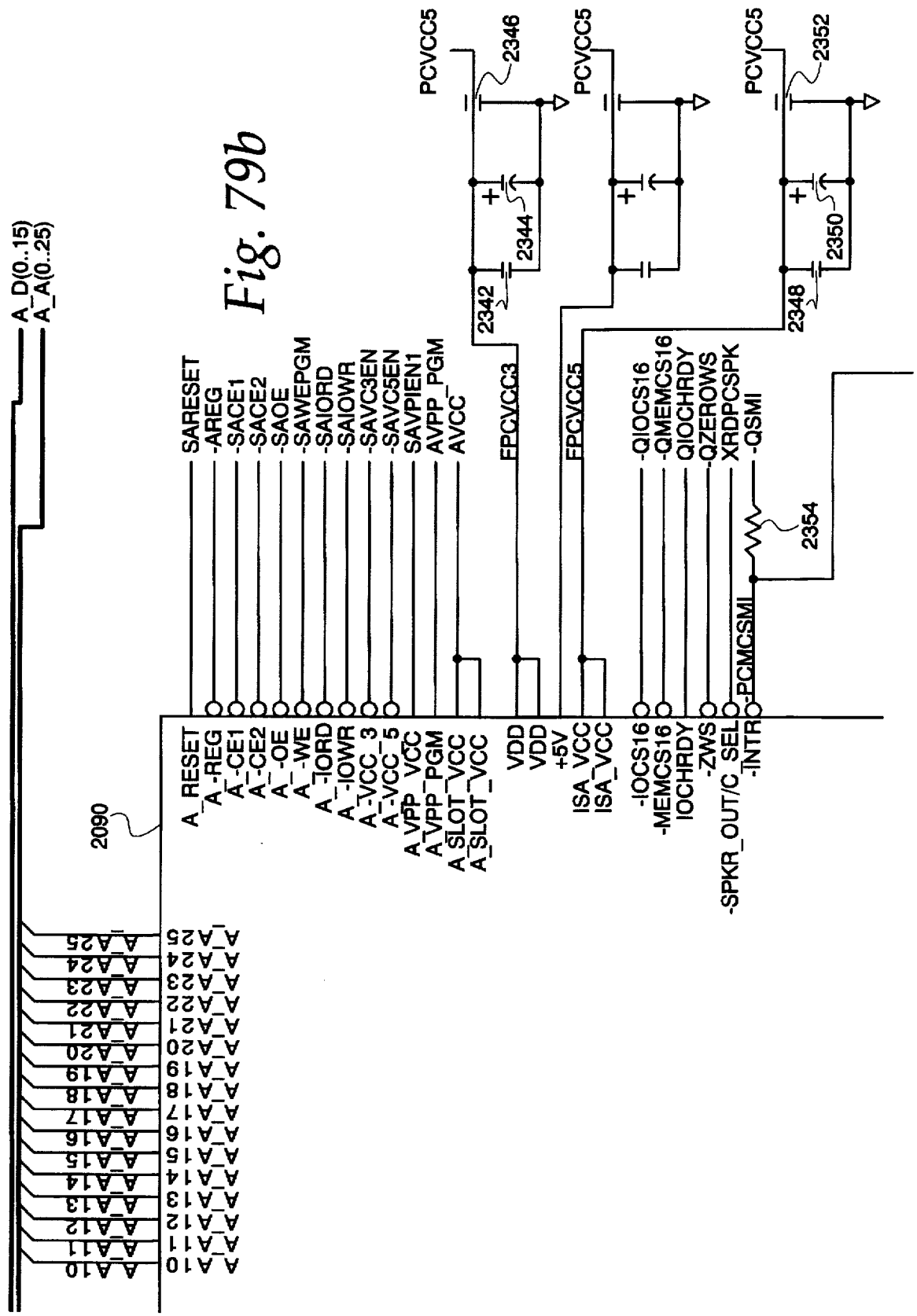
Figure 79C:
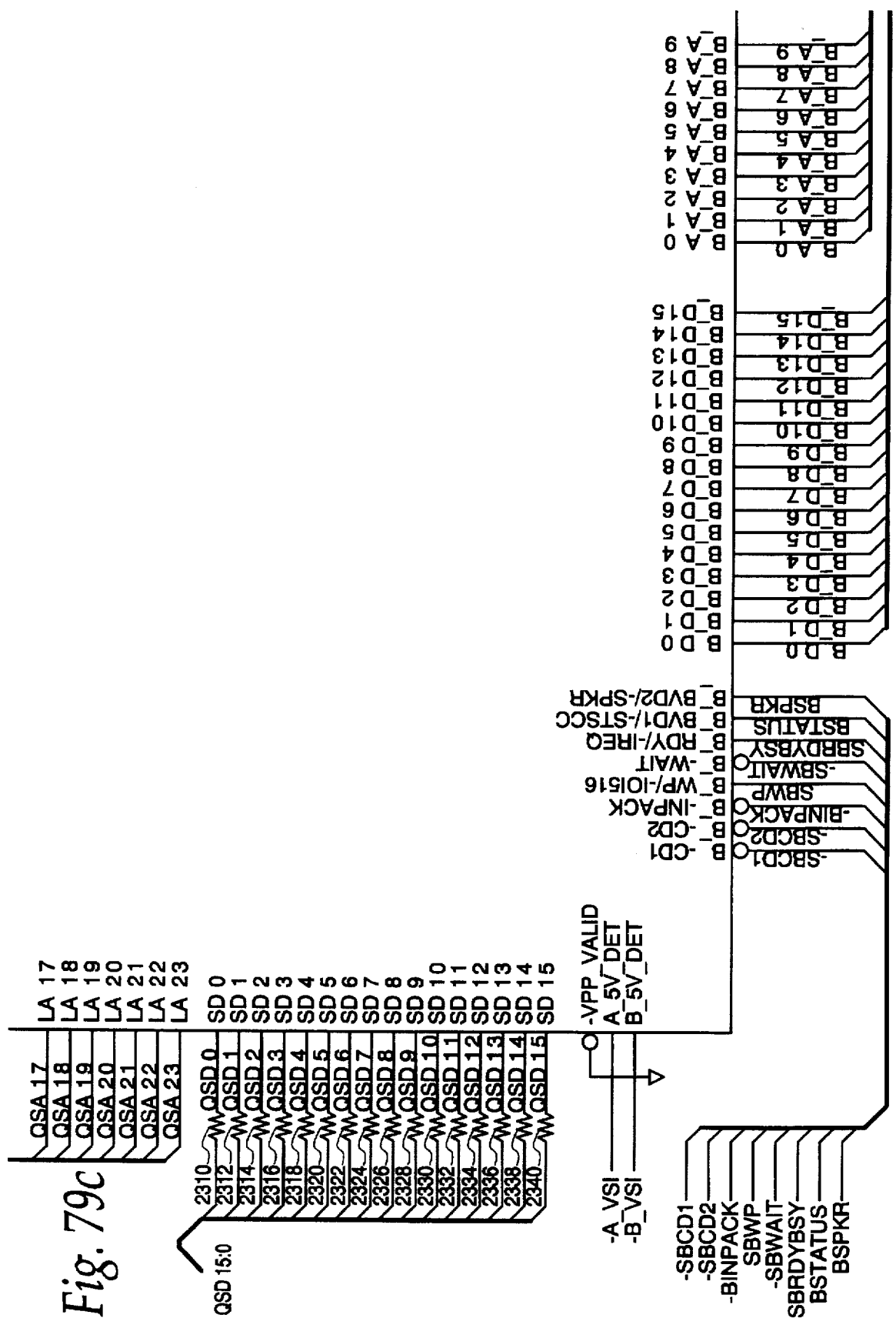
Figure 79D:
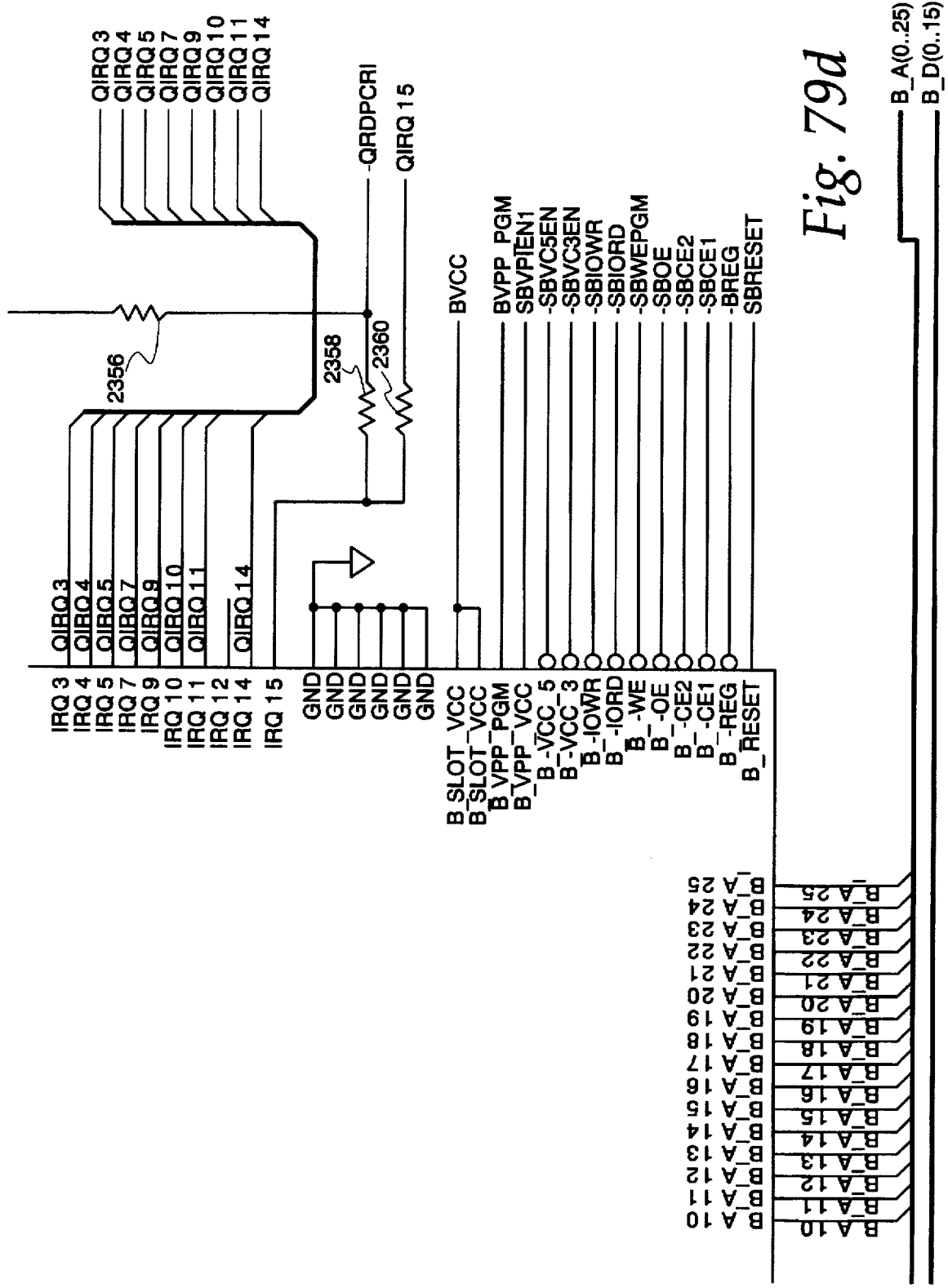

A video port 2064 is connected to a 15-pin connector 2408 (FIG. 78E). The control signals for the video port 2064 are connected to the main connector 2126 (FIG. 75A) while various other pins are filtered by a plurality of resistors 2410-2416, capacitors 2418-2426, as well as inductors 2428 and 2430.

As mentioned above, certain data, control and address signals are disconnected from the portable multimedia presentation unit 2060 when the power at the PC 102 is unavailable by way of the bus switches 2124A-2124H (FIG. 75C). In particular, the bus switches 2124A-2124H are under the control of an active low enable signal –QSEN, which is applied to the active low enable inputs –BEA and –BEB of each of the switches 2124A-2124H.

Figure 77A:
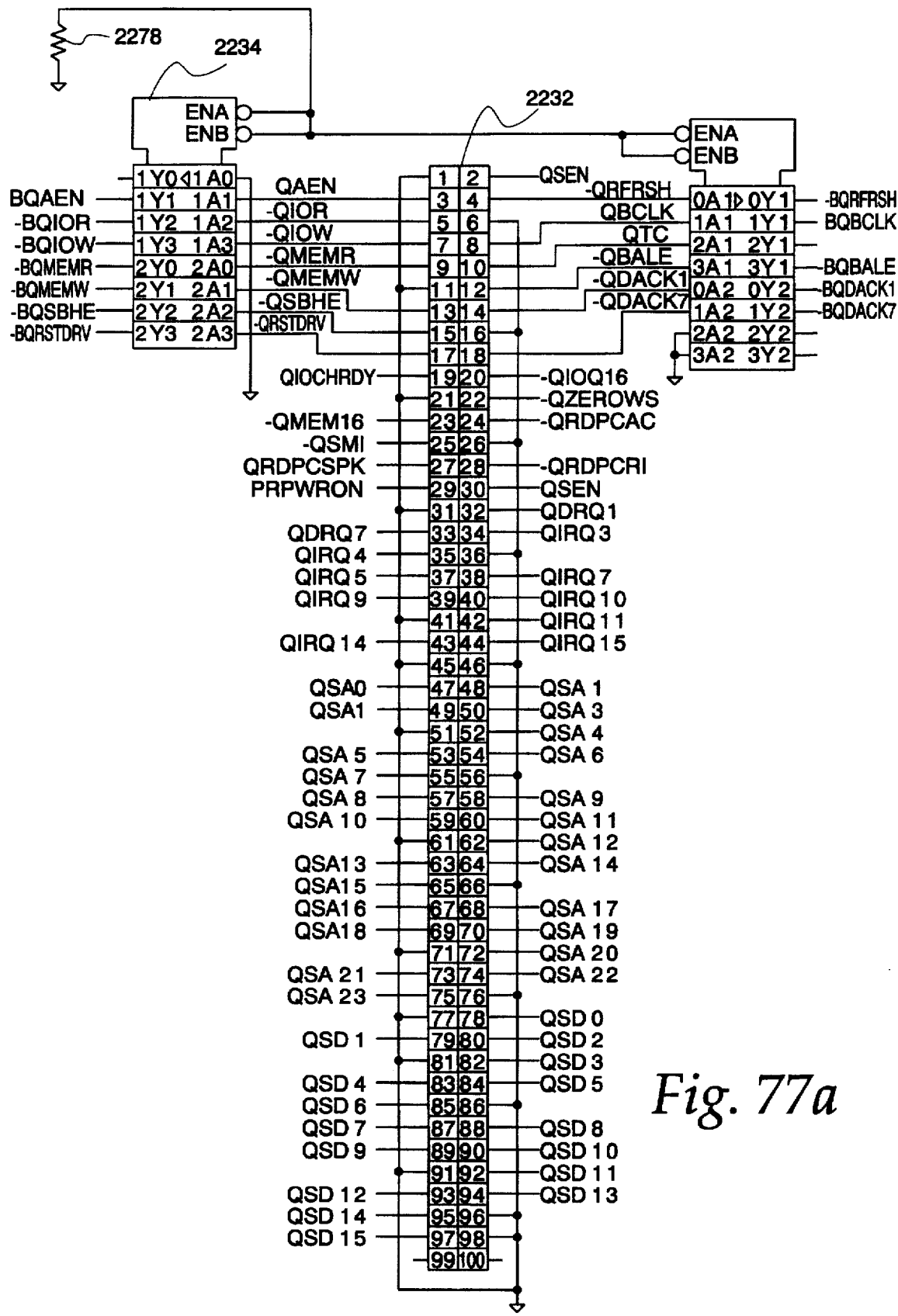
Figure 77B:
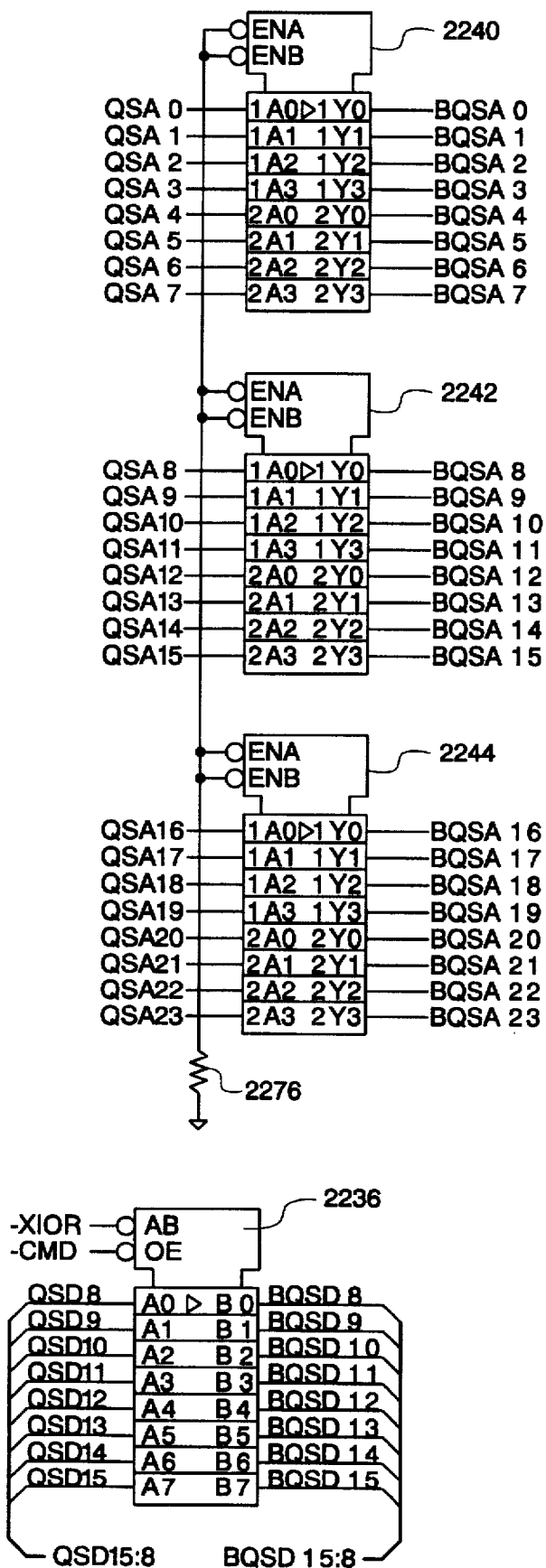
Figure 77C:
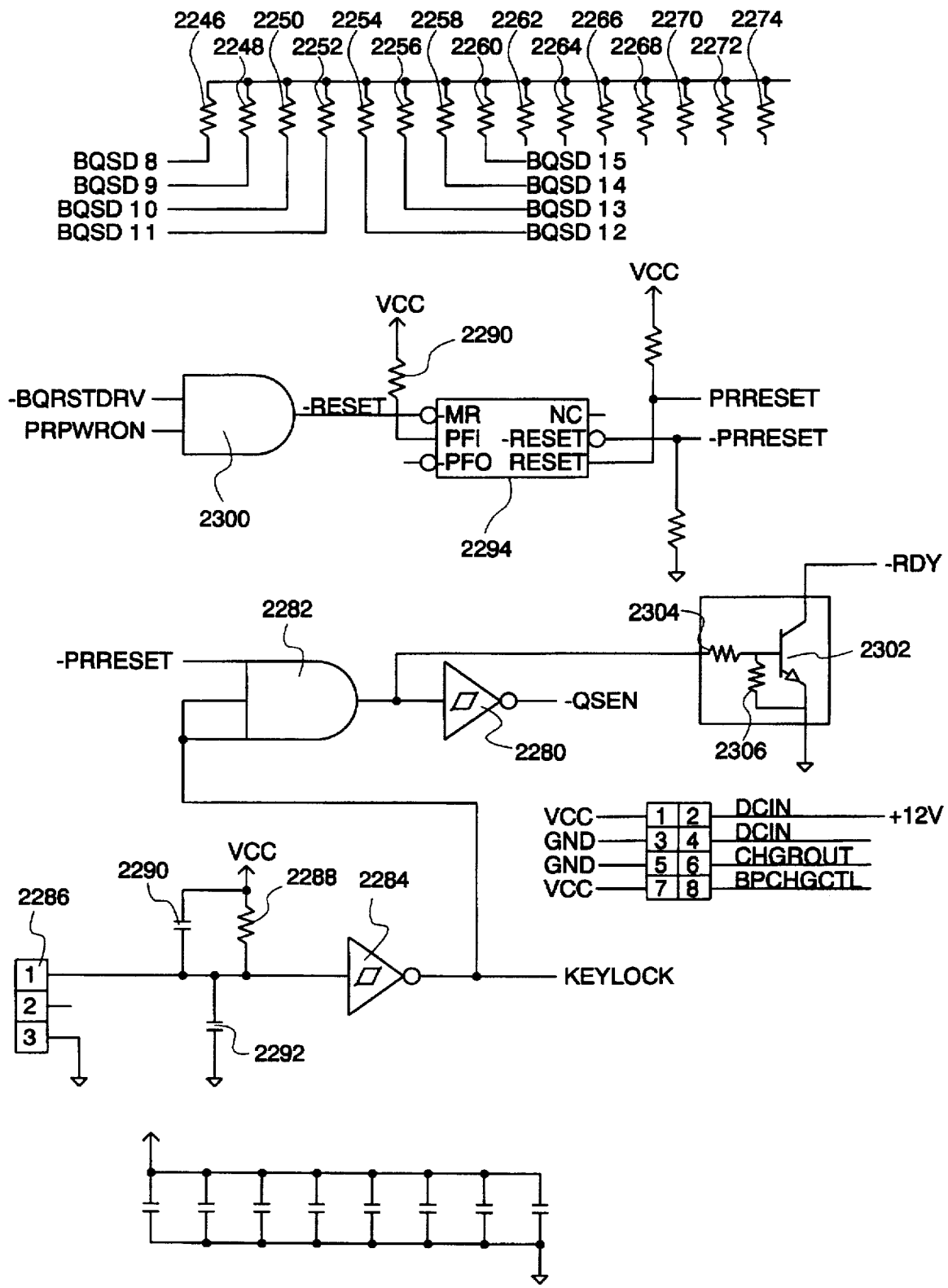

The switch enable signal –QSEN is available at the output of a NOT gate 2280 (FIG. 77C). The NOT gate 2280 is under the control of an AND gate 2282. The AND gate 2282 receives a system reset signal –PRRESET and a keylock signal KEYLOCK. The system reset signal –PRRESET is an active low signal and will be low when the PC 102 is in a reset condition. Otherwise, a system reset signal –PRRESET will be high, to place the AND gate 2282 under the control of the keylock signal KEYLOCK. The keylock signal KEYLOCK is available at the output of a NOT gate 2284. The keylock signal KEYLOCK is used to prevent unauthorized access of the portable multimedia system 2060. In particular, a security switch, discussed in more detail below, may be included on the portable multimedia presentation unit 2060 and connected to the circuitry by way of a connector 2286. In an unauthorized or unlocked position, pin 3 of the connector 2286 is pulled high by way of a pull-up resistor 2288 and filtered by way of capacitors 2290 and 2292. During such a condition, when the key is in an unlocked position, the keylock signal KEYLOCK will be low, thus disabling the AND gate 2282 and preventing the switches 2124A-2124H from being enabled. Once the keylock switch is placed in a locked position, pin 1 of the connector 2286 is pulled low by way of pin 3. During such a condition, the keylock signal KEYLOCK, available at the output of the NOT gate 2284 will be active high, thus enabling the AND gate 2282 to provide an active low switch enable signal –QSEN at the output of the NOT gate 2280 to enable the bus switches 2124A-2124H. Should the PC 102 go into reset or power not be available to the PC 102, the reset signal –PRRESET will go active low, thus disabling the AND gate 2282 and, in turn, the bus switches 2124A-2124H.

The system reset signal –PRRESET is available at the output of a reset power supervisory controller 2294, for example a Maxim model No. MX707. Pins 4 and 7 of the reset power supervisory controller 2294 are pulled high by pull-up resistors 2296 and 2298. Art AND gate 2300 is used to provide a control signal to the reset power supervisory controller 2294 to indicate whether the power supply within the PC 102 is available and stabilized, or if the PC 102 is in a system reset condition. In particular, a power on signal PRPWRON is applied to one input of the AND gate 2300, while a reset drive signal –BQRSTDRV is applied to the other input. The power on signal PRPWRON, available from the PC 102 at the connector 2126 (FIG. 75A), is normally pulled low by a pull-down resistor 2301. Thus, the power on signal PRPWRON will be high when the power supply within the PC 102 is available and stabilized. The reset drive signal –BQRSTDRV is an active low signal which will be low when the PC 102 is in a reset condition. When the PC 102 is not in a reset condition, the reset drive signal –BQRSTDRV will be high. Thus, when the power supply is available at the PC 102 and the PC 102 is not in a system reset condition, the reset signal –PRRESET will be high to enable the AND gate 2282, which, in turn, will provide an active low enable signal for the –QSEN for the bus switches 2124A-2124H.

In addition, as will be discussed in more detail below, the enable signal QSEN for the bus switches 2124A-2124H is used to provide a status indication on the status board 2074. In particular, a ready signal –RDY is tied to the collector of a BJT 2302; the BJT 2302 biased by biasing resistors 2304 and 2306. As will be discussed in more detail below, the ready signal –RDY is used to drive a status LED to indicate that the portable multimedia presentation system 2060 is in an active state.

In operation, whenever the key lock is turned to a locked position and the power is available within the PC 102 and the PC 102 is not in a system reset condition, the AND gate 2282 (FIG. 77) will be enabled to generate the active high enable signal QSEN. The active high enable signal QSEN, in turn, turns the BJT 2302 on to force the –RDY signal low. As will be discussed in more detail below, the active low ready signal –RDY is used to drive or force a status LED to conduct, to indicate the availability of the portable multimedia presentation unit 2060.

As mentioned above, the portable multimedia system 2060 includes a PCMCIA interface which supports two type I, II or III PCMCIA option card slots 2086 and 2088. A PCMCIA controller, for example a Cirrus model No. CLPD6720, is illustrated in FIG. 79. As shown, the data input lines to the PCMCIA controller 2090 are connected to the PCMCIA controller 2090 by way of a plurality of input resistors 2310 to 2340.

Similar to the PCMCIA controller discussed above for the active port replicator 104, the PCMCIA controller 2090 supports both 3.3 volt and 5 volt card slots A and B. The 3.3 volt supply PCVCC3 is filtered by way of a plurality of capacitors 2346. Similarly, the 5 volt power supply, PCVCC5 is filtered by a plurality of capacitors 2348, 2350 and 2352. The PCMCIA controller 2090 includes interrupt signals –INTR, IRQ3, IRQ4, IRQ5, IRQ7, IRQ9, IRQ10, IRQ11, IRQ12, IRQ14 and IRQ15. The interrupt signal –INTR is used to generate a signal –QSMI by way of an input resistor 2354. The –QSMI output signal is a standard ISA signal used by the processor in the PC 102. The interrupt signal –INTR is also tied to the interrupt signal IRQ15 by way of two voltage dividing resistors 2356 and 2358. The interrupt signal IRQ15 is also used to generate a signal –QRDPCRI by way of an input resistor 2360 to generate an interrupt to the system processor in the PC 102.

Figure 80A:
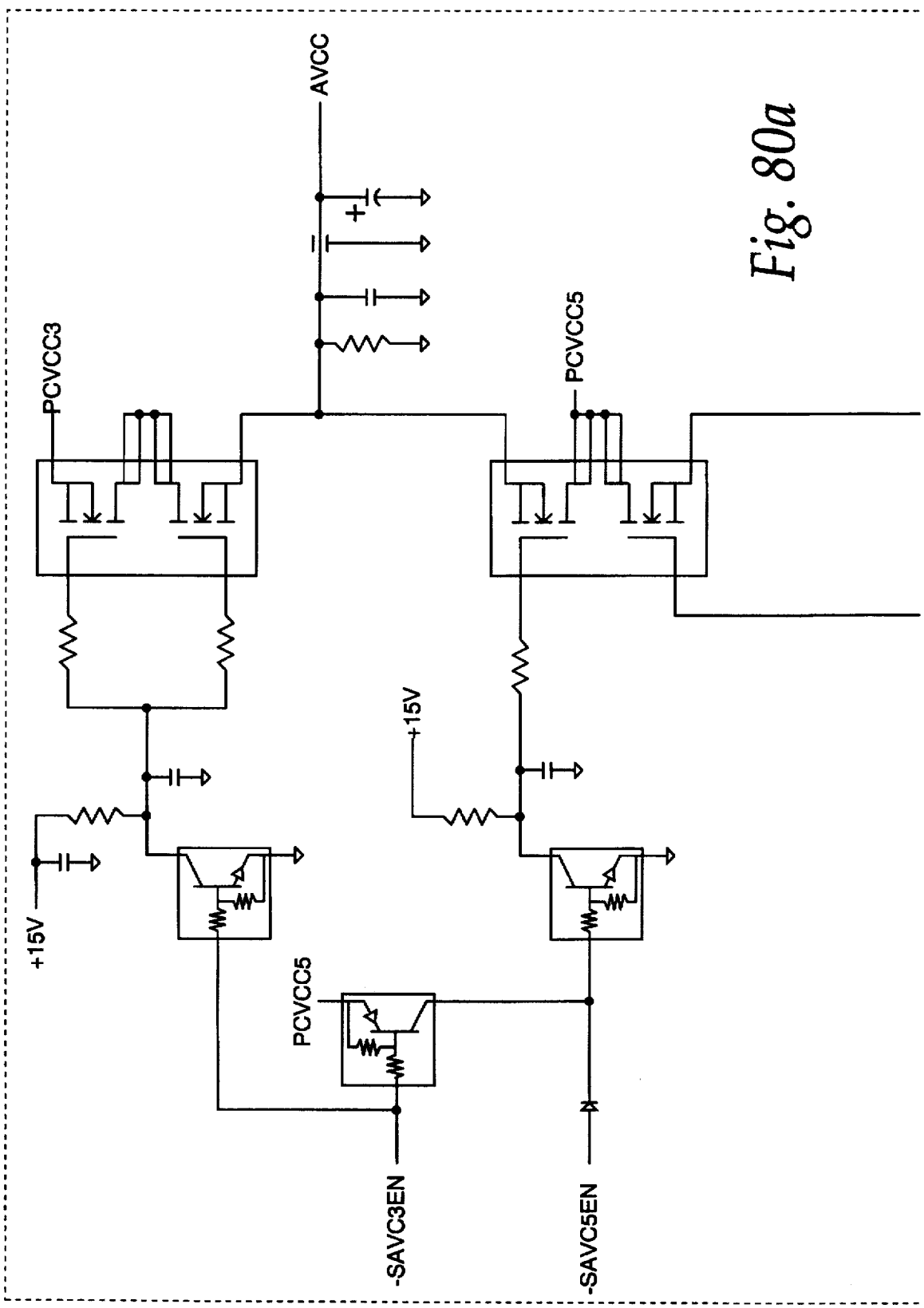
Figure 80B:
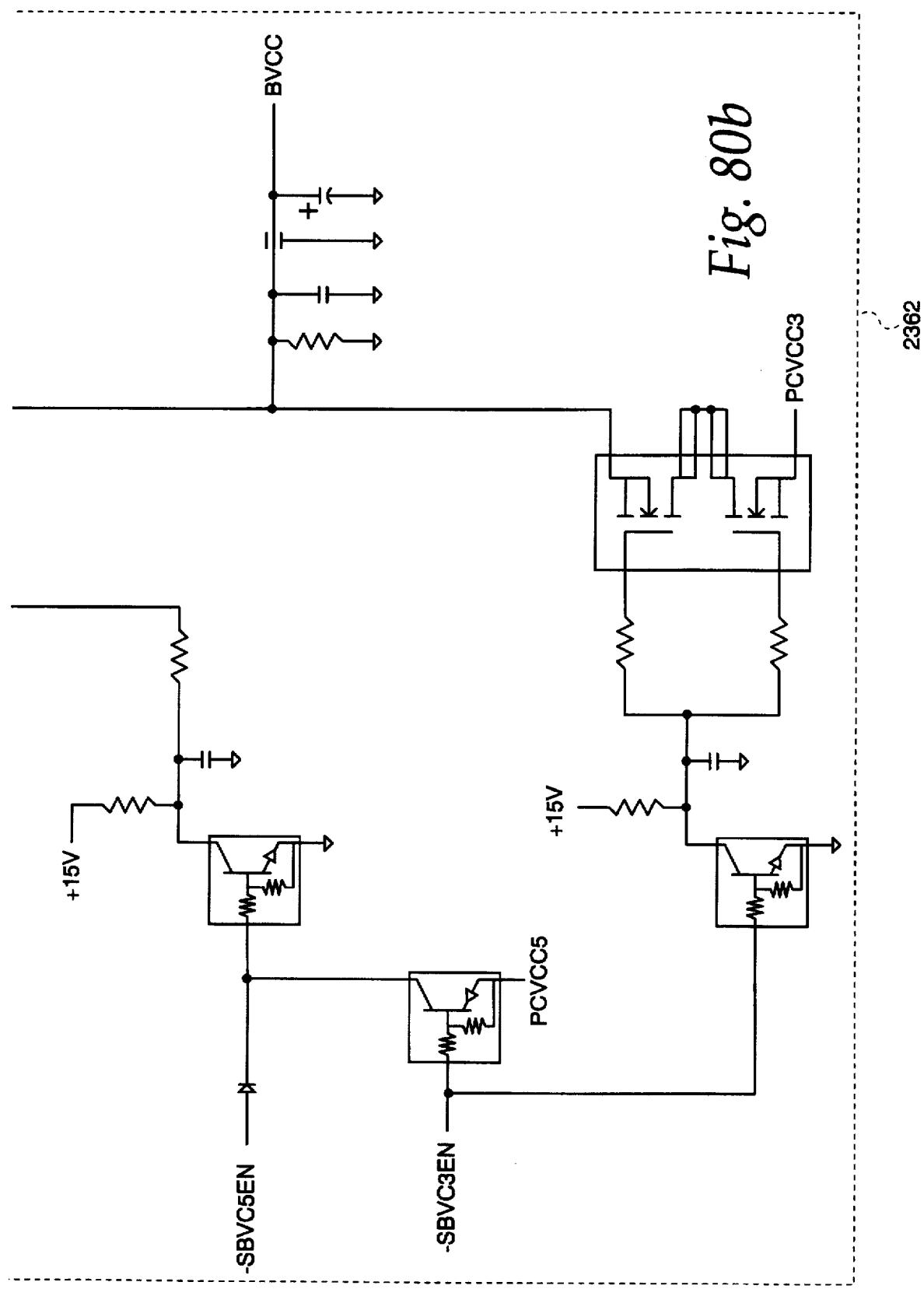
Figure 81C:
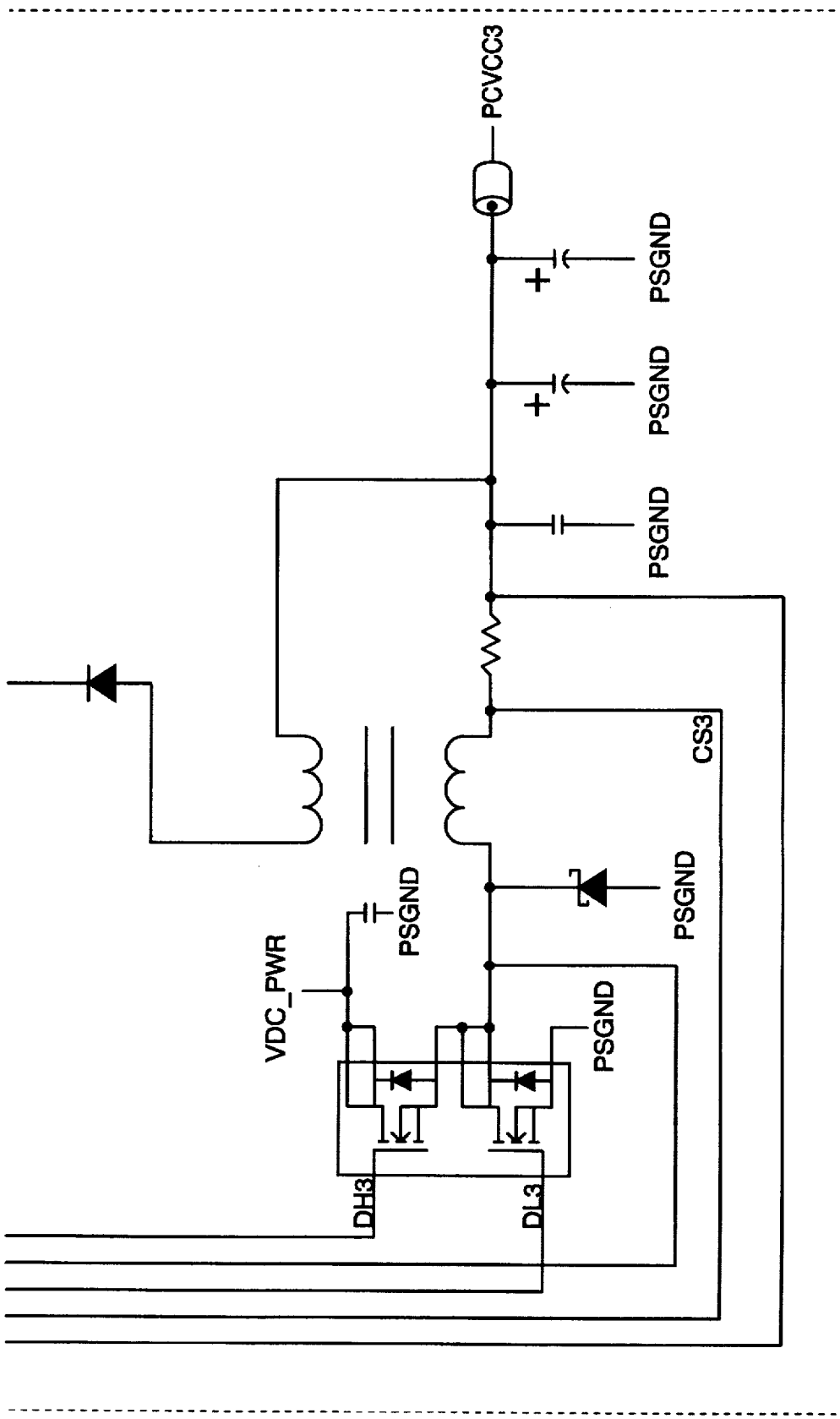
Figure 81D:
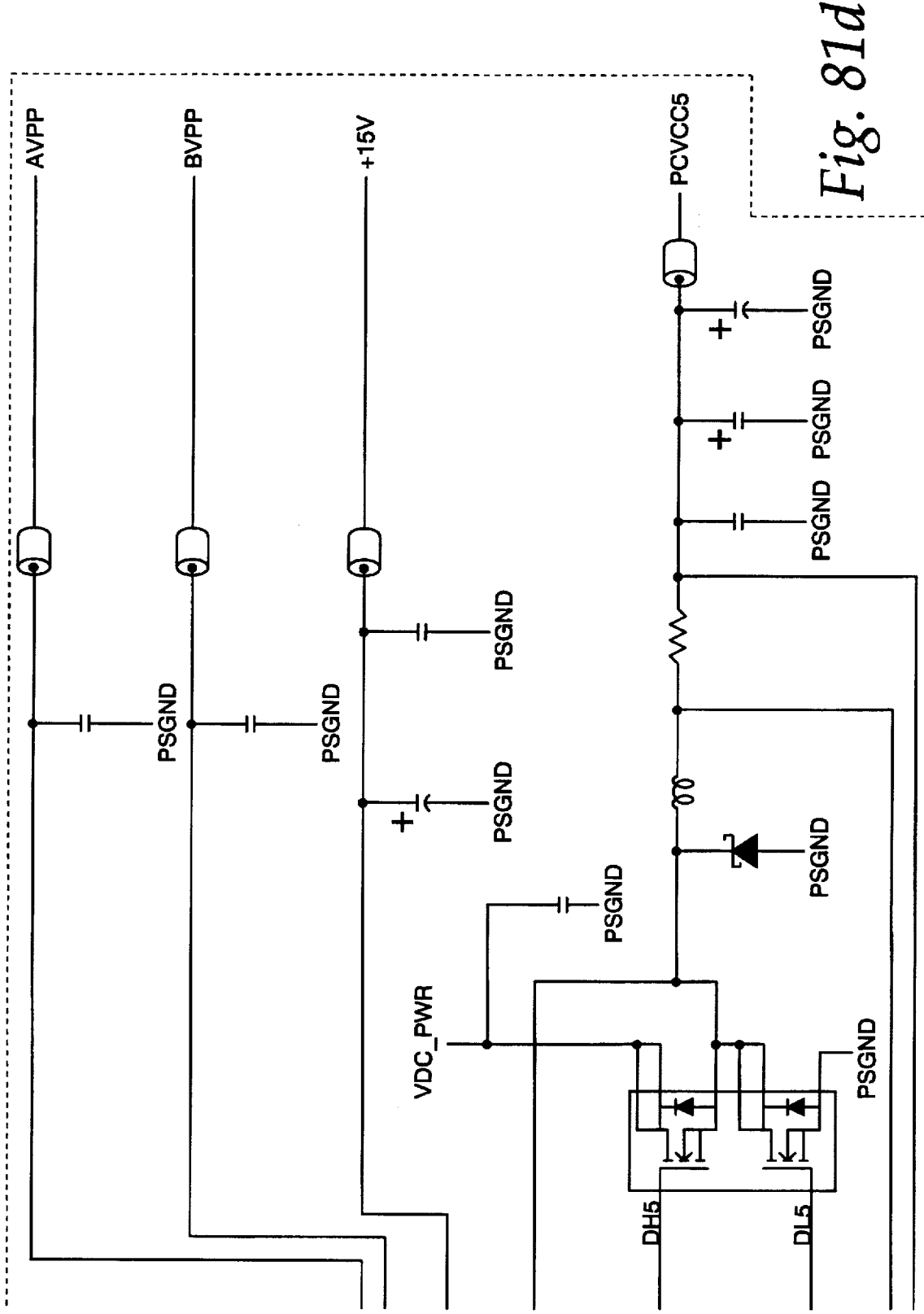
Figure 82A:
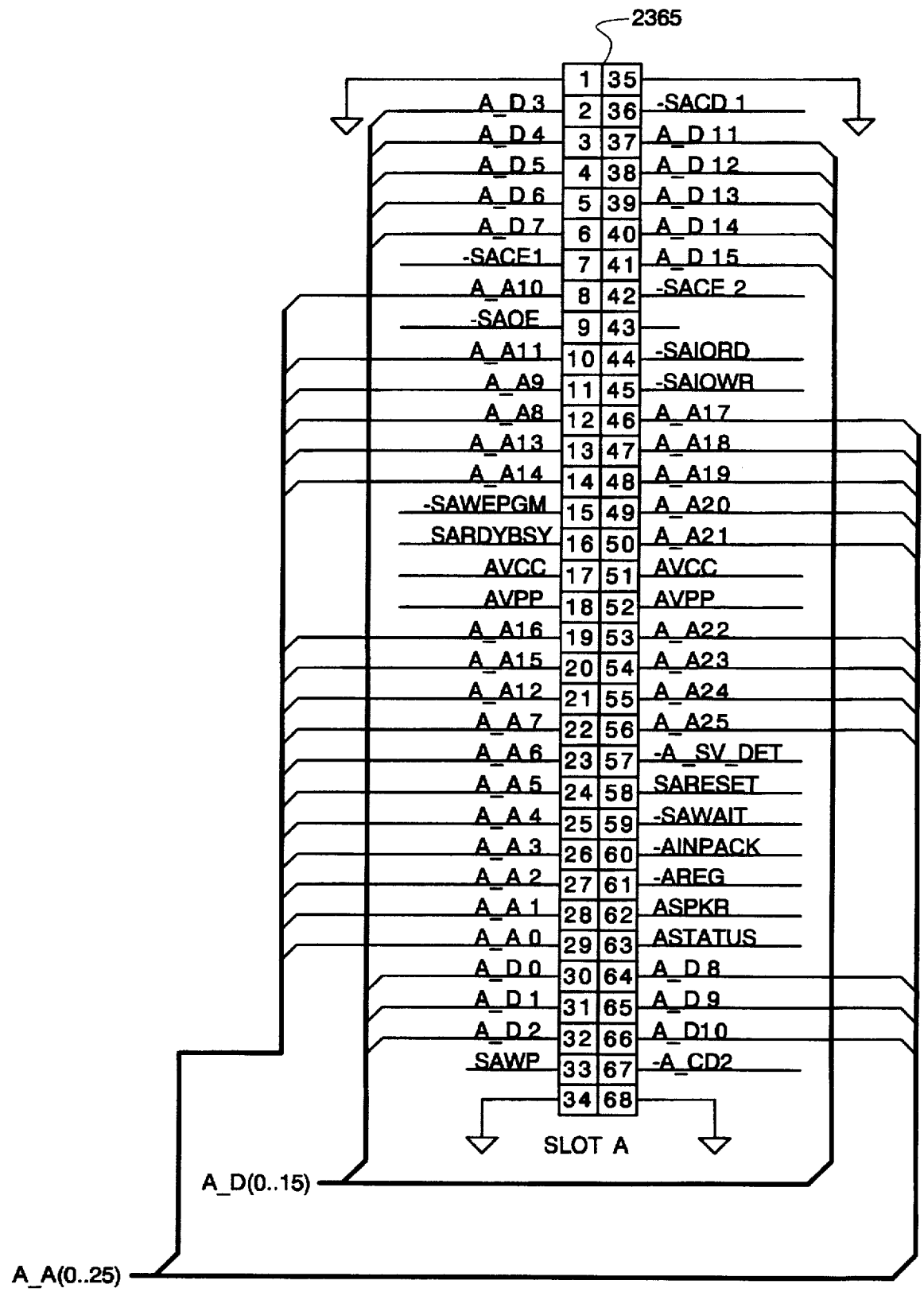
Figure 82B:
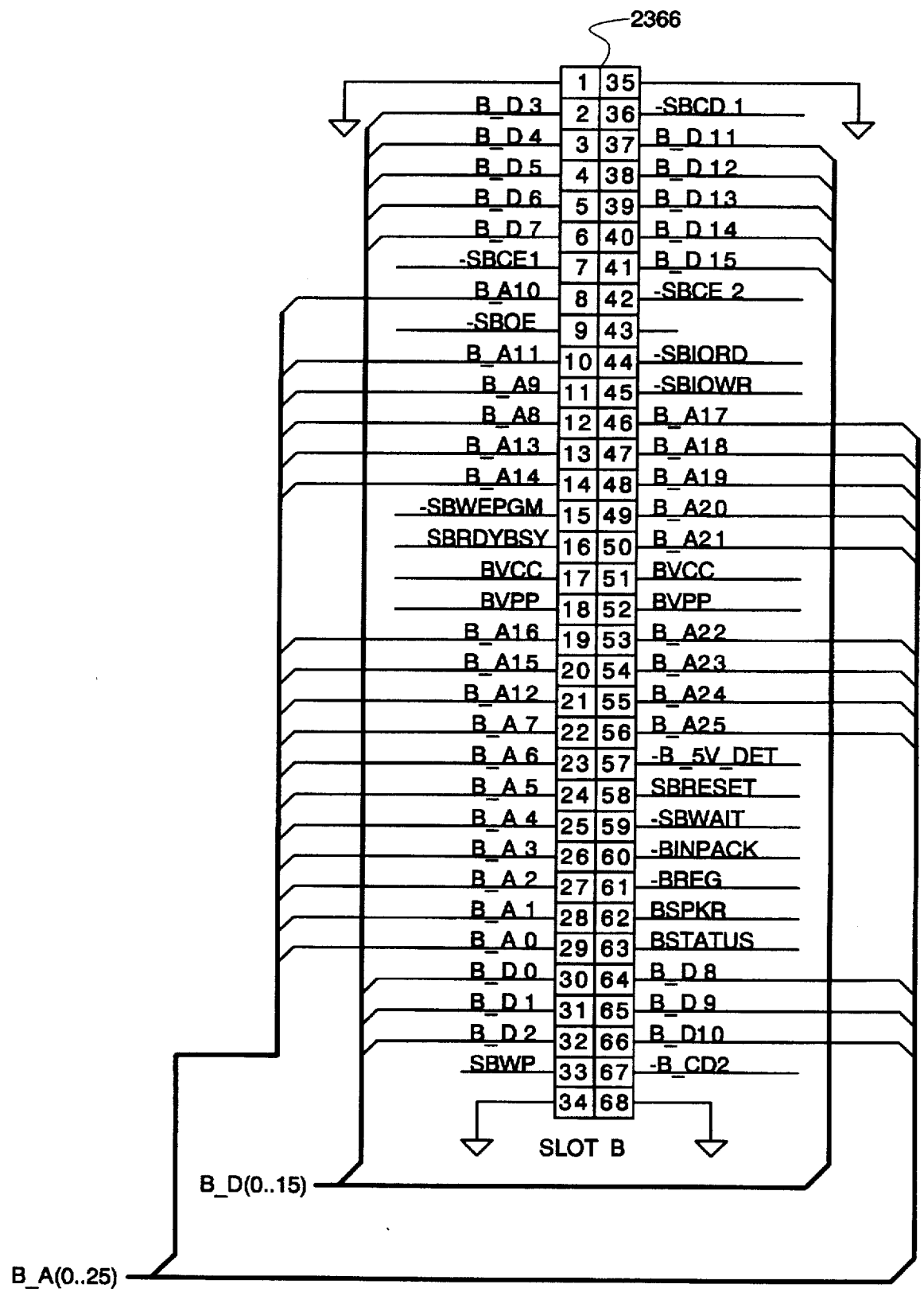

The circuitry for the power control for the PCMCIA interface is shown within FIGS. 80A–80C within the dashed boxes 2362 and 2363. The power control for the PCMCIA interface 2082 for the portable multimedia system 2060 is similar to that illustrated in FIGS. 49A and 49B for the active port replicator 104 and will not be described further. Similarly, the power supply circuitry shown in FIGS. 81A–81D within the dashed box 2365 for the PCMCIA interface is similar to the power supply circuitry illustrated in FIGS. 63 and 64 for the active port replicator 104 and thus will not be described further. As shown in FIG. 82, two 100-pin connectors 2365 and 2366 are provided within the PCMCIA card slot A 2086 and the PCMCIA card slot B 2088.

The audio subsystem 2078 includes an audio controller 2096 (FIGS. 74B and 83A–83D), for example, a 16-bit stereo, single chip sound system controller, Mozart Model No. 643-0776, as described in detail (inventor to insert data sheet for the controller, as well as provide as a copy) and herein incorporated by reference. The audio controller 2096 is used to drive the CD-ROM interface 2080 and may be used to support software generated audio signals, such as digitized WAV (Windows Audio Visual) signals or software-generated signals by way of a MIDI driver 2085.

Referring to FIGS. 83A–83D, the audio controller 2096 includes a 16-bit data input bus SD (0:15) that is connected to the system data bus SD (0:15) in the PC 102 by way of the quick switches 2124A–2124H (FIG. 75C) and the main connector 2126 (FIG. 75). The 24-bit address bus SA (0:23) on the controller 2096 is also connected to the system address bus SA (0:23) in the PC 102 by way of the quick switches 2124A–2124H (FIG. 75C) and the main connector 2126 (FIG. 75). The audio controller 2096 includes six interrupt request lines (IRQ3, IRQ5, IRQ7, IRQ9, IRQ10 and IRQ11), as well as direct memory access (DMA) request signals (DRQ0–DRQ7) and DMA acknowledge signals (–DACK0—DACK7), as well as various control signals, include read and write control signals (–IOW and –IOR), which are likewise connected to corresponding signals in the PC 102 by way of the quick switches 2124A–2124H (FIG. 75C) and the main connector 2126 (FIG. 75).

The power supply for the audio controller 2096 is derived from the power supply 2076 (FIG. 74B), discussed above. In order to provide a relatively stable voltage to the audio controller 2096, the input pins to the controller 2096 are filtered by way of a plurality of capacitors 2400–2414.

Figure 83A:
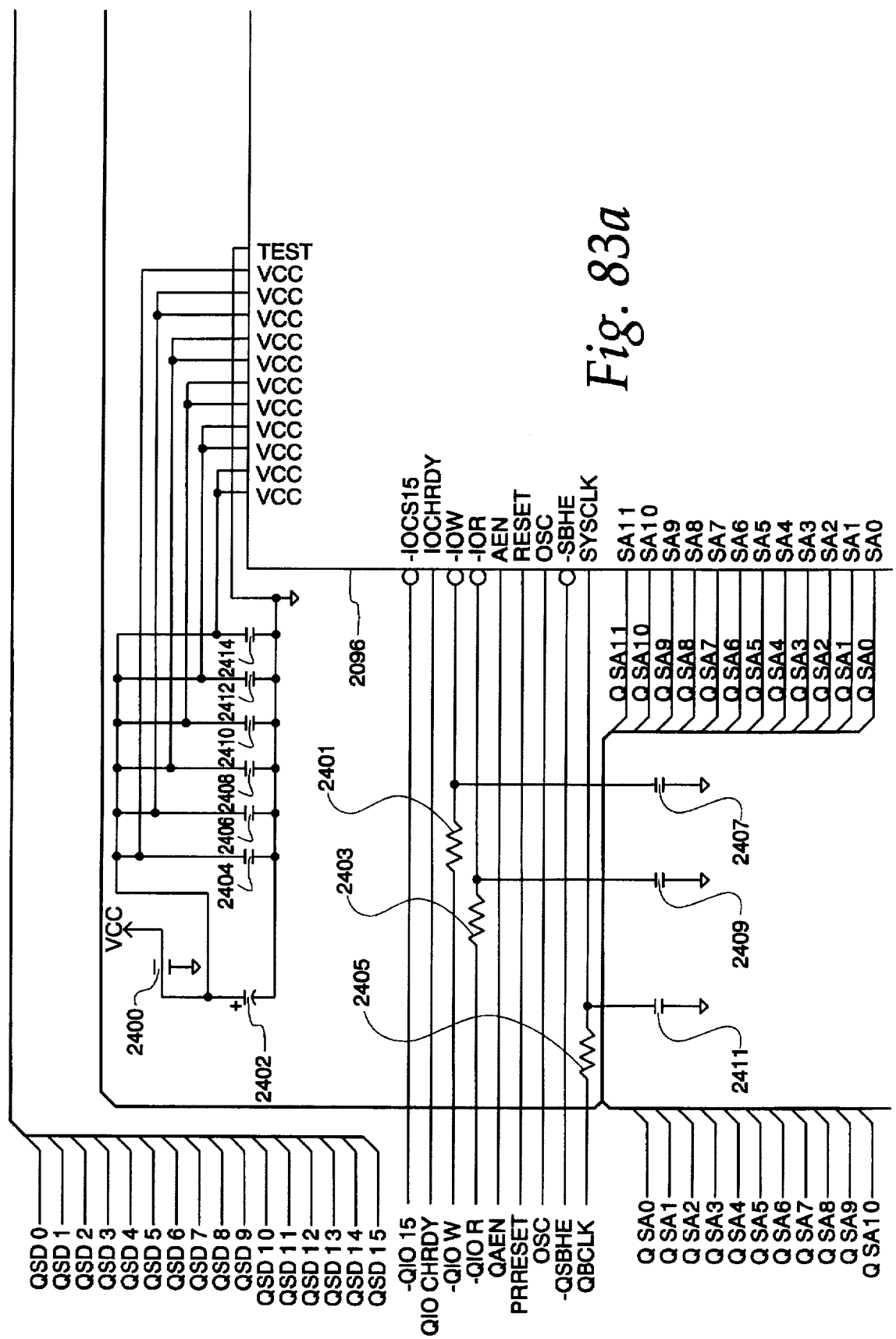
Figure 83B:
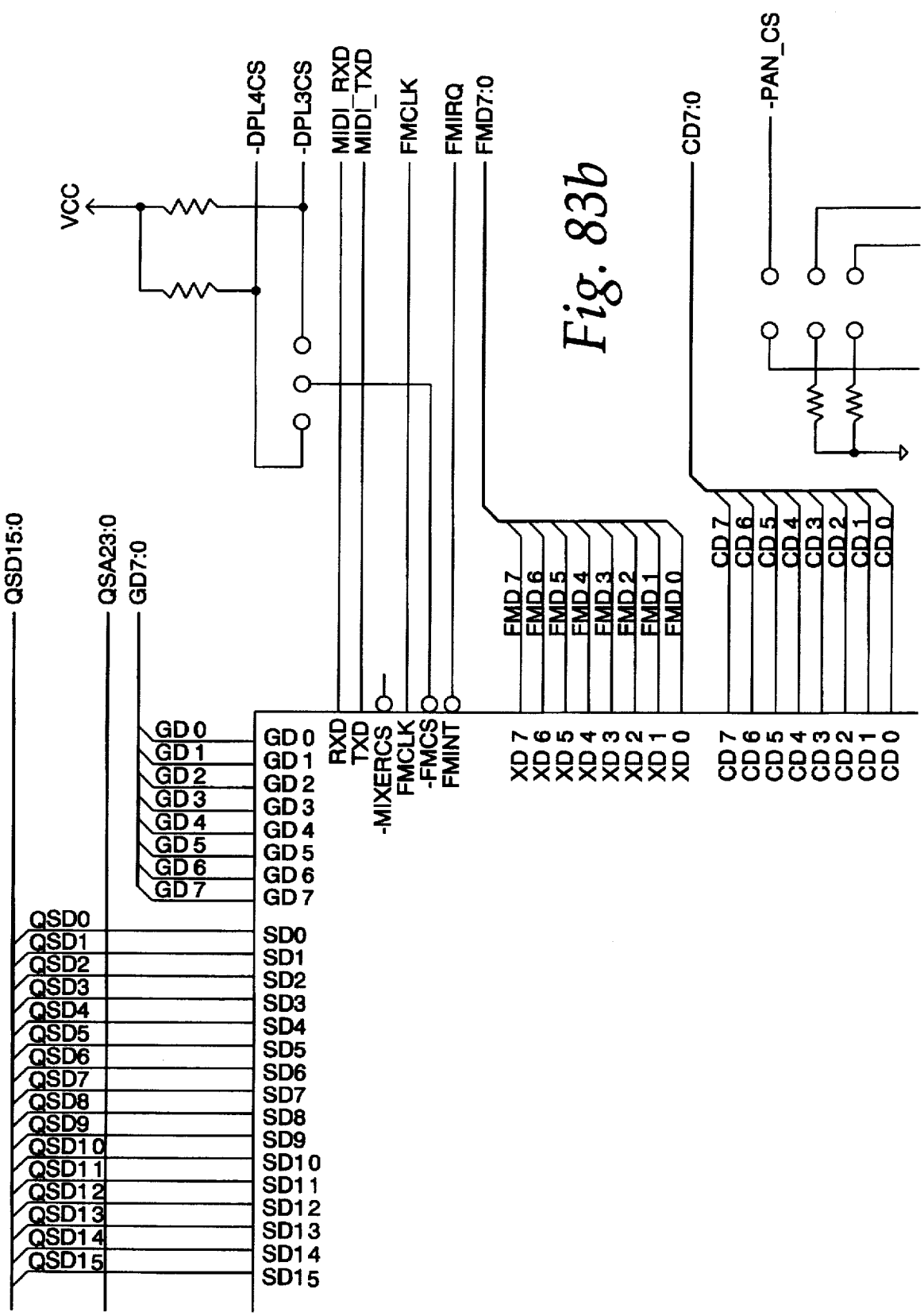
Figure 83C:
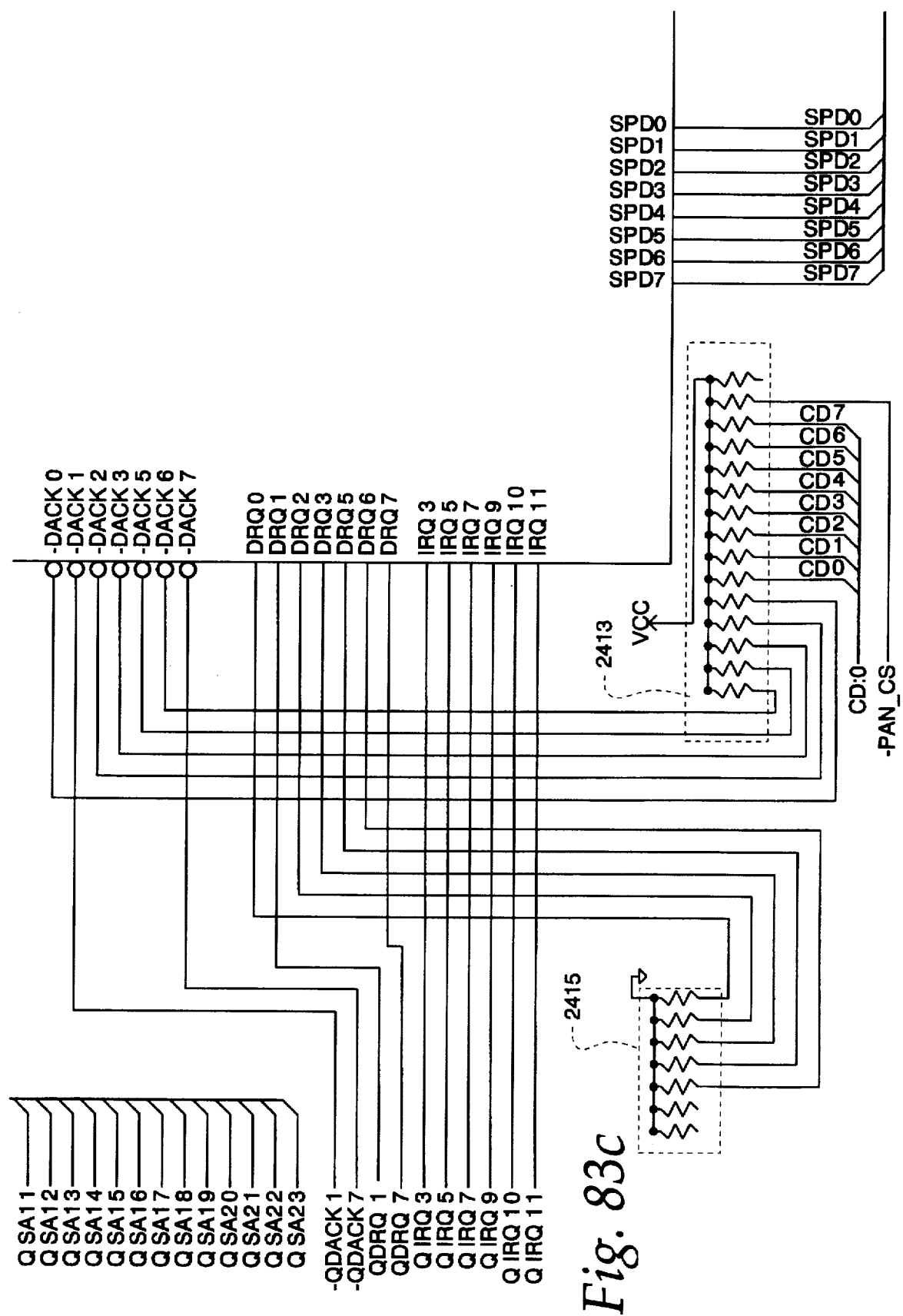
Figure 83D:
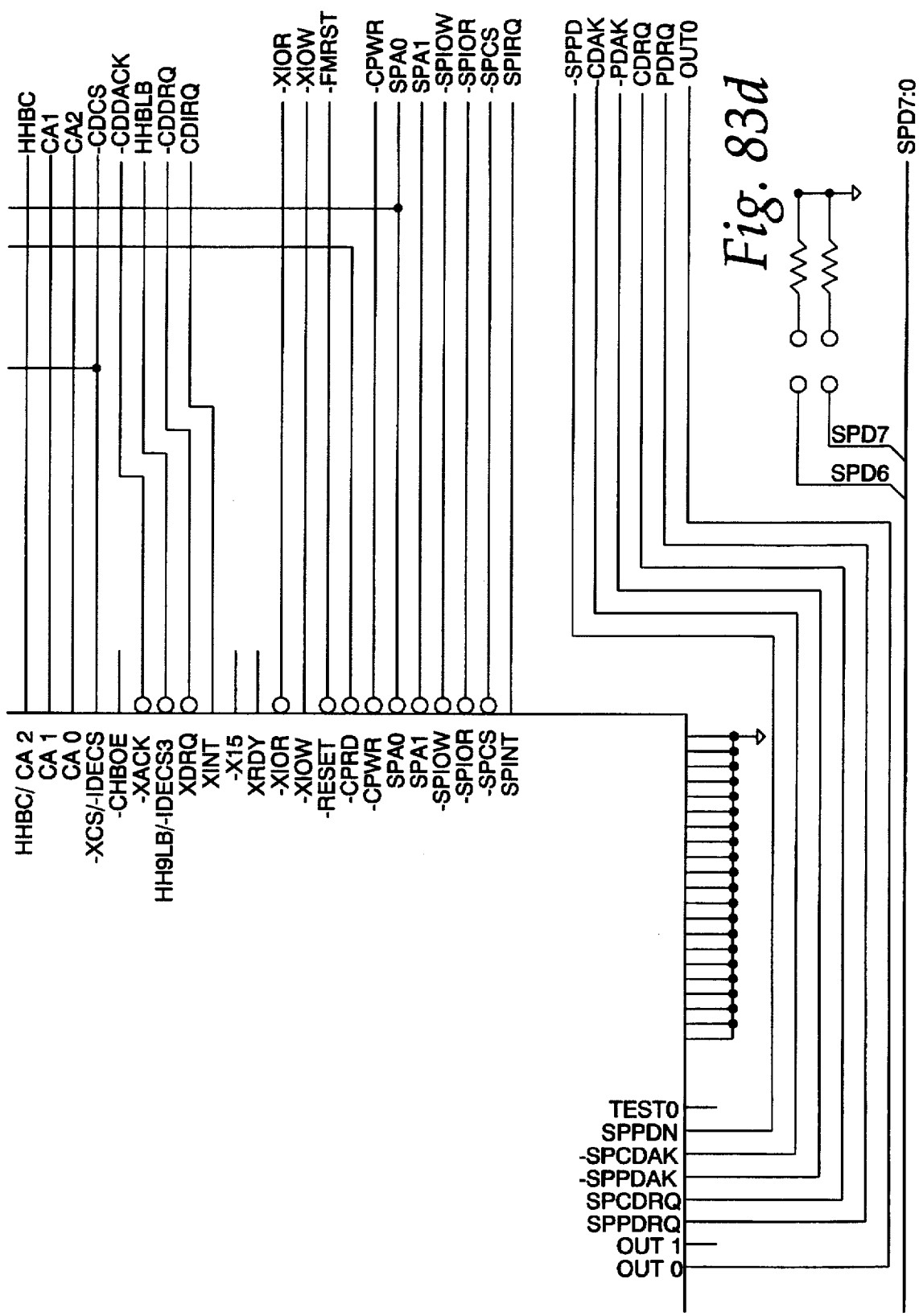
Figure 84B:
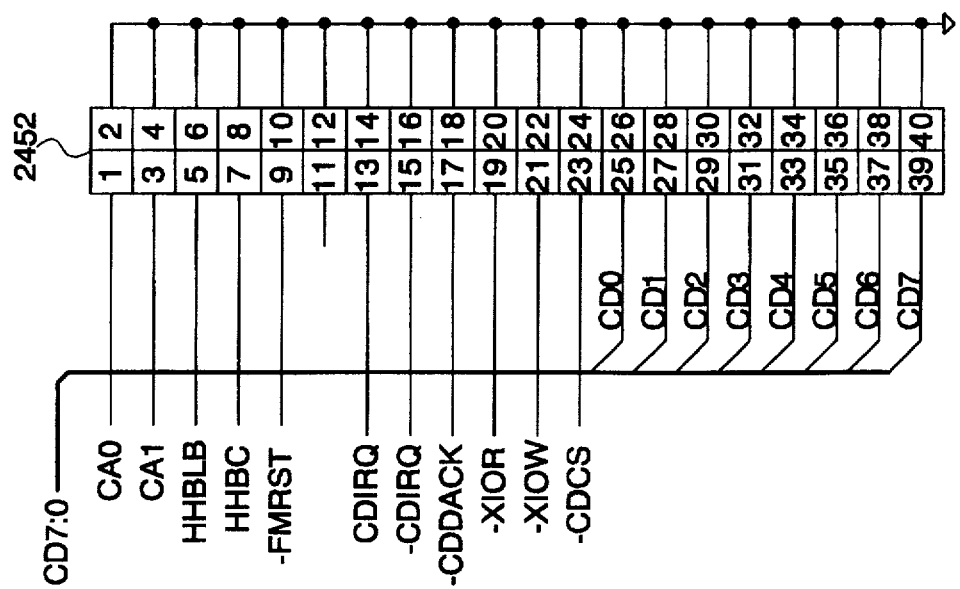
Figure 84A:
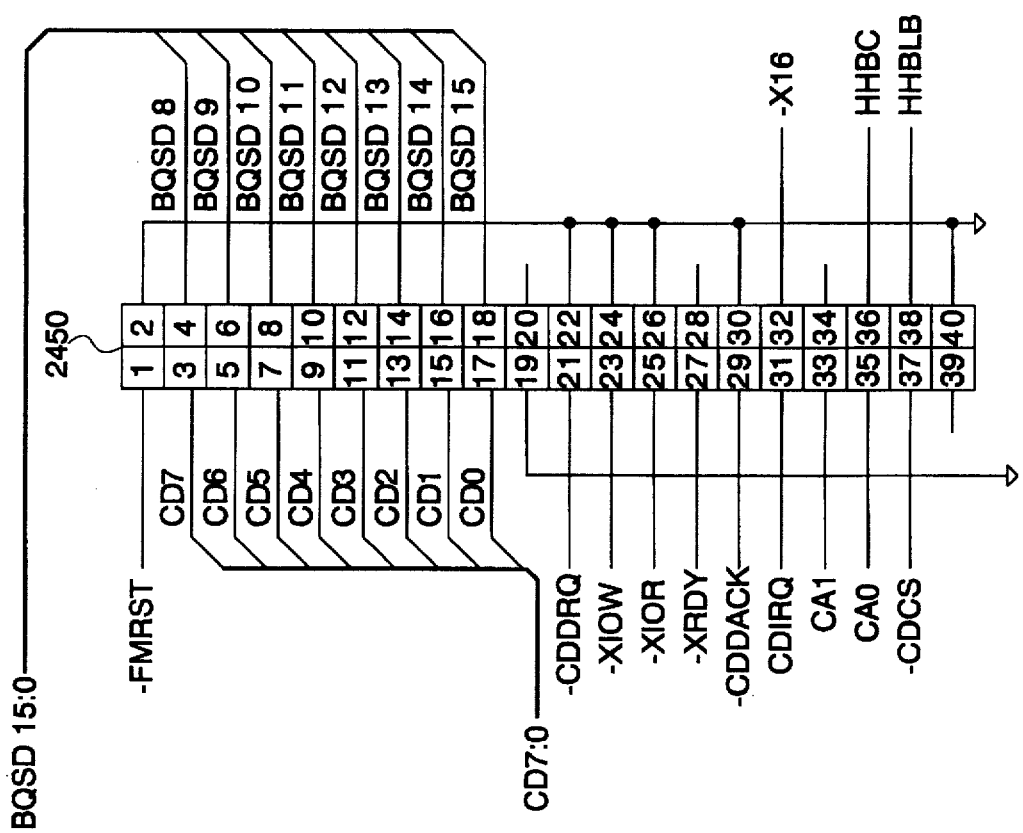
Figure 84C:
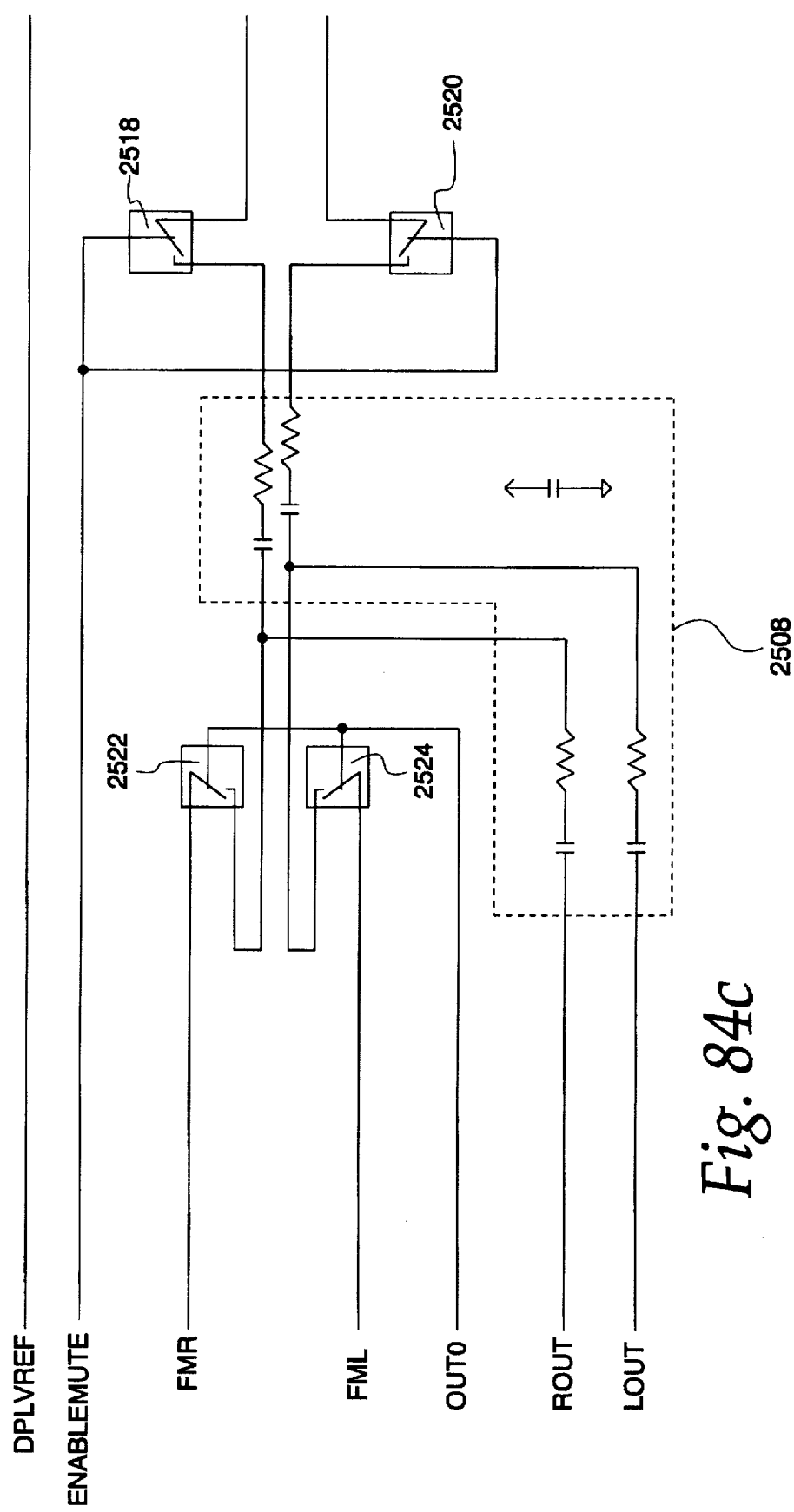
Figure 84D:
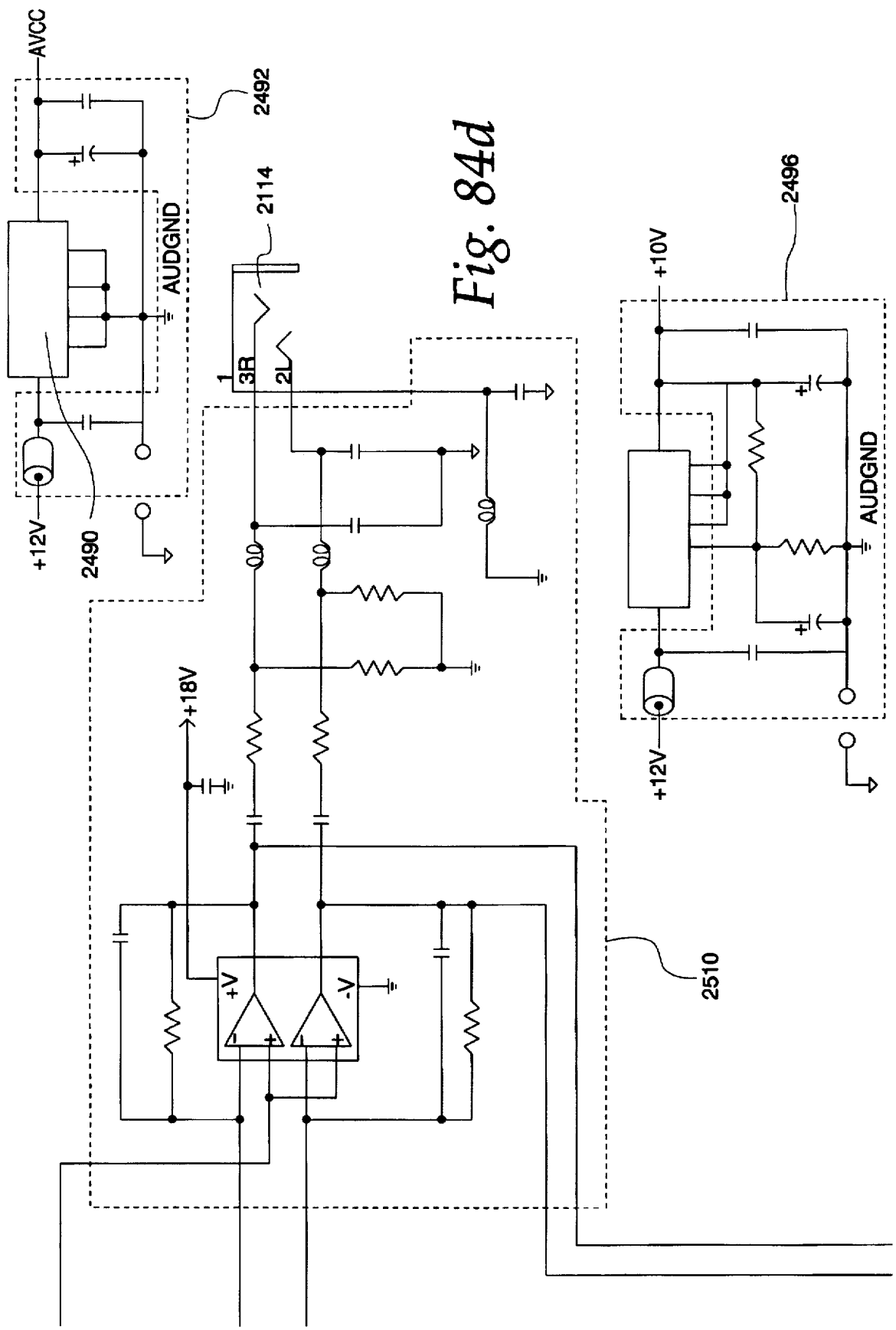
Figure 84E:
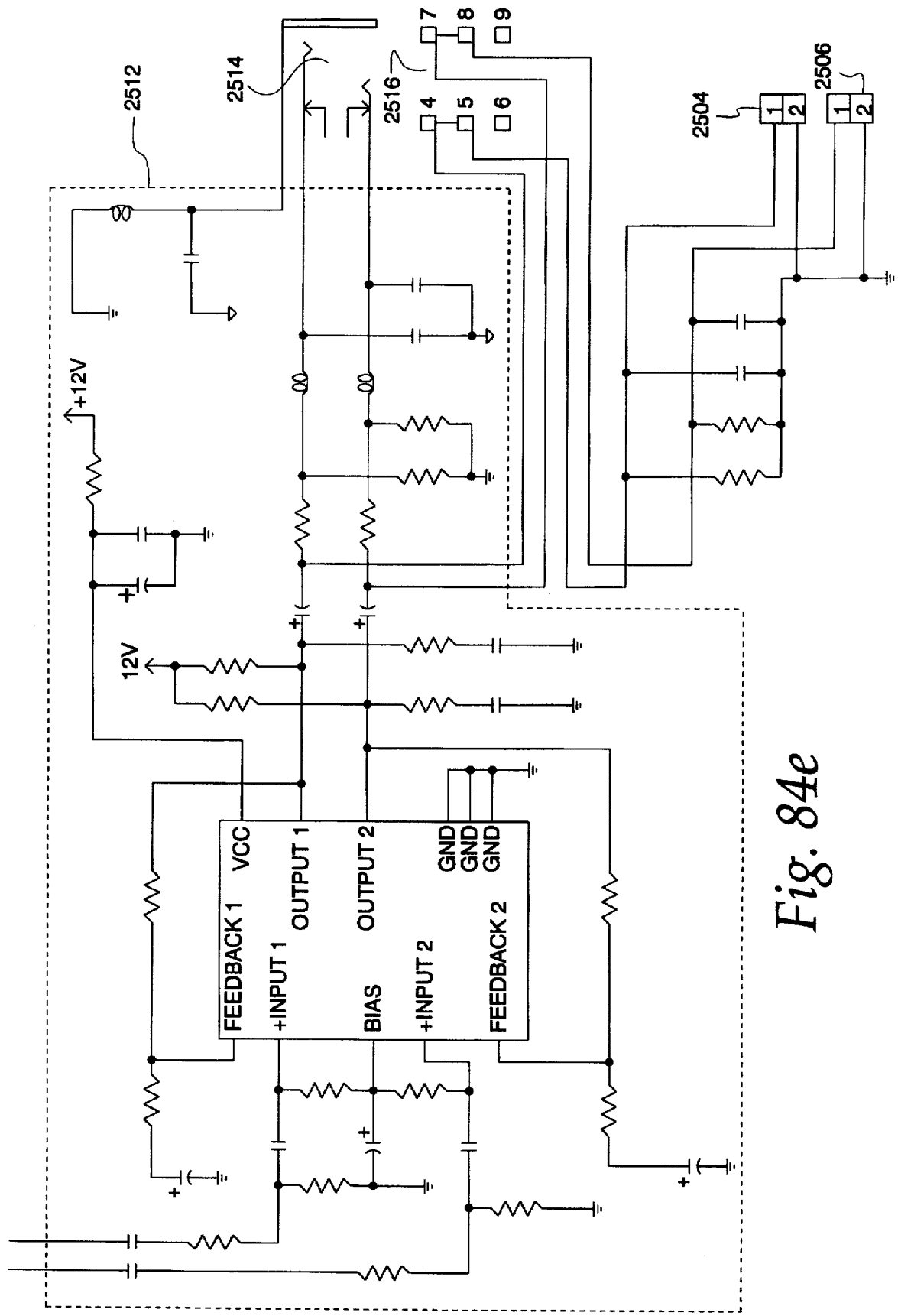

As mentioned above, the audio controller 2096 is adapted to drive a CD-ROM interface 2080. The read signal –IOR, write signal, –IOW, as well as the system clock signal SYSCLK are filtered by way of the resistors 2401, 2403 and 2405 and the capacitors 2407, 2409 and 2411. In addition, the PCM acknowledge signals, DACK[0:7], as well as the CD-ROM data bus signals CD[0:7] are pulled up by various pull-up resistors shown with the dashed box 2413 (FIG. 83C). The DMA request signals DRQ[0:7] are pulled low by the pull-down resistors 2415.

As mentioned above, the audio controller 2096 is adapted to drive the CD-ROM interface 2080 and provides digital processing of the audio and video signal while an audio CODEC 2098 provides for analog processing. In order to provide flexibility in the system, two different CD-ROM interfaces 2450 and 2452 are provided (FIG. 84) both implemented as 40-pin connectors. The CD-ROM interface 2450 is a standard IDE-type interface for supporting CDROMs, such as manufactured by Panasonic and Sony. The CD-ROM interface 2452 is adapted to support non-standard CD-ROMs, such as a CD-ROM as manufactured by Mitsumi.

The CD-ROM data bus CD (7:0) from the audio controller 2096 is connected to each of the connectors 2450 and 2452. In addition, as shown in FIG. 84, various control signals for both the IDE interface 2450 and the non-IDE interface 2452, including the read and write signals –XIOR and –XIOW, are connected between the audio controller 2096 and the interfaces 2450 and 2452. The audio controller 2096 is able to select between the CD-ROM interfaces 2450 and 2452 by address lines CA0 and CA1.

The audio subsystem 2084 is also adapted to broadcast the audio signals on the internal speakers 2108, 2110 (FIG. 74B). The CD-ROM audio signals may be connected by way of input connectors 2456, 2458 and 2460. The CD-ROM audio signals from the connectors 2456, 2458 and 2460 are processed by the audio CODEC 2098 (FIG. 85), which decompresses the compressed audio signals and broadcasts the audio signals on the internal speakers 2108 and 2110. The compressed audio signals from the CD-ROMs, connected to the connectors 2456, 2458 and 2460, are filtered for electromagnetic interference (EMI) by way of the capacitors, inductors and resistors shown within the dashed box 2462. The compressed audio signals from the CD-ROM interface connectors 2456, 2458 and 2460 are applied to the left and right auxiliary inputs RAUX1, LAUX1 of the audio CODEC 2098. In order to conserve inputs on the audio CODEC 2098, the line-in jack 2116 (FIG. 74B), for example from a laser disc, is also applied to the left and right auxiliary inputs LAUX1 and RAUX1 by way of the EMI filtering circuit shown within the dashed box 2464.

The audio CODEC 2098 is under the control of the audio controller 2096. In particular, an 8-bit data bus SPC [0:7] from the audio controller 2096 is applied to the audio CODEC 2898, along with various control signals including read and write signals –SPIOW and –SPIOR. In addition, DMA request and acknowledge signals PDRQ, CDRQ, –PDAK and –CDAK, along with an interrupt request line SPIRQ from the audio controller 2096, are also applied to the audio CODEC 2098 for control. Addressing of the audio controller 2096 by the audio CODEC 2098 is controlled by the select signals –SPCS, SPA1 and SPA0. External filtering for the audio CODEC 2098 is provided by the capacitors 2466–2476, applied to the filter inputs FILT1 and FILT0 of the audio CODEC 2098.

The clock signal for the audio 2098 is provided by a pair of crystals 2478 and 2480 and two pairs of capacitors, identified with the reference numerals 2482, 2484, 2486 and 2488. The clock signals from the crystals 2478 and 2480 are applied to the clock inputs XTAL1I, XTAL1O, XTAL2O and XTAL2I of the audio CODEC 2098. Two powers supplies are applied to the audio CODEC 2098 in order to provide isolation between the analog and digital circuitry on the chip. In particular, an analog power supply AVCC 2488 is developed by a linear regulator 2490 and associated filtering circuitry shown within the dashed box 2492 as shown in FIG. 84. The analog supply voltage AVCC is applied to the power supply inputs VCC of the audio CODEC 2098 by way of the filtering circuitry shown within the dashed box 2494 (FIG. 85). The digital power supply is developed by the power supply 2076, which includes a linear regulator, such as a LM317 and associated circuitry shown within the dashed box 2496 (FIG. 84). The digital power supply voltage is applied to the inputs VD1-VD7 by way of the filtering circuitry shown within the dashed box 2498 (FIG. 85).

The audio CODEC 2098 also includes a power-down input line -SPPD. This power-down signal -SPPD is under the control of the audio controller 2096 to shut down the audio CODEC 2098 anytime the power supply is unavailable.

In addition to the audio inputs from external CD-ROMs and external audio devices, such as a laser disc, the audio CODEC 2098 is also adapted to receive audio signals from an external microphone by way of an input jack 2500. The audio signal from the input jack is conditioned by way of filtering circuitry and an amplifier, shown within the dashed box 2502 and is applied to the left and right microphone inputs LMIC, RMIC on the audio CODEC 2098.

As mentioned above, the audio CODEC 2098 is adapted to receive various compressed and uncompressed audio input signals and to broadcast those signals by way of internal speakers 2108 and 2110. The internal speakers 2108 and 2110 are connected to input connectors 2504 and 2506 (FIG. 84), which, in turn, are connected to the output pins LOUT and ROUT on the audio CODEC 2098. The output signals LOUT and ROUT from the audio CODEC 2098 are conditioned by various filtering circuits shown within the dashed boxes 2508, 2510 and 2512. The output signals from the CODEC, LOUT and ROUT, are thus amplified and applied to the connectors 2504 and 2506 to drive the internal speakers 2108 and 2110.

In addition to driving the internal speakers 2108 and 2110, the audio CODEC is also adapted to drive a pair of headphones which may be plugged into a headphone jack 2514 (FIG. 84). Since the headphone jack 2514 and the internal speakers 2108 and 2110 are both driven by the same output signals LOUT, ROUT, a mechanical switch 2516 is provided, which automatically cuts out the internal speakers 2108 and 2110 when headphones are plugged into the jack 2514.

The audio CODEC 2098 also supports a standard line out jack 2114. The line out jack 2114 is also driven by the output signals LOUT, ROUT from the audio CODEC 2098.

The audio subsystem 2084 also includes a mute function, which enables the output signals, LOUT and ROUT, to be disconnected from the line out jack 2114, headphone jack 2514, as well as the internal speaker output connectors 2504 and 2506. The mute function is provided by a pair of in-line audio switches 2518 and 2520, which essentially disconnect the output signals, LOUT and ROUT, from the audio CODEC 2098 from the line out jack 2114, headphone jack 2514, as well as the speaker output connectors 2504 and 2506. The audio disconnect switches 2518 and 2520 are under the control of a mute enable signal ENABMUTE signal. The mute enable signal ENABMUTE is under the control of an external mute switch 2518 (FIG. 86). The mute switch 2518 may be a single pull, single throw maintain contact switch, which may be wired to a connector 2520 on the status board 2074 (FIG. 74A) and, in turn, connected to the main board 2062.

As mentioned above, the audio subsystem 2084 also supports software-generated audio signals, such as digitized wave signals WAV, as well as supports a MIDI driver 2085. The digitized audio signals are under the control of the audio controller 2096. The MIDI interface 2085 is connected to the receive and transmit pins MIDI_RXC, MIDI_TXD pins on the audio controller 2096. The digitized audio signals are under the control of an FM synthesis chip 2118 and a digital-to-analog converter 2120 (FIG. 85). The FM synthesis chip 2118 may be a Yamaha Model No. YMF262, while the digital-to-analog converter 2120 may be a Yamaha Model No. YAC512.

The FM synthesis chip is 2118 driven by the FM data bus FMD [7:0] from the audio controller 2096, which is connected to a connector 2520 on the audio card 2078 (FIG. 74B) along with various control signals. The FM data bus, FMD [7:0] is applied to the FM synthesis chip 2118 from the connector 2520, which, in turn, drives the digital-to-analog converter 2120. The analog audio output signals from the DAC 2120 are conditioned by the various components, including the amplifier shown within the dashed box 2520 to develop left and right FM signals FMR, FML. These conditioned FM output signals are then applied to a pair or switches 2522, 2524 (FIG. 84) and, in turn, to one of the various outputs of the audio subsystem 2084. The audio switches 2522, 2524 are normally open. During conditions when digitized audio signals are being processed and broadcast, the audio switches 2522 and 2524 will close to enable the process digital audio signals to be broadcast by one of the outputs from the audio subsystem 2084.

The system also includes the capability to upgrade the FM synthesis chip 2118 and the DAC 2120, which form a type OPL3 system to a type OPL4 system. In particular, the FM synthesis chip 2118 and DAC 2120 may be upgraded by the option board 2078 (FIG. 74B). The option board, illustrated in FIGS. 74C and 74D, includes an upgraded FM synthesis chip 2087 (FIG. 74C), for example a Yamaha Model No. YMF2788 and a DAC 2089, for example a Yamaha Model No. YAC513 and associated circuitry including a clock circuit 2095, an amplifier circuit 2093 and a filtering circuit 2095, which form a type OPL4 system.

Figure 85A:
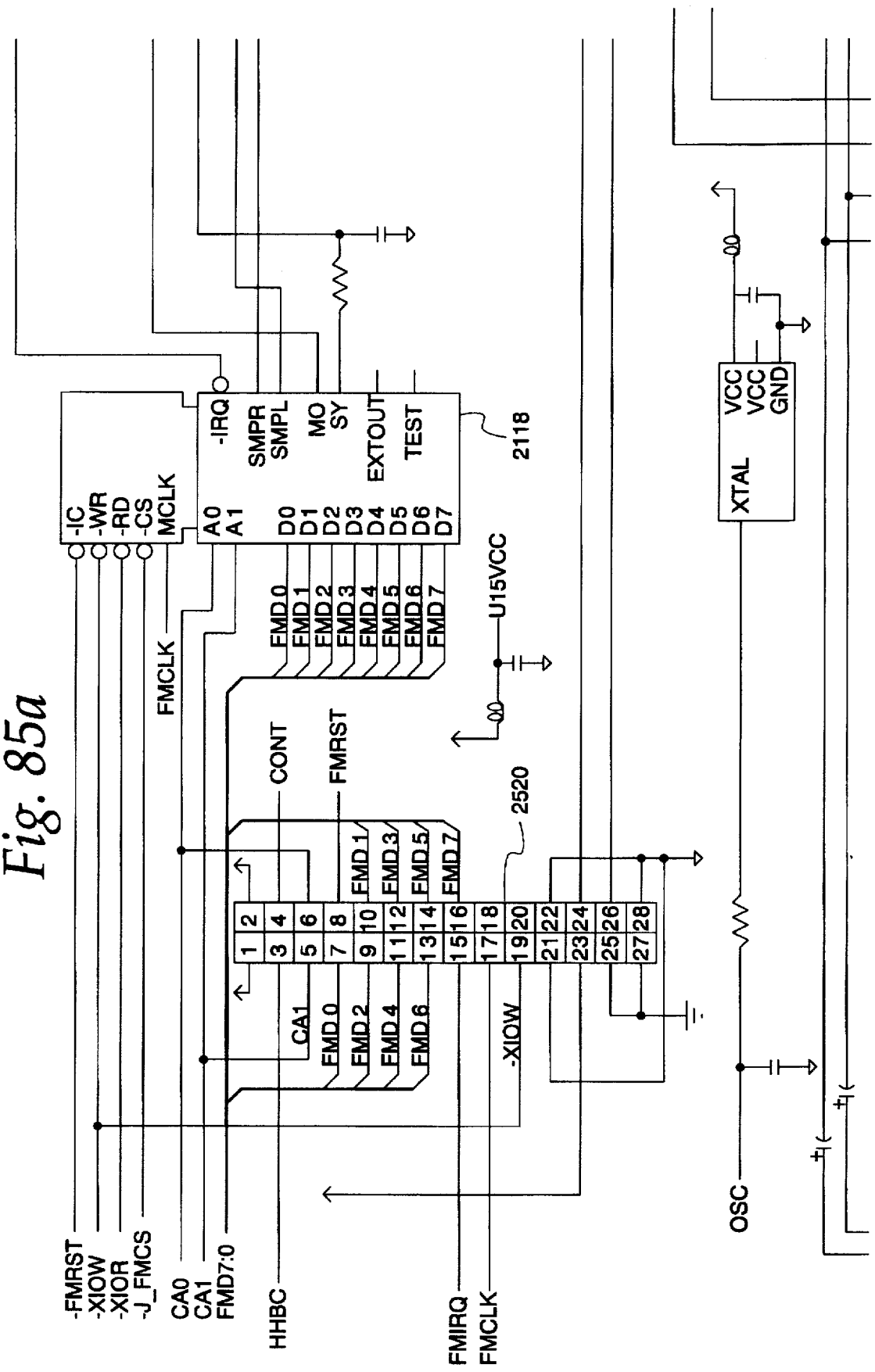
Figure 85B:
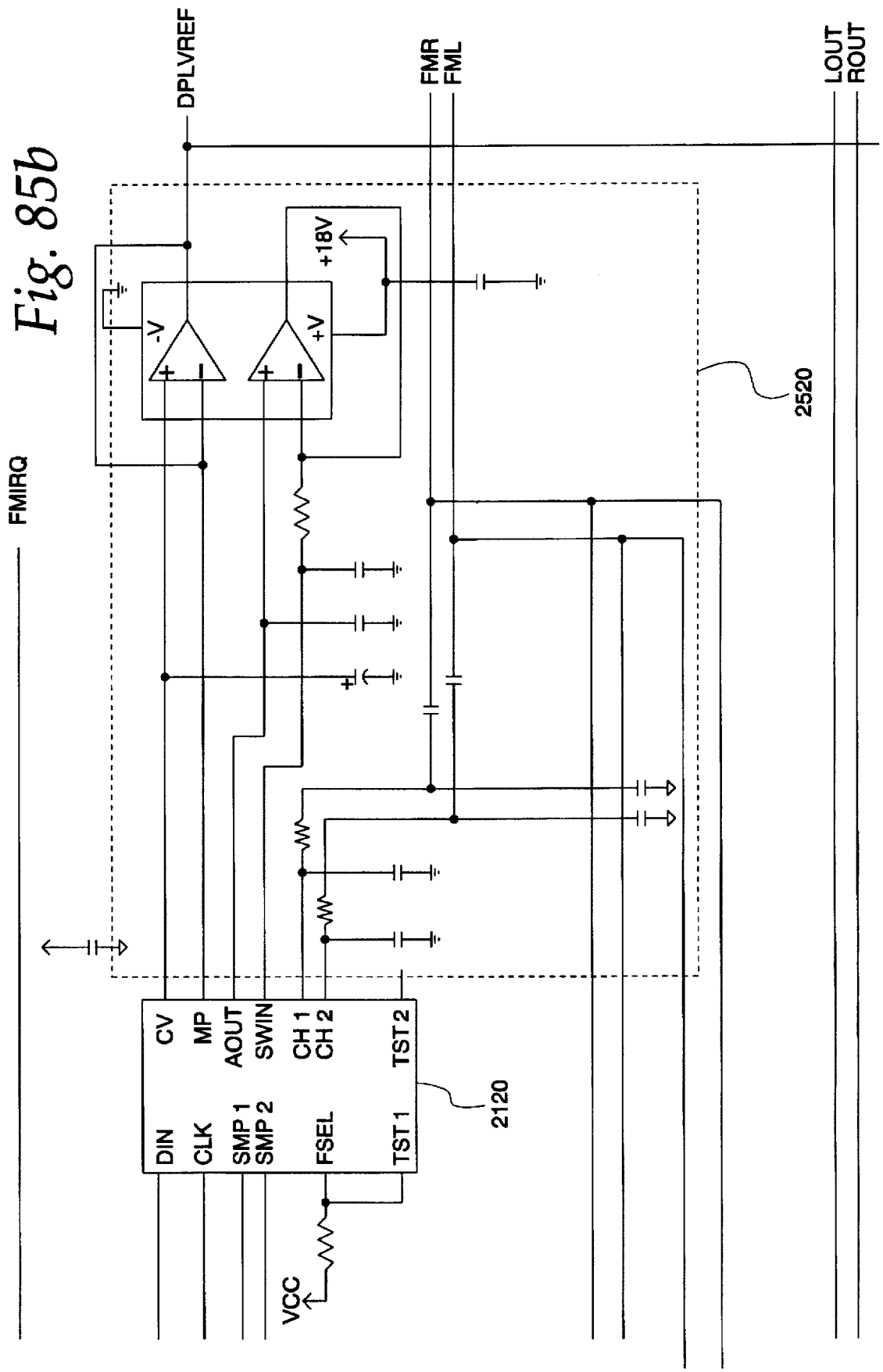
Figure 85C:
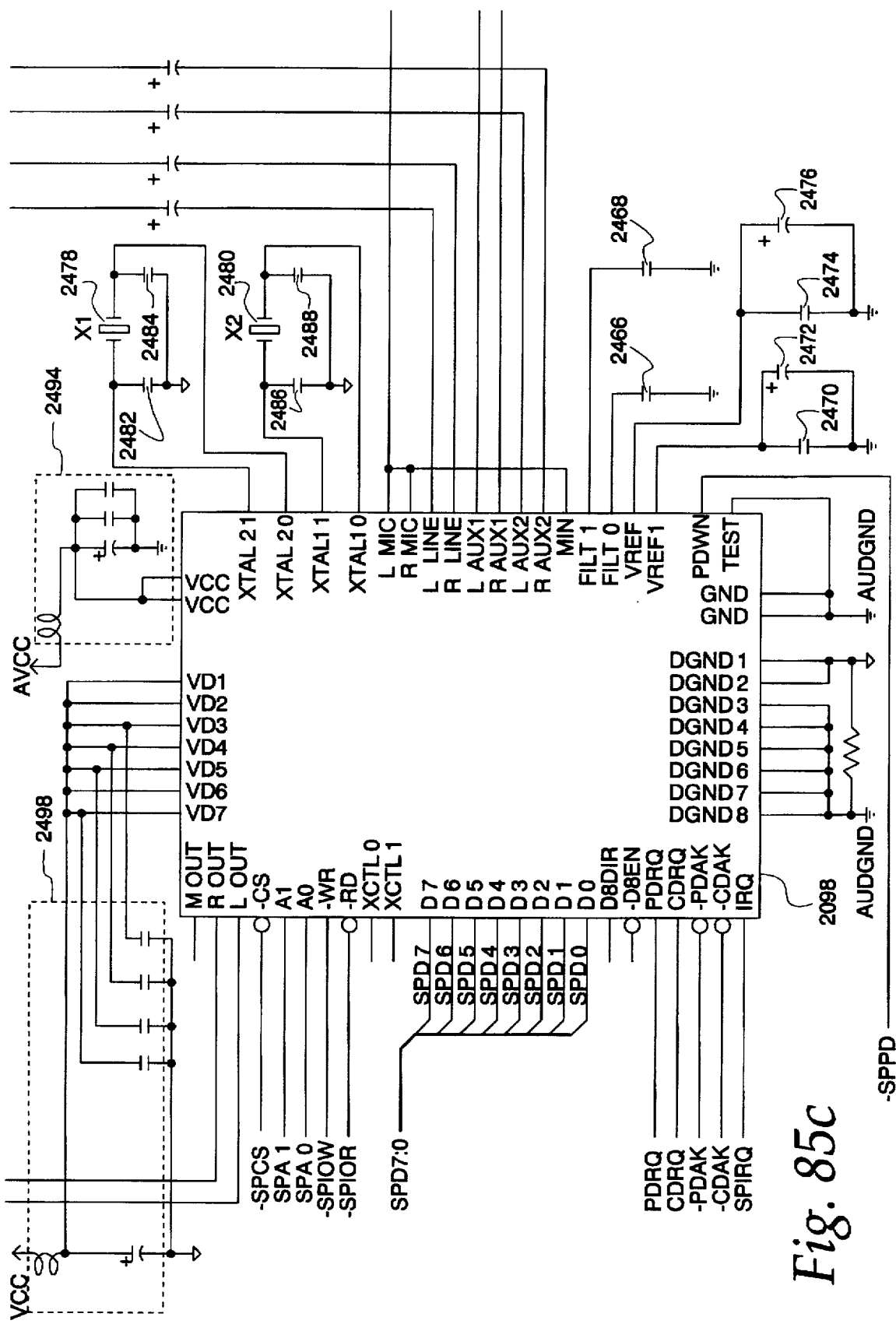
Figure 85D:
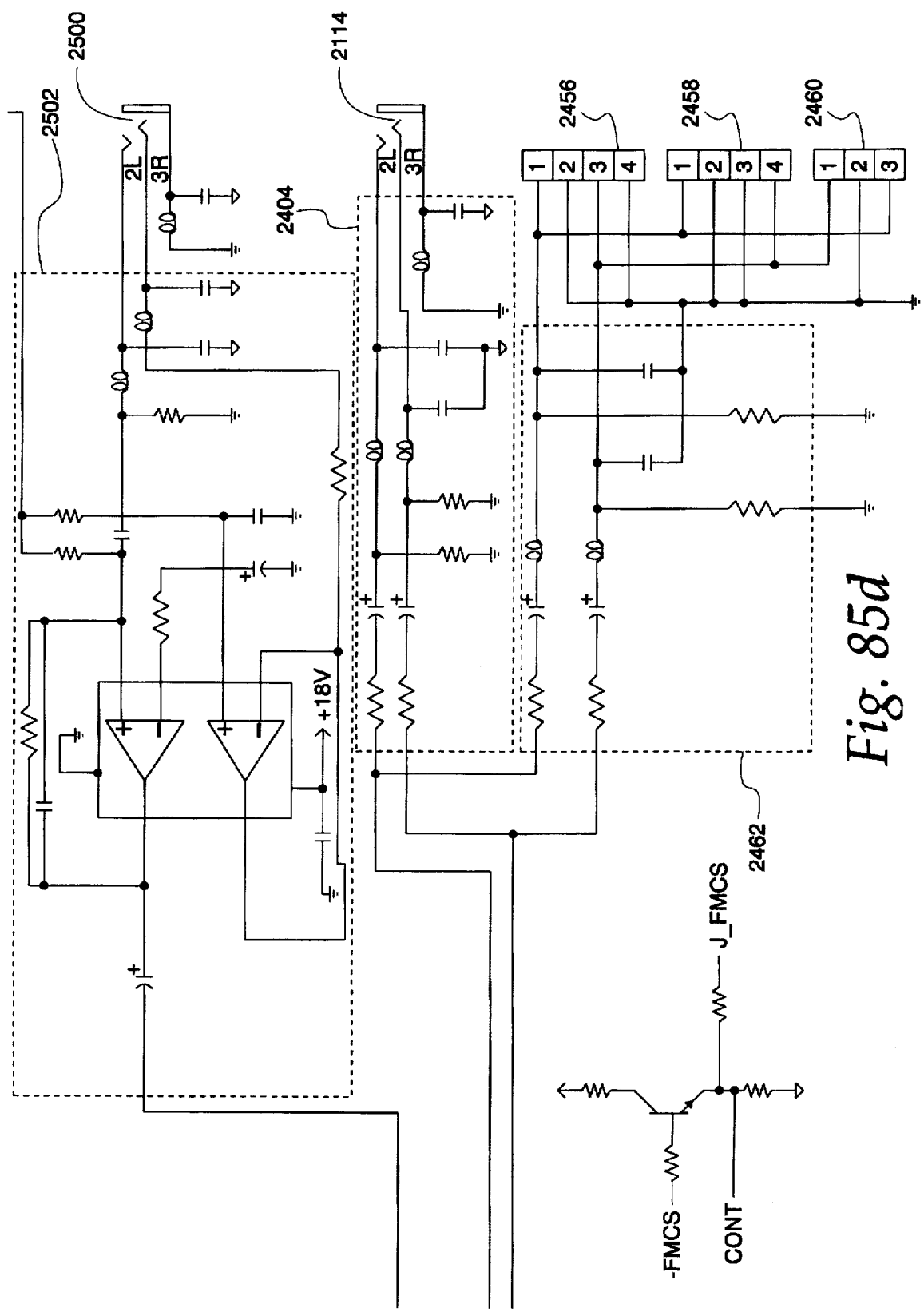

The OPL4 circuitry is configured on a plug-in printed circuit board which includes a connector 2091. In order to upgrade the FM synthesis circuitry, the connector 2091 is simply inserted into the connector 2520 (FIG. 85A).

Figure 86A:
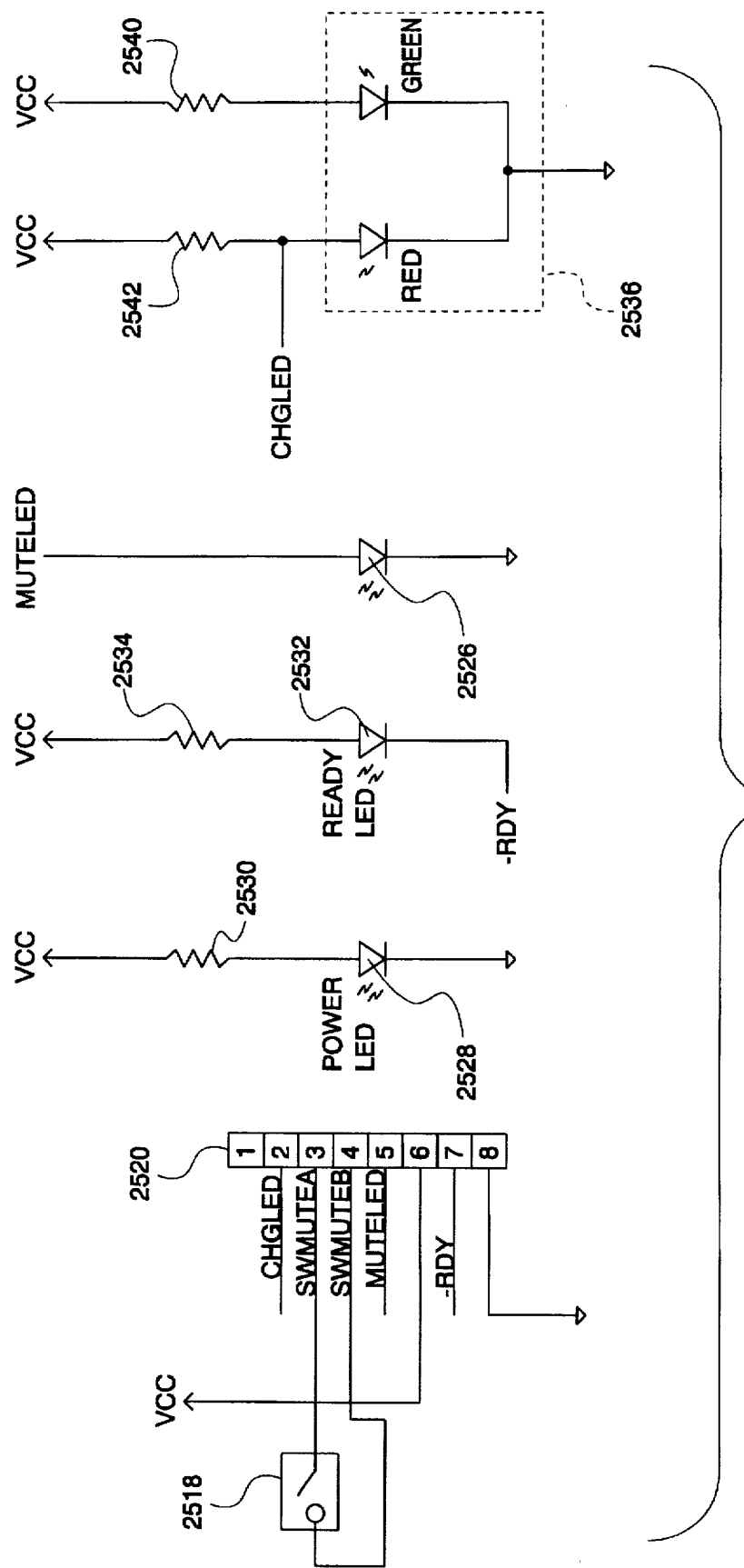
Figure 86B:
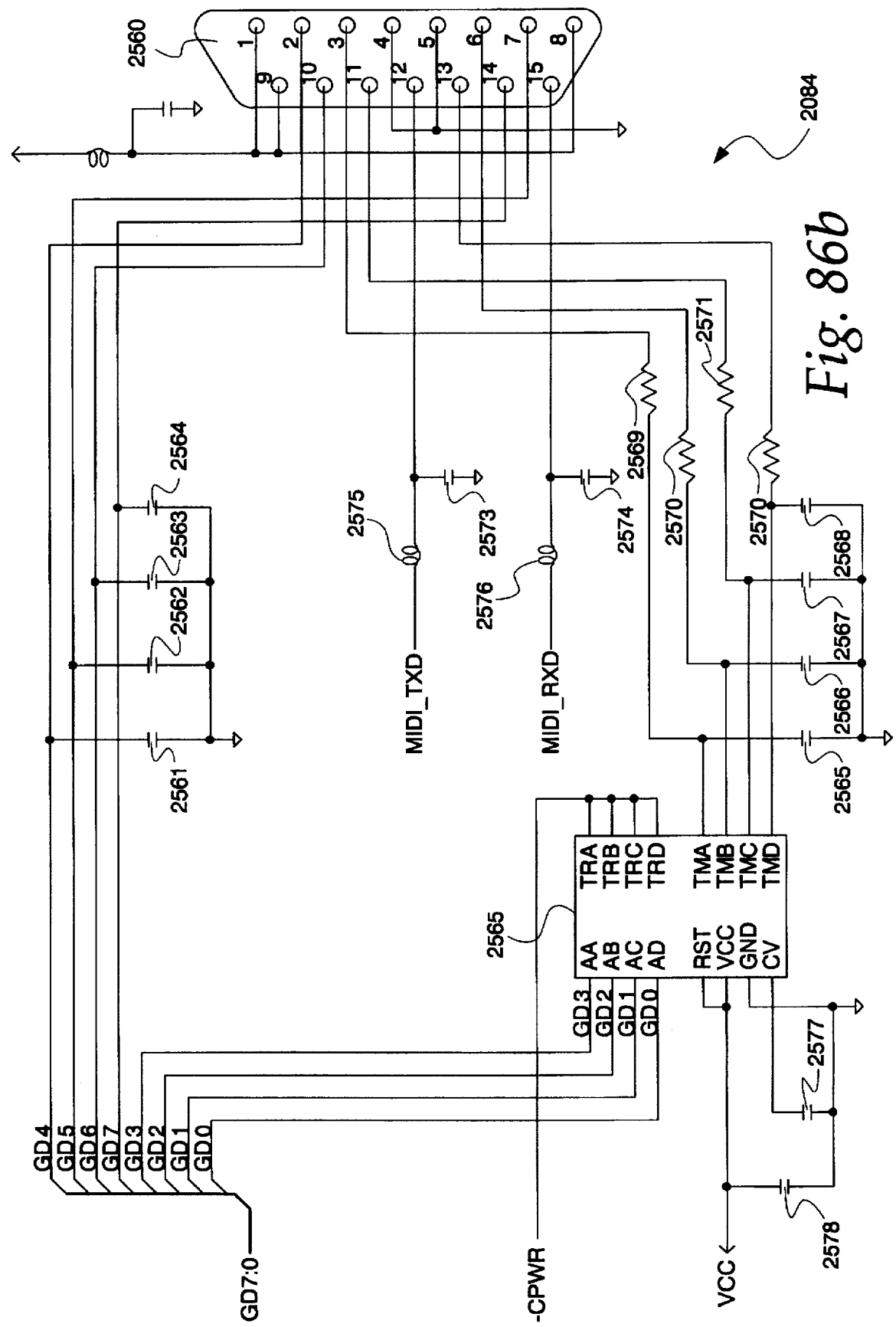

Referring to FIG. 86A, the number of LED's on the status board 2074 are shown, which provide the status of the system. In particular, a mute LED 2526 is shown connected between system ground and an active high mute signal MUTELED, available at a connector 2520 on the status board 2074. The active high mute signal MUTELED is available from a mute circuit, illustrated in FIG. 86B and discussed below. The mute signal MUTELED will be high whenever the mute switch 2518 on the face of the multimedia system 2060 is activated.

The status board 2074 also includes a power LED 2528. The cathode of the power LED 2528 is connected to ground, while the anode is connected to the supply voltage VCC by way of a current-limiting resistor 2530. Thus, anytime the power supply voltage VCC is available, the power LED 2528 will be illuminated.

The status board 2074 also includes a system ready LED 2532. The cathode of the system ready LED 2532 is connected to an active low system ready signal –RDY, while the anode is connected to the power supply VCC by way of the current-limiting resistor 2534. The system ready signal –RDY, as discussed above, is available at the collector of the BJT 2302 (FIG. 77C). The system ready signal –RDY will be active low when the multimedia system 2060 is not in a reset state and the keylock switch 2778 is not in a locked position. When these conditions are true, the ready LED 2532 will be illuminated.

A three-terminal battery charging LED 2536 is also provided. One anode of the LED 2536 is connected to the power supply voltage VCC by way of a current-limiting resistor 2540, while one cathode is connected to system ground. Thus, the LED 2536 will be illuminated when the power supply voltage VCC is available to the multimedia system 2060.

Figure 86D:
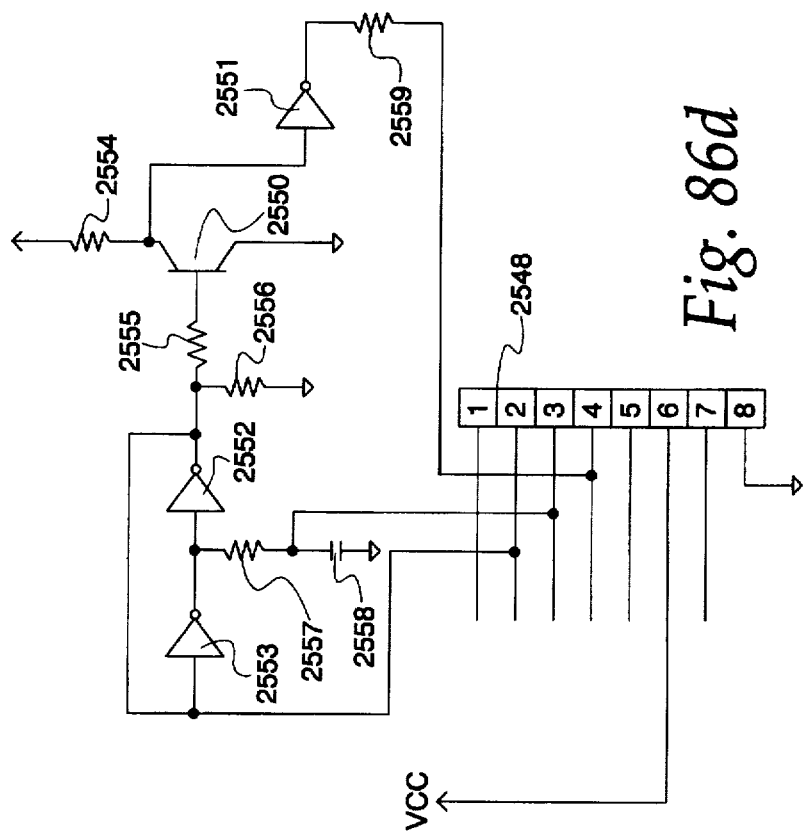
Figure 86E:
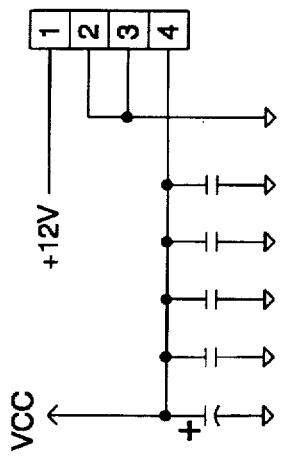
Figure 86F:
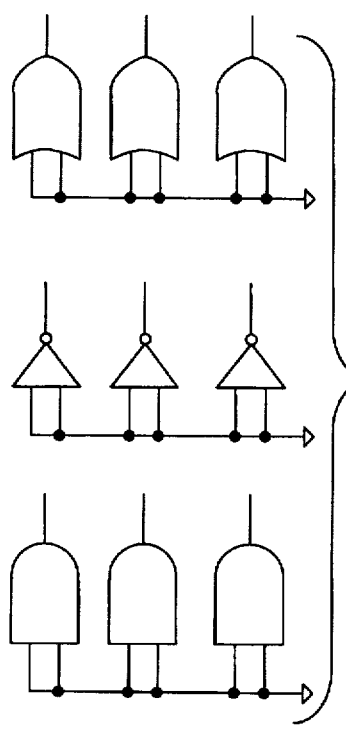
Figure 86C:
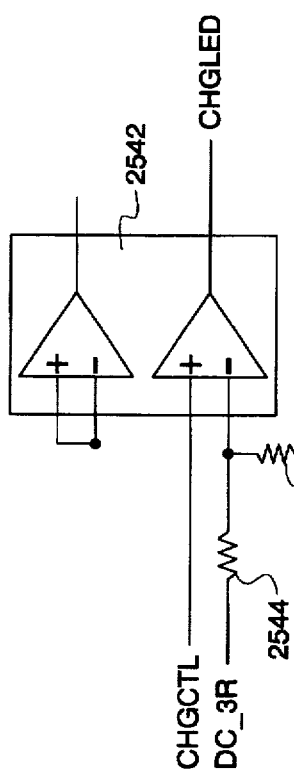
Figure 86G:
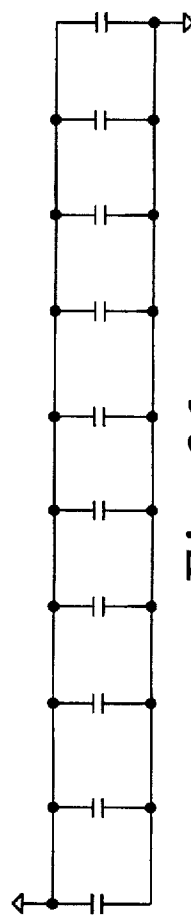
Figure 88:
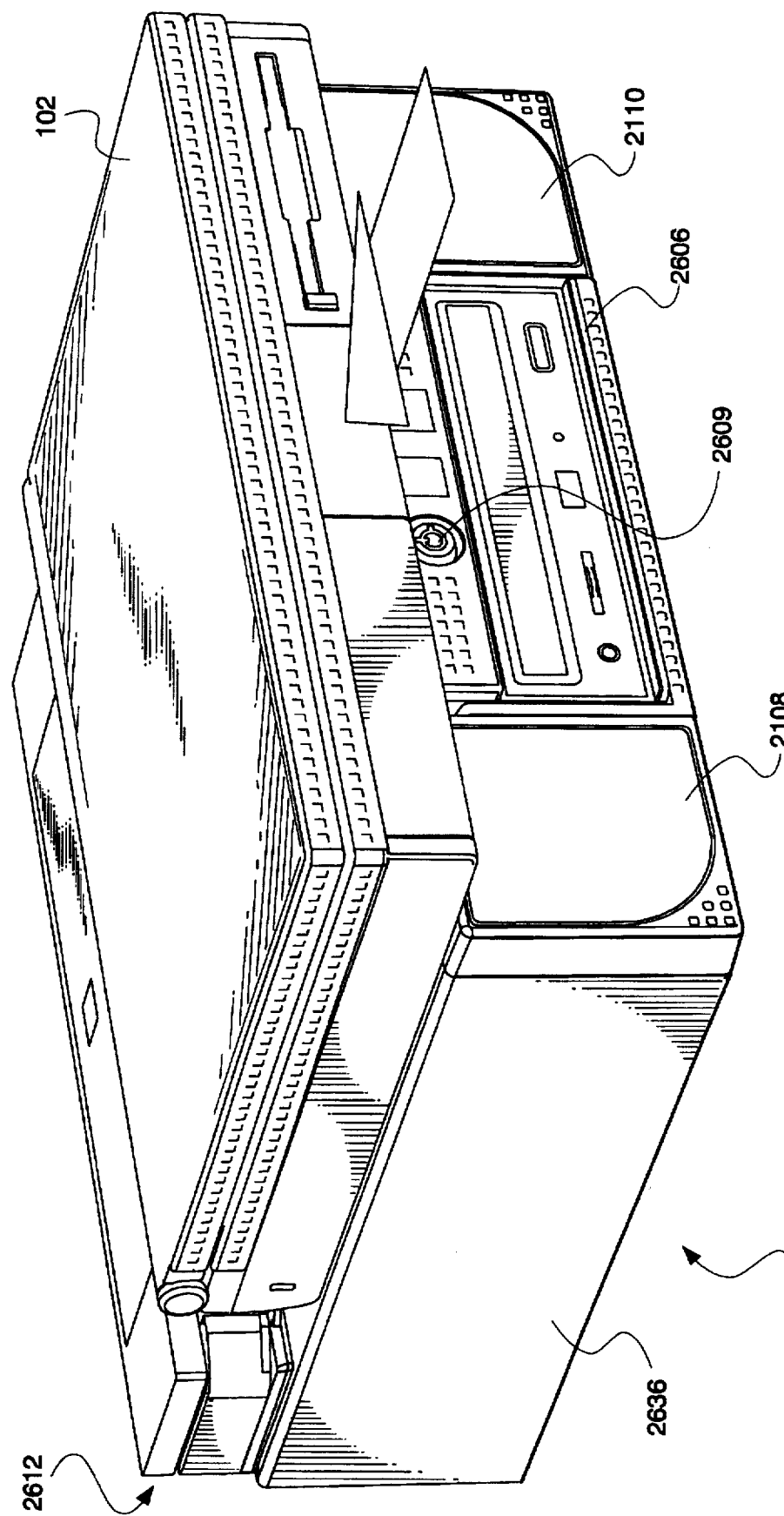
FIG. 88 is a perspective view of the multimedia system in accordance with the present invention, illustrating a portable personal computer close to being docked to the system.

The LED 2536 is under the control of a charge LED signal CHGLED, which indicates that the system is in a charge mode. More particularly, the anode of the LED 2536 is applied to the power supply voltage VCC by way of a current-limiting resistor 2542, while the cathode is connected to system ground. The anode of the LED 2536 is also connected to the charge LED signal CHGLED. The charge LED signal CHGLED is active high anytime the battery charging system, as discussed above, is in a charge mode operation. The charge LED signal is available from a comparator 42 (FIG. 86C). A charge control signal CHGCTL, as discussed above, is applied to a noninverting input of the comparator 2542, while the DC supply voltage DC_IN signal, as discussed above, is applied to an inverting input by way of a pair of voltage dividing resistors 2544 and 2546. The output of the comparator 2542 is the charge LED signal, which will be active high anytime the battery charging system, as discussed above, is in a charge mode of operation. During such a condition, the charging LED 2536 will be illuminated. However, once the charge LED signal CHGLED goes low, the anode of the LED 2536 is pulled low, thus switching off the LED 2536.

As discussed above, the mute LED 2526 is under the control of a mute LED signal MUTELED. This signal is available at a connector 2548 on the main PCB 2062. The connector 2548 is adapted to be connected to the connector 2520 on the status PCB 2520 (FIG. 86A). Referring to FIG. 86D, the mute signal MUTELED is generated by a mute circuit, which includes a BJT 2550; NOT gates 2551, 2552, 2553; resistors 2554, 2555, 2556, 2557; a capacitor 2558; and a resistor 2559. The switch contacts from the mute switch 2518 (FIG. 86A), available at pins 3 and 4 of the connector 2548, are applied to the cascaded NOT gates 2552 and 2553, and applied to the BJT 2550, by way of a current-limiting resistor 2555 and a biasing resistor 2556. The collector of the BJT 2550 is tied high by way of a resistor 2554. During normal conditions (i.e. when the mute switch 2518 is not enabled), the BJT 2550 will be off, causing the collector to be high. The collector output of the BJT 2550 is applied to the NOT gate 2551, which, in turn, is applied to the connector 2548 to generate the LED signal MUTELED by way of a current-limiting resistors 2559. Since the collector output of the BJT 2550 is high, the output of the NOT gate 2551 will be low, which, in turn, will cause the mute LED 2526 (FIG. 86A) to be off. When the mute switch 2518 is enabled, the NOT gate 2553 is essentially disabled, causing the output of the NOT gate 2552, which will bias the BJT 2550 to cause the BJT 2550 to turn on. When the BJT 2550 turns on, the collector output will go low, causing the output of the NOT gate 2551 to go high, generating an active high LED signal MUTELED and causing the mute LED 2526 to illuminate.

The collector output of the BJT 2550 is also used to generate a mute enable signal ENAMUTE. The mute enable signal ENAMUTE is utilized to enable the audio switches 2518 and 2520 (FIG. 84C) to disable the audio output of the audio subsystem.

As discussed above, the audio subsystem 2084 includes a MIDI/game port 2084. The MIDI/game port includes a 15-pin connector 2560. The MIDI/game port 2084 is applied to the game port data bus GD[7:0], connected to the audio controller 2096. In particular, bits GD[4:7] are applied to the connector 2560 by way of bypass capacitors 2561–2564. Bits GD[3:0] are applied to a timer 2565, for example, a Signetics Model No. 558. The output of the timer is applied to the connector 2560 by way of filtering circuits, which include the capacitors 2565–2568 and the resistors 2570–2572. The serial communications port on the audio controller 2596 (MIDI_TXD, MIDI_RXD) are applied to pins 12 and 15 of the connector 2560 by way of bypass capacitors 2573 and 2574 and series inductors 2575 and 2576. Power supply voltage VCC is applied to the timer 2565 by way of stabilizing capacitors 2577 and 2578. The output pins TMA, TMB, TMC and TMD are under the control of enable pins TRA, TRB, TRC and TRD, which are tied together and under the control of a power signal –GPWR. The power available signal –GPWR is an active low signal and available from the audio controller 2096.

Figure 89:
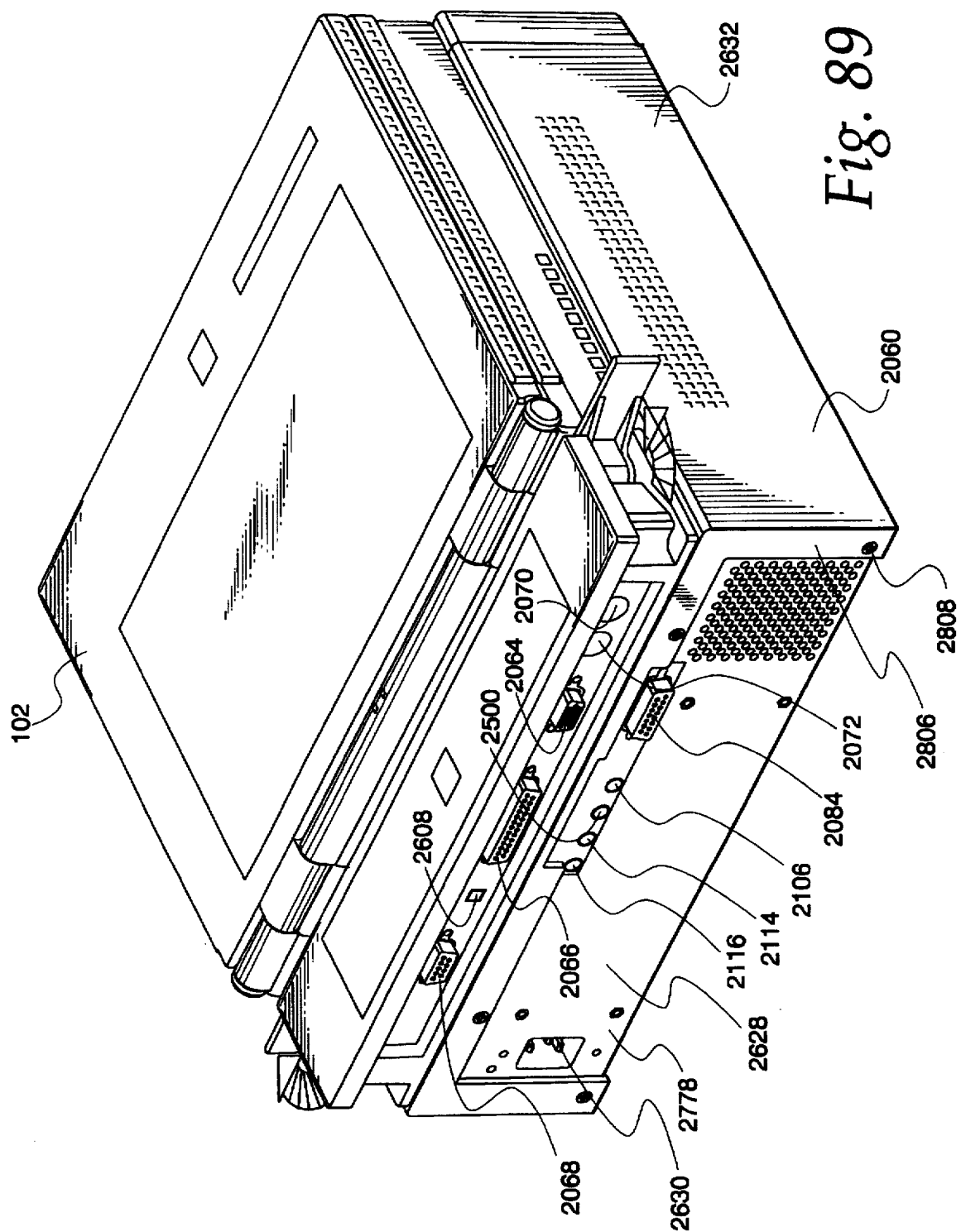
FIG. 89 is a perspective view of the multimedia system showing a portable personal computer docked thereto but with a latch assembly in accordance with the present invention shown in an unlatched position.
Figure 90:
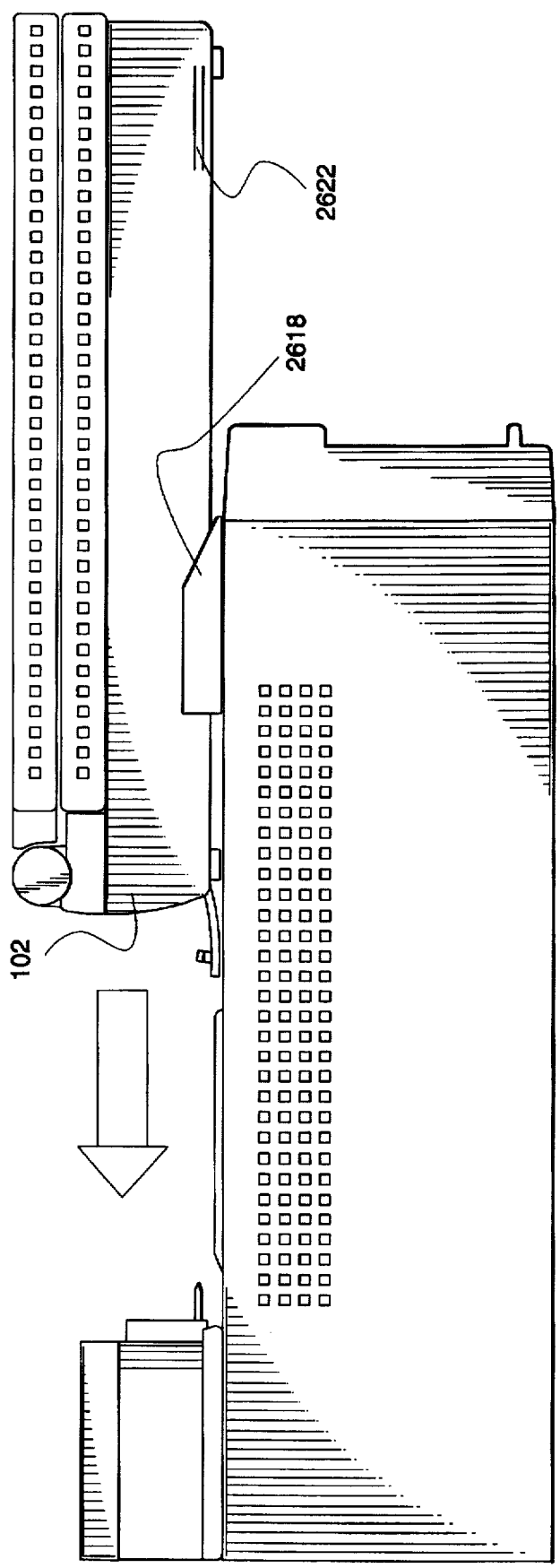
FIG. 90 is a side elevational view of the multimedia system in accordance with the present invention showing a portable personal computer close to being docked thereto.

The physical drawings for the portable, multimedia presentation system 2060 are illustrated in FIGS. 87–96. Referring first to FIGS. 87–92, the portable multimedia system 2060 is housed in a generally stepped housing 2600, forming a platform portion 2602, for receiving the PC 102 as illustrated in FIGS. 89–91. As shown, the platform portion 2602 is sized to the general contour of the PC 102 so as to form a box-like structure having a generally rectangular cross-section when the PC 102 is docked to the portable multimedia system 2060, for example as shown in FIG. 89, to promote mobile use of the system. As will be discussed in more detail below, a latch assembly 2604 is provided for securing the PC 102 to the portable multimedia system 2060. Once the PC 102 is secured to the portable multimedia system 2060, a retractable handle 2606 enables the assembly of the PC 102 and the portable multimedia system 2060 to be carried as a unit.

In order to protect the portable multimedia presentation system 2060 during desktop use, a keyhole slot 2608 (FIG. 89) is provided. The keyhole slot 2608 is adapted to receive a Kensington lock 2015 and cable 2017 assembly, for example as illustrated in FIG. 65B, to secure the portable multimedia system 2060 to a fixed object in a desktop mode. In addition, an electrical lock 2773 (FIG. 91A) is provided which includes an electrical interlock adapted to be connected to a connector 2286 (FIG. 77C) which electrically disables the multimedia presentation system 2060 when the electrical lock assembly 2773 is in a locked position.

As shown in FIG. 87, a keyhole slot 2617 may be provided between the two PCMCIA slots 2080 and 2088 on the multimedia presentation system 2060. As discussed above in connection with the port replicator 104, the keyhole slot 2617 is adapted to receive a lock assembly 2015 (FIG. 65B), such as a Kensington lock assembly, the enable any PCMCIA option cards within the PCMCIA slots 2080 and 2088.

As mentioned above, the portable multimedia presentation system 2060 includes a CD-ROM interface 2080 (FIG. 74), for supporting either a IDE CD-ROM drive, capable of playing standard CD-ROMs conforming to the ISO 9660 file format, MPC2 titles and multisession discs, including those based on Eastman Kodak's Photo CD format. In addition, as discussed above, the CD-ROM interface 2080 is also capable of supporting non-IDE-type CD-ROMs such as a Mitsumi model No. FX001D.

As mentioned above, the portable multimedia system 2060 includes a pair of speakers 2108 and 2110, configured to be within the general form factor of the portable multimedia presentation system 2060. In addition to the speakers 2108 and 2110, the portable multimedia system includes a headphone jack 2106 on the front panel of the portable multimedia presentation system 2060 for private use. A mute button 2518 (FIG. 86) is also provided on the front panel of the portable multimedia system 2060 to enable the audio output to the headphone jack 2106 and integral speakers 2108 and 2110 to be disabled. As mentioned above, in order to provide additional flexibility for the portable multimedia presentation system 2060, a PCMCIA 2082 interface is provided. The PCMCIA interface 2082 supports two PCMCIA card slots 2086 and 2088 located on a side panel of the portable multimedia presentation system 2060. As discussed above, the PCMCIA card slots support type III PCMCIA expansion cards for adding additional memory, a fax modem, to provide additional capability of the portable multimedia presentation system 2060.

Referring to FIG. 87, the portable multimedia system 2060 includes a stepped portion 2612, which enables the PC 102 to be mechanically and electrically docked to the portable multimedia presentation system 2060. In particular, the portable multimedia presentation system 2060 includes a step portion 2612, which includes the 152 pinless connector 2126 (FIGS. 75 and 87) that is adapted to mate with a corresponding connector on the PC 102. As discussed in connection with the active port replicator 104, the connector 2126 includes a pair of spaced apart guideposts 2614, 2616. These guideposts 2614 and 2616 cooperate with mating female apertures on the PC 102 to ensure proper connection of the two pinless connectors. In order to properly align the PC 102 with the portable multimedia system 2060, a pair of opposing guides 2618 and 2620 are provided on opposing ends of the platform portion 2602. The guides 2618, 2620 are adapted to be received in slots 2622 (FIG. 90) formed on opposing side panels of the PC 102 adjacent the front as best shown in FIG. 90. The guides 2618, 2620, in combination with the extended slots 2622 on the PC 102 cooperate to secure the front portion of the PC 102 relative to the portable multimedia system 2060.

A latch assembly 2626 is provided on the step portion 2612 of the portable multimedia system 2060. The latch assembly 2626 is similar to the latch assembly 1980, 1982 for the active port replicator 104, illustrated in FIGS. 73A and 73B and described above. The latch assembly 2626 secures the rear portion of the PC 102 to the portable multimedia system 2060. Once the PC 102 is secured to the portable multimedia system 2060 as described above, the assembly may be used in a desktop application or in a portable application and carried by way of the retractable handle 2606. As mentioned above, the portable multimedia system 2060 provides port replication of various ports in the PC 102. In particular, as discussed above, the serial port 2068, parallel port 2066, video port 2064, mouse port 2070, keyboard port 2072, as well as a MIDI/game port 2084 on a rear portion 2628 of the portable multimedia presentation system 2060. In addition, various audio input/output jacks are provided on the rear portion 2628 of the portable multimedia presentation system 2060. In particular, audio line input jack 2116, as well as an audio line output jack 2114, are provided on the rear portion 2628 of the portable multimedia presentation system 2060, along with a microphone input jack 2500 and a rear headphone output jack 2106. A power jack 2630 is also provided on the rear portion 2628 of the portable multimedia presentation system 2060 to enable the system 2060 to be easily connected to an external source of AC power (not shown).

Figure 91A:
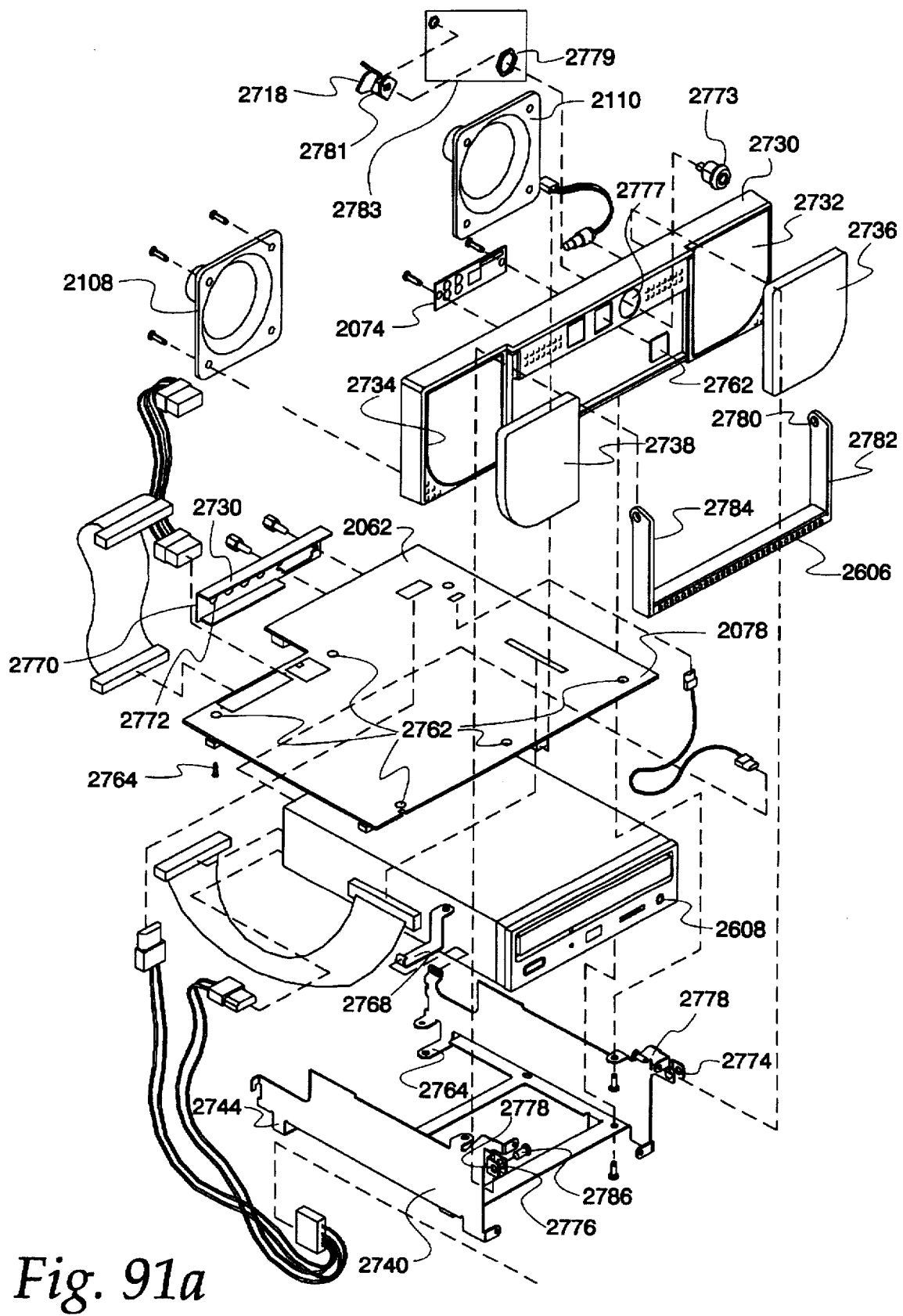
FIGS. 91A, 91B and 91C are exploded perspective drawings of the multimedia system in accordance with the present invention.
Figure 91B:
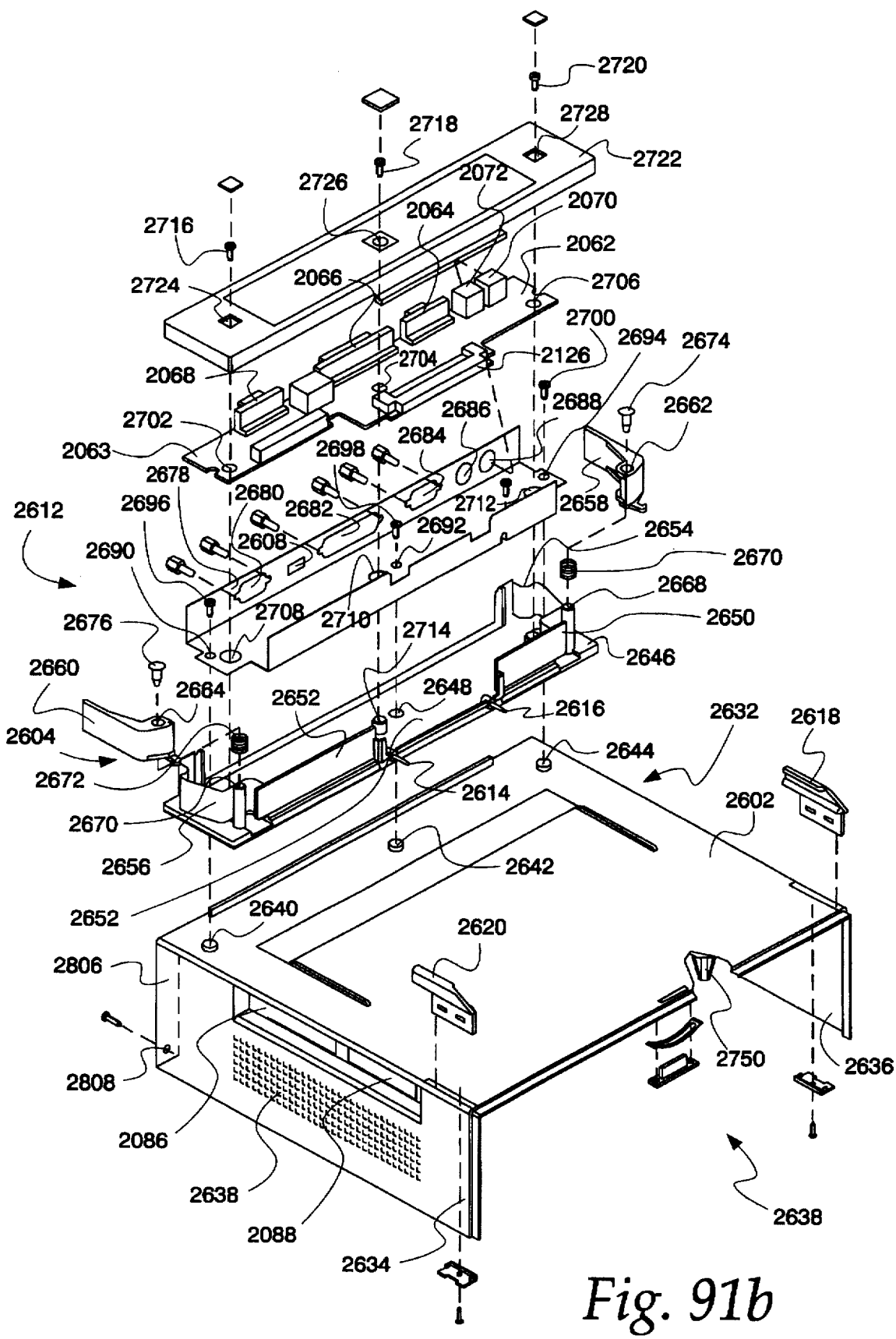

Referring to FIG. 91B, the portable multimedia system 2060 includes a generally rectangular housing 2632, open on the bottom as well as two ends. The housing 2632 includes a cover defining the platform portion 2602 and side wall portions 2634 and 2636. As mentioned above, the side wall portion 2634 includes a pair of slots 2086 and 2088 for the PCMCIA cards. In addition, the side wall portion 2634 may be formed with a vent portion 2638 to provide adequate cooling to the unit. The guides 2618 and 2620 may be secured to the housing 2632 on opposing sides of the platform portion 2602 adjacent a front portion 2638 of the housing 2632. As mentioned above, the guides 2618 and 2620 ensure proper registration of the PC 102 with respect to the portable multimedia presentation system 2060, and additionally cooperate with grooves 2622 (FIG. 90) formed in the PC 102 to secure the front portion of the PC 102 relative to the portable multimedia presentation unit.

The cover portion 2602 is formed with a plurality of threaded bosses 2640, 2642 and 2644. The threaded bosses 2640, 2642 and 2644 are utilized to register and secure the latch assembly 2612 to the housing 2632.

The latch assembly 2604 includes a generally rectangular base 2646 formed with a plurality of apertures 2648, positioned to receive the extending bosses, 2640, 2642 and 2644 on the cover portion 2602 of the housing 2632. A pair of spaced apart front side walls 2650 and 2653 are formed on a front portion of the latch assembly 2612, defining a gap 2653. As will be discussed in more detail below, the gap 2653 is formed to receive the 152-pin connector 2126, formed on the passive board 2062 that enables the portable multimedia presentation system 2060 to be connected to the PC 102. The guide pins 2614 and 2616 for guiding the proper connection of the connector 2126 with the corresponding connector on the PC 102 are disposed in the gap 2653 adjacent.

The latch assembly 2604 also includes a pair of irregularly shaped side wall portions 2654 and 2656. The side wall portions 2654 and 2656 are adapted to be formed to the shape of latch levers 2658 and 2660. Each of the latch levers 2658 and 2660 includes an aperture 2662, 2664 and is adapted to be received by upwardly extending pins 2668, 2670 formed on the base portion 2646 of the latch assembly 2612 to enable the latch levers 2658 and 2660 to rotate relative to the base portion 4646. A pair of torsion springs 2670, 2672 may be disposed on the extending pins 2668 and 2670 in order to bias the latch levers 2658 and 2660 to a latch position. The extending post 2668 and 2670 may be formed with threaded apertures to enable the levers 2658 and 2660 to be secured thereto in an axial direction with suitable fasteners 2674 and 2676.

A generally conductive chassis 2678 is carried by the base portion 2646 of the latch assembly 2604. The chassis 2678 is formed from an electrically conductive material and formed as a generally U-shaped member having a plurality of cut-outs 2680, 2682, 2684, 2686 and 2688 for receiving the serial port connector 2068, the parallel port connector 2066, the video port connector 2064, the two PS/2-type connectors 2070 and 2072. The chassis 2678 includes a plurality of apertures 2690, 2692 and 2694, which are adapted to be aligned with the apertures 2648 in the base portion 2646 of the latch assembly 2604, and in turn, with the extending bosses 2640, 2642 and 2644 in order to enable the chassis 2678, as well as the latch assembly 2612 to be securely fastened to the extending bosses 2640, 2642 and 2644 formed in the cover portion 2602 of the housing 2632 by way of suitable threaded fasteners 2696, 2698 and 2700.

Figure 92:
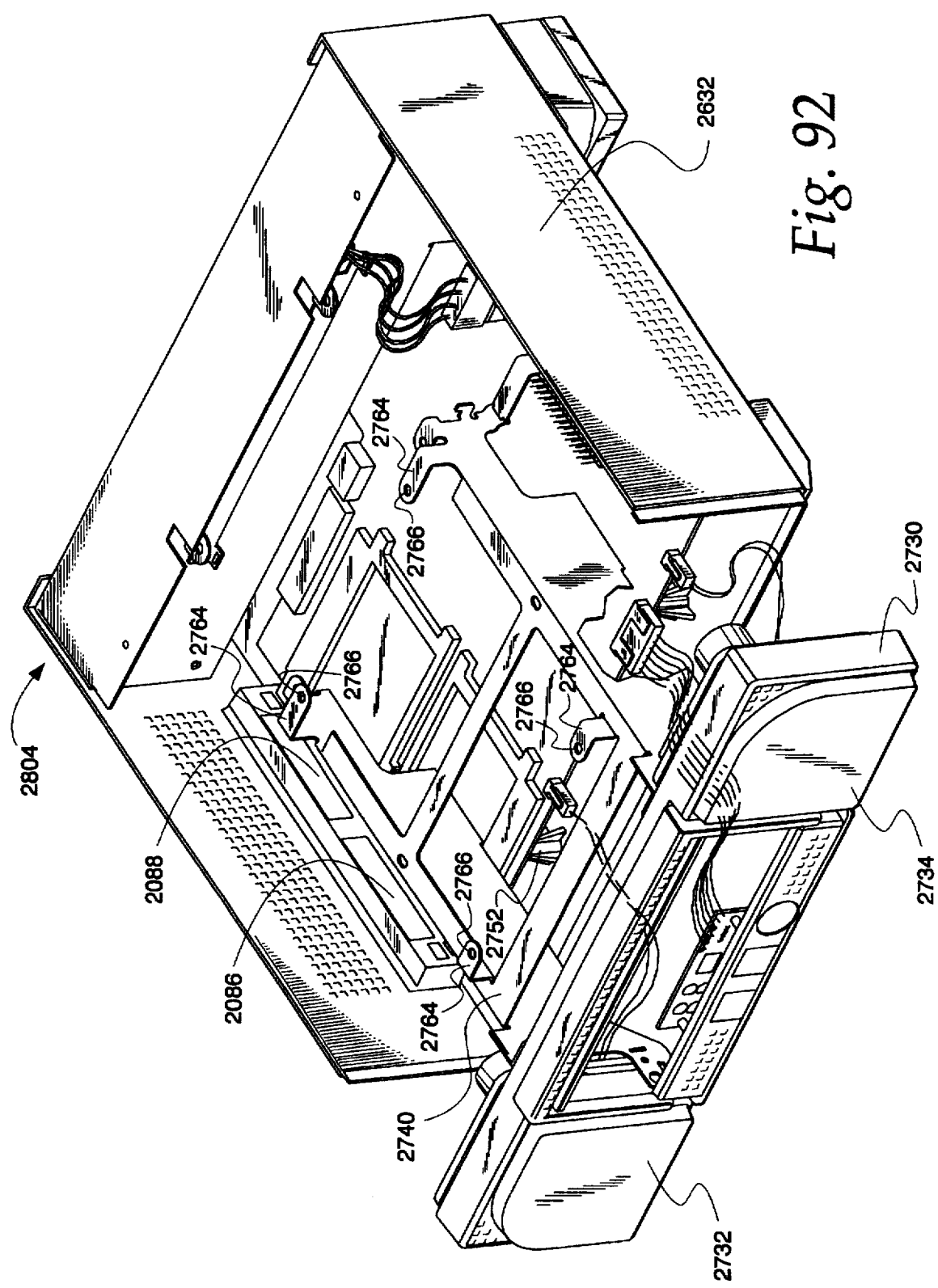
FIGS. 92–94 are perspective views of the bottom of the multimedia system in accordance with the present invention partially disassembled.

The chassis 2678 is used to carry the passive PC board 2062, which, as mentioned above, includes the 152-pin pinless connector 2126, which, as mentioned below, is adapted to be received in the gap 2653 formed by the spaced apart side walls 2650 and 2652 in the latch assembly 1612. The passive PC board 2062 is provided with a plurality of apertures 2702, 2704 and 2706, which are adapted to be aligned with corresponding apertures 2708, 2710 and 2712 formed in the chassis 2768. The aligned apertures 2702, 2704 and 2706 in the passive PC board 2062 are aligned with the apertures 2708, 2710 and 2712 in the chassis 2678 and received by a plurality of threaded bosses generally identified with the number 2714 in the base portion 2646 of the latch assembly 2604 by way of suitable fasteners 2716, 2718 and 2720. A cover portion 2722 is provided, which, in turn, includes a plurality of apertures 2724, 2726 and 2728, which, in turn, are aligned with the apertures 2702, 2704 and 2706 in the passive PC board 2062 to enable the cover 2722 to be secured to the base portion 2646 of the latch assembly 2604 along with the passive PC board 2062 and the chassis 2678. Referring to FIG. 92, a grill portion 2730 is used to cover the front portion 2638 of the housing 2632 (FIG. 91B). The grill portion includes a pair of irregularly shaped cut-outs 2732 and 2734 for receiving the internal speakers 2108 and 2110 on one side and grills 2736 and 2738 on the other side.

Figure 93:
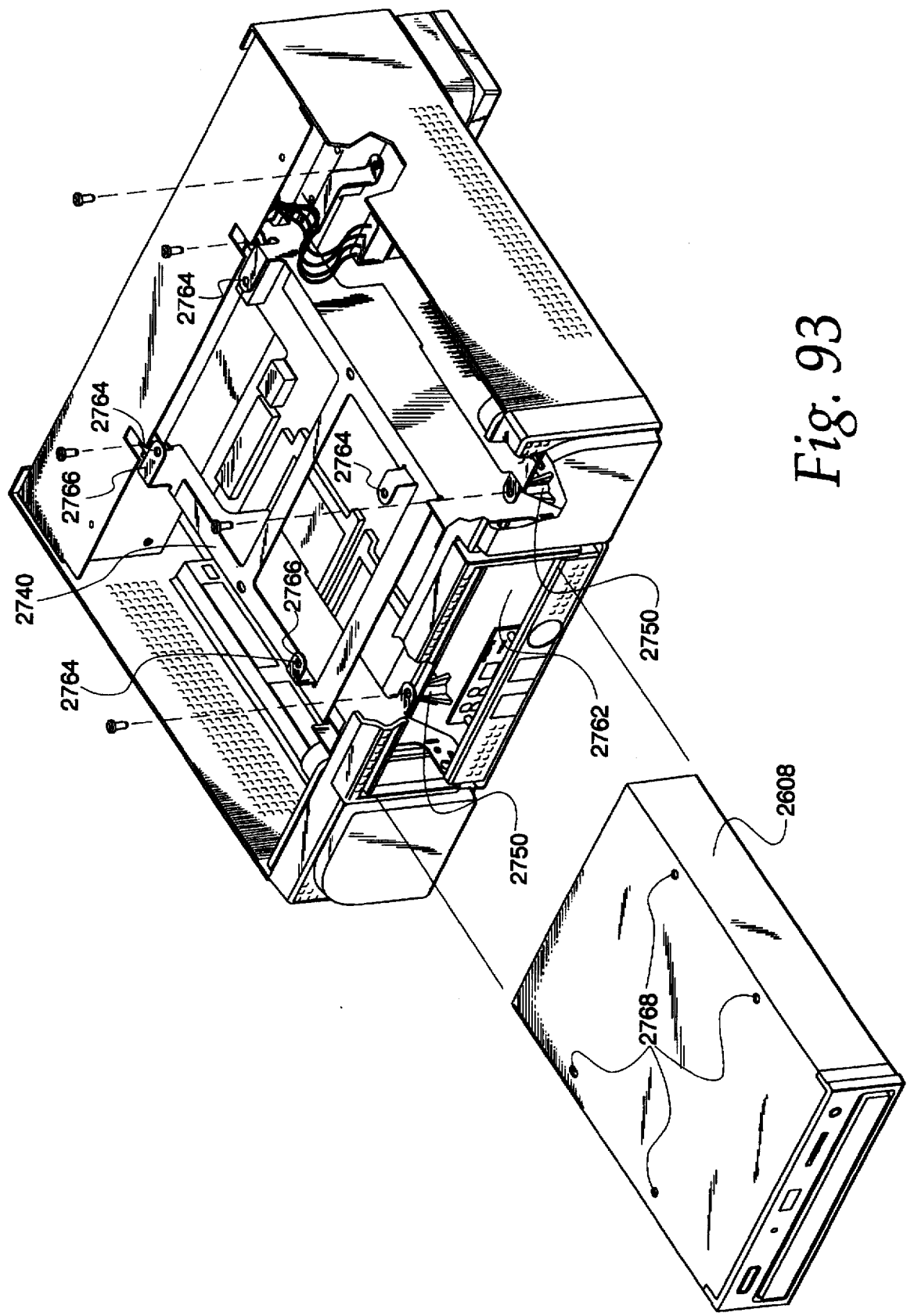
Figure 94:
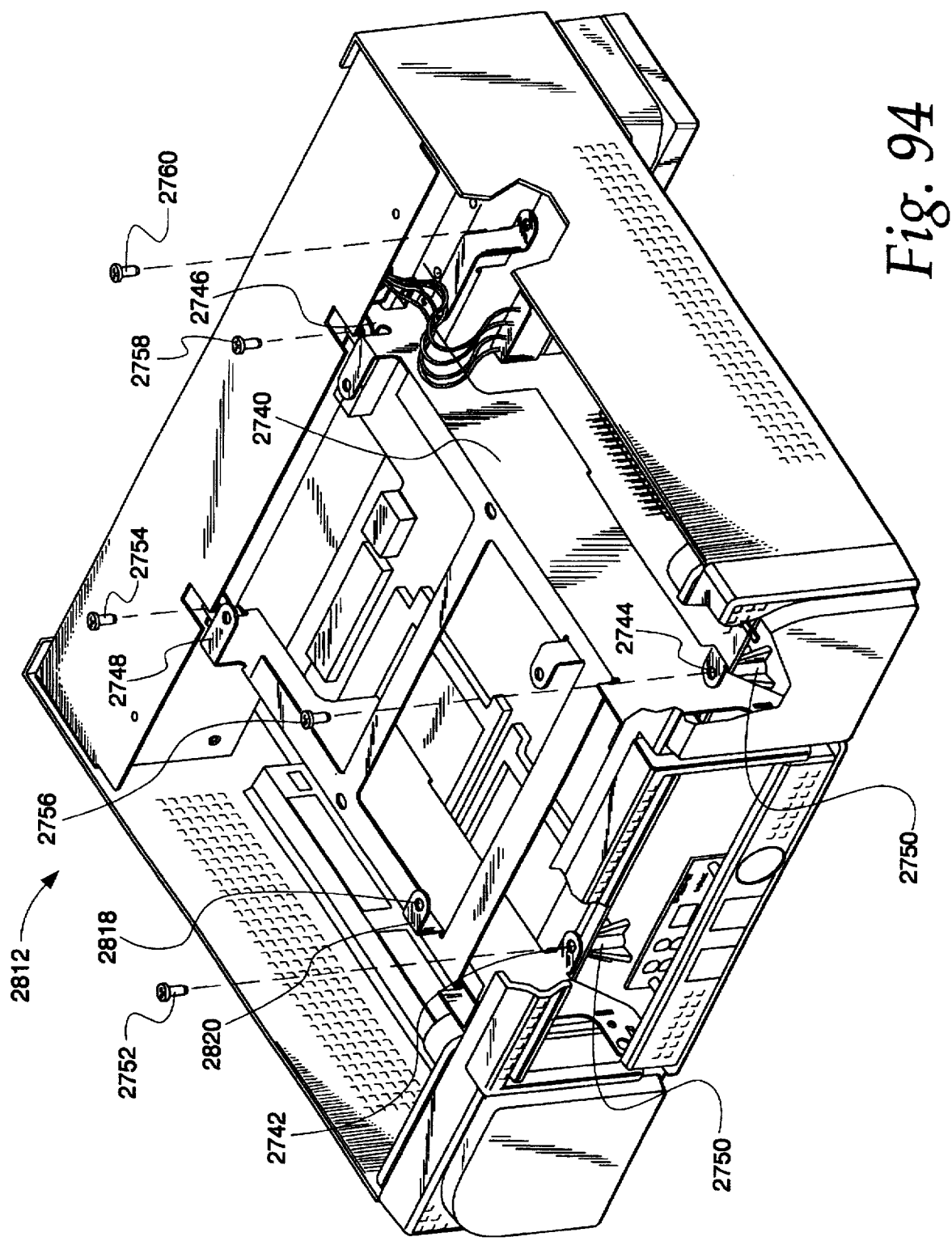
Figure 95:
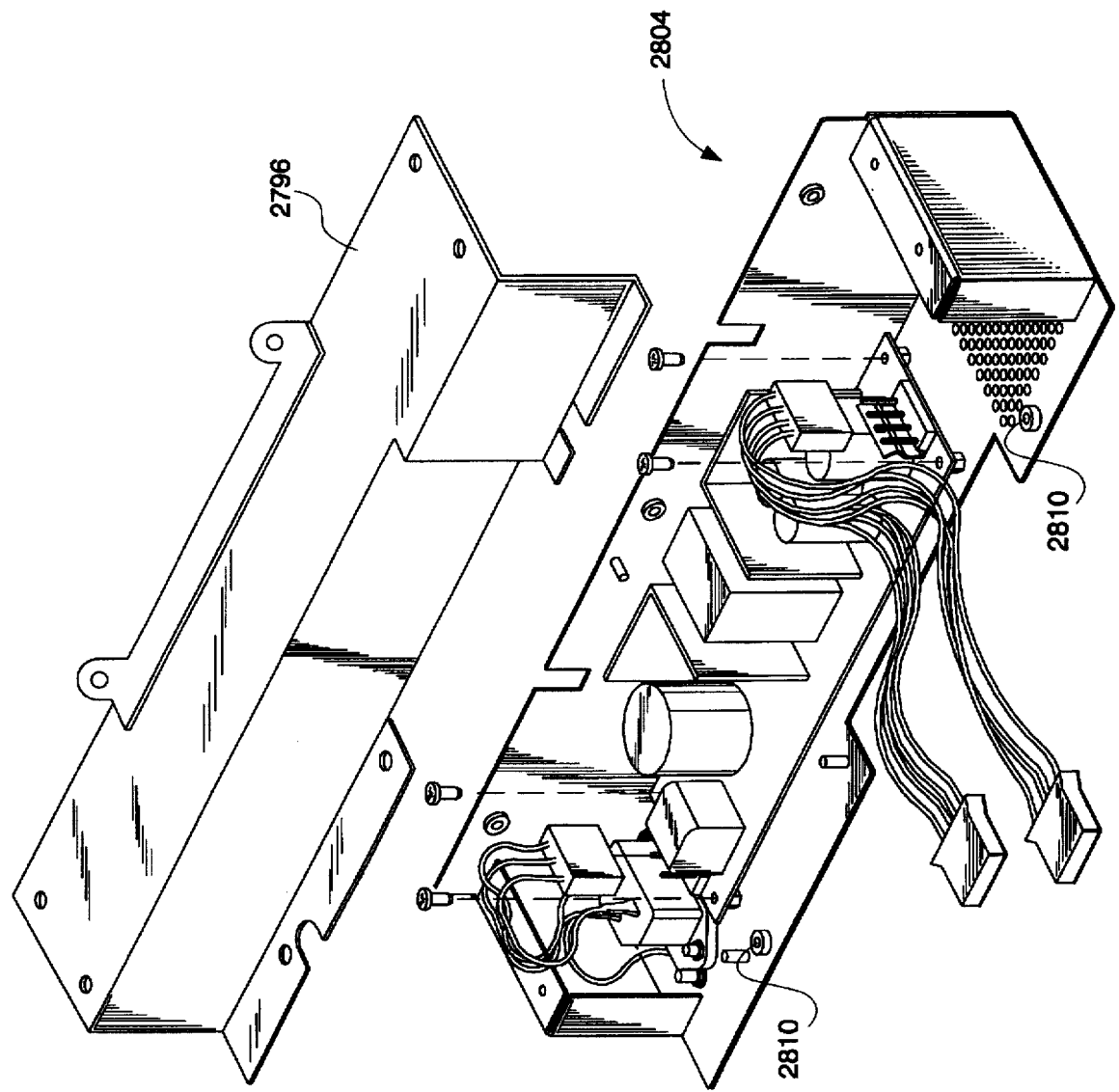
FIG. 95 is a perspective view of the power supply portion of the multimedia presentation system in accordance with the present invention.
Figure 96:
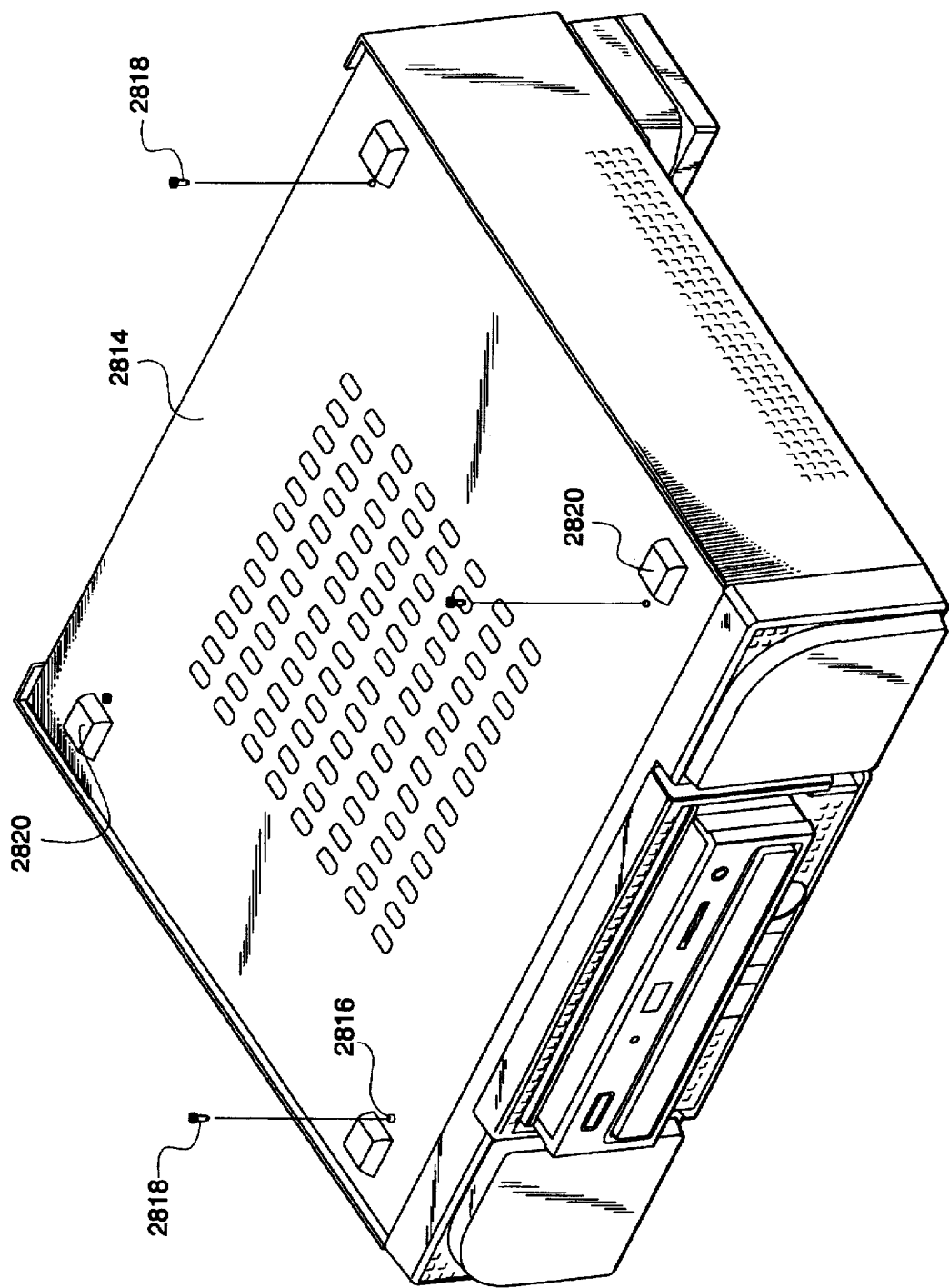
FIG. 96 is a perspective view of the multimedia presentation system showing the bottom cover installed thereto.

A generally conductive chassis 2740 is provided for carrying the CD-ROM drive 2608. The CD-ROM chassis 2740 is formed as a generally U-shaped structure with a plurality of extending tab portions 2742, 2744, 2746 and 2748 (FIG. 93) as best shown in FIG. 93, which enable the chassis 2744 to be rigidly secured to extended threaded bosses generally identified with the reference numeral 2750 formed on the underside of the cover portion 2602 by way of suitable fasteners 2752, 2754, 2756, 2758, 2760 (FIG. 94). As best shown in FIG. 93, the CD-ROM 2608 is received in a generally rectangular slot 2762, formed in the grill portion 2730. As best shown in FIG. 93, the chassis 2740 includes a plurality of extending tab portions 2764, which each include an aperture 2766. The apertures 2766 formed in the tab portions 2764 of the chassis 2740 are adapted to be aligned with threaded apertures 2768 formed on one side of the CD-ROM 2608 to enable the CD-ROM 2608 to be secured to the chassis 2740 with suitable threaded fasteners (not shown). The CD-ROM 2608 may be provided with a ground clip 2768, rigidly connected to a side wall of the CD-ROM to ensure proper grounding of the CD-ROM with respect to the conductive chassis 2740.

The main PCB board 2062 is rigidly connected to the underside of the cover portion 2602 of the housing 2632 (FIG. 91A). In particular, the main board 2062 includes a plurality of apertures 2762. These apertures 2762 are adapted to be aligned with threaded bosses (not shown) on the underside of the cover portion 2602 of the housing 2632 and secured thereto with suitable fasteners 2764.

Figure 91C:
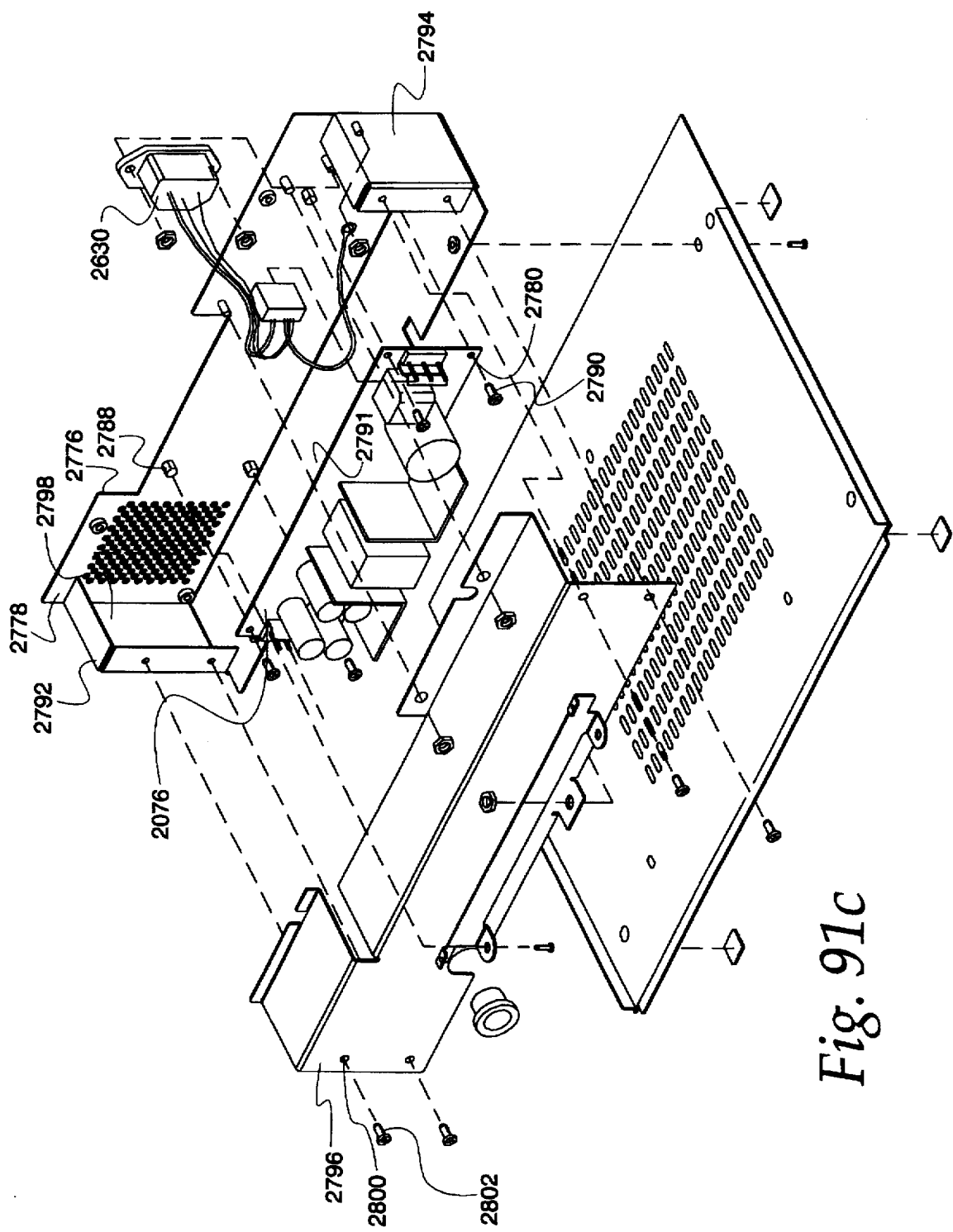

A carrier 2770 is rigidly secured to the main board 2062 and includes a plurality of cut-outs 2772 for receiving the audio jacks 2106, 2500, 2116 and 2066, as well as the MIDI port 2072, driven by the main board 2062. As best shown in FIG. 91C, the carrier 2770 is adapted to be received in a slot 2776 formed in a back panel 2778 that closes the back of the housing 2632.

As mentioned above, a retractable handle 2606 is provided. The retractable handle 2606 is rotatably carried by the chassis 2740. As best shown in FIG. 91A, the chassis 2740 includes two pairs of extending tabs 2774 and 2776. Each pair of extending tabs 2774 and 2776 includes aligned apertures generally identified with the reference numeral 2778. A pair of apertures 2780 are provided in the retractable handle 2606 in depending leg portions 2782 and 2784. These depending leg portions 2782 and 2784 are adapted to be sandwiched between the pairs of extending tabs 2774 and 2776 such that the apertures 2780 and the depending legs 2782 and 2784 are aligned with the apertures 2778 and the pairs of extending tabs 2776 and 2778 to enable the handle 2606 to be rotatably secured thereto by way of suitable fasteners.

As mentioned above, a Kensington type lock assembly 2015 (FIG. 65B) is provided to secure the portable multimedia system 2060. The lock assembly 2015 is adapted to cooperate with the keyhole slot lock 2608 (FIGS. 89 and 91B) in the chassis 2678 (FIG. 91B). As mentioned above, an electrical lock assembly 2773 is also provided which includes a lock cylinder 2775, received in an aperture 2777 on the front cover 2730. The lock cylinder 2775 is secured to the front cover 2730 and the electrical switch 2518 dismissed above by way of a suitable nut 2779. The electrical switch 2518 includes an actuator 2781 which cooperates and which activates a switch assembly 2783.

Referring to FIG. 91C, as mentioned above, the back of the housing 2632 (FIG. 91B) is closed by the back plate 2778 (FIG. 91C). As mentioned above, power receptacle 2630 is connected to the back plate 2778 to enable the portable multimedia presentation unit to be connected to a convenient source of AC electrical power. An inward portion of the back plate 2778 is provided with a plurality of threaded bosses 2788 that are adapted to be aligned with apertures 2780 in the AC power supply printed circuit board 2076 to enable the printed circuit board 2076 to be rigidly connected to the back plate 2778 by way of suitable fasteners 2790.

The back plate 2778 is connected to a bottom plate 2791 to form an L-shaped structure. Box-like structures 2792 and 2794 are rigidly connected to the base plate 2791 and the back plate 2778 to provide a support for a cover 2796. The box-like structures 2792 and 2794 include a plurality of apertures 2798, which are adapted to be aligned with apertures 2800 in the cover 2796 to enable the cover 2796 to be rigidly secured to the box-like structures 2792 and 2794 by way of suitable fasteners 2802 to form an assembly 2804 as shown in FIG. 92.

As best shown in FIG. 92, the assembly 2804 is assembled to the housing 2632. In particular, as shown in FIG. 91B and FIG. 89, the housing portion 2632 includes a lip portion 2806, which includes a plurality of apertures 2808. These apertures 2808 are adapted to be aligned with apertures 2810 (FIG. 95) to enable the assembly 2804 (FIG. 95) to be rigidly secured to the lip portion 2806 (FIG. 89) of the housing 2632 with suitable fasteners 2808. The assembled front panel 2730 may be secured to the housing 2632 in a similar manner to form the assembly 2812 as generally shown in FIG. 94. Subsequently, as discussed above, the CD-ROM 2608 is secured to the system as generally shown in FIG. 93 and discussed above. Lastly, a bottom cover 2814 is rigidly secured to the assembly 2812. The cover 2814 includes a plurality of apertures 2816. These apertures 2816 are adapted to be aligned with corresponding apertures 2818, formed in extending tab portions 2820 of the chassis 2740 to enable the cover portion 2814 to be secured to the chassis 2740 by way of suitable fasteners 2818. Suitable grommets 2820 may be provided on the bottom side of the bottom cover 2814.

Flexible Portable Presentation System

An important aspect of the invention relates to a portable presentation system 2900 illustrated in FIGS. 97–115, which enables presentations to be given to small groups. The presentation system 2900 includes a removable LCD screen 2902 (FIG. 97) and a stand assembly 2904 (FIGS. 98–102) for supporting the LCD screen 2902 when it is removed from the PC 102. The presentation system 2900 includes an adapter assembly 2906 (FIGS. 98, 105 and 106) adapted to be connected to the PC 102 for providing a transition between a video connector 2908 (FIG. 98) on the rear of the PC 102 and the LCD stand assembly 2904 (FIGS. 99–102) by way of a connector 2910 (FIG. 98) and cable 2912.

The LCD stand assembly 2904 is adapted to carry the removable LCD screen 2902 apart from the PC 102 and allows it to rotate in the same manner as when it is attached to the PC 102 by way of the hinge 2913 defining a hinge axis 2915 for optimum utility by enabling the viewing angle of the LCD 2902 to be fully adjustable even when the LCD 2902 is removed from the PC 102. As will be discussed in more detail below, the LCD stand assembly 2904 includes a pair of brackets 2914 and 2916 (FIG. 100) to enable the LCD screen 2902 to be securely latched thereto by way of a latch assembly 2917 (FIGS. 109, 110 and 112). A multi-pin connector 7918 (FIG. 103) is provided on the LCD stand assembly 2904 that is adapted to mate with a corresponding connector 2920 (FIG. 97) on the LCD screen 2902.

The LCD stand assembly 2904 includes an irregularly shaped base portion 2922 (FIGS. 99 and 100), which may be formed from a molded plastic. The base portion 2922 is formed with a vertical riser portion 2924 (FIG. 100) which defines a lower step portion 2926 and an upper step portion 2928. The LCD screen 2902 rests on the lower step portion 2926, formed with a generally rectangular notch 2930 to provide space for the connector assembly 2932 (FIG. 98) when the LCD screen 2902 is carried by the base portion 2922.

Figure 98:
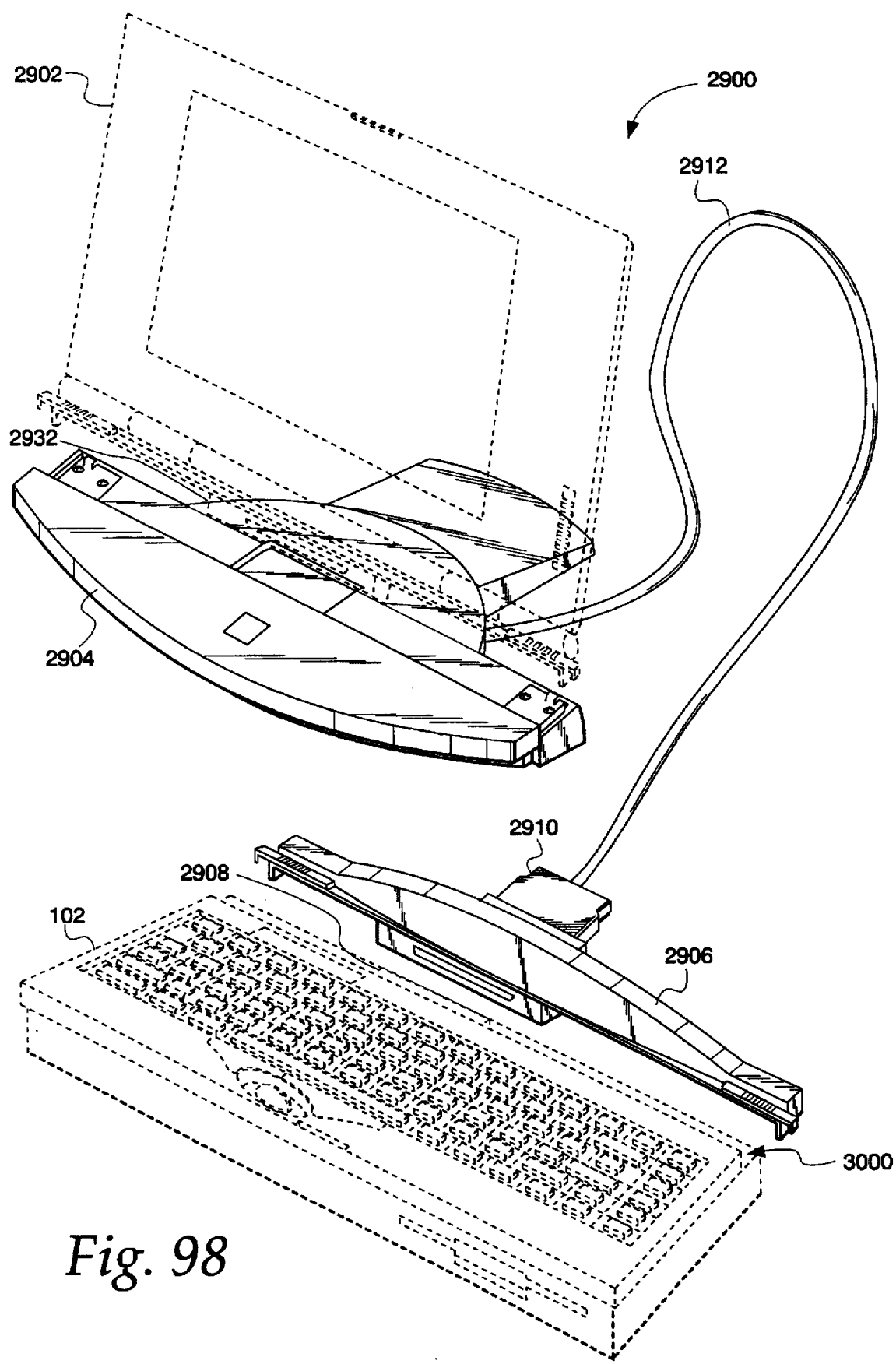
FIG. 98 is a perspective view of a portable presentation system in accordance with the present invention for enabling an LCD display to be used remotely from said personal computer.
Figure 99:
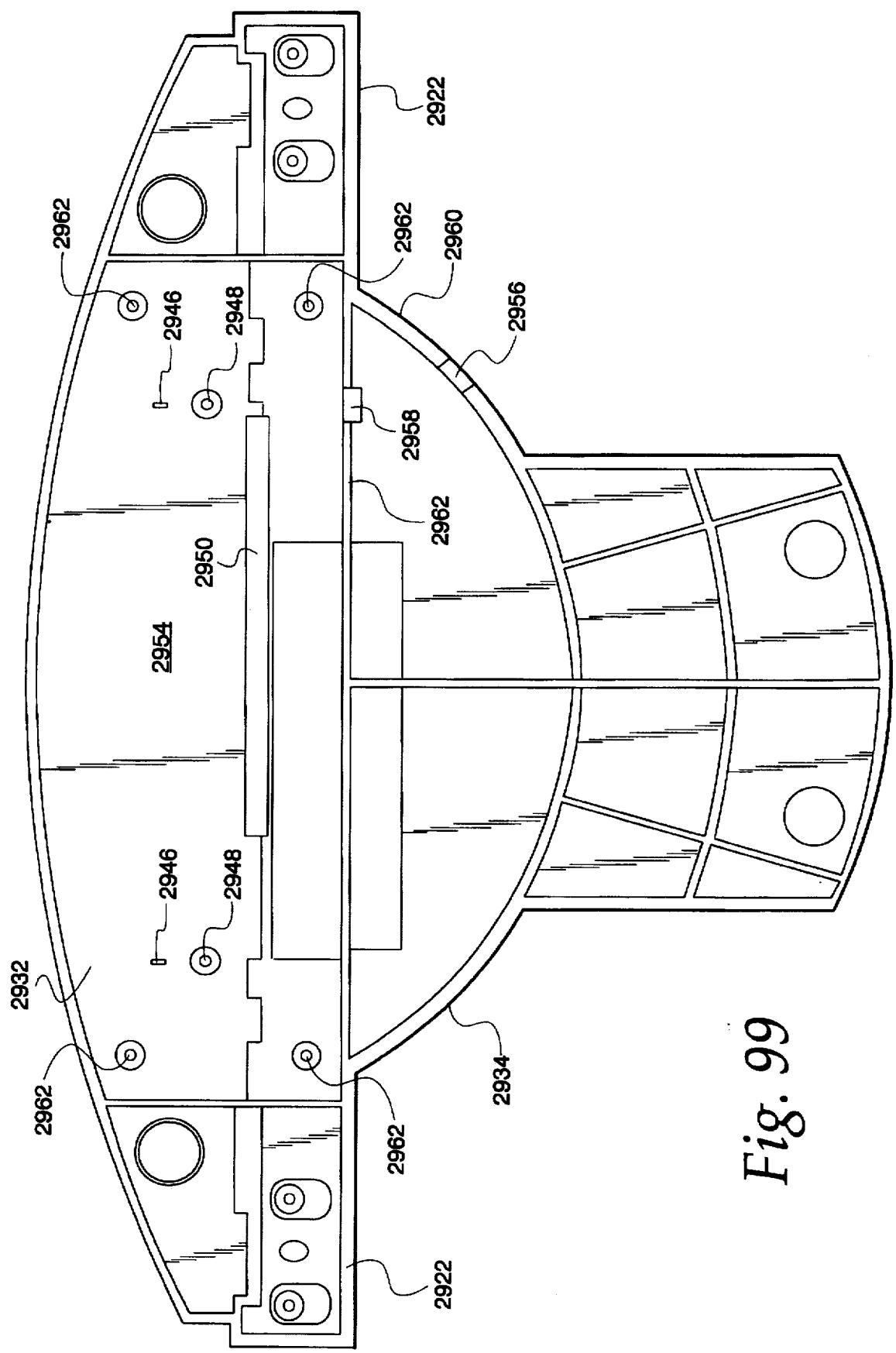
FIG. 99 is a bottom view of a stand assembly which forms a portion of the portable presentation system in accordance with the present invention.
Figure 100:
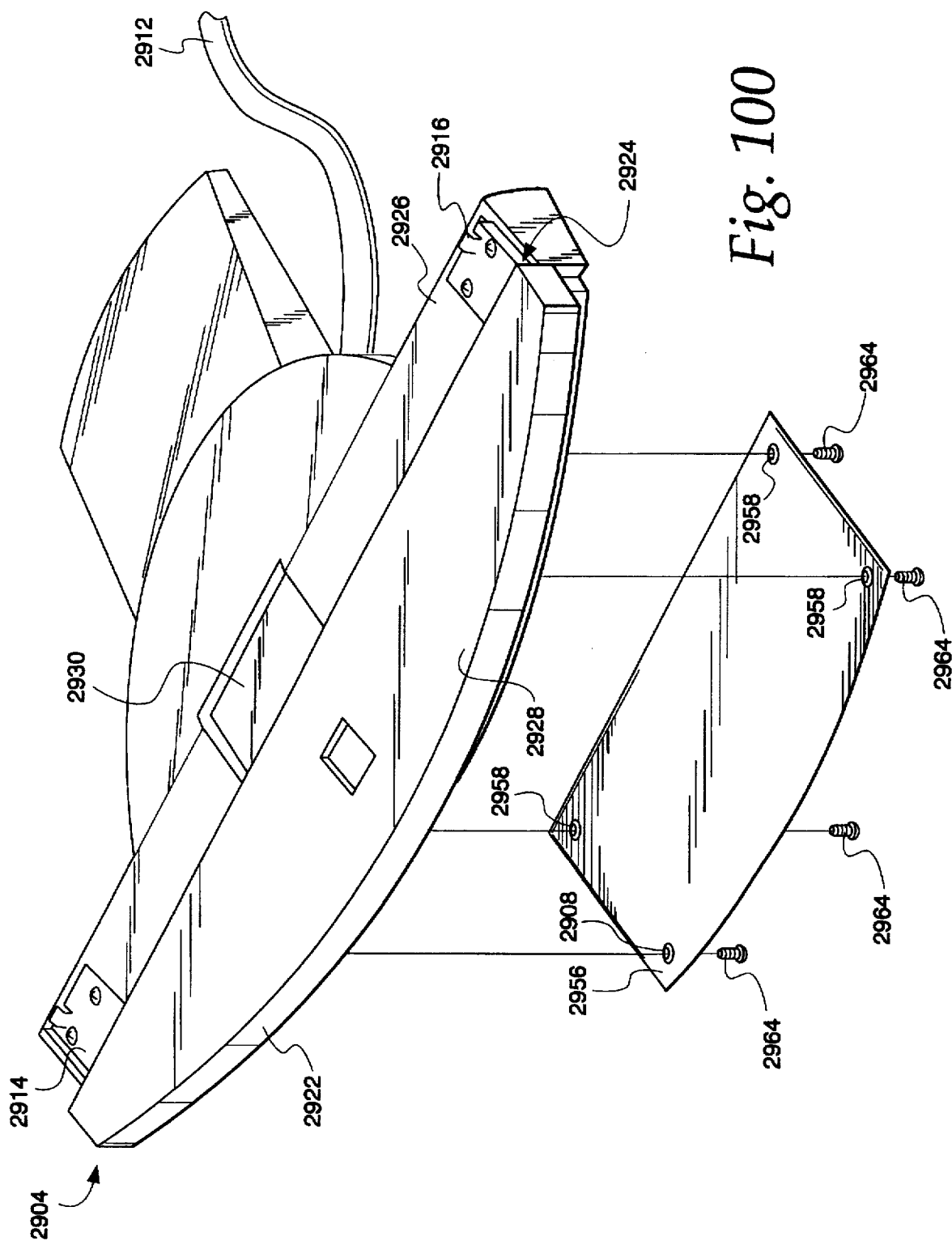
FIG. 100 is a perspective view of the stand assembly illustrated in FIG. 99 shown with a bottom cover removed.
Figure 101:
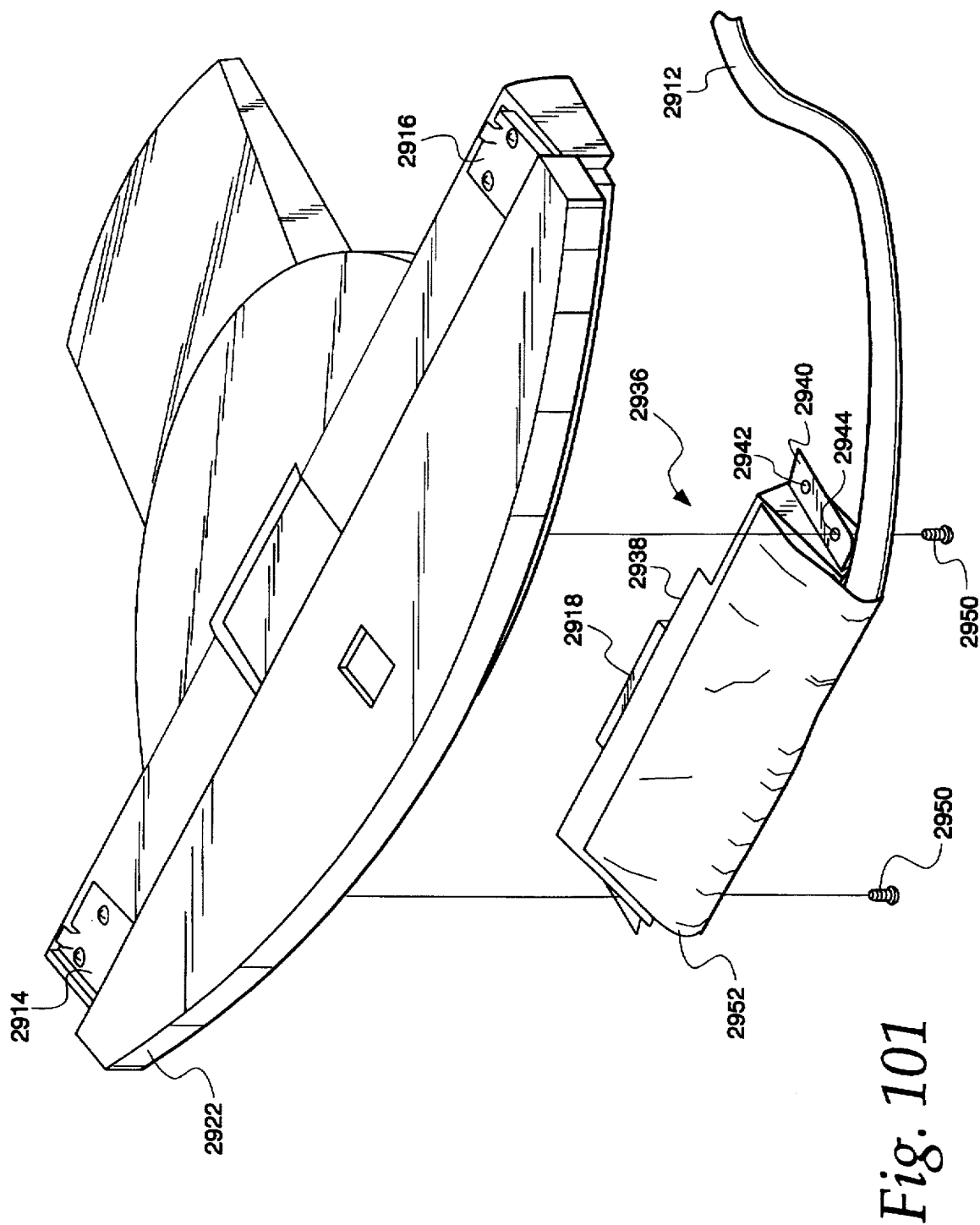
FIG. 101 is similar to FIG. 100 but shown with a connector assembly removed.

The underside of the LCD base portion 2922 is illustrated in FIG. 99. As shown, a pair of cavities 2932 and 2934 are provided for housing a portion of the cable 2912 (FIG. 98) and an electrical connector assembly 2936 (FIGS. 101 and 102), which includes the connector 2918. The connector assembly 2936 may include a housing assembly 2938 defining upper and lower housing portions 2939 and 2941 (FIG. 102). The lower housing portion 2941 may be formed with a pair of mounting flanges 2940 on opposing ends with two sets of apertures 2942 and 2944. The apertures 2942 are adapted to receive protuberances 2946 (FIG. 99) formed on the underside of the base portion 2934, while the set of apertures 2942 are aligned with extended threaded bosses 2948 on the underside of the base portion 2932 to enable the housing assembly 2938 (FIG. 101) to be secured thereto with suitable fasteners 2950 (FIG. 100).

Figure 116:
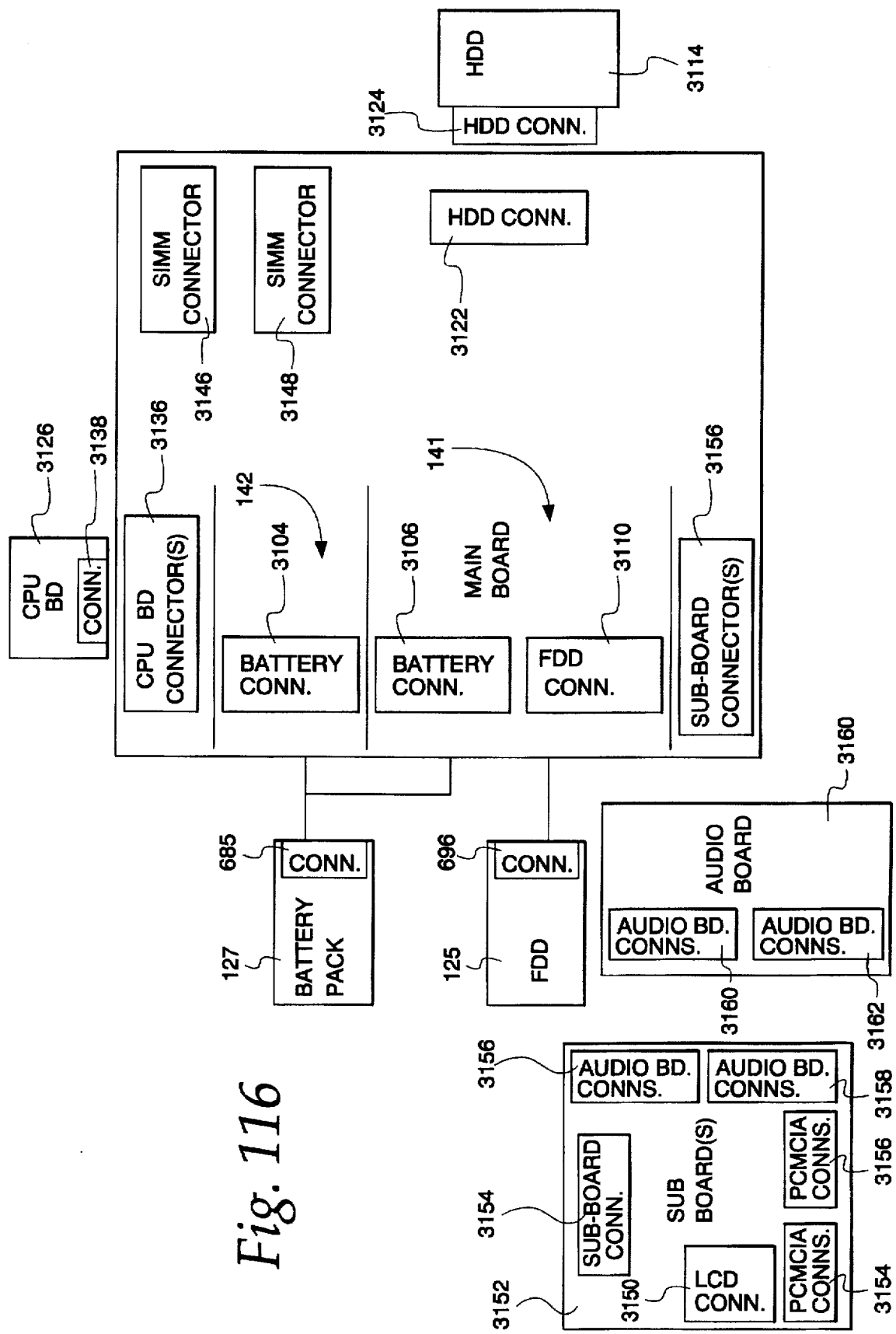
FIG. 116 is a simplified block diagram of the modular portable personal computer in accordance with the present invention.

The connector 2918, which forms a portion of the electrical connector assembly 2932 on the stand assembly 2904, may be carried by a printed circuit board (PCB) 2951 (FIG. 102) which, in turn, is carried by the lower housing portion 2940 of the housing assembly 2938. The connector 2918, for example, a 50-pin Amp Model No. 2-175677-7, is electrically connected to the multi-conductor cable 2912, for example, a 50 conductor cable, by way of the PCB 2951 which may include commonly known filtering circuitry (not shown) for filtering electromagnetic interference (EMI) and radio frequency interference (RFI). The entire connector assembly 2936 is wrapped with a conductive foil 2952 (FIG. 100). In addition, the cavity 2932 on the underside of the base portion 2922 is sprayed with a conductive coating 2954 (FIG. 116). The conductive foil 2952, as well as the conductive coating 2954, provide a ground plane for limiting electromagnetic interference (EMI) and radio frequency interference (RFI). The connector housing assembly 2938 is secured together, for example, with fasteners 2955, covered with the foil 2952 and installed in the cavity 2932 (FIG. 99) on the underside of the base portion 2922 as discussed above.

A pair of arcuate notches 2956 and 2958 are provided in an exterior wall 2960 and an internal side wall 2962 of the base portion 2922 for receiving the cable 2912. After the connector assembly 2936 is installed in the cavity 2932, the cavity 2932 is closed by a cover 2956 (FIG. 99). The cover 2956 is formed to the shape of the cavity 2932 and includes a plurality of apertures 2958. These apertures 2958 are adapted to be aligned with threaded bosses 2962 formed in the cavity 2932 to enable the cover 2956 to be secured thereto with a plurality of threaded fasteners 2964 (FIG. 100).

Figure 105:
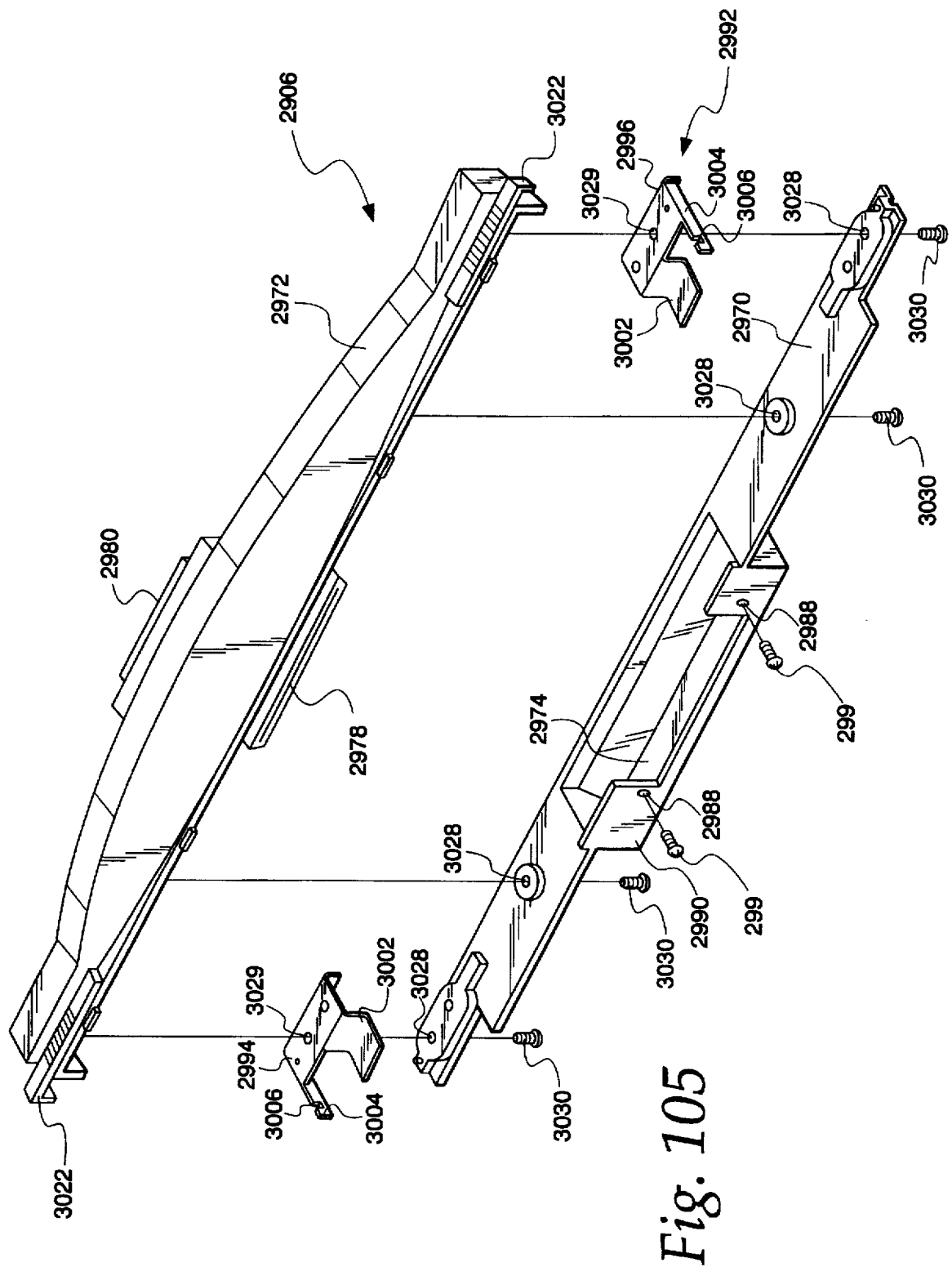
FIG. 105 is an exploded perspective view of an adapter assembly in accordance with the present invention.
Figure 106:
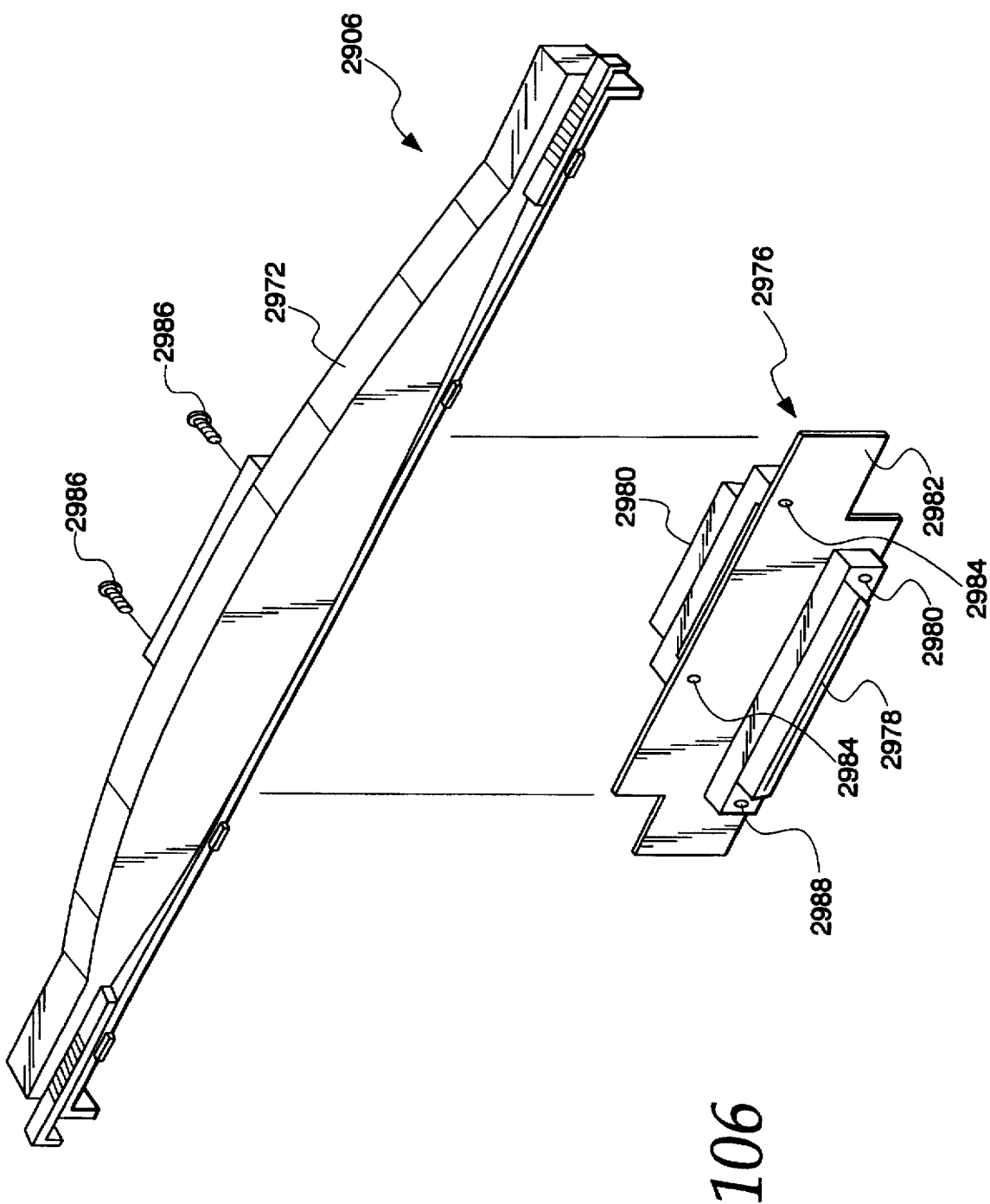
FIG. 106 is a perspective view of the housing for the adapter assembly illustrated in FIG. 105 shown with a connector assembly removed.

The adapter assembly 2906 is shown in FIGS. 105–108. The adapter assembly 2906 includes an irregularly shaped housing which includes a base portion 2970 and a cover portion 2972. A generally rectangular-shaped well 2974, formed in the base portion 2970 (FIG. 105), provides space for a connector assembly 2976 (FIG. 106) which enables the adapter to be electrically connected to the connector 2908 (FIG. 98) on the rear of the PC 102, with the connector 2910 at the end of the cable 2912 extending from the LCD stand assembly 2904. More particularly, the connector assembly 2976 includes a lower connector 2978 that is adapted to mate with the video connector 2908 (FIG. 98) on the PC 102. As best shown in FIG. 98, the connector 2908 on the rear of the PC 102 is linearly offset with respect to the mid-point of the PC 102. The connector 2978 provides a transition from the linearly offset video connector 2908 on the rear of the PC 102 to the output connector 2980, which may be essentially equally spaced from opposing ends of the upper housing portion 2972 of the adapter assembly 2906. The connectors 2978 and 2980 may be carried by a PCB 2982 which, in turn, may be provided with a pair of apertures 2984 to enable an upper portion of the connector assembly 2976 to be secured to the cover portion 2972 by way of suitable fasteners 2986 (FIG. 106).

The lower portion of the connector assembly 2976 may also be provided with a pair of apertures 2986, aligned with a pair of apertures 2988 formed in a front wall portion 2990 of the well 2974. These apertures 2988 are adapted to be aligned with the apertures 2986 and the connector assembly 2976 to enable the lower portion of the connector assembly 2976 to be secured to the base portion 2970 of the adapter assembly 2906 with suitable threaded fasteners 2991.

Figure 114:
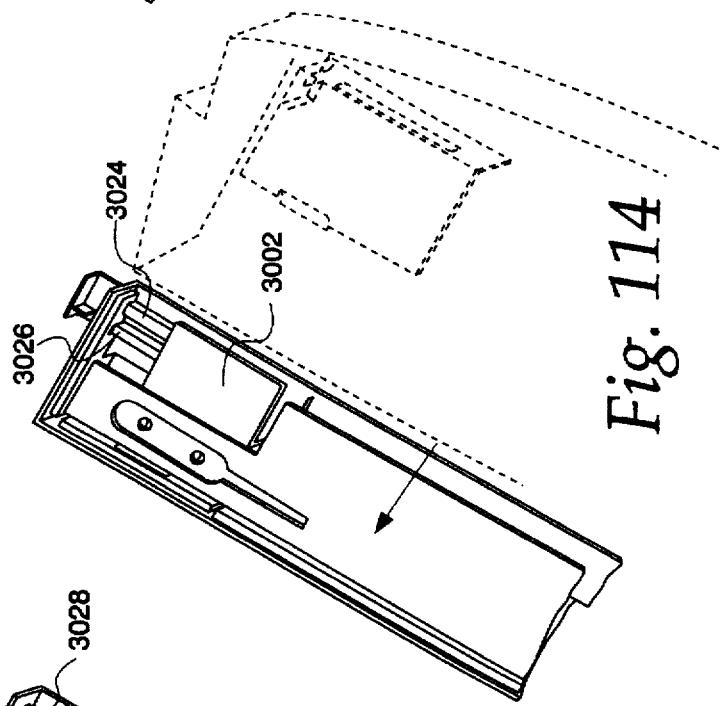
FIG. 114 is a partial perspective view of the latch assembly on the adapter assembly shown in an unlatched position.
Figure 113:
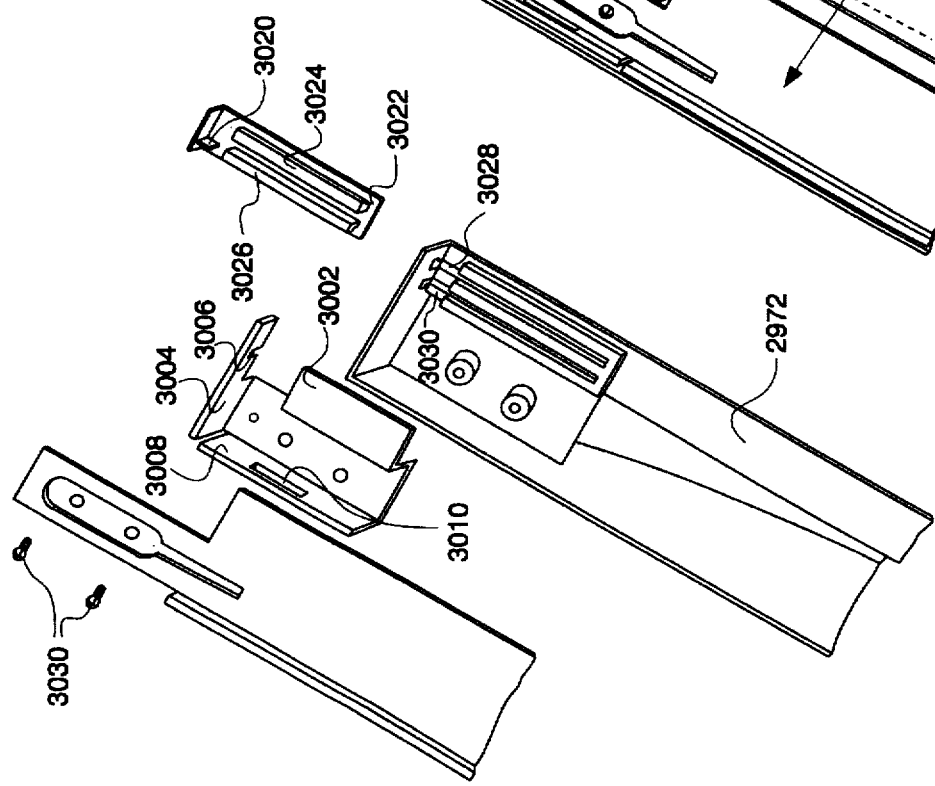
FIG. 113 is a partial exploded perspective view of the latch assembly on the adapter assembly in accordance with the present invention.

The adapter assembly 2906 also includes a latch assembly 2992. The latch assembly 2992 includes a pair of irregularly shaped brackets 2994 and 2996 (FIG. 105). These brackets 2994 and 2996 are adapted to mate with corresponding brackets 2998 (FIG. 112B) rigidly secured on opposing ends of a shelf portion 3000 (FIG. 98) disposed at the rear of the PC 102. Referring to FIG. 105 and 114, the brackets 2994 and 2996 are generally C-shaped brackets with an L-shaped depending arm portion 3002 disposed on one end and a depending arm portion 3004 disposed on an opposing end. The depending arm portion 3004 includes a generally rectangular-shaped cut-out 3006. The brackets 2994 and 2996 also include a depending side portion 3008 (FIG. 113) with a centrally disposed, generally rectangular aperture 3010.

Figure 115:
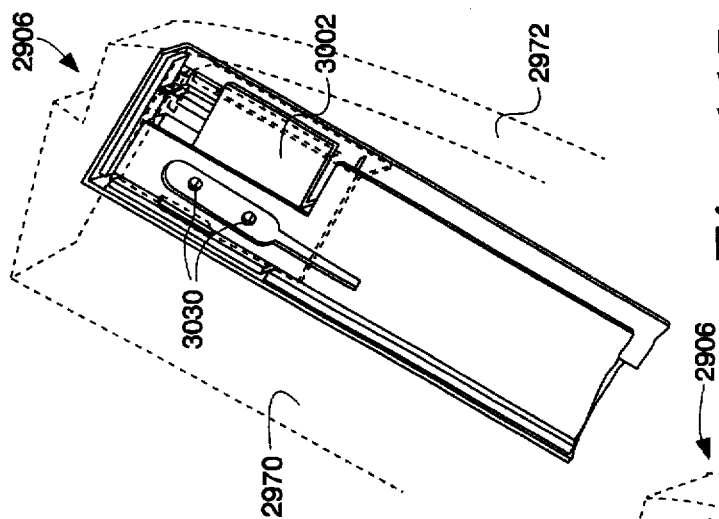
FIG. 115 is similar to FIG. 114 but with the latch assembly in a latch assembly.

As mentioned above, the brackets 2994 and 2996 on the adapter assembly 2906 are adapted to mate with corresponding brackets 2998 (FIG. 112B) on the PC 102. The brackets 2998 on the PC 102 include a tongue portion 3012 that is adapted to be received in the generally rectangular cut-out 3010 on the brackets 2994 and 2996 when the adapter assembly 2906 is secured to the PC 102. The brackets 2998 also include a generally rectangular aperture 3014 (FIG. 112B) that is adapted to receive the generally L-shaped pending leg portions 3002 (FIG. 113) on the brackets 2994 and 2996. Once the brackets 2994 and 2996 on the adapter assembly 2906 (FIG. 105) are engaged with the corresponding brackets 2998 on the PC 102, the extending arm portion 3004 on the brackets 2994 and 2996 will be aligned with corresponding depending arm portions 3016 (FIG. 112B) on the brackets 2998 on the PC 102, such that the generally rectangular cut-outs 3006 (FIG. 113) on the brackets 2994 and 2996 are aligned with notches 3018 (FIG. 112B) on the depending side wall portions 3016 on the brackets 2998 on the PC 102. The aligned notches 3006 and 3018 are adapted to receive a latch 3020 (FIG. 113) formed on a slide member 3022 when the slide member 3022 is in a closed position as shown in FIG. 115 in order to latch the adapter assembly 2906 to the PC 102. The latch 3020 is disengaged simply by pulling the slide member 3022 outwardly as shown in FIG. 114, which, in turn, disengages the latch 3020 from the aligned slots 3006 in the brackets 2994 and 2996 on the adapter assembly 2906 and the slot 3018 on the brackets 2998, secured to the rear portion of the PC 102 as discussed above.

The slide member 3022 (FIG. 113) is formed as a generally L-shaped member with a pair of spaced-apart rails 3024 and 3026. The rails 3024 and 3026 are adapted to be received in an aligned pair of slots 3028 and 3030 formed on the cover portion 2972 of the adapter assembly 2906. The arrangement of the rails 3024, 3026 and corresponding slots 3028 and 3030 enable the slide member 3022 to slide back and forth between an engaged position wherein the latch member 3020 is received in the slots 3006 and 3018 as shown in FIG. 115 and a disengaged position where the latch member 3020 is disengaged from the slots 3006 and 3018 as shown in FIG. 114.

The base portion 2970 of the adapter assembly 2906 is provided with a plurality of apertures 3028 which are adapted to be aligned with threaded apertures in the (not shown) in the cover portion 2972 as well as apertures 3029 in the brackets 2994 and 2996 to enable the base portion 2970, brackets 2994, 2996 and the cover portion 2972 to be assembled together by way of suitable fasteners.

Figure 97:
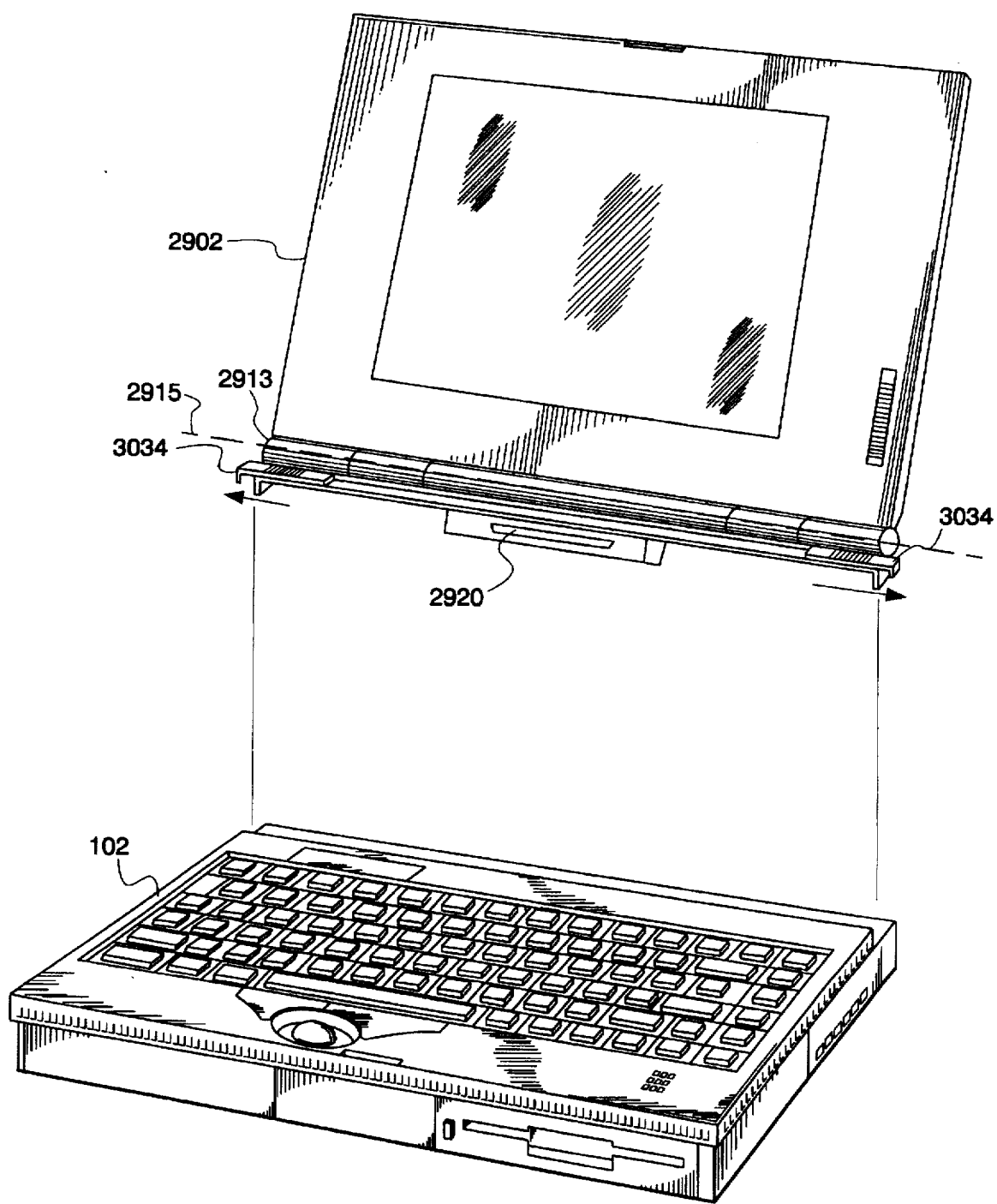
FIG. 97 is a perspective view of a portable personal computer in accordance with the present invention with a removable LCD display.
Figure 103:
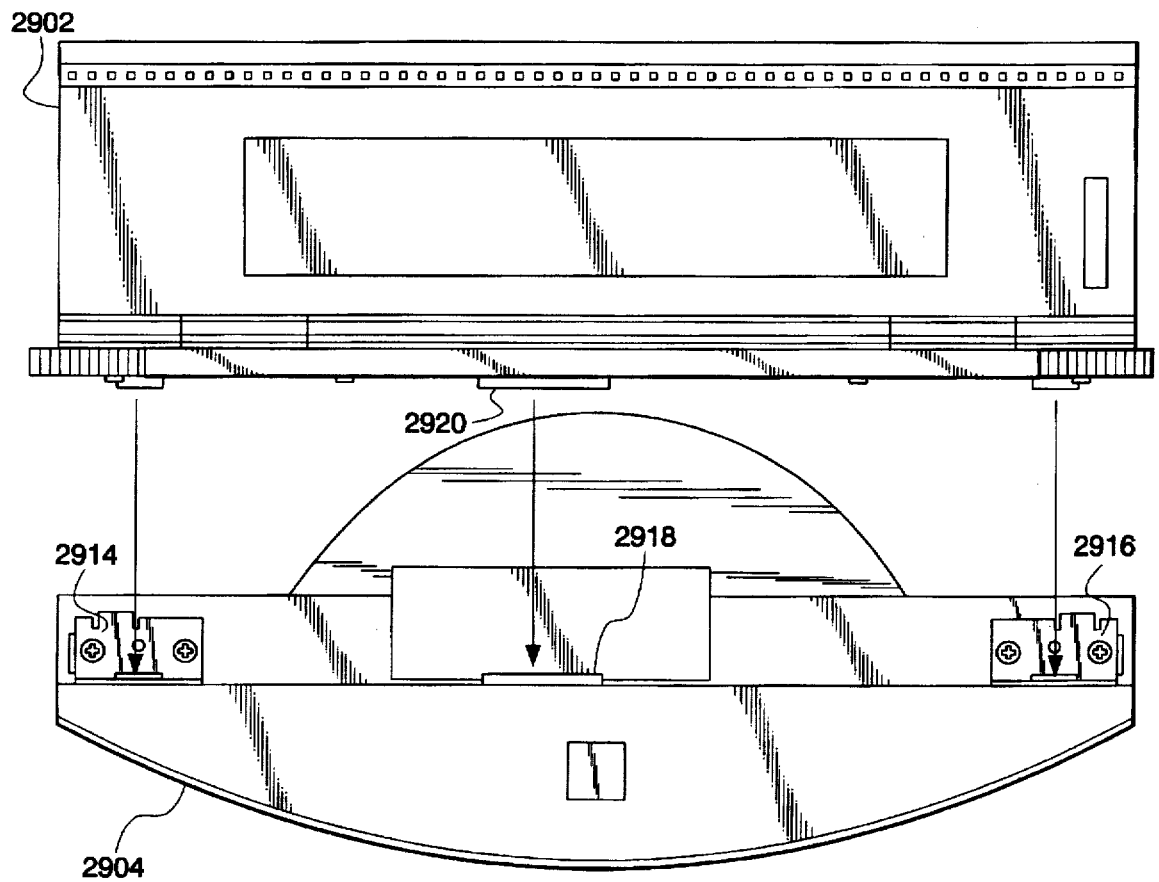
FIG. 103 is a plan view of the stand assembly in accordance with the present invention shown with the LCD display removed therefrom.
Figure 104:
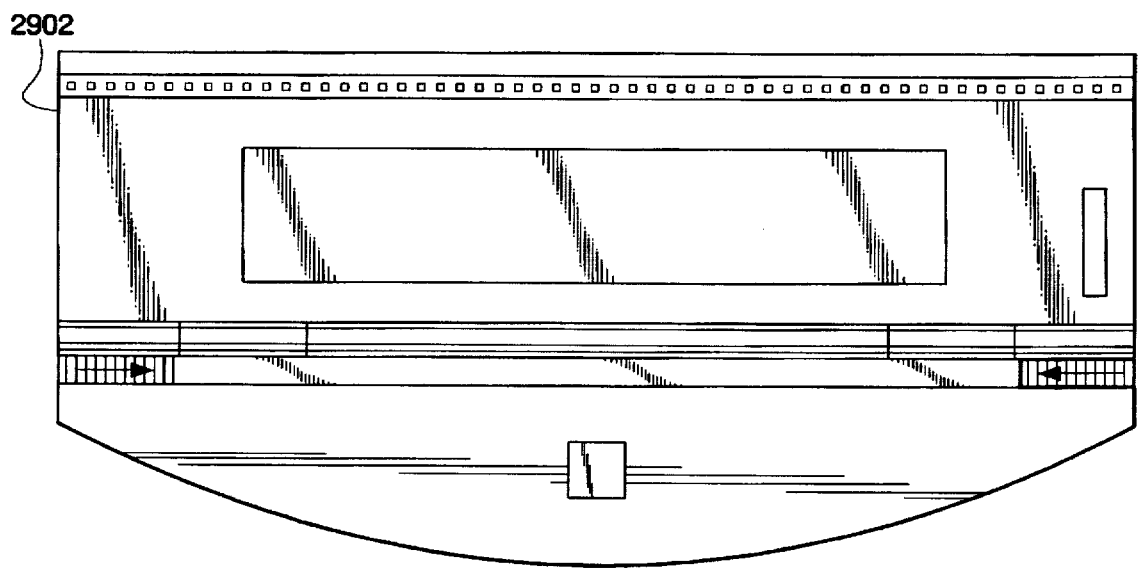
FIG. 104 is similar to FIG. 103 but illustrating the LCD display latched to the stand assembly.
Figure 107:
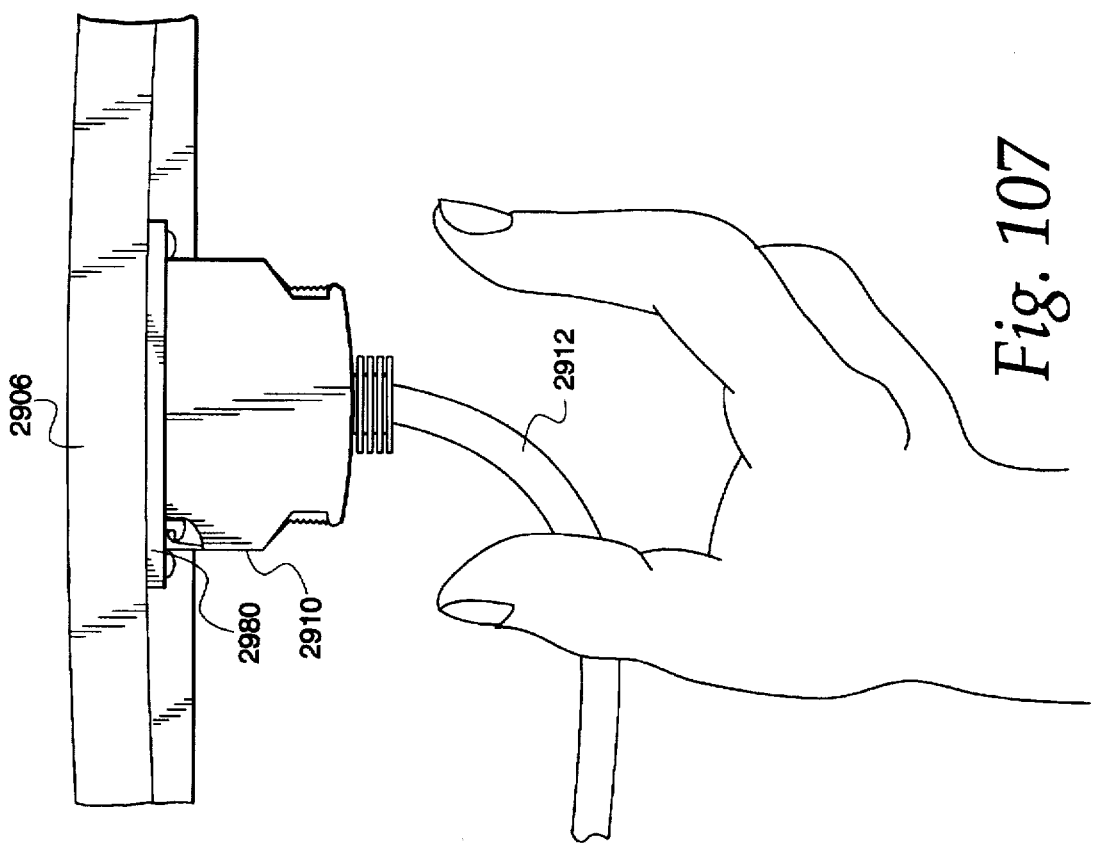
FIGS. 107 and 108 show the electrical connections to the adapter assembly illustrated in FIG. 106.
Figure 108:
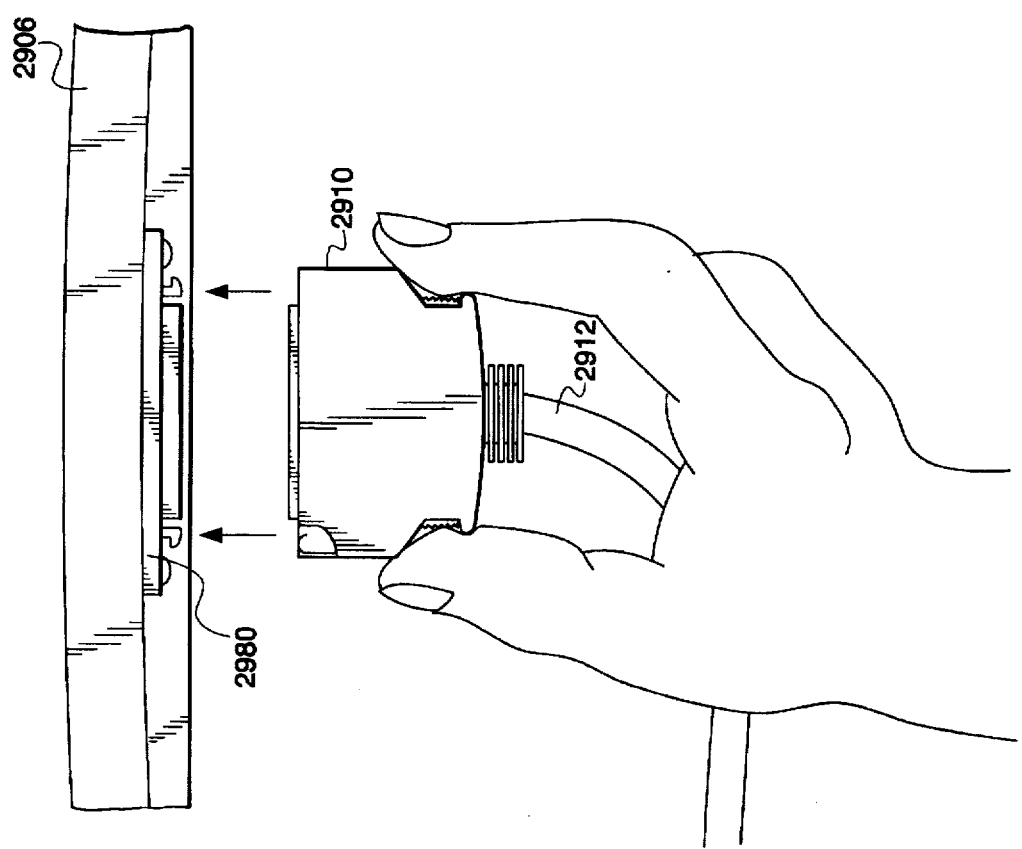

As mentioned above, removable LCD screen 2902 includes a latch assembly 2917. The latch assembly 2917 on the LCD screen is essentially the same as the latch assembly 2906 and includes a bracket 3032 (FIG. 112A) that is adapted to cooperate with the corresponding brackets 2998 (FIG. 112B) on the PC 102 as well as the brackets 2914 and 2916 on the LCD stand 2904. The latch assembly 2917 includes a slide member 3034 (FIGS. 103 and 104). In a portable mode of operation, the LCD screen 2902 is removed from the PC 102 by sliding the slide member 3034 outwardly in the direction of the arrows as shown in FIG. 97. The bracket 3032 on the LCD screen 2902 (FIG. 112A). With the slide members in a disengaged position as shown in FIGS. 97 and 109, the bracket 3032 on the LCD screen 2902 is then placed in engagement with the brackets 2998 on the PC 102 as discussed above and as illustrated in FIGS. 103 and 109. Once the brackets 2998 and 3032 are engaged as discussed above, the slide members 3034 are pushed toward one another in order to latch the LCD screen 2902 to the PC-102 as shown in FIGS. 104 and 110. Once the LCD screen 2902 is properly secured to the stand assembly 2904, the connector 2910 is placed into engagement with the connector 2980 (FIGS. 105, 107 and 108) on the adapter assembly 2906 as shown in FIGS. 107 and 108. In this configuration, the LCD screen 2902 is adapted to operate remotely from the PC 102 as shown in phantom in FIG. 98.

In order to return the LCD screen 2902 to the PC 102, the procedure is simply reversed. In particular, the slide members 3034 are pushed outwardly as shown in FIG. 112B to enable the LCD screen 2902 to be removed from the LCD stand assembly 2904. The connector 2910 is removed from the connector 2980 on the adapter assembly 2906 as shown in FIG. 108. The LCD screen 2902 is then oriented such that its brackets 3032 engage the corresponding brackets 2998 on the PC 102 as shown in FIG. 110. The slide members 3034 are then pushed inwardly to latch the LCD screen to the PC 102.

Modular Portable Personal Computer

Figure 117:
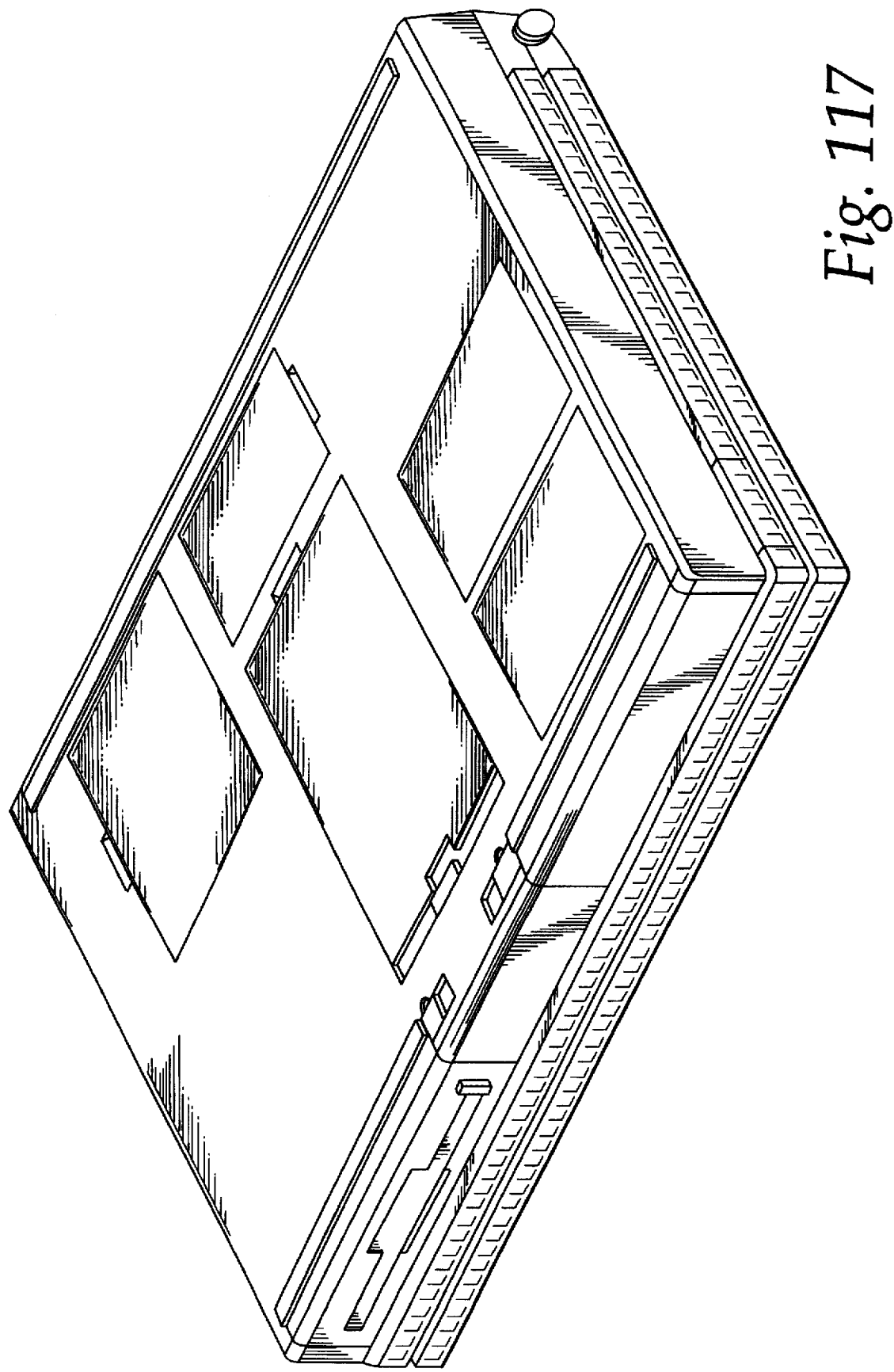
FIG. 117 is a perspective view of the bottom of the modular personal computer in accordance with the present invention.
Figure 118:
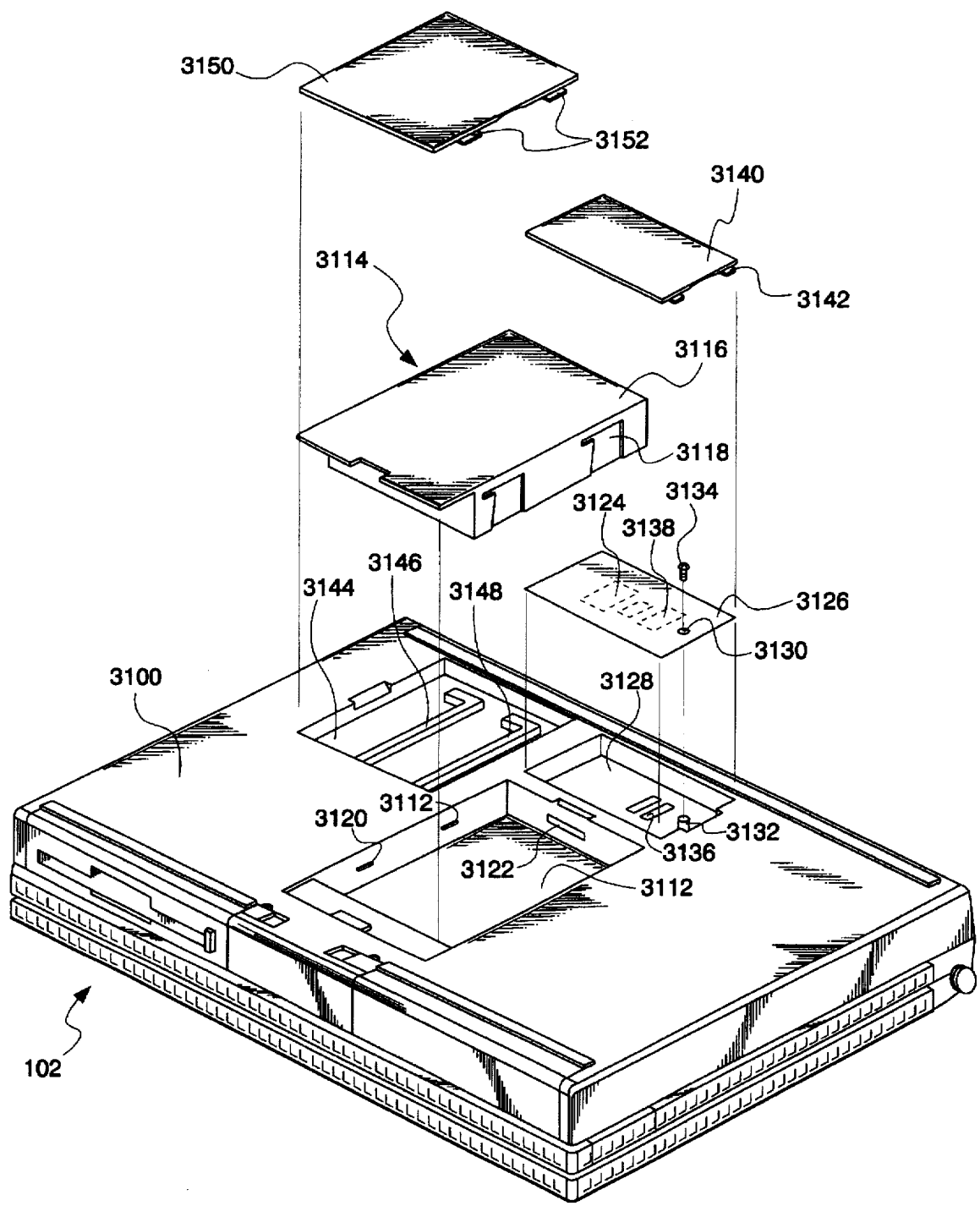
FIG. 118 is similar to FIG. 117 showing the modular devices removed.

In accordance with an important aspect of the invention, a modular portable personal computer is illustrated in FIGS. 1–3 and 116–118. As discussed above, the modular portable PC 102 includes one or more modular bays 141, 142 (FIG. 3) to enable modular devices, such as the modular battery pack 127 and/or a modular floppy disk drive 125 to be rather quickly and easily installed or removed from the PC 102. In addition, as illustrated in FIGS. 116–118, the modular portable PC 102 includes a plurality of compartments on a bottom surface 3100 of the modular portable PC 102 to enable various upgrade options to be rather quickly and easily incorporated into the modular portable PC 102.

Figure 119:
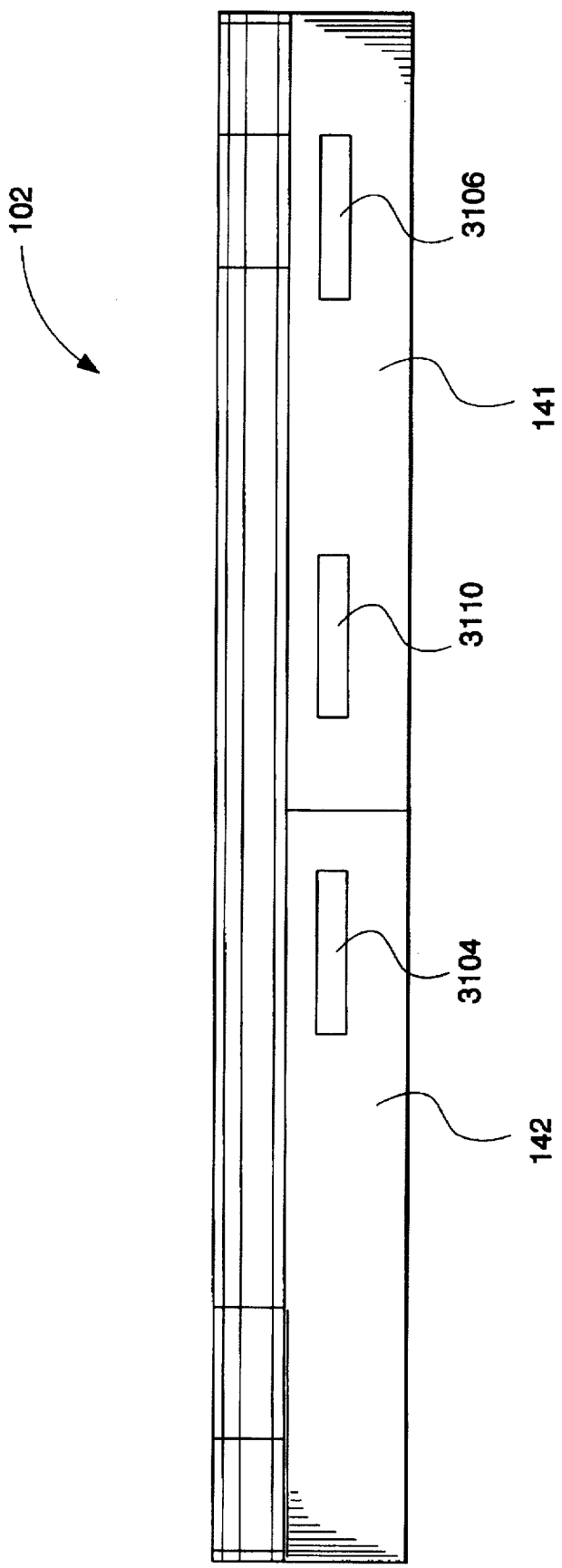
FIG. 119 is a front elevational view of the modular personal computer in accordance with the present invention illustrating the modular bays.

Referring to FIG. 3, a modular portable PC 102 is shown with two modular bays 141 and 142. It should be appreciated by those of ordinary skill in the art that the principles of the invention are applicable to modular portable PC's which have more or less than two bays, as shown. However, by way of example, the system will be described hereinafter showing the two modular bays 141 and 142. As discussed above, the bays 141 and 142 are formed as an interior cavity open to a front surface 3102 (FIG. 3) of the PC 102. As discussed above, the interior cavities are sized to receive either the modular battery pack 127 or the modular floppy disk drive 125 (FIG. 3), which may be formed with slightly different widths. In order to provide flexibility of the system, the cavities forming the modular bays 141 and 142 in the PC 102 are sized to enable either the flexible battery pack 127 or the modular floppy disk drive 125 to be interchangeably connected either to the PC 102 or the external flexible bay 116. As mentioned above, the modular bay 142 is adapted to receive the modular battery pack 127 while the modular bay 141 is adapted to receive either the modular battery pack 127 or the modular floppy disk drive 125. As best illustrated in FIG. 12, a modular battery pack 127 includes a connector 685 located adjacent the right rear portion of the housing 680. This connector 685 is adapted to mate with corresponding connectors 3104 (FIG. 119) in the modular bay 142, or the electrical connector 3106 in the modular bay 141. As shown in FIG. 116, the connectors 3104 and 3106 in the modular bays 142 and 141 are carried by the motherboard 3108 and are located toward the right in the rear of the bays 142 and 141 so as to enable connection with the corresponding connector 685 when the modular battery pack 125 is fully inserted into either bay 141 or 142 as shown in FIG. 2.

As mentioned above, the bay 141 is adapted to receive a modular battery pack 127 or a modular floppy disk drive 125 (FIG. 3). In order to accommodate the floppy disk drive 125, a connector 3110 (FIG. 116, 119) is located in the rear of the cavity 141 toward the left side to correspond with the location of the connector 696 (FIG. 15) on the modular floppy disk drive 125. With such a configuration, the bay 141 is used to interchangeably receive either a modular battery pack 125 or a modular floppy disk drive 127.

As discussed above, the bottom surface 3100 of the modular PC 102 includes a plurality of upgrade compartments. More particularly, a first compartment 3112 (FIG. 118) is shown for receiving a modular hard disk drive 3114. The modular hard disk drive 3114, for example a Model No. ST9235AG manufactured by Seagate, is disposed in a housing 3116 formed to be received within the cavity 3112. The housing 3116 for the floppy disk drive assembly 3114 is formed with a plurality of irregularly shaped slots 3118 that are adapted to cooperate with extending ribs 3120 formed in the interior of the cavity 3112. This configuration enables the floppy disk drive to rather quickly and easily be installed and secured to the PC 102. As shown in FIGS. 116 and 118, the rear portion of the cavity 3112 includes an electrical connector 3122. This electrical connector 3122 is adapted to mate with a corresponding electrical connector 3124 carried by the modular hard disk drive 3114. The configuration of the irregularly shaped slots 3118 enables connection of the electrical connector 3124 on the hard disk drive with the connector 3122 disposed in the rear of the cavity when the hard disk drive 3114 is fully inserted and moved rearwardly within the cavity 3112.

Another important aspect of the modular portable personal computer PC 102 is the ability to replace the CPU from the bottom surface 3100. In particular, the CPU 3124 is mounted on a printed circuit board 3126. The printed circuit board 3126 is sized to be received in a cavity 3128 formed in the bottom surface 3100 of the PC 102. A plated through aperture 3130 is formed on one end of the printed circuit board (PCB) 3126. This aperture 3130 enables the PCB 3126 to be secured to an extended threaded boss 3132 rigidly disposed in the interior cavity 3128 by way of a suitable fastener 3134. A multi-pin connector 3136 is formed in the base of the cavity 3128. As shown in FIG. 116, the multi-pin connector 3136 is carried by the motherboard 3108. The multi-pin connector 3136 on the motherboard 3108 is adapted to mate with a corresponding connector 3138 formed on the PCB 3126.

A cover 3140 is provided for closing the cavity 3128 after the PCB 3126 has been secured as described above. The cover 3140 may be formed with one or more tabs 3142 which correspond with mating elements (not shown) formed in the cavity 3128 in order to enable the cover 3140 to be latched in place. As should be clear, the configuration described above enables rather simple and easy replacement for upgrading of a CPU 3134.

Another important aspect of the invention relates to the facility in providing upgraded memory. In particular, another cavity 3144 is formed in the bottom surface 3100 of the PC 102. This cavity 3144 carries one or more multi-pin single in-line memory modular (SIMM) connectors 3146 and 3148. As shown best in FIG. 116, these SIMM connectors 3146 and 3148 are carried by the motherboard 3108. Thus, in order to add additional memory to the PC 102, additional SIMM's (not shown are inserted into the connectors 3146 and 3148.

A cover 3150 is provided for closing the cavity 3144. The cover may be formed with one or more extending tabs 3152, which cooperate with corresponding structure (not shown) within the cavity 3144 to latch the cover 3150 in place.

As mentioned above, the modular PC 102 also enables the LCD display 2902 to be removed. In particular, as described above, the LCD 2902 includes a connector 2920 (FIG. 103) that is adapted to mate with a corresponding connector 3150 (FIG. 111) on the rear portion of the PC 102 as described above. Such a configuration enables the removable LCD 2902 to be removed from the PC 102 and utilized with the portable presentation system 2900 as discussed above. As shown in FIG. 116, the connector 3150 may be carried by a sub-board 3152, which is connected to the motherboard 3108 by way of one or more connectors 3154. The connectors 3154 are adapted to mate with corresponding connectors 3156 on the motherboard 3108. The sub-board 3152 may be used for various other options, such as one or more PCMCIA interfaces 3154 and 3156. The sub-board 3152 may also be used to provide various other options, such as enhanced audio options. In particular, the sub-board 3152 may be provided with one or more connectors 3156 and 3158 for connection to an audio board 3160. The audio board 3160 may be used to provide various options for the PC 102. The audio board 3160 is provided with corresponding connectors 3160 and 3162, which are adapted to mate with the corresponding connectors 3156 and 3158 on the sub-board 3152. Although the sub-board 3156 and the audio board 3160 are not accessible from the exterior of the housing, such a configuration provides for modular configuration for various options and for maintenance replacements.

Obviously, many modifications and variations of the present invention are possible in light of the above teachings. Thus, it is to be understood that, within the scope of the appended claims, the invention may be practiced otherwise than as specifically described above.

APPENDIX A

.TITLE "(CHARGING CRADLE)"
.PL 60
.LINESIZE 132
.ROMSIZE 4
.VERS "ST6225"
.W_ON

| | | |
|---|---|---|
| v001 | .EQU | 10H |
| V002 | .EQU | 0FFFFH |
| V003 | .EQU | 0 |
| V004 | .EQU | V003 |
| X | .DEF | 80H!m |
| Y | .DEF | 81H!m |
| V | .DEF | 82H!m |
| W | .DEF | 83H!m |
| A | .DEF | 0FFH!m |
| V005 | .DEF | 0C0H |
| V006 | .DEF | 0C1H |
| V007 | .DEF | 0C2H |
| V005V171 | .DEF | 0C4H |
| V006V171 | .DEF | 0C5H |
| V007V171 | .DEF | 0C6H |
| V008 | .DEF | 0C8H |
| V009 | .EQU | 4 |
| V010 | .EQU | 5 |

APPENDIX A-continued

| | | |
|---|---|---|
| V011 | .EQU | 6 |
| V012 | .DEF | 0C9H |
| V005V172 | .DEF | 0CCH |
| V006V172 | .DEF | 0CDH |
| V007V172 | .DEF | 0CEH |
| V013 | .DEF | 0D0H |
| V014 | .DEF | 0D1H |
| V015 | .EQU | 4 |
| V016 | .EQU | 5 |
| V017 | .EQU | 6 |
| V018 | .EQU | 7 |
| V019 | .DEF | 0D2H |
| V020 | .DEF | 0D3H!m |
| V021 | .DEF | 0D4H |
| V022 | .EQU | 7 |
| V023 | .EQU | 6 |
| V024 | .EQU | 3 |
| V025 | .DEF | 0D8H |
| V005V173 | .EQU | 00000000B |
| V026 | .EQU | 11111111B |
| V027 | .EQU | 11111111B |
| V028 | .EQU | 7 |
| V029 | .EQU | 6 |
| V030 | .EQU | 5 |
| V031 | .EQU | 4 |
| V032 | .EQU | 3 |
| V033 | .EQU | 2 |
| V034 | .EQU | 1 |
| V035 | .EQU | 0 |
| V036 | .EQU | 00011111B |
| V006V173 | .EQU | 00110100B |
| V037 | .EQU | 00001011B |
| V038 | .EQU | 00001011B |
| V039 | .EQU | 0 |
| V040 | .EQU | 1 |
| V041 | .EQU | 2 |
| V042 | .EQU | 3 |
| V043 | .EQU | 4 |
| V044 | .EQU | 5 |
| V045 | .EQU | 6 |
| V046 | .EQU | 7 |
| V007V173 | .EQU | 01110000B |
| V047 | .EQU | 10000000B |
| V048 | .EQU | 00000000B |
| V049 | .EQU | 4 |
| V050 | .EQU | 5 |
| V051 | .EQU | 6 |
| V052 | .EQU | 7 |
| V053 | .EQU | 00000000B |
| V054 | .EQU | 1 << V009 |
| V055 | .EQU | 00010000B |
| V056 | .EQU | 07FH |
| V057 | .EQU | 10H |
| V058 | .EQU | 01101101B |
| V059 | .EQU | 41 |
| V060 | .EQU | 038H |
| V061 | .EQU | 0F0H |
| V062 | .EQU | 0F2H |
| V063 | .EQU | 0F3H |
| V064 | .EQU | 0F7H |
| V065 | .EQU | 0FEH |
| V066 | .EQU | 0FAH |
| V067 | .EQU | 0FBH |
| V068 | .EQU | 0FCH |
| V069 | .EQU | 0FDH |
| V070 | .EQU | 0FEH |
| V071 | .EQU | 0FFH |
| V072 | .DEF | 084H |
| V073 | .DEF | 085H |
| V074 | .DEF | 086H |
| V075 | .EQU | 0 |
| V076 | .EQU | 1 |
| V077 | .EQU | 2 |
| V078 | .EQU | 3 |
| V079 | .EQU | 4 |
| V080 | .EQU | 5 |
| V081 | .EQU | 11 |
| V082 | .DEF | 087H |
| V083 | .DEF | 088H |
| V084 | .DEF | 089H |
| V085 | .DEF | 08AH |
| V086 | .DEF | 08BH |
| V087 | .DEF | 08CH |
| V088 | .DEF | 08DH |
| V089 | .EQU | 4 |
| V090 | .DEF | 08EH |
| V091 | .EQU | 6 |
| V006V174 | .DEF | 08FH |
| V092 | .DEF | 090H |
| V093 | .EQU | 0 |
| V094 | .EQU | 1 |
| V095 | .EQU | 2 |
| V096 | .EQU | 3 |
| V097 | .EQU | 4 |
| V098 | .EQU | 5 |
| V099 | .EQU | 6 |
| V100 | .DEF | 091H |
| V101 | .EQU | 0 |
| V102 | .EQU | 1 |
| V103 | .EQU | 2 |
| V104 | .DEF | 092H |
| V105 | .EQU | 0 |
| V106 | .EQU | 1 |
| V107 | .EQU | 2 |
| V108 | .EQU | 3 |
| V109 | .EQU | 4 |
| V110 | .DEF | 093H |
| V111 | .DEF | 094H |
| V112 | .DEF | 095H |
| V113 | .DEF | 096H |
| V114 | .DEF | 097H |
| V005V174 | .DEF | 098H |
| V115 | .DEF | 099H |
| V098V175 | .EQU | 0C1H |
| V116 | .DEF | 09AH |
| V117 | .DEF | 09BH |
| V118 | .DEF | 09CH |
| | .MACRO | V119 V120,V121 |
| | CPI | A,V120 |
| | JRZ | $+3 |
| | JP | V121 |
| | .ENDM | |
| | .MACRO | V122 V120,V121 |
| | CPI | A,V120 |
| | JRNZ | V121 |
| | .ENDM | |
| | .MACRO | V123 V120,V121 |
| | CPI | A,V120 |
| | JRNC | V121 |
| | .ENDM | |
| | .MACRO | V124 V120,V121 |
| | CPI | A,V120 |
| | JRC | $+3 |
| | JP | V121 |
| | .ENDM | |
| | .MACRO | V125 V120,V121 |
| | CPI | A,V120 |
| | JRC | V121 |
| | .ENDM | |
| | .MACRO | V126 V120,V121 |
| | CP | A,V120 |
| | JRC | V121 |
| | .ENDM | |
| | .MACRO | V127 V120,V121 |
| | CPI | A,V120 |
| | JRNC | $+3 |
| | JP | V121 |
| | .ENDM | |
| | .MACRO | V128 V121 |
| | JRZ | $+3 |
| | JP | V121 |
| | .ENDM | |
| | .MACRO | V129 V121 |
| | JRNZ | $+3 |
| | JP | V121 |
| | .ENDM | |
| | .MACRO | V130 V121 |
| | JRC | $+3 |

APPENDIX A-continued

```
            JP      V121
            .ENDM
            .MACRO  V131    V121
            JRNC    $+3
            JP      V121
            .ENDM
            .MACRO  V132    V176,V121
            DEC     V176
            JRNZ    V121
            .ENDM
            .MACRO  V133    V176,V121
            DEC     V176
            JRZ     $+3
            JP      V121
            .ENDM
            .ORG    80H
V134:
            RETI
            LDI     V008,V053
            LDI     V025,0FEH
            LDI     V005V171,V027
            LDI     V005,V005V173
            LDI     V005V172,V026
            LDI     V006V171,V038
            LDI     V006,V006V173
            LDI     V006V174,V006V173
            LDI     V006V172,V037
            LDI     V007V171,V048
            LDI     V007,V007V173
            LDI     V007V172,V047
            LDI     V021,V058
            LDI     V019,V056
            LDI     V020,V057
            LDI     V014,V055
V137:       LDI     X,84H
            LDI     Y,0C0H
V138:       LDI     A,0
            LD      (X),A
            INC     X
            LD      A,X
            CP      A,Y
            JRNZ    V138
            LDI     V006V174,V006V173
            LDI     V113,10
            LDI     V072,8
            LDI     V073,V059
            LDI     V008,V054
V135:       LDI     V025,0FEH
            JRS     V101,V100,V139
            JRS     V102,V100,V140
            JRS     V103,V100,V143
            LD      A,V104
            JRZ     V136
            JP      V161TX
V136:       WAIT
            JP      V135
V139:       RES     V101,V100
            CALL    V145
            JP      V135
V140:       RES     V102,V100
            JRR     V096,V092,V142
            JRR     V040,V006,V141
            RES     V029,V112
            RES     V040,V006V174
            SET     V030,V112
            SET     V039,V006V174
            JP      V142
V141:       SET     V029,V112
            SET     V040,V006V174
            RES     V030,V112
            RES     V039,V006V174
V142:       LD      A,V006V174
            LD      V006,A
            SET     V097,V092
            JP      V135
V143:       RES     V103,V100
            JRS     V041,V006,V144
            SET     V094,V092
            JRS     V093,V092,V16020
            SET     V093,V092
            SET     V102,V100
            JP      V16020
V144:       JRS     V094,V092,V16012
            RES     V093,V092
V16012:     RES     V094,V092
V16020:     JRR     V049,V007,V16025
            RES     V096,V092
            JP      V16038
V16025:     JRS     V096,V092,V16030
            SET     V096,V092
            JRR     V044,V006,V16035
            JP      V16032
V16030:     JRR     V044,V006,V16035
            JRR     V095,V092,V16040
V16032:     RES     V095,V092
            SET     V040,V006V174
            SET     V029,V112
            RES     V039,V006V174
            RES     V030,V112
            JP      V16039
V16035:     JRS     V095,V092,V16040
            SET     V095,V092
V16038:     SET     V039,V006V174
            SET     V030,V112
            RES     V029,V112
            RES     V040,V006V174
V16039:     LD      A,V006V174
            LD      V006,A
            SET     V097,V092
V16040:     DEC     V073
            V128    V16099
            SET     V015,V014
            LDI     V073,V059
            SET     V043,V006V172
            LDI     X,V115
            CALL    V152
            RES     V043,V006V172
            RES     V015,V014
            CPI     A,V098V175
            JRNC    V16050
            JRS     V098,V092,V16053
            SET     V098,V092
            JP      V16052
V16050:     JRR     V098,V092,V16053
            RES     V098,V092
V16052:     JRR     V099,V092,V16053
            CALL    V151
V16053:     SET     V105,V104
V16099:     JP      V135
V161TX:     LD      A,V084
            JRS     V109,V104,V161T7
            V128    V161T9
            JRS     V105,V104,V161T1
            JRS     V106,V104,V161T2
            JRS     V107,V104,V161T3
            JRS     V108,V104,V161T4
            JP      V161T9
V161T1:     RES     V105,V104
            LDI     A,V064
            JP      V161T8
V161T2:     RES     V106,V104
            LDI     A,V060
            JP      V161T8
V161T3:     RES     V107,V104
            LDI     A,V062
            JP      V161T8
V161T4:     RES     V108,V104
            LDI     A,V063
            JP      V161T8
V161T7:     RES     V109,V104
V161T8:     LD      V084,A
            CALL    V149
V161T9:     JP      V135
V145:
            JRS     V076,V074,V146
            JRR     V075,V074,V16240
            RES     V075,V074
            JRR     V050,V007,V16230
```

APPENDIX A-continued

```
            LD      A,V087
            CPI     A,V070
            V129    V16290
V146:
            JRS     V077,V074,V16220
            SET     V077,V074
            SET     V109,V104
            JP      V16290
V16220:     RES     V076,V074
            LDI     A,V070
            JP      V16235
V16230:     LDI     A,V071
            LDI     V088,0
            RES     V099,V092
V16235:     LD      V,A
            RES     V077,V074
            JP      V148
V16240:     SET     V099,V092
V16241:     LD      A,V082
            LD      V,A
            LD      A,V084
            CPI     A,V060
            JRZ     V147
            CPI     A,V064
            JRZ     V148
            LD      A,V
            CPI     A,V066
            V128    V146
            JP      V16290
V147:
            LD      A,V
            LD      V088,A
            JP      V16280
V148:
            LD      A,V
            CP      A,V087
            V129    V16280
            LD      V087,A
            CALL    V151
            SET     V106,V104
V16250:     LD      A,V112
            ANDI    A,0FFH-V036
            LD      V112,A
            LDI     V110,0
            LDI     V111,0
            LD      A,V087
            LD      X,A
            CPI     A,V070
            JRC     V16251
            V128    V16259
            LD      A,V112
            ADDI    A,V036
            LD      V112,A
            LDI     V110,V036
            JP      V16259
V16251:     SET     V031,V112
            CPI     A,V067
            JRC     V16253
            JRZ     V16252
            SET     V031,V110
            JRNZ    V16253
V16252:     SET     V031,V111
            JP      V16259
V16253:     CPI     A,20
            JRC     V16254
            SET     V035,V112
            CPI     A,40
V16254:     JRC     V16255
            SET     V034,V112
            CPI     A,60
V16255:     JRC     V16256
            SET     V033,V112
            CPI     A180
V16256:     JRC     V16259
            SET     V032,V112
V16259:     SET     V097,V092
V16280:     LD      A,V084
            CPI     A,V060
            JRNZ    V16290
            CALL    V150
V16290:     LDI     V084,0
            RET
V149:
            RES     V075,V074
            RES     V076,V074
            SET     V079,V074
            LDI     V085,V081
            LD      V082,A
            LDI     Y,8
            LDI     X,1
V16310:     RLC     A
            JRNC    V16320
            INC     X
V16320:     DEC     Y
            JRNZ    V16310
            LDI     A,40H
            JRR     0,X,V16330
            LDI     A,0C0H
V16330:     LD      V083,A
            LDI     V090,V091
            SET     V045,V006V171
            RET
V150:
            LD      A,V087
            JRR     7,A,V16410
            CPI     A,V070
            JRNC    V16420
            JP      V16430
V16410:     CPI     A,95
            JRC     V16430
            JRS     V089,V088,V16499
V16420:     SET     V042,V006V174
            JP      V16490
V16430:     RES     V042,V006V174
V16490:     LD      A,V006V174
            LD      V006,A
V16499:     RET
V151:
            JRS     V098,V092,V16510
            SET     V108,V104
            JRNC    V16599
V16510:     SET     V107,V104
V16599:     RET
V152:
            SET     V016,V014
            SET     V018,V014
V16610:     WAIT
            JRR     V017,V014,V16610
            LD      A,V013
            LD      (X),A
            RET
V153:
            LD      V118,A
            JRS     V079,V074,V149V180
V145V180:
            DEC     V085
            LD      A,V085
            CPI     A,2
            JRNC    V16710
            JRR     V051,V006,V16730
            INC     V086
            JP      V16730
V16710:     JRR     V051,V006,V16720
            INC     V086
V16720:     LD      A,V082
            RLC     A
            LD      V082,A
V16730:     LD      A,V085
            V128    V154
            LDI     V090,0
            JRR     V080,V074,V16740
            RES     V080,V074
            SET     V075,V074
            JP      V16750
V16740:     JRR     0,V086,V16750
            SET     V076,V074
V16750:     SET     V101,V100
            JP      V154
```

APPENDIX A-continued

```
V149V180:
         LD    A,V083
         RLC   A
         LD    V083,A
         LD    A,V082
         RLC   A
         LD    V082,A
         JRNC  V16810
         RES   V045,V006V171
         JRC   V16820
V16810:  SET   V045,V006V171
V16820:  DEC   V085
         JRNZ  V16890
         RES   V045,V006V171
         JRR   V045,V006,V16830
         SET   V080,V074
V16830:  LDI   V085,V081
         RES   V079,V074
         LDI   V086,0
V16890:  LDI   V090,V091
V154:
         LDI   A,20
V16995:  JRS   V046,V006,V16999
         DEC   A
         JRNZ  V16995
V16999:  LD    A,V118
         RETI
V155:
         RES   V022,V021
         LDI   V020,V057
         LD    V116,A
         LD    A,X
         LD    V117,A
         LD    A,V005V174
         JRS   0,V072,V17000
         COM   A
V17000:  LD    V005,A
         DEC   V072
         V128  V17090
         LDI   V072,8
         LD    A,V110
         JRNZ  V17010
         LD    A,V111
         JRNZ  V17010
         LDI   V114,0
         JP    V17011
V17010:  DEC   V113
         JRNZ  V17011
         INC   V114
         LDI   V113,5
         JP    V17020
V17011:  JRR   V097,V092,V17025
V17020:  RES   V097,V092
         LDI   X,0FFH
         JRR   0,V114,V17021
         LD    A,V110
         COM   A
         LD    X,A
V17021:  JRR   1,V114,V17022
         LD    A,V111
         COM   A
         AND   A,X
         LD    X,A
V17022:  LD    A,X
         AND   A,V112
         LD    V005V174,A
V17025:  SET   V103,V100
         LD    A,V090
         JRZ   V17090
         DEC   V090
         JRNZ  V17090
         SET   V075,V074
         RES   V045,V006V171
         SET   V101,V100
V17090:  LD    A,V117
         LD    X,A
         LD    A,V116
         RETI
V156:
```

APPENDIX A-continued

```
         RETI
V157:
         RES   V018,V014
         RETI
V158:
         RETI
         .ORG  0F9CH
         NOP
V159:
         WAIT
         JP    V159
         .ORG  0FF0H
         JP    V157
         JP    V155
         JP    V153
         JP    V158
         .ORG  0FFCH
         JP    V156
         JP    V134
         .END
```

What is claimed and desired to be secured by Letters Patent of the United States is:

1. An active port replicator having a data bus and an address bus, the active port replicator for replicating ports on a portable personal computer comprising:
   one or more predetermined replicated I/O ports for connection to one or more external I/O devices;
   means for enabling said one or more replicated I/O ports on said active port replicator to mate with corresponding ports on said portable personal computer;
   means for electrically connecting one or more predetermined interfaces to the data bus and the address bus for use by said portable personal computer, said predetermined interfaces including a PCMCIA interface for removably receiving one or more PCMCIA cards; and
   means for automatically electrically disconnecting said PCMCIA interface from the data bus and the address bus when power supply voltage in said personal computer is less than a predetermined value.

2. An active port replicator as recited in claim 1, further including means for disconnecting said one or more predetermined interfaces from said portable personal computer under predetermined conditions.

3. An active port replicator as recited in claim 2, wherein said disconnecting means includes means for sensing the power supply voltage available at said portable personal computer when said active port replicator is docked to said portable personal computer and wherein said disconnecting means includes means for disconnecting said one or more predetermined interfaces from said portable personal computer when said power supply voltage at said portable personal computer is less than a predetermined value and reconnecting said one or more predetermined interfaces when said power supply voltage is greater than said predetermined value.

4. An active port replicator as recited in claim 1, wherein one of said interfaces is a network interface for enabling said portable personal computer to be connected to a local area network in a desktop application.

5. An active port replicator as recited in claim 1, wherein one of said interfaces is a PCMCIA interface.

6. An active port replicator as recited in claim 1, wherein one of said predetermined replicated I/O ports is a parallel port.

7. An active port replicator as recited in claim 1, wherein one of said predetermined replicated I/O ports is a serial port.

8. An active port replicator as recited in claim 1, wherein one of said predetermined replicated I/O ports is a video port.

9. An active port replicator as recited in claim 1, wherein one of said predetermined replicated I/O ports is a power port.

10. An active port replicator as recited in claim 1, wherein one of said predetermined replicated I/O ports is a type PS/2 port.

11. An active port replicator as recited in claim 10, wherein one of said predetermined replicated I/O ports is a second type PS/2 port.

12. An active port replicator as recited in claim 1, further including means for communicating to said portable personal computer that said active port replicator is connected to said portable personal computer.

13. An active port replicator having a data bus and an address bus for replicating ports on a portable personal computer, comprising:

a housing, said housing including means for enabling the data bus and the address bus to removably receive one or more predetermined interface cards for use by the portable personal computer;

means for replicating one or more ports on a portable personal computer, said replicating means including one or more connectors for enabling said replicated ports to be connected to external I/O devices; said connectors being disposed so as to be accessible from the outside of said housing;

means for enabling communication with one or more ports in said portable personal computer to be replicated, said enabling means including one or more connectors adapted to be connected with one or more predetermined mating connectors on said portable personal computer;

one or more guides for aligning said connector on said personal computer and said active port replicator; and means for latching said portable personal computer and said active port replicator when said connector on said port replicator is properly inserted and means for electrically disconnecting said predetermined one or more interface cards from said data bus and the address bus when voltage in said personal computer is below a predetermined value.

14. An active port replicator as recited in claim 13, further including means for providing one or more predetermined interfaces, said enabling means adapted to be disposed within said housing.

15. An active port replicator as recited in claim 14, wherein one of said predetermined interfaces is a network interface.

16. An active port replicator as recited in claim 14, wherein one of said predetermined interfaces is a PCMCIA interface.

17. An active port replicator as recited in claim 14 wherein said one or predetermined interfaces are formed as modular units.

18. An active port replicator having a data bus and an address bus, the active port replicator for replicating ports on a portable personal computer comprising:

one or more predetermined replicated I/O ports for connection to one or more external I/O devices;

means for enabling said one or more replicated I/O ports on said active port replicator to mate with corresponding ports on said portable personal computer;

means for electrically connecting one or more predetermined interfaces to the data bus and the address bus for use by said portable personal computer, said predetermined interfaces including a network interface card; and means for automatically electrically disconnecting said network interface card from the data bus and the address bus when power supply voltage in said personal computer is less than a predetermined value.

* * * * *

UNITED STATES PATENT AND TRADEMARK OFFICE
CERTIFICATE OF CORRECTION

PATENT NO. : 5,687,387
DATED      : November 11, 1997
INVENTOR(S): Endejan, et. al.

It is certified that error appears in the above-identified patent and that said Letters Patent is hereby corrected as shown below:

Title page, item ]57], Abstract, line 4, "printers" should be --printer--.

line 12, after "easily" insert-- be--.

Signed and Sealed this

Second Day of June, 1998

Attest:

BRUCE LEHMAN

Attesting Officer

Commissioner of Patents and Trademarks